United States Patent [19]
Nakagawa et al.

[11] Patent Number: 6,014,096
[45] Date of Patent: Jan. 11, 2000

[54] DATA DECODING METHOD AND DEVICE

[75] Inventors: Toshiyuki Nakagawa, Kanagawa; Hiroyuki Ino, Chiba; Shunji Yoshimura; Shinichi Kai, both of Tokyo; Yoshihide Shimpuku, Kanagawa; Michihiko Iida, Kanagawa; Tetsuji Kawashima, Kanagawa; Shoji Sato, Kanagawa, all of Japan

[73] Assignee: Sony Corporation, Tokyo, Japan

[21] Appl. No.: 08/947,429

[22] Filed: Oct. 8, 1997

[30] Foreign Application Priority Data

Oct. 11, 1996 [JP] Japan ................................ 8-270340

[51] Int. Cl.[7] .......................... H03M 5/06; H03M 7/46; G11B 5/09
[52] U.S. Cl. ........................... 341/68; 360/48; 369/44.39
[58] Field of Search .................................. 341/58, 59, 68, 341/69, 70; 360/39, 48, 51, 24, 25, 26, 27; 369/43, 44.39

[56] References Cited

U.S. PATENT DOCUMENTS

| | | | |
|---|---|---|---|
| 4,211,997 | 7/1980 | Rudnick et al. | 371/38 |
| 5,231,544 | 7/1993 | Matsushige | 360/46 |
| 5,400,023 | 3/1995 | Ino et al. | 341/59 |
| 5,430,772 | 7/1995 | Lee et al. | 375/363 |
| 5,537,422 | 7/1996 | Shimpuku et al. | 371/42 |
| 5,701,310 | 12/1997 | Deguchi et al. | 371/30 |

OTHER PUBLICATIONS

Patent Abstracts of Japan, vol. 10, No. 52 (P–432), Feb. 28, 1985 & JP 60 195783 A (Ricoh KK), Oct. 4, 1985.

NN: "Encoding and Decoding Checking Arrangement for 2–7 Run Length Limited Codes" IBM Technical Disclosure Bulletin, vol. 23, No. 4, Sep. 1980, pp. 1635–1636, XP002092690 US.

Primary Examiner—Brian Young
Assistant Examiner—Peguy JeanPierre
Attorney, Agent, or Firm—Frommer Lawrence & Haug, LLP.; William S. Frommer

[57] ABSTRACT

If there is any portion in channel bit data obtained on converting a signal read out from a recording medium into a bi-level signal which fails to satisfy a condition concerning a minimum run length or a maximum run length of the same symbol, the channel bit data is corrected to improve the bit error rate to secure a skew margin. To this end, channel bit data not satisfying a minimum run length d' of the same symbol is detected by a (d'−1) detector 4 using n-tupled clocks obtained on n-tupling channel clocks of playback data by a bit clock generator 2, where n is an integer not less than 2. A correction position of the channel bit data having the run length of the same symbol equal to (d'−1) is designated by a correction bit position designating unit 5. A data correction unit 6 then corrects the channel bit data so that the minimum run length of the same symbol will be equal to d'.

224 Claims, 18 Drawing Sheets

FIG.11A PLAYBACK RF SIGNAL

FIG.11B CHANNEL CLOCK

FIG.11C DOUBLE CLOCK

FIG.11D CHANNEL CLOCK COMPARATE

FIG.11E DOUBLE CLOCK INFORMATION

FIG.11F NUMBER OF ITEMS MEMORY

FIG.11G 2T DETECTION

FIG.11H COMPARISON

FIG.11I CORRECTION BIT POSITION DESIGNATION

FIG.11J EXOR OUTPUT

FIG.11K CORRECTED OUTPUT

FIG.13A PLAYBACK RF SIGNAL
FIG.13B CHANNEL CLOCK
FIG.13C DOUBLE CLOCK
FIG.13D CHANNEL CLOCK COMPARATE
FIG.13E DOUBLE CLOCK INFORMATION
FIG.13F NUMBER OF ITEMS MEMORY
FIG.13G 2T DETECTION
FIG.13H COMPARISON
FIG.13I CORRECTION BIT POSITION DESIGNATION
FIG.13J EXOR OUTPUT
FIG.13K CORRECTED OUTPUT

DATA DECODING METHOD AND DEVICE

BACKGROUND OF THE INVENTION

FIELD OF THE INVENTION

This invention relates to a data decoding device for decoding an RF playback signal read out from a recording medium having recorded thereon the information using the run-length-limited code (RLL code) based on at least a comparison level for outputting channel bit data. More particularly, it relates to a data decoding method and a data decoding device in which, if there is a portion not satisfying the requirement for minimum run length (minimum continuation length) or maximum run length (minimum continuation length) of the same symbol in channel bit data, bits with high probability of bit error are selected based on the playback RF signal level at the time of level decision and the bits so selected are corrected for outputting channel bit data satisfying the requirement for minimum run length or maximum run length.

When transmitting data or when recording data on a recording medium, such as a magnetic disc, optical disc or a magneto-optical disc, data are modulated for suitability to transmission or recording. Among the techniques for modulation is a block code in which a data string is blocked into units made up of m×i bits, termed data words, which are then converted into code words of n×i bits in accordance with a suitable coding rule. If i=1, the resulting codes are fixed-length codes, whereas, if i can be selected from plural numbers, that if it is 2 or more and if imax (maximum value of i)=r is used for conversion, the code is the variable length code. The codes represented by the block coding are variable-length code (d, k; m, n; r), where i is the constraint length, r is the maximum constraint length and d and k denote the minimum run value and the maximum run value of '0's comprised between neighboring '1's in the code string, respectively.

As an illustrative example, the modulation system for a compact disc (CD) system is explained. The compact disc system employs an eight to fourteen modulation (EFM). After pattern conversion of 8-bit data words into 14-bit code words (channel bits), 3 merging bits are appended for decreasing dc components following EFM. The resulting data is recorded on the disc by NRZI. The EFM and appendage of the merging bits are carried out so that the conditions of the minimum run value of the logical level '0' of 2 and the maximum run value of the logical level '0's will be met. Therefore, the parameters of this modulation system are (2, 10; 8, 17; 1). If the bit length of the channel bits (recording waveform string) is T, the minimum length between transitions Tmin is 3 (=2+1)T. If the data length T data of the data string is Tdata, the window margin Tw is (m/n) X Tdata, its value being 0.47 (=8/17)T data.

After NRZI modulation, the minimum run length d' of the same symbol is d'=d+1=2+1=3, with the maximum run length being k'=k+1=10+1=11.

With the above compact disc system, if the pits are contracted on the optical disc, the recording density can be enhanced, in which case the minimum pit length corresponding to the minimum length between transition lengths Tmin is decreased. If this minimum pit length becomes excessively shorter than the spot size of the laser beam, the pits become difficult to detect, so that errors tend to be produced.

If, in the disc reproduction, skew is applied to the disc display surface, the error rate is worsened. The disc skew is classified into that in a tangential direction and that in a radial direction of the optical disc with respect to a plane of the objective lens normal to the optical axis of the lens. Of these, the skew in the tangential direction worsens the error rate relatively promptly. These skews lead to margin decrease in system designing.

The distribution of errors in the length of continuation of the same symbol has been checked with respect to the respective directions of the skew. The error with respect to the skew in the tangential direction mainly occurs in case of a shorter length of continuation of the same symbol. Thus, it has been found that the error rate has become worsened as a result of decoding the length of Tmin(d') to a length of Tmin-1(d'-1). It has also been found that if, in the above EFM modulation system, skew is produced in the tangential direction, there frequently occurs an error due to decoding of the minimum length between transitions Tmin of 3T into 2T, where T is the bit length in the recording waveform string.

On the other hand, some margin is allowed in disc asymmetry in disc manufacture such that it is necessary to take into account the fact that the playback waveform tends to become vertically asymmetrical with respect to the center level.

Among known correction methods by signal processing against worsened error rate is a viterbi decoding method. The viterbi decoding method, as one of the maximum likelihood decoding methods for reducing the encoding errors for retrieving the shortest geometrical distance, is to discard the less probable way and simplifying the retrieval of more likely values in decoding. With the viterbi decoding, it is possible to add an internal algorithm of compensating the minimum length between transitions Tmin.

However, the viterbi decoding method has a drawback that the memory length is large and the memory circuit becomes complex to increase the hardware scale. Moreover, with the viterbi decoding method, asymmetry needs to be removed, such that, in a system in which asymmetry is not allowed, such as optical disc, the circuit needs to be optimized with respect to asymmetry, thus further complicating the structure.

Thus, in a recording medium, such as an optical disc, there are occasions wherein the skew margin cannot be secured without difficulties. In particular, the skew margin is decreased in the tangential direction.

In addition, in the recording medium of high recording density, such as optical disc, the minimum length between transitions Tmin becomes difficult to reproduce in stability, thus lowering the error rate.

SUMMARY OF THE INVENTION

It is therefore an object of the present invention to provide a data decoding method and a data decoding device wherein, if there is any portion not meeting the requirements for minimum run length and maximum run length of the same symbol in the channel bits obtained on converting the signal read out from a recording medium into binary data, the channel bits are corrected in order to output channel bit data satisfying the requirements for minimum run length and maximum run length of the same symbol for improving the bit error rate and securing the skew margin.

In one aspect, the present invention provides a data decoding method for playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, in which the method includes the steps of generating n-tuples clocks obtained on n-tupling channel clocks of the playback data, detecting channel bit data having the run length of the same symbol equal to (d'−1) using the n-tupled clocks and designating a correction position for detected channel bit data having the run length of the same symbol equal to (d'−1) for correcting the channel bit data so that the run length of the same symbol will be equal to d'.

In another aspect, the present invention provides a data decoding method for playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, where d is a positive integer, in which the method includes the step of generating n-tupled clocks obtained on n-tupling channel clocks of the playback data, n being an integer not less than 2, detecting channel bit data having a run length of the same symbol following inverse NRZI modulation equal to (d−1), using the n-tupled clocks and designating a correction position of the channel bit data having the run length of detected "0"s equal to (d−1) for correcting channel bit data having the run length of "0"s equal to (d−1) so that the run length of "0"s will be equal to d.

In a further aspect, the present invention provides a data decoding method for playback data from a recording medium having recording codes recorded thereon, the recording codes being NRZI modulated codes having a maximum run length of "0"s between neighboring "1"s in a code string equal to k, the recording codes having a maximum run length of the same symbol following inverse NRZI modulation equal to k'=k+1, where k≧1 and k≧d, in which the method includes the steps of generating n-tupled clocks obtained on n-tupling channel clocks of the playback data, n being an integer not less than 2, detecting channel bit data having a run length of the same symbol equal to (k'+1), using the n-tupled clocks and designating a correction position of the detected channel bit data having the run length of the same symbol equal to (k'+1) for correcting channel bit data having the run length of the same symbol equal to (k'+1) so that the run length of the same symbol will be equal to k'.

In a further aspect, the present invention provides a data decoding method for playback data from a recording medium having recording codes recorded thereon, the recording codes being NRZI modulated codes having a maximum run length of "0"s between neighboring "1"s in a code string equal to k, the recording codes having a maximum run length of the same symbol following inverse NRZI modulation equal to k'=k+1, where k≧1 and k≧d, in which the method includes the steps of generating n-tupled clocks obtained on n-tupling channel clocks of the playback data, n being an integer not less than 2, detecting channel bit data having a run length of "0"s following inverse NRZI modulation equal to (k+1), using the n-tupled clocks, and designating a correction position of the detected channel bit data having the run length of "0"s equal to (k+1) for correcting channel bit data having the run length of "0"s equal to (k+1) by so that the run length of "0"s will be equal to k.

In a further aspect, the present invention provides a data decoding apparatus for playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, in which the apparatus includes a clock generator for n-tupling channel clocks of channel clocks, n being an integer not less than 2, a (d'−1) detector for detecting channel bit data having a run length of the same symbol equal to (d'−1), a correction bit position detector for outputting a correction bit position designating signal for designating a correction position for channel bit data having the run length of the same symbol equal to (d'−1) as detected by the (d'−1) detector and a data correction unit for correcting the channel bit data having the run length of the same symbol equal to (d'−1) as detected by the (d'−1) detector, based on the correction bit position designating signal of the correction bit position detector, so that the run length of the same symbol will be equal to d'.

In a further aspect, the present invention provides a data decoding apparatus for playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, in which the apparatus includes a clock generator for n-tupling channel clocks of channel clocks, n being an integer not less than 2, a (d−1) detector for detecting channel bit data having a run length of the same symbol following inverse NRZI modulation equal to (d−1), a correction bit position detector for outputting a correction bit position designating signal for designating a correction position for channel bit data having the run length of "0"s as detected by the (d−1) detector equal to (d−1) and a data correction unit for correcting the channel bit data having the run length of "0"s as detected by the (d−1) detector equal to (d−1), based on the correction bit position designating signal of the correction bit position detector, so that the run length of '0's will be equal to d.

In a further aspect, the present invention provides a data decoding apparatus for playback data from a recording medium having recording codes recorded thereon, recording codes being NRZI modulated codes having a minimum run length of "0"s between neighboring "1"s in a code string equal to d, recording codes having a minimum run length of the same symbol equal to d'=d+1, d being a positive integer, in which the apparatus includes a clock generator for n-tupling channel clocks of channel clocks, n being an integer not less than 2, a (d−1) detector for detecting channel bit data having a run length of the same symbol following inverse NRZI modulation equal to (d−1), a correction bit position detector for outputting a correction bit position designating signal for designating a correction position for channel bit data having the run length of "0"s as detected by (d−1) detector equal to (d−1) and a data correction unit for correcting the channel bit data having the run length of "0"s as detected by (d−1) detector equal to (d−1), based on the correction bit position designating signal of correction bit position detector, so that the run length of '0's will be equal to d.

In a further aspect, the present invention provides a data decoding apparatus for playback data from a recording medium having recording codes recorded thereon, the recording codes being NRZI modulated codes having a maximum run length of "0"s between neighboring "1"s in a code string equal to k, the recording codes having a maximum run length of the same symbol following inverse NRZI modulation equal to k'=k+1, where k≧1 and k≧d, in which the apparatus includes a clock generator for n-tupling channel clocks of channel clocks, n being an integer not less than 2, a (k'+1) detector for detecting channel bit data having a run length of the same symbol equal to (k'+1), a correction bit position detector for outputting a correction bit position designating signal for designating a correction position for channel bit data having the run length of the same symbol as detected by the (k'+1) detector equal to (k'+1) and a data correction unit for correcting the channel bit data having the run length of the same symbol as detected by the (k'+1) detector equal to (k'+1), based on the correction bit position designating signal of the correction bit position detector, so that the run length of the same symbol will be equal to k'.

In yet another aspect, the present invention provides a data decoding apparatus for playback data from a recording medium having recording codes recorded thereon, the recording codes being NRZI modulated codes having a maximum run length of "0"s between neighboring "1"s in a code string equal to k, the recording codes having a maximum run length of the same symbol following inverse NRZI modulation equal to k'=k+1, where k≧1 and k≧d, in which the apparatus includes a clock generator for n-tupling channel clocks of channel clocks, a (k+1) detector for detecting channel bit data having a run length of "0"s following inverse NRZI modulation equal to (k+1), a correction bit position detector for outputting a correction bit position designating signal for designating a correction position for channel bit data having the run length of "0"s as detected by the (k+1) detector equal to (k+1) and a data correction unit for correcting the channel bit data having the run length of "0"s as detected by the (k+1) detector equal to (k+1), based on the correction bit position designating signal of the correction bit position detector, so that the run length of "0"s will be equal to k.

DESCRIPTION OF THE PREFERRED EMBODIMENTS

Figure 1:
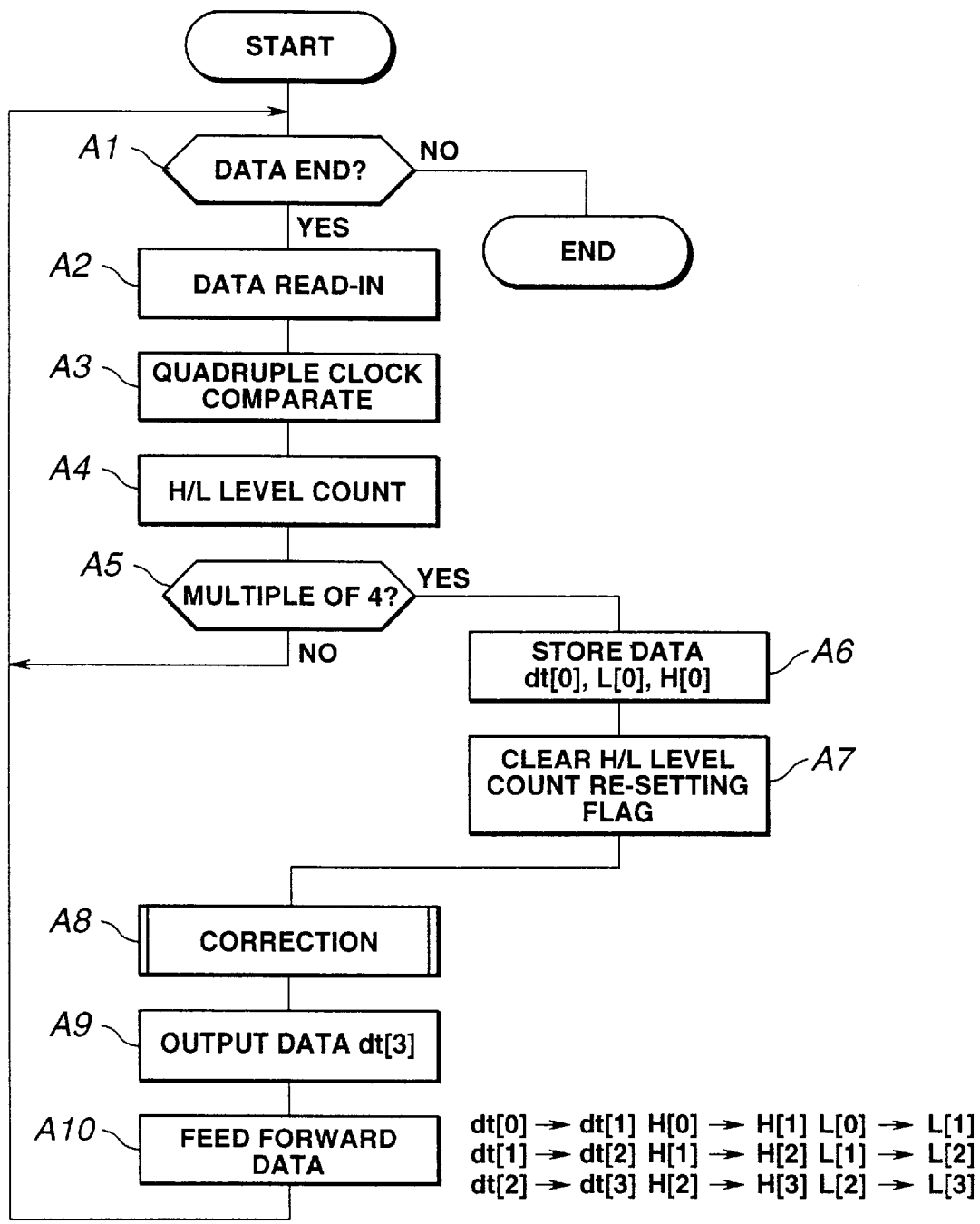
FIG. 1 is a flowchart showing a first embodiment of the data decoding method according to the present invention.

Referring to the drawings, a preferred embodiment of the present invention will be explained in detail. The preferred embodiment of the present invention will be explained taking an illustrative device configured for reproducing a NRZI modulated channel bit data string from an optical disc as a recording medium having recorded thereon bi-level (d, k) recording codes by NRZI modulation, using, as the recording code, the bi-level (d, k) recording code in which the minimum run length d of the same symbol is 2 and the maximum run length k of the same symbol is 10. The (d, k) recording code is an edge-specifying code and the channel bit data string following NRZI modulation is the code representing the shape of the pit after NRZI modulation. After the NRZI modulation, the minimum run length d' of the same symbol is d'=d+1=2+1=3, with the maximum run length k' of the same symbol being k'=k+1=10+1.

Figure 2:
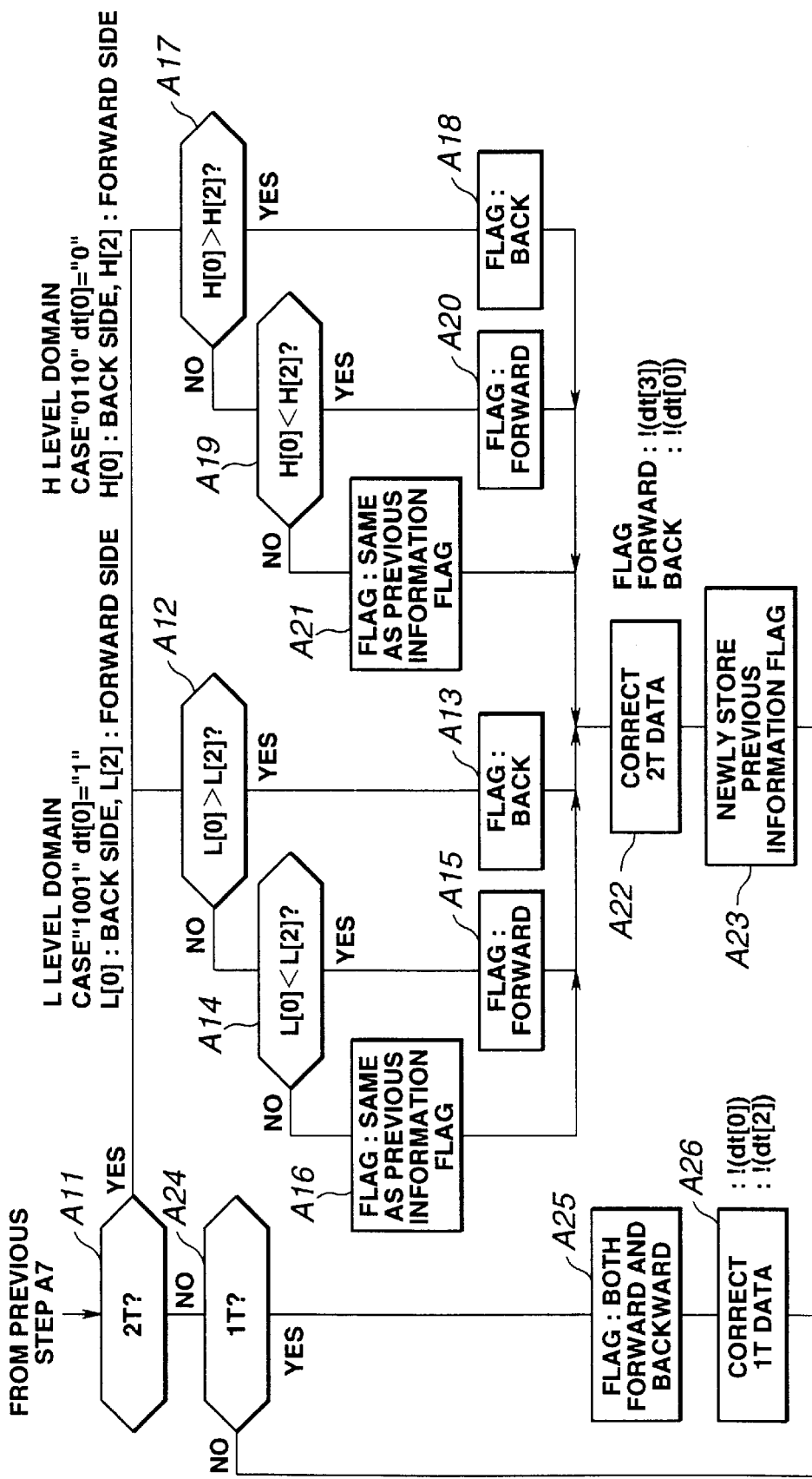
FIG. 2 is a flowchart showing the correction processing operation for the first embodiment shown in FIG. 1.

The data decoding method according to the present invention is carried out by a sequence of operations as indicated by flowcharts of FIGS. 1 and 2.

The data decoding method for playback data from a recording medium, having recording codes recorded thereon, the recording codes being NRZI modulated codes having a minimum run length of "0"s between neighboring "1"s in a code string equal to d, the recording codes having a minimum run length of the same symbol equal to d'=d+1, as shown in a flowchart of FIGS. 1 and 2, includes the steps of generating, as n-tuples clocks obtained on n-tupling channel clocks of the playback data, n being a positive integer, quadrupled clocks, with n then being 4, detecting channel bit data having the run length of the same symbol equal to (d'−1), using the quadrupled clocks, and designating a correction position for detected channel bit data having the run length of the same symbol equal to (d'−1), for correcting the channel bit data so that the run length of the same symbol will be equal to d'.

FIGS. 1 and 2 also partially include correcting channel bit data having a run length of the same symbol of (d'−2).

In the data decoding method, shown by the flowchart of FIG. 1, it is first judged at step A1 whether or not the playback data has come to a close. If the result of judgment at step A1 is NO, that is if the playback data has not come to a close, processing transfers to step A2 to read in playback data. If the result of judgment at step A1 is YES, that is if the playback data has come to a close, the decoding processing comes to a close.

At the next step A3, the playback data read-in at step A2 is compared to a pre-set comparison level and the comparison operation of splitting the playback data to two values of a H level and a L level with the pre-set comparison level as a boundary is carried out using quadrupled clocks.

At step A4, the value of the number of the H-level and that of the L-levels, obtained as a result of comparison at step A4, are counted. At step A5, it is judged whether or not the number of counts of the step A3 is a multiple of 4. If the result of judgment at step A5 is NO, that is if it is not a multiple of 4, processing reverts to step A1 to repeat the processing operations of the steps A1 to A4. If the result of judgment at step A5 is YES, that is if the count value is a multiple of 4, processing transfers to step A6.

At this step A6, (n+1) items of the domain information obtained on splitting the playback data into two values of H and L levels with the comparison level as the boundary are taken out with the channel clocks for storing the comparison level value dt[0], L-level count value L[0] and the H-level count value H[0].

At the next step A7, only the last comparison value portion of the H/L level count value is entered to set the H/L level count again while clearing the flag.

At the next step A8, only the portion of the channel bit data in need of correction is corrected in accordance with the flowchart of FIG. 2.

At the next step A9, data dt[3] is outputted. After sequentially feeding the data at step A10, processing reverts to step A1 to repeat the processing of steps A1 to A10.

At the above step A8, it is judged at step A11 of the flowchart of FIG. 2 whether or not the data is channel bit data having the length of 2T, that is channel bit data having the run length of the same symbol equal to (d'−1), where T is the bit length of the channel bit string.

If the result of judgment at step A11 is YES, that is if the data is the channel bit data with the run length of the same symbol equal to (d'−1), processing transfers to step A12 or A17 if the data is the channel bit data "1001" or "0110", respectively. If the result of judgment at step A11 is NO, that is if data is the channel bit data with the run length of the same symbol not equal to (d'−1), processing transfers to step A24.

At the next step A12, the L-level count values are compared in order to judge whether or not L[0]>L[2]. If the result of judgment at step A12 is YES, that is if L[0]>L[2], processing transfers to step A15 to set a flag to 'forward'. If the result of judgment at step A14 is NO, that is if L[0]>L[2], processing transfers to step A13 for setting the same flag as the previous information flag. If the result of judgment at step A12 is NO, that is if L[0] is not larger than L[2], processing transfers to step A14.

At the next step A14, the L-level count values are compared in order to judge whether or not L[0]<L[2]. If the result of judgment at step A14 is YES, that is if L[0]>L[2], processing transfers to step A15 to set a flag to 'forward'. If the result of judgment at step A14 is NO, that is if L[0] is not less than L[2], processing transfers to step A16 for setting the same flag as the previous information flag.

At step A17, H-level count values are compared to judge whether or not H[0]>H[2]. If the result of judgment at step A17 is NO, that is if L[0] is not less than L[2], processing transfers to step A16 for setting the same flag as the previous information flag.

At the above step A17, H-level count values are compared to judge whether or not L[0]<L[2]. If the result of judgment at step A17 is YES, that is if L[0]>L[2], processing transfers to step A18 for setting the flag to 'backward'. Conversely, if the result of judgment is NO, that is if H(0) is not larger than H[2], processing transfers to step A19.

At the above step A19, H-level count values are compared to judge whether or not L[0]<L[2]. If the result of judgment at step A149 is YES, that is if H[0]<H[2], processing transfers to step A20 for setting the flag to 'forward'. If the result of judgment at step A19 is NO, that if H[0] is not less than H[2], processing transfers to step A21 for setting the same flag as the previous information flag.

At the next step A22, the 2T data is corrected in accordance with a flag set by processing of the above steps A12 to A21. At step A23, the previous information flag is newly stored.

At step A24, it is judged whether or not the data is the channel bit data of 1T, that is the channel bit data having the run length of the same symbol equal to (d'−2).

If the result of judgment at step A24 is YES, that is if the channel bit data has the run length of the same symbol of (d'−2), the flag is set to 'forwards and backward' at step A25. At step A26, 1T data is corrected in accordance with the flag.

If the result of judgment at step A24 is NO, that is if the channel bit data is not of the run length of the same symbol of (d'−1) nor (d'−2), processing for step A8 is terminated without correcting the channel bit data.

That is, in the data decoding method according to the present invention for decoding playback data from a recording medium having recorded thereon NRZI modulated recording codes having a minimum run length of "0"s between neighboring "1"s in a code string equal to d, the recording codes having a minimum run length of the same symbol equal to d'=d+1, n-tuples clocks are generated by n-tupling channel clocks of the playback data, channel bit data having the run length of the same symbol equal to (d'−1) are detected using the n-tupled clocks and a correction position for detected channel bit data having the run length of the same symbol equal to (d'−1) is designated for correcting the channel bit data so that the run length of the same symbol will be equal to d'. This reduces data decoding error in the vicinity of the minimum length between transitions Ymin for improving the bit error rate.

For example, by decoding the playback RF signal read out from the recording medium into channel bit data at at least one comparison level for correcting the channel bit data with the run length of the same symbol equal to d', the data decoding error in the vicinity of the minimum length between transitions Tmin may be decreased for improving the bit error rate.

In decoding playback RF signals read out from a recording medium at at least ne comparison level into channel bit data, the bit information obtained by bit data of a given channel clock and bit data of the next channel clock and n-tupled clocks sandwiched in-between is split with a comparison level as the boundary into the H-level and the L-level to give (n+1) items of the domain information for designating a correction position of channel bit data having a run length of the same symbol equal to (d'−1). This corrects channel bit data having a run length of the same symbol equal to (d'−1) so that the run length of the same symbol will be equal to d' to reduce data decoding errors in the vicinity of the minimum length between transitions Tmin to improve the bit error rate.

Also, in decoding playback RF signals read out from a recording medium at at least one comparison level into channel bit data, (n+1) items of the domain information from the bit information obtained by bit data of a given channel clock and next bit data of the next channel clock and n-tupled clocks sandwiched in-between a r e held on memory for designating a correction position of channel bit data having a run length of the same symbol equal to (d'−1). This corrects channel bit data having a run length of the same symbol equal to (d'−1) so that the run length of the same symbol will be equal to d'.

In decoding playback RF signals read out from a recording medium at at least one comparison level into channel bit data, the bit information obtained by bit data of a given channel clock and bit data of the next channel clock and n-tupled clocks sandwiched in-between is split with a comparison level as the boundary into the H-level and the L-level to give (n+1) items of the domain information, such that (n+1) items of the domain information by the bit information obtained by channel bit data directly previous to a (d'−1) domain and next channel bit data and n-tupled clocks sandwiched in-between are compared to (n+1) items of the domain information by the bit information obtained from channel bit data directly following the (d'−1) domain, previous channel bit data and n-tupled clocks sandwiched in-between to select a correction bit position which is designated. This corrects channel bit data having a run length of the same symbol equal to (d'−1) so that the run length of the same symbol will be equal to d'.

In decoding playback RF signals read out from a recording medium at at least one comparison level into channel bit data, the bit information obtained by bit data of a given channel clock and bit data of the next channel clock and n-tupled clocks sandwiched in-between is split with a comparison level as the boundary into the H-level and the L-level to give (n+1) items of the domain information, such that (n+1) items of the domain information by the bit information obtained by channel bit data directly previous to a (d'−1) domain and next channel bit data and n-tupled clocks sandwiched in-between and (n+1) items of the domain information by the bit information obtained from channel bit data directly following the (d'−1) domain, previous channel bit data and n-tupled clocks sandwiched in-between are split respectively into H-levels and L-levels with a comparison level as a boundary and a correction bit position as selected depending on the magnitude of the H-levels or L-levels is designated. This corrects channel bit data having a run length of the same symbol equal to (d'−1) so that the run length of the same symbol will be equal to d'.

In decoding playback RF signals read out from a recording medium at at least one comparison level into channel bit data, the bit information obtained by bit data of a given channel clock and bit data of the next channel clock and n-tupled clocks sandwiched in-between is split with a comparison level as the boundary into the H-level and the L-level to give (n+1) items of the domain information, such that (n+1) items of the domain information by the bit information obtained by channel bit data directly previous to a (d'−1) domain and next channel bit data and n-tupled clocks sandwiched in-between and (n+1) items of the domain information by the bit information obtained from channel bit data directly following the (d'−1) domain, previous channel bit data and n-tupled clocks sandwiched in-between are split respectively into H-levels and L-levels with a comparison level as a boundary and a side with a larger number of the H-levels is designated as a correction bit position if the (d'−1) domain is of the H-level and a side with a larger number of the H-levels is designated as a correction bit position if the (d'−1) domain is of the H-level. This corrects channel bit data having a run length of the same symbol equal to (d'−1) so that the run length of the same symbol will be equal to d'.

In decoding playback RF signals read out from a recording medium at at least one comparison level into channel bit data, the bit information obtained by bit data of a given channel clock and bit data of the next channel clock and n-tupled clocks sandwiched in-between is split with a comparison level as the boundary into the H-level and the L-level to give each (n+1) items of the domain information, such that (n+1) items of the domain information by the bit information obtained by channel bit data directly previous to a (d'−1) domain and next channel bit data and n-tupled clocks sandwiched in-between and (n+1) items of the domain information by the bit information obtained from channel bit data directly following the (d'−1) domain, previous channel bit data and n-tupled clocks sandwiched in-between are split respectively into H-levels and L-levels with a comparison level as a boundary and the number of the L-levels or that of the H-levels is used for designation as a correction bit position. This corrects channel bit data having a run length of the same symbol equal to (d'−1) so that the run length of the same symbol will be equal to d'.

In decoding playback RF signals read out from a recording medium at at least one comparison level into channel bit data, the bit information obtained by bit data of a given channel clock and bit data of the next channel clock and n-tupled clocks sandwiched in-between is split with a comparison level as the boundary into the H-level and the L-level to give (n+1) items of the domain information, such that (n+1) items of the domain information by the bit information obtained by channel bit data directly previous to a (d'−1) domain and next channel bit data and n-tupled clocks sandwiched in-between and (n+1) items of the domain information by the bit information obtained from channel bit data directly following the (d'−1) domain, previous channel bit data and n-tupled clocks sandwiched in-between are split respectively into H-levels and L-levels with a comparison level as a boundary and, if the number of "0"s on transition from the L level to the H level is larger than the number of "0"s on transition from the H level to the L level, the backward side of the (d'−1) domain is designated as the correction bit position, whereas, if the number of "0"s on transition from the H level to the L level is larger than the number of "0"s on transition from the L level to the H level, the forward side of the (d'−1) domain is designated as the correction bit position. This corrects channel bit data having a run length of the same symbol equal to (d'−1) so that the run length of the same symbol will be equal to d'.

In decoding playback RF signals read out from a recording medium at at least one comparison level into channel bit data, the bit information obtained by bit data of a given channel clock and bit data of the next channel clock and n-tupled clocks sandwiched in-between is split with a comparison level as the boundary into the H-level and the L-level to give (n+1) items of the domain information, such that (n+1) items of the domain information by the bit information obtained by channel bit data directly previous to a (d'−1) domain and next channel bit data and n-tupled clocks sandwiched in-between and (n+1) items of the domain information by the bit information obtained from channel bit data directly following the (d'−1) domain, previous channel bit data and n-tupled clocks sandwiched in-between are split respectively into H-levels and L-levels with a comparison level as a boundary and, if the number of "1"s on transition from the H level to the L level is larger than the number of "1"s on transition from the L level to the H level, the backward side of the (d'−1) domain is designated as the correction bit position, whereas, if the number of "1"s on transition from the L level to the H level is larger than the number of "1"s on transition from the H level to the L level, the forward side of the (d'−1) domain is designated as the correction bit position. This corrects channel bit data having a run length of the same symbol equal to (d'−1) so that the run length of the same symbol will be equal to d'.

In decoding playback RF signals read out from a recording medium at at least one comparison level into channel bit data, the bit information obtained by bit data of a given channel clock and bit data of the next channel clock and n-tupled clocks sandwiched in-between is split with a comparison level as the boundary into the H-level and the L-level to give (n+1) items of the domain information, such that (n+1) items of the domain information by the bit information obtained by channel bit data directly previous to a (d'−1) domain and next channel bit data and n-tupled clocks sandwiched in-between and (n+1) items of the domain information by the bit information obtained from channel bit data directly following the (d'−1) domain, previous channel bit data and n-tupled clocks sandwiched in-between are split respectively into H-levels and L-levels with a comparison level as a boundary and, if the domain information for the H levels and that for the L-levels is the same, the correction bit position is designated based on the previous correction bit position held on memory. This again corrects channel bit data having a run length of the same symbol equal to (d'−1) so that the run length of the same symbol will be equal to d'.

Figure 3:
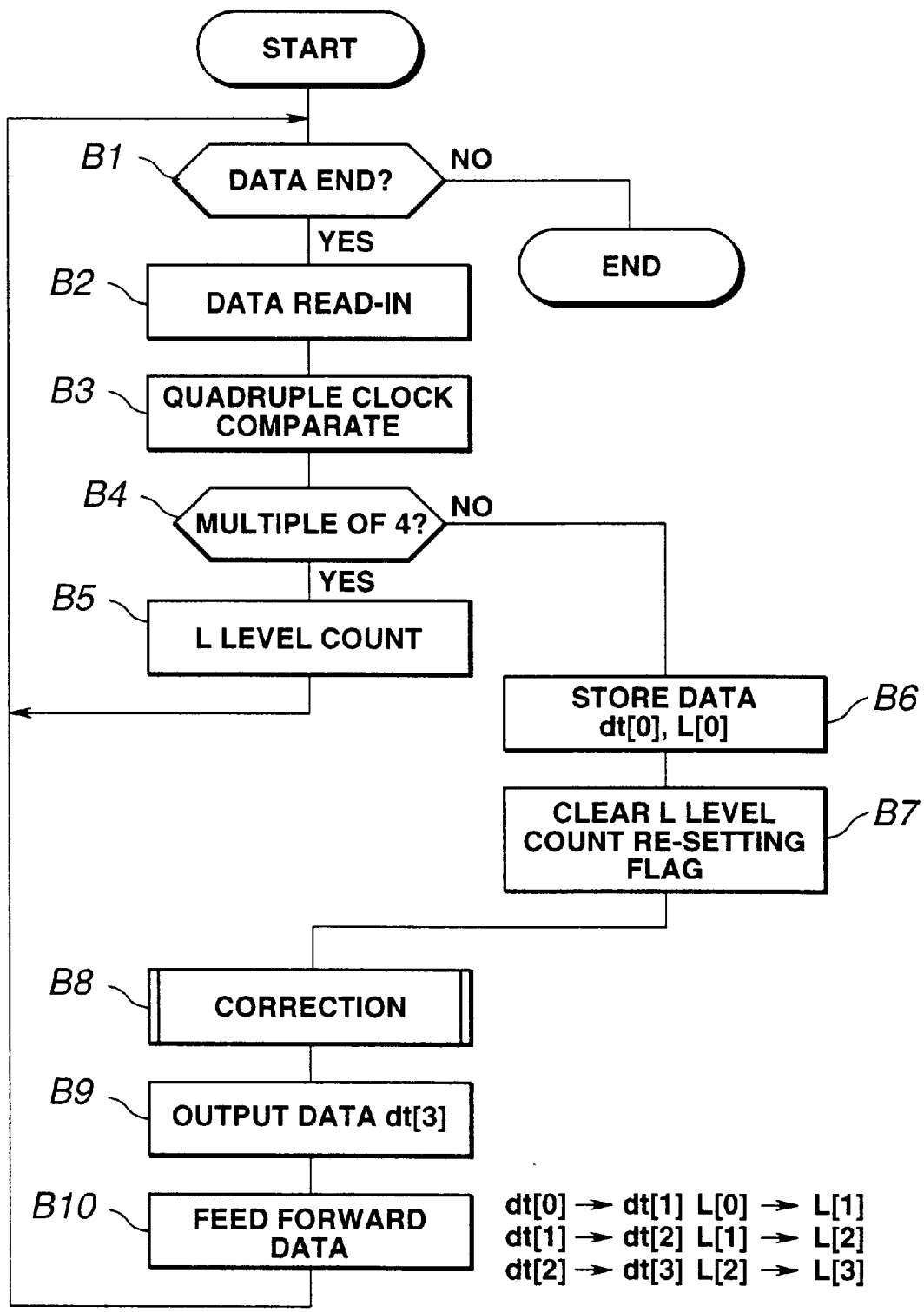
FIG. 3 is a flowchart showing a second embodiment of the decoding method of the present invention.
Figure 4:
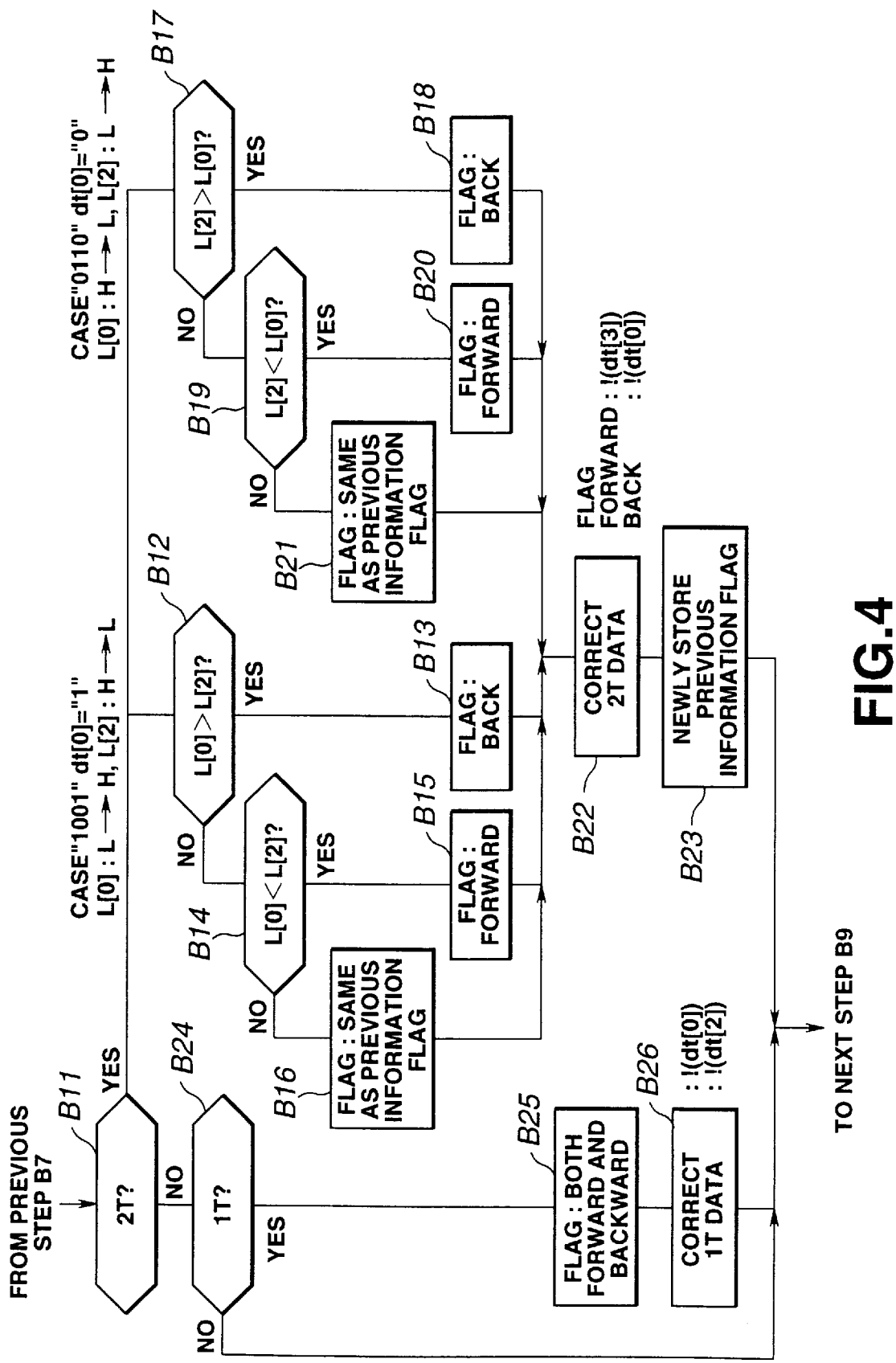
FIG. 4 is a flowchart showing the correction processing operation for the above second embodiment.

The data decoding method according to the present invention is carried out by a sequence of operations shown by flowcharts of FIGS. 3 and 4.

The data decoding method for playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, as shown in a flowchart of FIGS. 3 and 4, includes the steps of generating, as n-tuples clocks obtained on n-tupling channel clocks of the playback data, n being a positive integer, quadrupled clocks, with n then being 4, detecting channel bit data having the run length of the same symbol equal to (d'−1) using the quadrupled clocks, and designating a correction position for detected channel bit data having the run length of the same symbol equal to (d'−1) for correcting the channel bit data so that the run length of the same symbol will be equal to d'.

In the data decoding method shown by the flowchart of FIG. 3, it is first judged at step B1 whether or not the playback data has come to a close. If the result of judgment at step B1 is NO, that is if the playback data has not come to a close, processing transfers to step B2 to read-in playback data. If the result of judgment at step B1 is YES, that is if the playback data has come to a close, the decoding processing is terminated.

At the next step B3, the playback data read-in at step B2 is compared to a pre-set comparison level and the playback data is split into two levels of H-level and L-level, with the pre-set comparison level as a boundary, using quadrupled clocks.

At step B4, it is judged whether the count value of the step B3 is a multiple of 4. If the result of check at step B4 is NO, that is if the count value is not a multiple of 4, processing transfers to step B5 to count the number of L-levels obtained by the comparison at step B3 before processing reverts to step B1 for repeatedly carrying out the processing is of the steps B1 to B5. If the result of judgment at step B4 is YES, that is if the above count value is a multiple of 4, processing transfers to step B6.

At this step B6, the (n−1) items of the domain information obtained on splitting the playback data into the H level and the L-level by channel clocks with the comparison level as the boundary for storage of the comparator level dt[0] and the level count value L[0].

At the next step B7, the level count is cleared, at the same time as the flag is cleared.

At the next step B8, the channel bit data portion in need of correction is corrected in accordance with the sequence of operations shown in FIG. 4.

Moreover, at step B9, data dt[3] is outputted. After sequentially feeding data at step B10, processing reverts to step B1 for repeatedly executing the processing of steps B1 to B10.

At the above step B8, it is first judged at step B11, as shown in a flowchart of FIG. 4, whether or not the data is the channel bit data having the bit length equal to 2T, where T is the bit length of the channel bit string, that is channel bit data having a run length of the same symbol equal to (d'−1).

For channel bit data for which the result of decision at the above step B11 is YES, that is for channel bit data having a run length of the same symbol equal to (d'−1), processing transfers to step B12 or to B17 if the channel bit data is "1001" or "0110", respectively. For channel bit data for which the result of decision at the above step B11 is NO, that is for channel bit data having a run length of the same symbol not equal to (d'−1), processing transfers to step B24.

At the above step B12, the L level count values are compared for judging whether or not L[0]>L[2]. If the result of decision at step B12 is YES, that is if L[0]>L[2], processing transfers to step B13 for setting the flag to 'backward'. If the result of decision at step B12 is NO, that is if L[0] is not larger than L[2], processing transfers to step S14.

At the above step B14, the L level count values are compared for judging whether or not L[0]<L[2]. If the result of decision at step B14 is YES, that is if [0]<L[2], processing transfers to step B15 for setting the flag to 'forward'. If the result of decision at step B14 is NO, that is if L[0]1 is not less than L[2], processing transfers to step B16 for setting the same flag as the previous information flag.

At step B17, the L-level count values are compared in order to check whether or not L[2]>L[0]. If the result of judgment at step B17 is YES, that is if L[2]>L[0], processing transfers to step B18 to set the flag to 'backward'. If the result of decision at step B17 is NO, that is if L[2] is not more than L[0], processing transfers to step B19.

At the step B19, the L-level count values are compared to each other for judging whether on not L[2]<L[0]. If the result of decision at step B19 is YES, that is if L[2]<L[0], processing transfers to step B20 for setting the flag to 'forward'. If the result of decision at step B19 is NO, that is if L[2] is not less than L[2], processing transfers to step B21 for setting the same flag as the previous information flag.

At the next step B22, 2T data is corrected in accordance with the flag set by the processing of the above steps B12 to B21. At the next step B23, the previous information flag is newly stored.

At the next step B24, it is checked whether or not the playback data is the channel bit data of 1T, that is channel bit data with the run length of the same symbol equal to (d'−2).

If the result of decision at step B24 is YES, that is if the playback data is the channel bit data with the run length of the same symbol equal to (d'−2), the flag is set to 'both forward and backward' at step B25. At step B26, 1T data is corrected in accordance with the flag.

If the result of decision at step B24 is NO, that is if the playback data is the channel bit data with the run length of the same symbol not equal to (d−1) nor (d'−2), the processing at step B8 is terminated without correction processing.

Figure 5:
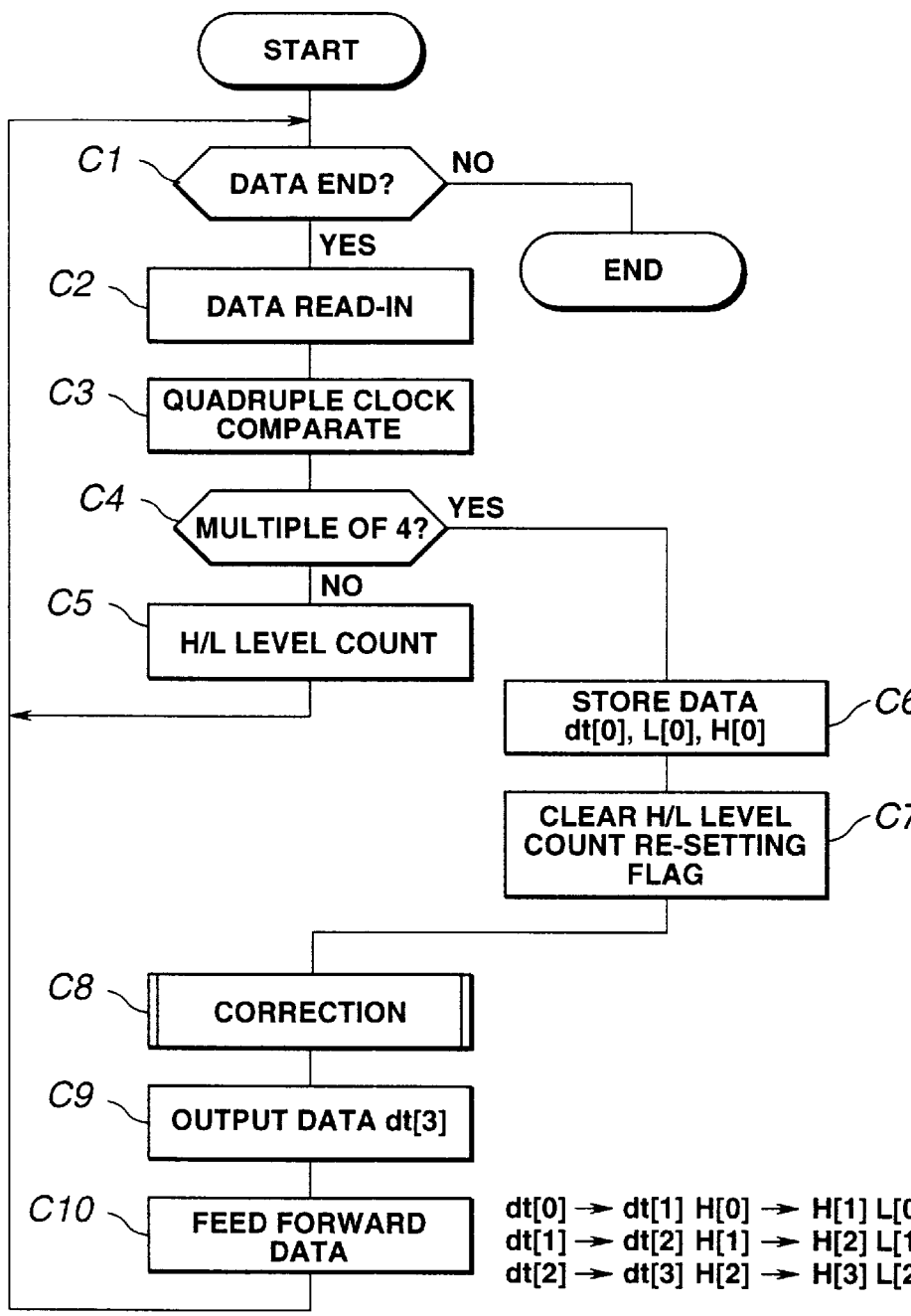
FIG. 5 is a flowchart showing a third embodiment of the data decoding method according to the present invention.

The data decoding method according to the present invention is carried out as shown by a flowchart of FIG. 5.

Figure 6:
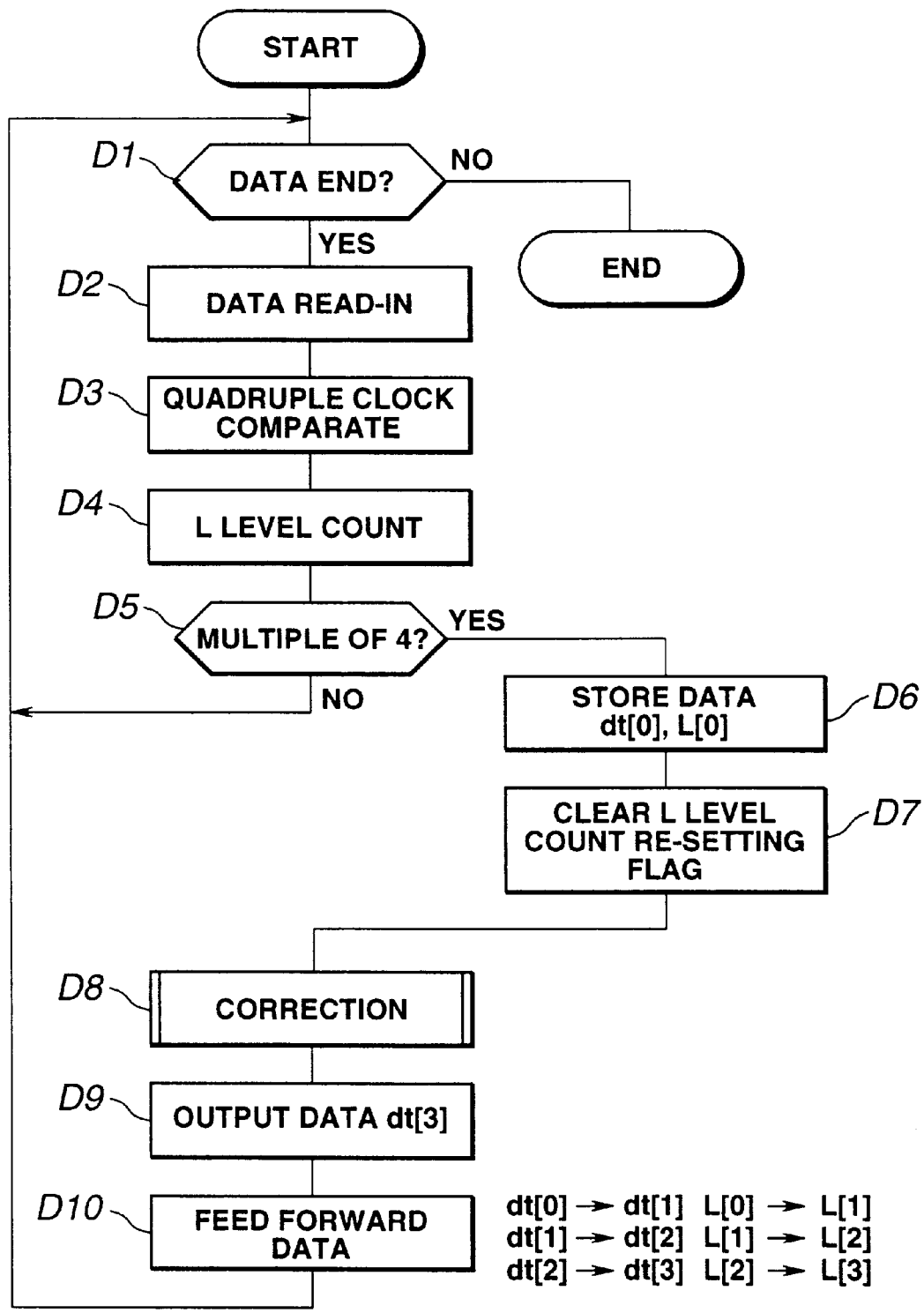
FIG. 6 is a flowchart showing a fourth embodiment of the data decoding method according to the present invention.

The data decoding method for playback data from a recording medium having recorded thereon NRZI modulated recording codes having a minimum run length of "0"s between neighboring "1"s in a code string equal to d, the recording codes having a minimum run length of the same symbol equal to d'=d+1, d being a positive integer, as shown in a flowchart of FIGS. 5 and 6, includes the steps of generating, as n-tuples clocks obtained on n-tupling channel clocks of the playback data, n being a positive integer, quadrupled clocks, with n then being 4, detecting channel bit data having the run length of the same symbol equal to (d'−1) using the quadrupled clocks, and designating a correction position for detected channel bit data having the run length of the same symbol equal to (d'−1) for correcting the channel bit data so that the run length of the same symbol will be equal to d'.

In the data decoding method shown in the flowchart of FIG. 5, it is first judged at step C1 whether or not playback has come to a close. If the result of judgment at step C1 is NO, that is if the playback data has not come to a close, processing transfers to step C2 to read in playback data. If the result of judgment at step C1 is YES, that is if the playback data has come to a close, the decoding processing is terminated.

At the next step C3, the operation of comparing the playback data read in at step C2 to a pre-set comparison level and splitting the playback data into two values of H-level and L-level with the pre-set comparison level as a boundary is carried out using quadrupled clocks.

At step C4, it is judged whether or not the count value at step C3 is a multiple of 4. If the result of judgment at step C4 is NO, that is if the count value is not a multiple of 4, processing transfers to step C5 to count the number of the H-levels and L-levels obtained by the comparison processing of step C3 before processing reverts to step C1 to repeat the processing of the steps C1 to C5. If the result of judgment at step C4 is YES, that is if the above count value is a multiple of 4, processing transfers to step C6.

At this step C6, (n−1) items of the domain information obtained by splitting the playback data into the H-level and the L-level with the comparison level as the boundary are taken out with channel clocks while the comparison level value dt[0], L-level count value L[0] and the H-level count value H[0] are held on memory.

At the next step C7, the L/H level cont value and the flag are both cleared.

At the next step C8, the portions of the playback data in need of correction is corrected in accordance with the sequence of operations shown in the flowchart of FIG. 2.

At the next step C9, data dt[3] is outputted. At step C10, data is sequentially fed before processing reverts to step C1 to repeat the processing of steps C1 to C10.

In decoding channel bit data at at least one comparison level into channel bit data in accordance with the present data decoding method, channel clocks of playback data from a recording medium having recorded thereon recording codes, which are NRZI modulated codes having a minimum run length of "0"s between neighboring "1"s in a code string equal to d, with the recording codes having a minimum run length of the same symbol equal to d'=d+1, d being a positive integer, are n-tupled to give n-tupled clocks, n being an integer not less than 2, and channel bit data having a run length of the same symbol equal to (d'−1) are detected, using these n-tupled clocks. For example, the bit information obtained from n-tupled clocks sandwiched between bit data of a given channel clock and bit data of the next channel clock is split with a comparison level as the boundary into the H-level and the L-level to give (n−1) items of the domain information for designating a correction position of channel bit data having a run length of the same symbol equal to (d'−1). This corrects channel bit data having a run length of the same symbol equal to (d'−1) so that the run length of the same symbol will be equal to d'to decrease the data decoding error in the vicinity of the minimum length between transitions Tmin to improve the bit error rate.

In decoding channel bit data at at least one comparison level into channel bit data in accordance with the present data decoding method, channel clocks of playback data from a recording medium having recorded thereon recording codes, which are NRZI modulated codes having a minimum run length of "0"s between neighboring "1"s in a code string equal to d, with the recording codes having a minimum run length of the same symbol equal to d'=d+1, d being a positive integer, are n-tupled to give n-tupled clocks, n being an integer not less than 2, and channel bit data having a run length of the same symbol equal to (d'−1) are detected using these n-tupled clocks. For example, (n−1) items of the domain information from the bit information obtained by n-tupled clocks sandwiched between bit data of a given channel clock and bit data of the next channel clock are held on memory for designating a correction position of channel bit data having a run length of the same symbol equal to (d'−1). This corrects channel bit data having a run length of the same symbol equal to (d'−1) so that the run length of the same symbol will be equal to d' to decrease the data decoding error in the vicinity of the minimum length between transitions Tmin to improve the bit error rate.

In decoding channel bit data at at least one comparison level into channel bit data in accordance with the present data decoding method, channel clocks of playback data from a recording medium having recorded thereon recording codes, which are NRZI modulated codes having a minimum run length of "0"s between neighboring '1's in a code string equal to d, with the recording codes having a minimum run length of the same symbol equal to d'=d+1, d being a positive integer, are n-tupled to give n-tupled clocks, n being an integer not less than 2, and channel bit data having a run length of the same symbol equal to (d'−1) using these n-tupled clocks. For example, (n−1) items of the domain information by the bit information obtained from n-tupled clocks sandwiched between channel bit data directly previous to the (d'−1) domain are compared to next channel bit data are compared to (n−1) items of the domain information by the bit information obtained from n-tupled clocks sandwiched between channel bit data directly following the (d'−1) domain and previous channel bit data to designate a correction bit position. This corrects channel bit data having a run length of the same symbol equal to (d'−1) so that the run length of the same symbol will be equal to d' to decrease the data decoding error in the vicinity of the minimum length between transitions Tmin to improve the bit error rate.

In decoding channel bit data at at least one comparison level into channel bit data in accordance with the present data decoding method, channel clocks of playback data from a recording medium having recorded thereon recording codes, which are NRZI modulated codes having a minimum run length of "0"s between neighboring "1"s in a code string equal to d, with the recording codes having a minimum run length of the same symbol equal to d'=d+1, d being a positive integer, are n-tupled to give n-tupled clocks, n being an integer not less than 2, and channel bit data having a run length of the same symbol equal to (d'−1) using these n-tupled clocks. For example, (n−1) items of the domain information by the bit information obtained from n-tupled clocks sandwiched between channel bit data directly previous to the (d'−1) domain and the next channel bit data and (n−1) items of the domain information by the bit information obtained from n-tupled clocks sandwiched between channel bit data directly following the (d'−1) domain and previous channel bit data are split respectively into H-levels and L-levels with a comparison level as a boundary and a correction bit position as selected depending on the relative magnitude of the H-levels or L-levels is designated. This corrects channel bit data having a run length of the same symbol equal to (d'−1) so that the run length of the same symbol will be equal to d'to decrease the data decoding error in the vicinity of the minimum length between transitions Tmin to improve the bit error rate.

In decoding channel bit data at at least one comparison level into channel bit data in accordance with the present data decoding method, channel clocks of playback data from a recording medium having recorded thereon recording codes, which are NRZI modulated codes having a minimum run length of "0"s between neighboring "1"s in a code string equal to d, with the recording codes having a minimum run length of the same symbol equal to d'=d+1, are n-tupled to give n-tupled clocks, n being an integer not less than 2, and channel bit data having a run length of the same symbol equal to (d'−1) using these n-tupled clocks. For example, (n−1) items of the domain information by the bit information obtained from n-tupled clocks sandwiched between channel bit data directly previous to the (d'−1) domain and the next channel bit data and (n−1) items of the domain information by the bit information obtained from n-tupled clocks sandwiched between channel bit data directly following the (d'−1) domain and previous channel bit data are split respectively into H-levels and L-levels with a comparison level as a boundary a side with a larger number of the H-levels is designated as a correction bit position if the (d'−1) domain is of the H-level and a side with a larger number of the H-levels is designated as a correction bit position if the (d'−1) domain is of the L-level. This corrects channel bit data having a run length of the same symbol equal to (d'−1) so that the run length of the same symbol will be equal to d' to decrease the data decoding error in the vicinity of the minimum length between transitions Tmin to improve the bit error rate.

In decoding channel bit data at at least one comparison level into channel bit data in accordance with the present data decoding method, channel clocks of playback data from a recording medium having recorded thereon recording codes, which are NRZI modulated codes having a minimum run length of "0"s between neighboring "1"s in a code string equal to d, d being a positive integer, with the recording codes having a minimum run length of the same symbol equal to d'=d+1, are n-tupled to give n-tupled clocks, n being an integer not less than 2, and channel bit data having a run length of the same symbol equal to (d'−1) using these n-tupled clocks. For example, (n−1) items of the domain information by the bit information obtained from n-tupled clocks sandwiched between channel bit data directly previous to the (d'−1) domain and the next channel bit data and (n−1) items of the domain information by the bit information obtained from n-tupled clocks sandwiched between channel bit data directly following the (d'−1) domain and previous channel bit data are split respectively into H-levels and L-levels with a comparison level as a boundary and the number of the L-levels or that of the H-levels is used for designation as a correction bit position. This corrects channel bit data having a run length of the same symbol equal to (d'−1) so that the run length of the same symbol will be equal to d' to decrease the data decoding error in the vicinity of the minimum length between transitions Tmin to improve the bit error rate.

In decoding channel bit data at at least one comparison level into channel bit data in accordance with the present data decoding method, channel clocks of playback data from a recording medium having recorded thereon recording codes, which are NRZI modulated codes having a minimum run length of "0"s between neighboring "1"s in a code string equal to d, d being a positive integer, with the recording codes having a minimum run length of the same symbol equal to d'=d+1, are n-tupled to give n-tupled clocks, n being an integer not less than 2, and channel bit data having a run length of the same symbol equal to (d'−1) using these n-tupled clocks. For example, (n−1) items of the domain information by the bit information obtained from n-tupled clocks sandwiched between channel bit data directly previous to the (d'−1) domain and the next channel bit data and (n−1) items of the domain information by the bit information obtained from n-tupled clocks sandwiched between channel bit data directly following the (d'−1) domain and previous channel bit data are split respectively into H-levels and L-levels with a comparison level as a boundary and, if the number of "0"s on transition from the L level to the H level is larger than the number of "0"s on transition from the H level to the L level, the backward side of the (d'−1) domain is designated as the correction bit position, whereas, if the number of "0"s on transition from the H level to the L level is larger than the number of "0"s on transition from the L level to the H level, the forward side of the (d'−1) domain is designated as the correction bit position. This corrects channel bit data having a run length of the same symbol equal to (d'−1) so that the run length of the same symbol will be equal to d' to decrease the data decoding error in the vicinity of the minimum length between transitions Tmin to improve the bit error rate.

In decoding channel bit data at at least one comparison level into channel bit data in accordance with the present data decoding method, channel clocks of playback data from a recording medium having recorded thereon recording codes, which are NRZI modulated codes having a minimum run length of "0"s between neighboring "1"s in a code string equal to d, d being a positive integer, with the recording codes having a minimum run length of the same symbol equal to d'=d+1, are n-tupled to give n-tupled clocks, n being an integer not less than 2, and channel bit data having a run length of the same symbol equal to (d'−1) using these n-tupled clocks. For example, (n−1) items of the domain information from the bit information obtained from n-tupled clocks sandwiched between channel bit data directly previous to the (d'−1) domain and the next channel bit data and (n−1) items of the domain information by the bit information obtained from n-tupled clocks sandwiched between channel bit data directly following the (d'−1) domain and previous channel bit data are split respectively into H-levels and L-levels with a comparison level as a boundary. If the number of "1"s on transition from the H level to the L level is larger than the number of "1"s on transition from the L level to the H level, the backward side of the (d'−1) domain is designated as the correction bit position, whereas, if the number of "1"s on transition from the L level to the H level is larger than the number of "1"s on transition from the H level to the L level, the forward side of the (d'−1) domain is designated as the correction bit position. This corrects channel bit data having a run length of the same symbol equal to (d'−1) so that the run length of the same symbol will be equal to d' to decrease the data decoding error in the vicinity of the minimum length between transitions Tmin to improve the bit error rate.

In decoding channel bit data at at least one comparison level into channel bit data in accordance with the present data decoding method, channel clocks of playback data from a recording medium having recorded thereon recording codes, which are NRZI modulated codes having a minimum run length of "0"s between neighboring "1"s in a code string equal to d, d being a positive integer, with the recording codes having a minimum run length of the same symbol equal to d'=d+1, are n-tupled to give n-tupled clocks, n being an integer not less than 2, and channel bit data having a run length of the same symbol equal to (d'−1) using these n-tupled clocks. For example, (n−1) items of the domain information from the bit information obtained from n-tupled clocks sandwiched between channel bit data directly previous to the (d'−1) domain and the next channel bit data and (n−1) items of the domain information by the bit information obtained from n-tupled clocks sandwiched between channel bit data directly following the (d'−1) domain and previous channel bit data are split respectively into H-levels and L-levels with a comparison level as a boundary and, if the domain information for the H levels is the same as that for the L-levels, the correction bit position is designated based on the previous correction bit position held on memory. This corrects channel bit data having a run length of the same symbol equal to (d'−1) so that the run length of the same symbol will be equal to d' to decrease the data decoding error in the vicinity of the minimum length between transitions Tmin to improve the bit error rate.

Figure 7:
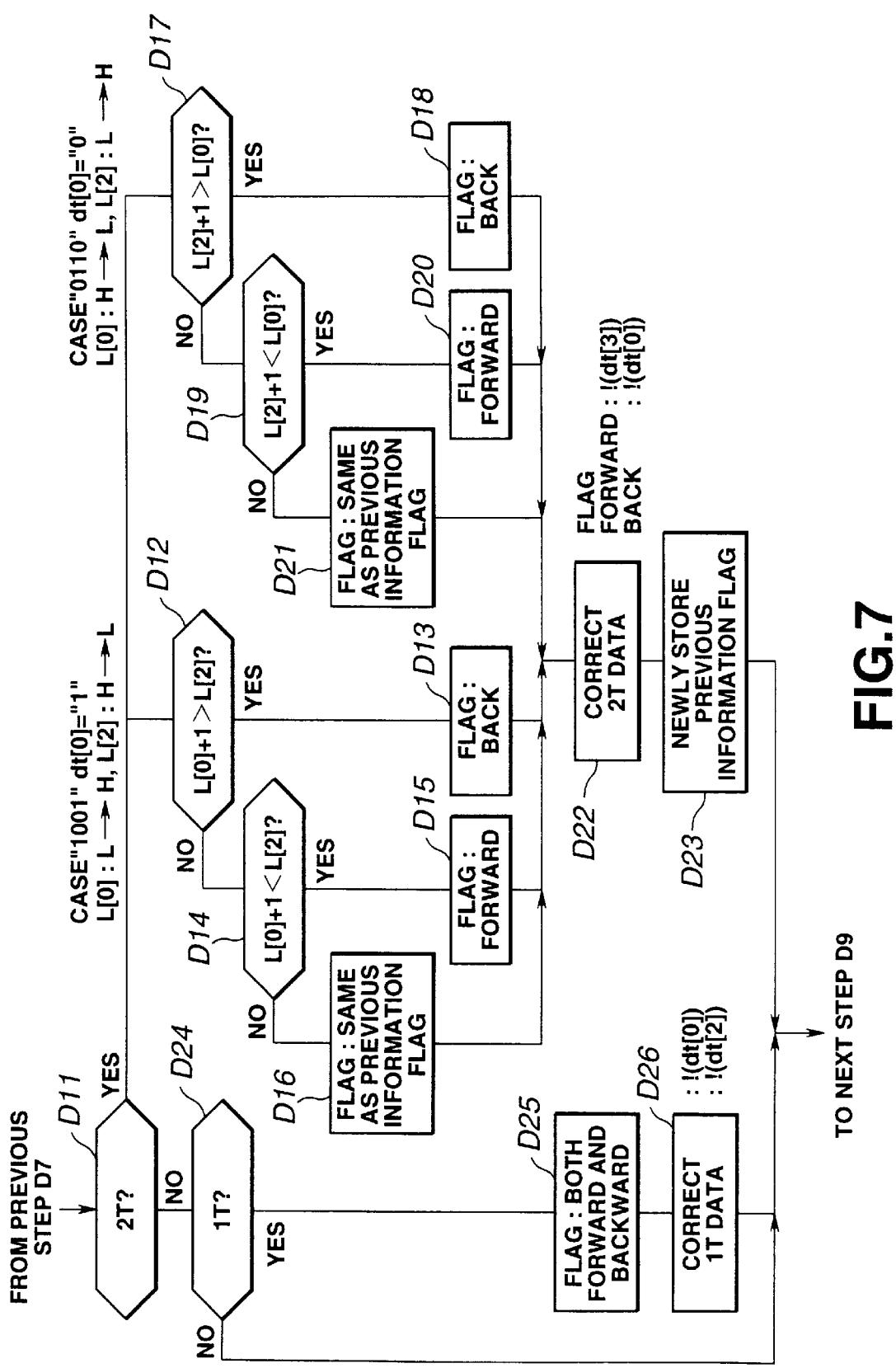
FIG. 7 is a flowchart showing the correction processing operation for the above fourth embodiment.

The decoding method according to the present invention is carried out in accordance with the sequence of operations shown in the flowcharts of FIGS. 6 and 7.

The data decoding method for playback data from a recording medium having recording codes recorded thereon, the recording codes being NRZI modulated codes having a minimum run length of "0"s between neighboring "1"s in a code string equal to d, d being a positive integer, the recording codes having a minimum run length of the same symbol equal to d'=d−1, shown in a flowchart of FIGS. 6 and 7, includes the steps of generating, as n-tuples clocks obtained on n-tupling channel clocks of the playback data, n being a positive integer, quadrupled clocks, with n then being 4, detecting channel bit data having the run length of the same symbol equal to (d'−1), using the quadrupled clocks, and designating a correction position for detected. channel bit data having the run length of the same symbol equal to (d'−1) for correcting the channel bit data so that the run length of the same symbol will be equal to d'.

In the data decoding method shown in the flowchart of FIG. 6, it is first judged at step D1 whether or not the playback data has come to a close. If the result of judgment at step D1 is NO, that is if the playback data has not come to a close, processing transfers to step D2 to judge whether or not the playback data has come to a close. If the result of judgment at step D1 is NO, that is if the playback data has not come to a close, processing transfers to step D2 to read in the playback data. If the result of judgment at step D1 is YES, that is if the playback data has come to a close, the decoding operation comes to a close.

At the next step D3, the comparison operation of comparing the playback data read-in at step D2 to a pre-set comparison level and splitting the playback data to two values of a H level and a L level with the pre-set comparison level as a boundary is carried out using quadrupled clocks.

At the next step D4, the number of the L-levels obtained by the comparison processing of step D3 is counted. At the next step D5, it is judged whether or not the count value of step D3 is a multiple of 4. If the result of judgment at step D5 is NO, that is if the count value is not a multiple of 4, processing reverts to step D1 to repeat the processing of steps D1 to D5. If the result of judgment at step D5 is YES, that is if the count value is a multiple of 4, processing transfers to step D6.

At this step D6, the n items of the domain information obtained on splitting the playback data into the H-level and the L-level with the comparison level as a boundary are taken out with the channel clocks for storage of the comparison level value dt[0] and the level count value L[0].

At the next step D7, the L level count and the flag are cleared.

At the next step D8, the data portion in need of correction is corrected in accordance with the sequence of operations shown in the flowchart of FIG. 7.

At step D9, data dt[3] is outputted. At step D10, data is fed sequentially before processing reverts to step D1 to repeat the processing of steps D1 to D10.

At the above step D8, it is first judged at step D11 in the flowchart of FIG. 7 whether or not the data is the channel bit data of 2T, where T is the bit length of the channel bit string, that is having a run length of the same symbol equal to (d'−1)

If the result of judgment at step D11 is YES, that is if data is the channel bit data having the run length of the same symbol of (d'−1), processing transfers to step D12 or to D17 if the data is the channel bit data "1001" or the channel bit data "0110", respectively. If the result of judgment at step D11 is NO, that is if the data is not the channel bit data with a run length of the same symbol not equal to (d'−1), processing transfers to step D24.

At step D12, the L-level count values are compared to each other for judging whether on not L[0]+1>L[2]. If the result of decision at step D12 is YES, that is if L[0]+1>L[2], processing transfers to step D13 for setting the flag to 'backward'. If the result of decision at step D12 is NO, that is if L[0]+1 is not larger than L[2], processing transfers to step D14.

At step D14, the L-level count values are compared to each other for judging whether on not L[0]+1<L[2]. If the result of decision at step D14 is YES, that is if L[0]+1<L[2], processing transfers to step D15 for setting the flag to 'forward'. If the result of decision at step D14 is NO, that is if L[0]+1 is not lesser than L[2], processing transfers to step D16 for setting the same flag as the previous information flag.

At step D17, the L-level count values are compared to each other for judging whether on not L[2]+1>L[0]. If the result of decision at step D17 is YES, that is if L[2]+1>L[0], processing transfers to step D18 for setting the flag to 'backward'. If the result of decision at step D17 is NO, that is if L[2]+1 is not larger than L[0], processing transfers to step D19.

At step D19, the L-level count values are compared to each other for judging whether on not L[2]+1<L[0]. If the result of decision at step D14 is YES, that is if L[2]+1<L[0], processing transfers to step D20 for setting the flag to 'forward'. If the result of decision at step D19 is NO, that is if L[2]+1 is not lesser than L[0], processing transfers to step D21 for setting the same flag as the previous information flag.

At the next step D22, 2T data is corrected in accordance with the flag as set by the processing of the above steps D12 to D21. At the next step D23, the previous information flag is newly stored.

At step D24, it is checked whether or not is 1T data, that is channel bit data with a run length of the same symbol equal to (d'−2).

If the result of decision at step D24 is YES, that is if the playback data is channel bit data with the run length of the same symbol equal to (d'−2), the flag is set at step D25 to 'forward and backward'. The 1T data is corrected in accordance with the flag thus set.

If the result of judgment at step D24 is NO, that is if the playback data is not the channel bit data with the run length not equal to (d'−1) or (d'−2), processing of step D8 is terminated without correcting this playback data.

In decoding channel bit data at at least one comparison level into channel bit data in accordance with the present data decoding method, channel clocks of playback data from a recording medium having recorded thereon recording codes, which are NRZI modulated codes having a minimum run length of "0"s between neighboring "1"s in a code string equal to d, d being a positive integer, with the recording codes having a minimum run length of the same symbol equal to d'=d+1, are n-tupled to give n-tupled clocks, n being an integer not less than 2, and channel bit data having a run length of the same symbol equal to (d'−1) are detected, using these n-tupled clocks. For example, n-items of the bit information including bit data of a given channel clock in the bit information obtained from n-tupled clocks are split into H-levels and L-levels with a comparison level as a boundary to give respective n-items of the domain information for designating a correction position of channel bit data having a run length of the same symbol equal to (d'−1). This corrects channel bit data having a run length of the same symbol equal to (d'−1) so that the run length of the same symbol will be equal to d' while decreasing the data decoding error in the vicinity of the minimum length between transitions Tmin to improve the bit error rate.

In decoding channel bit data at at least one comparison level into channel bit data in accordance with the present data decoding method, channel clocks of playback data from a recording medium having recorded thereon recording codes, which are NRZI modulated codes having a minimum run length of "0"s between neighboring "1"s in a code string equal to d, d being a positive integer, with the recording codes having a minimum run length of the same symbol equal to d'=d+1, are n-tupled to give n-tupled clocks, n being an integer not less than 2, and channel bit data having a run length of the same symbol equal to (d'−1) using these n-tupled clocks. For example, from n-items of the bit information including bit data of a given channel clock in the bit information obtained from n-tupled clocks, plural domain information items each consisting of n bits are held on memory for designating a correction position of channel bit data having a run length of the same symbol equal to (d'−1). This corrects channel bit data having a run length of the same symbol equal to (d'−1) so that the run length of the same symbol will be equal to d', while decreasing data decoding error in the vicinity of the minimum length between transitions Tmin to improve the bit error rate.

In decoding channel bit data at at least one comparison level into channel bit data in accordance with the present data decoding method, channel clocks of playback data from a recording medium having recorded thereon recording codes, which are NRZI modulated codes having a minimum run length of "0"s between neighboring "1"s in a code string equal to d, d being a positive integer, with the recording codes having a minimum run length of the same symbol equal to d'=d+1, are n-tupled to give n-tupled clocks, n being an integer not less than 2, and channel bit data having a run length of the same symbol equal to (d'−1) are detected, using these n-tupled clocks. For example, n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between are compared to each other to select a correction bit position which is designated. This corrects channel bit data having a run length of the same symbol equal to (d'−1) so that the run length of the same symbol will be equal to d', while decreasing data decoding error in the vicinity of the minimum length between transitions Tmin to improve the bit error rate.

In decoding channel bit data at at least one comparison level into channel bit data in accordance with the present data decoding method, channel clocks of playback data from a recording medium having recorded thereon recording codes, which are NRZI modulated codes having a minimum run length of "0"s between neighboring "1"s in a code string equal to d, d being a positive integer, with the recording codes having a minimum run length of the same symbol equal to d'=d+1, are n-tupled to give n-tupled clocks, n being an integer not less than 2, and channel bit data having a run length of the same symbol equal to (d'−1) are detected, using these n-tupled clocks. For example, n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between are split respectively into H-levels and L-levels with a comparison level as a boundary and a correction bit position as selected depending on the relative magnitude of the H-levels or L-levels is designated. This corrects channel bit data having a run length of the same symbol equal to (d'−1) so that the run length of the same symbol will be equal to d', while decreasing data decoding error in the vicinity of the minimum length between transitions Tmin to improve the bit error rate.

In decoding channel bit data at at least one comparison level into channel bit data in accordance with the present data decoding method, channel clocks of playback data from a recording medium having recorded thereon recording codes, which are NRZI modulated codes having a minimum run length of "0"s between neighboring "1"s in a code string equal to d, with the recording codes having a minimum run length of the same symbol equal to d'=d+1, d being a positive integer, are n-tupled to give n-tupled clocks, n being an integer not less than 2, and channel bit data having a run length of the same symbol equal to (d'−1) are detected, using these n-tupled clocks. For example, n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between are split respectively into H-levels and L-levels with a comparison level as a boundary and the number of the L-levels or that of the H-levels is used for designation as a correction bit position. This corrects channel bit data having a run length of the same symbol equal to (d'−1) so that the run length of the same symbol will be equal to d', while decreasing data decoding error in the vicinity of the minimum length between transitions Tmin to improve the bit error rate.

In decoding channel bit data at at least one comparison level into channel bit data in accordance with the present data decoding method, channel clocks of playback data from a recording medium having recorded thereon recording codes, which are NRZI modulated codes having a minimum run length of "0"s between neighboring "1"s in a code string equal to d, with the recording codes having a minimum run length of the same symbol equal to d'=d+1, d being a positive integer, are n-tupled to give n-tupled clocks, n being an integer not less than 2, and channel bit data having a run length of the same symbol equal to (d'−1) are detected, using these n-tupled clocks. For example, n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between are split respectively into H-levels and L-levels with a comparison level as a boundary and, if the n-items of the domain information include backward side channel bit data, the backward side of the (d'−1) domain is designated as the correction bit position in case the number of "0"s on transition from the L-level to the H-level plus 1 is larger than the number of "0"s on transition from the H-level to the L-level, while the forward side of the (d'−1) domain is designated as the correction bit position in case the number of "0"s on transition from the H-level to the L-level is larger than the number of "0"s on transition from the L-level to the H-level plus 1. This corrects channel bit data having a run length of the same symbol equal to (d'−1) so that the run length of the same symbol will be equal to d', while decreasing data decoding error in the vicinity of the minimum length between transitions Tmin to improve the bit error rate.

In decoding channel bit data at at least one comparison level into channel bit data in accordance with the present data decoding method, channel clocks of playback data from a recording medium having recorded thereon recording codes, which are NRZI modulated codes having a minimum run length of "0"s between neighboring "1"s in a code string equal to d, d being a positive integer, with the recording codes having a minimum run length of the same symbol equal to d'=d+1, are n-tupled to give n-tupled clocks, n being an integer not less than 2, and channel bit data having a run length of the same symbol equal to (d'−1) are detected, using these n-tupled clocks. For example, n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between are split respectively into H-levels and L-levels with a comparison level as a boundary and, if the n-items of the domain information include forward side channel bit data, the backward side of the (d'−1) domain is designated as the correction bit position in case the number of "0"s on transition from the L-level to the H-level is larger than the number of "0"s on transition from the H-level to the L-level plus 1, while the forward side of the (d'−1) domain is designated as the correction bit position in case the number of "0"s on transition from the H-level to the L-level plus 1 is larger than the number of "0"s on transition from the L-level to the H-level. This corrects channel bit data having a run length of the same symbol equal to (d'−1) so that the run length of the same symbol will be equal to d', while decreasing data decoding error in the vicinity of the minimum length between transitions Tmin to improve the bit error rate.

In decoding channel bit data at at least one comparison level into channel bit data in accordance with the present data decoding method, channel clocks of playback data from a recording medium having recorded thereon recording codes, which are NRZI modulated codes having a minimum run length of "0"s between neighboring "1"s in a code string equal to d, d being a positive integer, with the recording codes having a minimum run length of the same symbol equal to d'=d+1, are n-tupled to give n-tupled clocks, n being an integer not less than 2, and channel bit data having a run length of the same symbol equal to (d'−1) are detected, using these n-tupled clocks. For example, n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between are split respectively into H-levels and L-levels with a comparison level as a boundary and, if n-items of the domain information include backward side channel bit data, the backward side of the (d'−1) domain is designated as the correction bit position in case the number of "1"s on transition from the H-level to the L-level plus 1 is larger than the number of "1"s on transition from the L-level to the H-level plus 1, while the forward side of the (d'−1) domain is designated as the correction bit position in case the number of "1"s on transition from the L-level to the H-level plus 1 is larger than the number of "1"s on transition from the H-level to the L-level plus 1. This corrects channel bit data having a run length of the same symbol equal to (d'−1) so that the run length of the same symbol will be equal to d', while decreasing data decoding error in the vicinity of the minimum length between transitions Tmin to improve the bit error rate.

In decoding channel bit data at at least one comparison level into channel bit data in accordance with the present data decoding method, channel clocks of playback data from a recording medium having recorded thereon recording codes, which are NRZI modulated codes having a minimum run length of "0"s between neighboring "1"s in a code string equal to d, d being a positive integer, with the recording codes having a minimum run length of the same symbol equal to d'=d +1, are n-tupled to give n-tupled clocks, n being an integer not less than 2, and channel bit data having a run length of the same symbol equal to (d'−1) are detected, using these n-tupled clocks. For example, n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between are split respectively into H-levels and L-levels with a comparison level as a boundary and, if n-items of the domain information include forward side channel bit data, the backward side of the (d'−1) domain is designated as the correction bit position in case the number of "1"s on transition from the H-level to the L-level is larger than the number of "1"s on transition from the L-level to the H-level plus 1, while the forward side of the (d'−1) domain is designated as the correction bit position in case the number of "1"s on transition from the L-level to the H-level plus 1 is larger than the number of "1"s on transition from the H-level to the L-level. This corrects channel bit data having a run length of the same symbol equal to (d'−1) so that the run length of the same symbol will be equal to d', while decreasing data decoding error in the vicinity of the minimum length between transitions Tmin to improve the bit error rate.

In decoding channel bit data at at least one comparison level into channel bit data in accordance with the present data decoding method, channel clocks of playback data from a recording medium having recorded thereon recording codes, which are NRZI modulated codes having a minimum run length of "0"s between neighboring "1"s in a code string equal to d, d being a positive integer, with the recording codes having a minimum run length of the same symbol equal to d'=d+1, are n-tupled to give n-tupled clocks, n being an integer not less than 2, and channel bit data having a run length of the same symbol equal to (d'−1) are detected, using these n-tupled clocks. For example, n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between are split respectively into H-levels and L-levels with a comparison level as a boundary and, if the domain information for the H levels is the same as that for the L-levels, the correction bit position is designated based on the previous correction bit position held on memory. This corrects channel bit data having a run length of the same symbol equal to (d'−1) so that the run length of the same symbol will be equal to d', while decreasing data decoding error in the vicinity of the minimum length between transitions Tmin to improve the bit error rate.

In a data decoding method for playback data from a recording medium having recording codes recorded thereon, with the recording codes being NRZI modulated codes having a minimum run length of "0"s between neighboring "1"s in a code string equal to d, and with the recording codes having a minimum run length of the same symbol equal to d'=d+1, where d is a positive integer, n-tupled clocks are generated by n-tupling channel clocks of the playback data, n being an integer not less than 2, channel bit data having a run length of the same symbol following inverse NRZI modulation equal to (d−1) are detected, using the n-tupled clocks and a correction position of the channel bit data having the run length of detected "0"s equal to (d−1) is designated for correcting channel bit data having the run length of "0"s equal to (d−1) so that the run length of "0"s will be equal to d. This decreases data decoding error in the vicinity of the minimum length between transitions Tmin to improve the bit error rate.

The playback RF signals read out from a recording medium are decoded at at least a comparison level into channel bit data in which the minimum run length of "0"s between neighboring "0"s in a codestring is equal to d, and the channel bit data having a run length of "0"s equal to (d−1) are corrected so that the run length of "0"s will be equal to d. This decreases data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, the bit information obtained by bit data of a given channel clock and bit data of the next channel clock and n-tupled clocks sandwiched in-between is split with a comparison level as the boundary into the H-level and the L-level to give (n+1) items of the domain information for designating a correction position of channel bit data having a run length of "0"s equal to (d−1) for correcting channel bit data having a run length of "0"s equal to (d−1) so that the run length of "0"s will be equal to d. This decreases data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, (n+1) items of the domain information from the bit information obtained by bit data of a given channel clock and next bit data of the next channel clock and n-tupled clocks sandwiched in-between are held on memory for designating a correction position of channel bit data having a run length of "0"s equal to (d−1). This corrects channel bit data having a run length of "0"s equal to (d−1) so that the run length of "0"s will be equal to d. This decreases data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, (n+1) items of the domain information from the bit information obtained by channel bit data directly previous to the (d−1) domain and next channel bit data and n-tupled clocks sandwiched in-between are compared to (n+1) items of the domain information by the bit information obtained from channel bit data directly following the (d−1) domain, previous channel bit data and n-tupled clocks sandwiched in-between to select a correction bit position which is designated. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, (n+1) items of the domain information from the bit information obtained by channel bit data directly previous to the (d−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between are split respectively into H-levels and L-levels with a comparison level as a boundary and a correction bit position as selected depending on the relative magnitude of the H-levels or L-levels is designated. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, (n+1) items of the domain information from the bit information obtained by channel bit data directly previous to the (d−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between are split respectively into H-levels and L-levels with a comparison level as a boundary and a side with a larger number of the H-levels is designated as a correction bit position if the (d−1) domain is of the H-level whilst a side with a larger number of the H-levels is designated as a correction bit position if the (d−1) domain is of the L-level. This corrects channel bit data having a run length of the same symbol equal to (d−1) so that the run length of the same symbol will be equal to d', while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, (n+1) items of the domain information from the bit information obtained from channel bit data directly previous to the (d−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between are split respectively into H-levels and L-levels with a comparison level as a boundary and the number of the L-levels or that of the H-levels is used for designation as a correction bit position. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, (n+1) items of the domain information from the bit information obtained by channel bit data directly previous to the (d−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between are split respectively into H-levels and L-levels with a comparison level as a boundary and, if the number of "0"s on transition from the L level to the H level is larger than the number of "0"s on transition from the H level to the L level, the backward side of the (d−1) domain is designated as the correction bit position, whereas, if the number of "0"s on transition from the H level to the L level is larger than the number of "0"s on transition from the L level to the H level, the forward side of the (d−1) domain is designated as the correction bit position. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, (n+1) items of the domain information from the bit information obtained by channel bit data directly previous to the (d−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between are split respectively into H-levels and L-levels with a comparison level as a boundary and, if the number of "1"s on transition from the H level to the L level is larger than the number of "1"s on transition from the L level to the H level, the backward side of the (d−1) domain is designated as the correction bit position, whereas, if the number of "1"s on transition from the L level to the H level is larger than the number of "1"s on transition from the H level to the L level, the forward side of the (d−1) domain is designated as the correction bit position. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, (n+1) items of the domain information from the bit information obtained by channel bit data directly previous to the (d−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between are split respectively into H-levels and L-levels with a comparison level as a boundary and, if the domain information for the H levels is the same as that for the L-levels, the correction bit position is designated based on the previous correction bit position held on memory. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, the bit information obtained from n-tupled clocks sandwiched between bit data of a given channel clock and bit data of the next channel clock is split with a comparison level as the boundary into the H-level and the L-level to give (n−1) items of the domain information for designating a correction position of channel bit data having a run length of "0"s equal to (d−1). This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, (n−1) items of the domain information from the bit information obtained by n-tupled clocks sandwiched between bit data of a given channel clock and bit data of the next channel clock are held on memory for designating a correction position of channel bit data having a run length of "0"s equal to (d−1) This corrects channel bit data having a run length of the same symbol equal to (d−1) so that the run length of the same symbol will be equal to d, while decreasing data decoding error in the vicinity of the minimum length between transitions Tmin to improve the bit error rate.

The play back RF signals read out from a recording medium are decoded at at least a comparison level into channel bit data and, using n-tupled clocks, channel bit data having a run length of the same symbol following inverse NRZI modulation equal to (d−1) are detected. For example, (n−1) items of the domain information by the bit information obtained from n-tupled clocks sandwiched between channel bit data directly previous to the (d−1) domain and next channel bit data are compared to (n−1) items of the domain information by the bit information obtained from n-tupled clocks sandwiched between channel bit data directly following the (d−1) domain and previous channel bit data to select a correction bit position which is designated. This corrects channel bit data having a run length of the same symbol equal to (d−1) so that the run length of the same symbol will be equal to d , while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, (n−1) items of the domain information by the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data are split respectively into H-levels and L-levels with a comparison level as a boundary and a correction bit position as selected depending on the magnitude of the H-levels or L-levels is designated. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, (n−1) items of the domain information by the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data are split respectively into H-levels and L-levels with a comparison level as a boundary and a side with a larger number of the H-levels is designated as a correction bit position if the (d−1) domain is of the H-level whilst a side with a larger number of the L-levels is designated as a correction bit position if the (d−1) domain is of the L-level. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, (n−1) items of the domain information by the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data are split respectively into H-levels and L-levels with a comparison level as a boundary and the number of the L-levels or that of the H-levels is used for designation as a correction bit position. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, (n−1) items of the domain information by the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data are split respectively into H-levels and L-levels with a comparison level as a boundary and, if the number of "0"s on transition from the L level to the H level is larger than the number of "0"s on transition from the H level to the L level, the backward side of the (d−1) domain is designated as the correction bit position, whereas, if the number of "0"s on transition from the H level to the L level is larger than the number of "0"s on transition from the L level to the H level, the forward side of the (d−1) domain is designated as the correction bit position. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, (n−1) items of the domain information from the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data are split respectively into H-levels and L-levels with a comparison level as a boundary and, if the number of "1"s on transition from the H level to the L level is larger than the number of "1"s on transition from the L level to the H level, the backward side of the (d−1) domain is designated as the correction bit position, whereas, if the number of "1"s on transition from the L level to the H level is larger than the number of "1"s on transition from the H level to the L level, the forward side of the (d−1) domain is designated as the correction bit position. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, (n+1) items of the domain information by the bit information obtained from channel bit data directly previous to the (d−1) domain and the next channel bit data sandwiched between n-tupled clocks and (n+1) items of the domain information by the bit information obtained from channel bit data directly following the (d−1) domain and previous channel bit data sandwiched between n-tupled clocks are split respectively into H-levels and L-levels with a comparison level as a boundary and, if the domain information for the H levels is the same as that for the L-levels, the correction bit position is designated based on the previous correction bit position held on memory. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, (n−1) items of the domain information obtained by n-tupled clocks sandwiched between bit data of a given channel clock and bit data of the next channel clock are split into H-levels and L-levels with a comparison level as a boundary to give respective (n−1) items of the domain information for designating a correction position of channel bit data having a run length of "0"s equal to (d−1). This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, from the bit information obtained from n-tupled clocks, sandwiched between bit data of a channel clock and bit data of the next channel clock, (n−1) items of the domain information are held on memory for designating a correction position of channel bit data having a run length of "0"s equal to (d−1). This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, (n−1) items of the domain information by the bit information obtained from n-tupled clocks sandwiched between channel bit data directly previous to the (d−1) domain and next channel bit data are compared to (n−1) items of the domain information by the bit information obtained from n-tupled clocks sandwiched between channel bit data directly following the (d−1) domain and previous channel bit data to select a correction bit position which is designated. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at least a comparison level into channel bit data and, using n-tupled clocks, channel bit data having a run length of the same symbol following inverse NRZI modulation equal to (d−1) are detected. For example, (n−1) items of the domain information by the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data are split respectively into H-levels and L-levels with a comparison level as a boundary and a correction bit position as selected depending on the magnitude of the H-levels or L-levels is designated. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, (n−1) items of the domain information by the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data are split respectively into H-levels and L-levels with a comparison level as a boundary and a side with a larger number of the H-levels is designated as a correction bit position if the (d−1) domain is of the H-level and a side with a larger number of the L-levels is designated as a correction bit position if the (d−1) domain is of the L-level. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, (n−1) items of the domain information by the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data are split respectively into H-levels and L-levels with a comparison level as a boundary and the number of the L-levels or that of the H-levels is used for designation as a correction bit position. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, (n−1) items of the domain information by the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data are split respectively into H-levels and L-levels with a comparison level as a boundary and the number of the L-levels or that of the H-levels is used for designation as a correction bit position. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, (n−1) items of the domain information by the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data are split respectively into H-levels and L-levels with a comparison level as a boundary and, if the number of "0"s on transition from the L level to the H level is larger than the number of "0"s on transition from the H level to the L level, the backward side of the (d−1) domain is designated as the correction bit position, whereas, if the number of "0"s on transition from the H level to the L level is larger than the number of "0"s on transition from the L level to the H level, the forward side of the (d−1) domain is designated as the correction bit position. This corrects channel bit data having a run length of the same symbol equal to (d−1) so that the run length of the same symbol will be equal to d', while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, (n−1) items of the domain information from the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data are split respectively into H-levels and L-levels with a comparison level as a boundary and, if the number of "1"s on transition from the H level to the L level is larger than the number of "1"s on transition from the L level to the H level, the backward side of the (d−1) domain is designated as the correction bit position, whereas, if the number of "1"s on transition from the L level to the H level is larger than the number of "1"s on transition from the H level to the L level, the forward side of the (d−1) domain is designated as the correction bit position. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, (n−1) items of the domain information from the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data are split respectively into H-levels and L-levels with a comparison level as a boundary and, if the domain information for the H levels is the same as that for the L-levels, the correction bit position is designated based on the previous correction bit position held on memory. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, n-items of the bit information including bit data of a given channel clock in the bit information obtained from n-tupled clocks are split into H-levels and L-levels with a comparison level as a boundary to give respective n-items of the domain information for designating a correction position of channel bit data having a run length of "0"s equal to (d−1). This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, from n-items of the bit information including bit data of a given channel clock in the bit information obtained from n-tupled clocks, plural domain information items consisting of n bits are held on memory for designating a correction position of channel bit data having a run length of "0"s equal to (d−1). This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between are compared to each other to select a correction bit position which is designated. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between are split respectively into H-levels and L-levels with a comparison level as a boundary and a correction bit position as selected depending on the relative magnitude of the H-levels or L-levels is designated. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between are split respectively into H-levels and L-levels with a comparison level as a boundary and the number of the L-levels or that of the H-levels is used for designation as a correction bit position. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between are split respectively into H-levels and L-levels with a comparison level as a boundary and, if n-items of the domain information include backward side channel bit data, the backward side of the (d−1) domain is designated as the correction bit position in case the number of "0"s on transition from the L-level to the H-level plus 1 is larger than the number of "0"s on transition from the H-level to the L-level, while the forward side of the (d−1) domain is designated as the correction bit position in case the number of "0"s on transition from the H-level to the L-level is larger than the number of "0"s on transition from the L-level to the H-level plus 1. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between are split respectively into H-levels and L-levels with a comparison level as a boundary and, if n-items of the domain information include forward side channel bit data, the backward side of the (d−1) domain is designated as the correction bit position in case the number of "0"s on transition from the L-level to the H-level is larger than the number of "0"s on transition from the H-level to the L-level plus 1, while the forward side of the (d−1) domain is designated as the correction bit position in case the number of "0"s on transition from the H-level to the L-level plus 1 is larger than the number of "0"s on transition from the L-level to the H-level. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between are split respectively into H-levels and L-levels with a comparison level as a boundary and, if n-items of the domain information include backward side channel bit data, the backward side of the (d−1) domain is designated as the correction bit position in case the number of "1"s on transition from the H-level to the L-level plus 1 is larger than the number of "1"s on transition from the L-level to the H-level, while the forward side of the (d−1) domain is designated as the correction bit position in case the number of "1"s on transition from the L-level to the H-level is larger than the number of "1"s on transition from the H-level to the L-level plus 1. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between are split respectively into H-levels and L-levels with a comparison level as a boundary and, if n-items of the domain information include forward side channel bit data, the backward side of the (d−1) domain is designated as the correction bit position in case the number of "1"s on transition from the H-level to the L-level is larger than the number of "1"s on transition from the L-level to the H-level plus 1, while the forward side of the (d−1) domain is designated as the correction bit position in case the number of "1"s on transition from the L-level to the H-level plus 1 is larger than the number of "1"s on transition from the H-level to the L-level. This corrects channel bit data having a run length of the same symbol equal to (d−1) so that the run length of the same symbol will be equal to d, while decreasing data decoding error in the vicinity of the minimum length between transitions Tmin to improve the bit error rate.

The playback RF signals read out from a recording medium are decoded at at least a comparison level into channel bit data and, using n-tupled clocks, channel bit data having a run length of the same symbol following inverse NRZI modulation equal to (d−1) are detected. For example, n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between are split respectively into H-levels and L-levels with a comparison level as a boundary and, if the domain information for the H levels is the same as that for the L-levels, the correction bit position is designated based on the previous correction bit position held on memory. This corrects channel bit data having a run length of the same symbol equal to (d−1) so that the run length of the same symbol will be equal to d, while decreasing data decoding error in the vicinity of the minimum length between transitions Tmin to improve the bit error rate.

Also, n-tupled clocks are obtained on n-tupling channel clocks of the playback data, n being an integer not less than 2, from a recording medium having recording codes recorded thereon, with the recording codes being NRZI modulated codes having a minimum run length of "0"s between neighboring "1"s in a code string equal to d, and having a minimum run length of the same symbol equal to d'=d+1, where d is a positive integer. Using the n-tupled clocks, channel bit data having a run length of the same symbol following inverse NRZI modulation equal to (d−1) are detected and, by designating a correction position of the channel bit data having the run length of detected "0"s equal to (d−1), the logical level of data at the designated correction bit position is inverted. In addition, the logical level of data at a bit position outside of the (d−1) domain of the designated correction bit position is inverted for correcting channel bit data having the run length of "0"s equal to (d−1) so that the run length of "0"s will be equal to d. This decreases data decoding error in the vicinity of the minimum length between transitions Tmin to improve the bit error rate.

Also, n-tupled clocks are obtained on n-tupling channel clocks of the playback data, n being an integer not less than 2, from a recording medium having recording codes recorded thereon, the recording codes being NRZI modulated codes having a minimum run length of "0"s between neighboring "1"s in a code string equal to d, and having a minimum run length of the same symbol equal to d'=d+1, where d is a positive integer. Using the n-tupled clocks, channel bit data having a run length of the same symbol following inverse NRZI modulation equal to (d−1) are detected and, by designating a correction position of the channel bit data having the run length of "0"s equal to (d−1), data of "1" at the designated bit position is shifted to data outside the (d−1) domain for correcting the channel bit data having a run length equal to (d−1) so that the run length of "0"s will be equal to d. This decreases data decoding error in the vicinity of the minimum length between transitions Tmin to improve the bit error rate.

Figure 8:
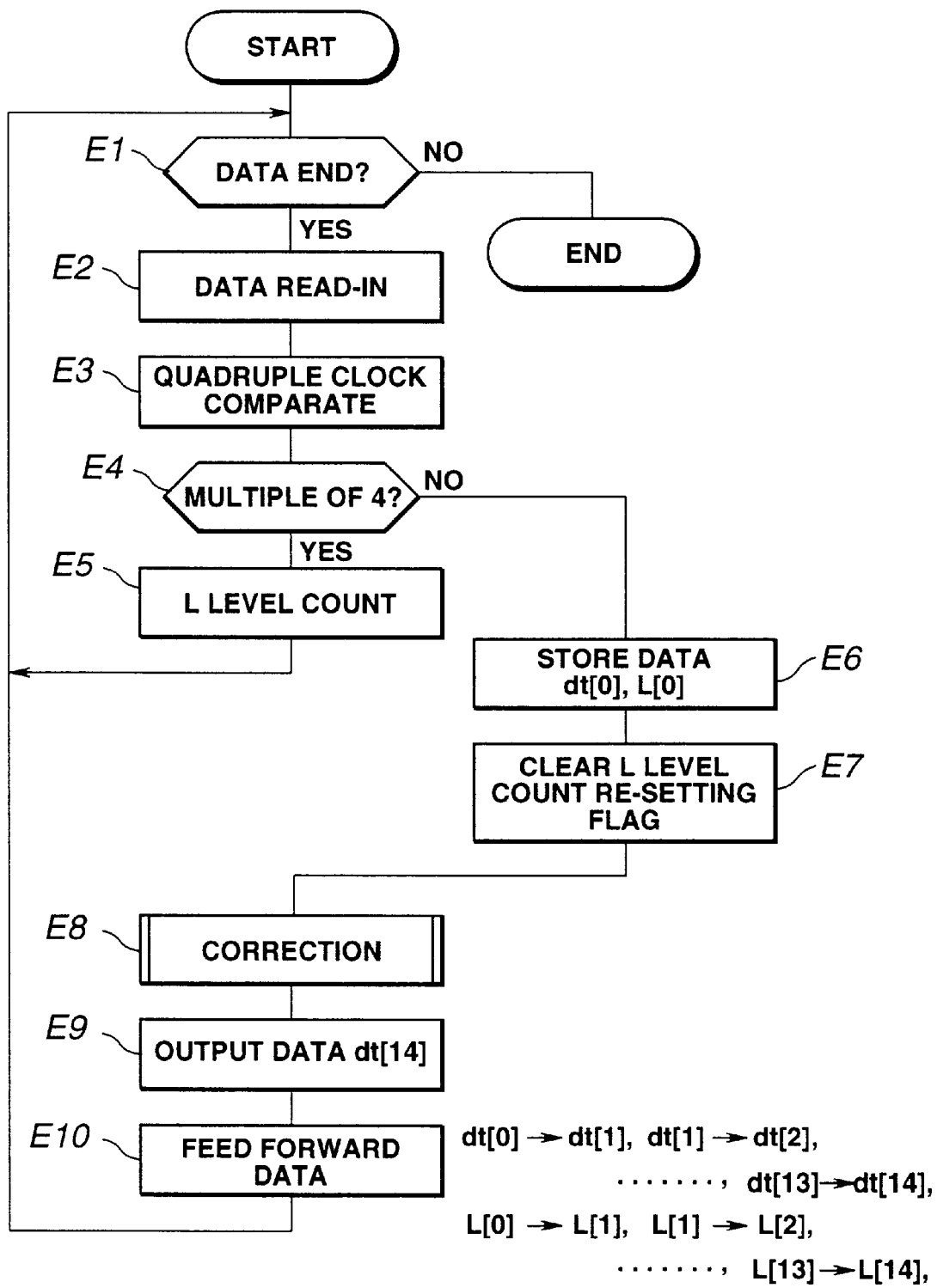
FIG. 8 is a flowchart showing a fifth embodiment of the data decoding method according to the present invention.
Figure 9:
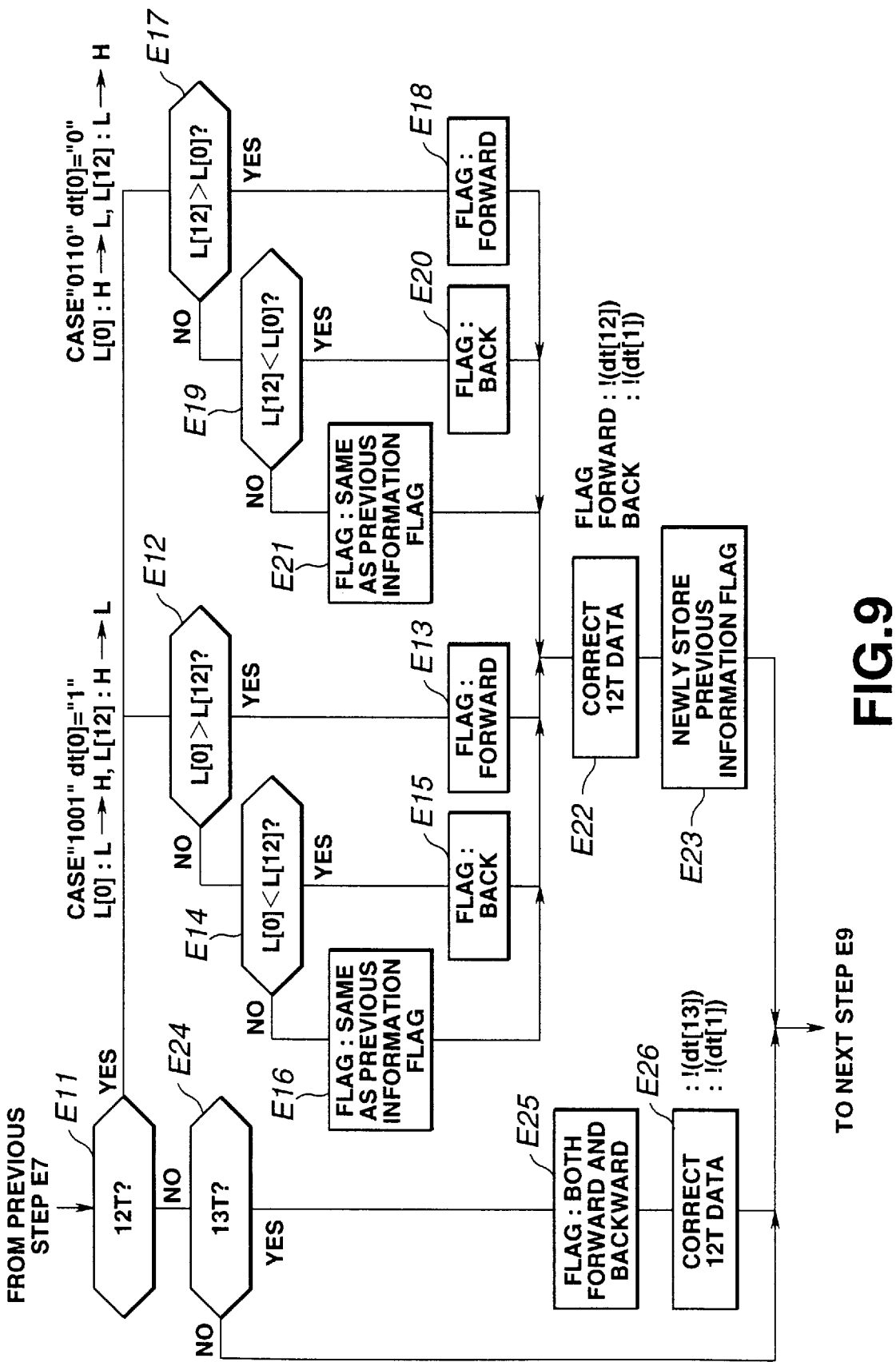
FIG. 9 is a flowchart showing the correction processing for the above fifth embodiment.

The data decoding method according to the present invention is carried out in accordance with the flowchart shown in FIGS. 8 and 9.

In the data decoding method for playback data, shown in the flowcharts of FIGS. 8 and 9, quadrupled clocks, as n-tupled clocks obtained on n-tupling, herein quadrupling, channel clocks of playback data from a recording medium having recording codes recorded thereon, which recording codes are NRZI modulated codes having a maximum run length of "0"s between neighboring "1"s in a code string equal to d, and have a maximum run length of the same symbol following inverse NRZI modulation equal to k'=k+1, where k is a positive integer, channel bit data having a run length of the same symbol equal to (k'+1) are detected, using the quadrupled clocks, and a correction position of the detected channel bit data having the run length of the same detected symbol equal to (k'+1) is designated for correcting channel bit data having the run length of the same symbol equal to (k'+1) so that the run length of the same symbol will be equal to k'.

In the data decoding method shown by the flowchart of FIG. 8, it is first judged at step E1 whether or not the playback data has come to a close. If the result of judgment at step E1 is NO, that is if the playback data has not come to a close, processing transfers to step E2 to read-in the playback data. If the result of judgment at step E1 is YES, that is if the playback data has come to a close, the decoding processing comes to a close.

At the next step E3, the playback data read-in at step E2 is compared to a pre-set comparison level and the comparison operation of splitting the playback data to two values of a H level and a L level with the pre-set comparison level as a boundary is carried out using the above-mentioned quadrupled clocks.

At step E4, it is judged whether or not the count value of step E3 is a multiple of 4. If the result of judgment at step E4 is NO, that is if the above count value is not a multiple of 4, processing transfers to step E5 to count the number of the L-levels obtained by the comparison processing of step E3 before processing reverts to step E1 to repeat the processing of steps E1 to E5. If the result of judgment at step E4 is YES, that is if the above count value is a multiple of 4, processing transfers to step E6.

At this step E6, the (n−1) items of the domain information obtained by splitting the playback data into two levels, that is the H-level and the L-level, are taken out with the channel clocks for storing the comparison level value dt[0] and the L-level count value L[0].

At the next step E7, the L-level count is cleared, whilst the flag is cleared.

At the next step E8, correction processing is carried out for the data portion in need of correction in accordance with the sequence shown in the flowchart of FIG. 9.

At the step E9, data dt[14] is outputted. At step E10, data is fed sequentially, before processing reverts to step E1 to repeat the sequence of operations of steps E1 to E10.

At the above step E8, it is first judged at step E11 whether or not the data is 12T channel bit data, that is channel bit data having a run length of the same symbol equal to(k'+1), as indicated by the flowchart of FIG. 9. T is the bit length of the channel bit string.

If the result of judgment at step E11 is YES, that is if the data is the channel bit data with the run length of the same symbol equal to (k'+1), processing transfers to step E12 or to step E17 for the channel bit data "10 . . . 01" or the channel bit data "01 . . . 10". If the result of judgment at step E11 is NO, that is if the data is not the channel bit data of the same symbol not equal to (k'+1), processing transfers to step E24.

At the above step E12, the L-level count values are compared to judge whether or not L[0]>L[12]. If the result of judgment at step E12 is YES, that is if L[0]>L[12], processing transfers to step E13 to set the flag to 'forward'. If the result of judgment at step E12 is NO, that is if the run length of the same symbol is not larger than L[12], processing transfers to step E14.

At the step E14, the L-level count values are compared to each other to judge whether or not L[0]<L[12]. If the result of judgment at step E14 is YES, that is if L[0]<L[12], processing transfers to step E15 to set the flag to 'backward'. If the result of judgment at step E14 is NO, that is if L[0] is not lesser than L[12], processing transfers to step E16 to set the same flag as the previous information flag.

At the above step E17, the L-level count values are compared to each other to judge whether or not L[12]>L[0]. If the result of judgment at step E14 is YES, that is if L[12]>L[0], processing transfers to step E18 to set the flag to 'forward'. If the result of judgment at step E17 is NO, that is if L[12] is not larger than L[0], processing transfers to step E19.

At the above step E19, the L-level count values are compared to each other to judge whether or not L[12]<L[0]. If the result of judgment at step E19 is YES, that is if L[12]<L[0], processing transfers to step E20 to set the flag to 'backward'. If the result of judgment at step E19 is NO, that is if L[12] is not lesser than L[0], processing transfers to step E21 to set the same flag as the previous information flag.

At the next step E22, 12T data is corrected in accordance with a flag set by the processing of the above steps E12 to E21. At step E23, the previous information flag is newly stored.

At step E24, it is checked whether or not the data is channel bit data of 13T, that is channel bit data having a run length of the same symbol equal to (k'+2).

If the result of judgment at step E24 is YES, that is if the data is channel bit data having the run length of the same symbol of (k'+2), the flag is set at step E25 to 'forward and back' to correct 13T data at step E26 in accordance with the flag so set.

If the result of judgment at step E24 is NO, that is if the data is the channel bit data having the run length of the same symbol not equal to (k'+1) or (k'+2), the processing of step E8 is terminated without correction.

Thus, in a data decoding method for playback data from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, n-tupled clocks are produced on n-tupling channel clocks of the playback data, n being an integer not less than 2, channel bit data having a run length of the same symbol equal to (k'+1) are detected, using the n-tupled clocks and a correction position of the detected channel bit data having the run length of the same symbol equal to (k'+1) is designated for correcting channel bit data having the run length of the same symbol equal to (k'+1) so that the run length of the same symbol will be equal to k'. This decreases data decoding error in the vicinity of the minimum length between transitions Tmin to improve the bit error rate.

Moreover, the playback RF signals read out from the recording medium are decoded at at least a comparison level into channel bit data and the channel bit data having a run length of the same symbol equal to (k'+1) are corrected so that the run length of the same symbol will be equal to k' for decreasing data decoding error in the vicinity of the minimum run length Tmax for improving the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, the channel bit data having a run length of the same symbol equal to (k'+1) are detected, using n-tupled clocks obtained on n-tupling channel clocks of the playback data, and the bit information obtained by bit data of a given channel clock and bit data of the next channel clock and n-tupled clocks sandwiched in-between is split with a comparison level as the boundary into the H-level and the L-level to give (n+1) items of the domain information and a correction position of channel bit data having a run length of the same symbol equal to (k'+1) is designated whereby the channel bit data having the run length of the same symbol equal to (k'+1) can be corrected so that the run length of the same symbol will be equal to k', thus decreasing the der in the vicinity of the minimum run length Tmax to improve the bit error rate.

On the other hand, the playback PF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k'+1) are detected, using n-tupled clocks obtained on n-tupling channel clocks of the playback data. For example, from the bit information obtained by bit data of a given channel clock and bit data of the next channel clock and n-tupled clocks sandwiched in-between, (n+1) items of the domain information are stored and a correction position of channel bit data having a run length of the same symbol equal to (k'+1) is designated whereby the channel bit data having the run length of the same symbol equal to (k'+1) can be corrected so that the run length of the same symbol will be equal to k', thus decreasing the der in the vicinity of the minimum run length Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k'+1) are detected, using n-tupled clocks obtained on n-tupling channel clocks of the playback data. From the bit information obtained by bit data of a given channel clock and bit data of the next channel clock and n-tupled clocks sandwiched in-between, (n+1) items of the domain information are obtained. Then, (n+1) items of the domain information from the bit information obtained by channel bit data directly previous to the (k'+1) domain and next channel bit data and n-tupled clocks sandwiched in-between are compared to (n+1) items of the domain information by the bit information obtained from channel bit data directly following the (k'+1) domain, previous channel bit data and n-tupled clocks sandwiched in-between to select a correction bit position which is designated, so that the run length of the same symbol will be equal to k' thus decreasing the der in the vicinity of the minimum run length Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, the channel bit data having a run length of the same symbol equal to (k'+1) are detected, using n-tupled clocks obtained on n-tupling channel clocks of the playback data. From the bit information obtained by bit data of a given channel clock and bit data of the next channel clock and n-tupled clocks sandwiched in-between, (n+1) items of the domain information are obtained. For example, (n+1) items of the domain information from the bit information obtained by channel bit data directly previous to the (k'+1) domain and next channel bit data and n-tupled clocks sandwiched in-between and (n+1) items of the domain information by the bit information obtained from channel bit data directly following the (k'+1) domain, previous channel bit data and n-tupled clocks sandwiched in-between are split respectively into H-levels and L-levels with a comparison level as a boundary and a correction bit position as selected depending on the relative magnitude of the H-levels or L-levels is designated, so that the run length of the same symbol will be equal to k' thus decreasing the der in the vicinity of the minimum run length Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, the channel bit data having a run length of the same symbol equal to (k'+1) are detected, using n-tupled clocks obtained on n-tupling channel clocks of the playback data, and the bit information obtained by bit data of a given channel clock and bit data of the next channel clock and n-tupled clocks sandwiched in-between is split with a comparison level as the boundary into the H-level and the L-level to give (n+1) items of the domain information. For example, (n+1) items of the domain information from the bit information obtained by channel bit data directly previous to the (k'+1) domain and next channel bit data and n-tupled clocks sandwiched in-between and (n+1) items of the domain information by the bit information obtained from channel bit data directly following the (k'+1) domain, previous channel bit data and n-tupled clocks sandwiched in-between are split respectively into H-levels and L-levels with a comparison level as a boundary and a side with a larger number of the H-levels is designated as a correction bit position if the (k'+1) domain is of the H-level whilst a side with a larger number of the H-levels is designated as a correction bit position if the (k'+1) domain is of the L-level, so that the run length of the same symbol will be equal to k', thereby decreasing the der in the vicinity of the minimum run length Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, the channel bit data having a run length of the same symbol equal to (k'+1) are detected, using n-tupled clocks obtained on n-tupling channel clocks of the playback data, and the bit information obtained by bit data of a given channel clock and bit data of the next channel clock and n-tupled clocks sandwiched in-between is split with a comparison level as the boundary into the H-level and the L-level to give (n+1) items of the domain information, so that the run length of the same symbol will be equal to k', thereby decreasing the data decoding error in the vicinity of the minimum run length Tmax to improve the bit error rate. For example, (n+1) items of the domain information from the bit information obtained from channel bit data directly previous to the (k'+1) domain and next channel bit data and n-tupled clocks sandwiched in-between and (n+1) items of the domain information by the bit information obtained from channel bit data directly following the (k'+1) domain, previous channel bit data and n-tupled clocks sandwiched in-between are split respectively into H-levels and L-levels with a comparison level as a boundary and the number of the L-levels or that of the H-levels is used for designation as a correction bit position, so that the run length of the same symbol will be equal to k', thereby decreasing the der in the vicinity of the minimum run length Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, the channel bit data having a run length of the same symbol equal to (k'+1) are detected, using n-tupled clocks obtained on n-tupling channel clocks of the playback data, and the bit information obtained by bit data of a given channel clock and bit data of the next channel clock and n-tupled clocks sandwiched in-between is split with a comparison level as the boundary into the H-level and the L-level to give (n+1) items of the domain information. For example, the (n+1) items of the domain information from the bit information obtained by channel bit data directly previous to the (k'+1) domain and next channel bit data and n-tupled clocks sandwiched in-between and (n+1) items of the domain information by the bit information obtained from channel bit data directly following the (k'+1) domain, previous channel bit data and n-tupled clocks sandwiched in-between are split respectively into H-levels and L-levels with a comparison level as a boundary. If the number of "0"s on transition from the L level to the H level is larger than the number of "0"s on transition from the H level to the L level, the backward side of the (k'+1) domain is designated as the correction bit position, whereas, if the number of "0"s on transition from the H level to the L level is larger than the number of "0"s on transition from the L level to the H level, the forward side of the (k'+1) domain is designated as the correction bit position, for correcting the channel bit data having the run length of the same symbol so that the run length of the same symbol will be equal to k', thereby decreasing the der in the vicinity of the minimum run length Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k'+1) are detected, using n-tupled clocks obtained on n-tupling channel clocks of the playback data, and the bit information obtained by bit data of a given channel clock and bit data of the next channel clock and n-tupled clocks sandwiched in-between is split with a comparison level as the boundary into the H-level and the L-level to give (n+1) items of the domain information. For example, (n+1) items of the domain information from the bit information obtained by channel bit data directly previous to the (k'+1) domain and next channel bit data and n-tupled clocks sandwiched in-between and (n+1) items of the domain information by the bit information obtained from channel bit data directly following the (k'+1) domain, previous channel bit data and n-tupled clocks sandwiched in-between are split respectively into H-levels and L-levels with a comparison level as a boundary and, if the number of "1"s on transition from the H level to the L level is larger than the number of "1"s on transition from the L level to the H level, the forward side of the (k'+1) domain is designated as the correction bit position, whereas, if the number of "1"s on transition from the L level to the H level is larger than the number of "1"s on transition from the H level to the L level, the backward side of the (k'+1) domain is designated as the correction bit position, for correcting the channel bit data having the run length of the same symbol so that the run length of the same symbol will be equal to k', thereby decreasing the der in the vicinity of the minimum run length Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k'+1) are detected, using n-tupled clocks obtained on n-tupling channel clocks of the playback data. The bit information obtained by bit data of a given channel clock and bit data of the next channel clock and n-tupled clocks sandwiched in-between is split with a comparison level as the boundary into the H-level and the L-level to give (n+1) items of the domain information. For example, (n+1) items of the domain information from the bit information by channel bit data directly previous to the (k'+1) domain and next channel bit data and n-tupled clocks sandwiched in-between and (n+1) items of the domain information by the bit information obtained from channel bit data directly following the (k'+1) domain, previous channel bit data and n-tupled clocks sandwiched in-between are split respectively into H-levels and L-levels with a comparison level as a boundary and, if the domain information for the H levels is the same as that for the L-levels, the correction bit position is designated based on the previous correction bit position held on memory, for correcting the channel bit data having the run length of the same symbol so that the run length of the same symbol will be equal to k', thereby decreasing the der in the vicinity of the minimum run length Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k'+1) are detected, using n-tupled clocks obtained on n-tupling channel clocks of the playback data. For example, the bit information obtained from n-tupled clocks sandwiched between bit data of a given channel clock and bit data of the next channel clock is split with a comparison level as the boundary into the H-level and the L-level to give (n−1) items of the domain information for designating a correction position of channel bit data having a run length of the same symbol equal to (k'+1), for correcting the channel bit data having the run length of the same symbol so that the run length of the same symbol will be equal to k', thereby decreasing the der in the vicinity of the minimum run length Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k'+1) are detected, using n-tupled clocks obtained on n-tupling channel clocks of the playback data. For example, (n-1) items of the domain information from the bit information obtained by n-tupled clocks sandwiched between bit data of a given channel clock and bit data of the next channel clock are held on memory for designating a correction position of channel bit data having a run length of the same symbol equal to (k'+1), for correcting the channel bit data having the run length of the same symbol so that the run length of the same symbol will be equal to k', thereby decreasing the der in the vicinity of the minimum run length Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k'+1) are detected, using n-tupled clocks obtained on n-tupling channel clocks of the playback data. The bit information obtained by bit data of a given channel clock and bit data of the next channel clock and n-tupled clocks sandwiched in-between is split with a comparison level as the boundary into the H-level and the L-level to give (n+1) items of the domain information. For example, (n-1) items of the domain information by the bit information obtained from n-tupled clocks sandwiched between channel bit data directly previous to the (k'+1) domain and next channel bit data are compared to (n-1) items of the domain information by the bit information obtained from n-tupled clocks sandwiched between channel bit data directly following the (k'+1) domain and previous channel bit data to select a correction bit position which is designated, for correcting the channel bit data having the run length of the same symbol so that the run length of the same symbol will be equal to k', thereby decreasing the der in the vicinity of the minimum run length Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k'+1) are detected, using n-tupled clocks obtained on n-tupling channel clocks of the playback data. The bit information obtained by bit data of a given channel clock and bit data of the next channel clock and n-tupled clocks sandwiched in-between is split with a comparison level as the boundary into the H-level and the L-level to give (n+1) items of the domain information. For example, (n-1) items of the domain information by the bit information obtained from n-tupled clocks sandwiched between channel bit data directly previous to the (k'+1) domain and the next channel bit data and (n-1) items of the domain information by the bit information obtained from n-tupled clocks sandwiched between channel bit data directly following the (k'+1) domain and previous channel bit data are split respectively into H-levels and L-levels with a comparison level as a boundary and a correction bit position as selected depending on the magnitude of the H-levels or L-levels is designated, for correcting the channel bit data having the run length of the same symbol so that the run length of the same symbol will be equal to k', thereby decreasing the der in the vicinity of the minimum run length Tmax to improve the bit error rate.

On the other hand, the playback RF signals read out from a recording medium having recorded thereon recording codes as NRZI modulated codes having a maximum run length of "0"s between neighboring '1's in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k'+1) are detected, using n-tupled clocks obtained on n-tupling channel clocks of the playback data. The bit information obtained by bit data of a given channel clock and bit data of the next channel clock and n-tupled clocks sandwiched in-between is split with a comparison level as the boundary into the H-level and the L-level to give (n+1) items of the domain information. For example, (n-1) items of the domain information by the bit information obtained from n-tupled clocks sandwiched between channel bit data directly previous to the (k'+1) domain and the next channel bit data and (n-1) items of the domain information by the bit information obtained from n-tupled clocks sandwiched between channel bit data directly following the (k'+1) domain and previous channel bit data are split respectively into H-levels and L-levels with a comparison level as a boundary and a side with a smaller number of the H-levels is designated as a correction bit position if the (k'+1) domain is of the H-level whilst a side with a smaller number of the L-levels is designated as a correction bit position if the (k'+1) domain is of the L-level, for correcting the channel bit data having the run length of the same symbol so that the run length of the same symbol will be equal to k', thereby decreasing the der in the vicinity of the minimum run length Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k'+1) are detected, using n-tupled clocks obtained on n-tupling channel clocks of the playback data. The bit information obtained by bit data of a given channel clock and bit data of the next channel clock and n-tupled clocks sandwiched in-between is split with a comparison level as the boundary into the H-level and the L-level to give (n+1) items of the domain information. For example, (n-1) items of the domain information by the bit information obtained from n-tupled clocks sandwiched between channel bit data directly previous to the (k'+1) domain and the next channel bit data and (n−1) items of the domain information by the bit information obtained from n-tupled clocks sandwiched between channel bit data directly following the (k'+1) domain and previous channel bit data are split respectively into H-levels and L-levels with a comparison level as a boundary and the number of the L-levels or that of the H-levels is used for designation as a correction bit position, for correcting the channel bit data having the run length of the same symbol so that the run length of the same symbol will be equal to k', thereby decreasing the der in the vicinity of the minimum run length Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, the channel bit data having a run length of the same symbol equal to (k'+1) are detected, using n-tupled clocks obtained on n-tupling channel clocks of the playback data, and the bit information obtained by bit data of a given channel clock and bit data of the next channel clock and n-tupled clocks sandwiched in-between is split with a comparison level as the boundary into the H-level and the L-level to give (n+1) items of the domain information. For example, (n−1) items of the domain information by the bit information obtained from n-tupled clocks sandwiched between channel bit data directly previous to the (k'+1) domain and the next channel bit data and (n−1) items of the domain information by the bit information obtained from n-tupled clocks sandwiched between channel bit data directly following the (k'+1) domain and previous channel bit data are split respectively into H-levels and L-levels with a comparison level as a boundary and, if the number of "0"s on transition from the L level to the H level is larger than the number of "0"s on transition from the H level to the L level, the forward side of the (k'+1) domain is designated as the correction bit position, whereas, if the number of "0"s on transition from the H level to the L level is larger than the number of "0"s on transition from the L level to the H level, the backward side of the (k'+1) domain is designated as the correction bit position, for correcting the channel bit data having the run length of the same symbol so that the run length of the same symbol will be equal to k', thereby decreasing the der in the vicinity of the minimum run length Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, the channel bit data having a run length of the same symbol equal to (k'+1) are detected, using n-tupled clocks obtained on n-tupling channel clocks of the playback data. The bit information obtained by bit data of a given channel clock and bit data of the next channel clock and n-tupled clocks sandwiched in-between is split with a comparison level as the boundary into the H-level and the L-level to give (n+1) items of the domain information. For example, (n−1) items of the domain information from the bit information obtained from n-tupled clocks sandwiched between channel bit data directly previous to the (k'+1) domain and the next channel bit data and (n−1) items of the domain information by the bit information obtained from n-tupled clocks sandwiched between channel bit data directly following the (k'+1) domain and previous channel bit data are split respectively into H-levels and L-levels with a comparison level as a boundary and, if the number of "1"s on transition from the H level to the L level is larger than the number of "1"s on transition from the L level to the H level, the forward side of the (k'+1) domain is designated as the correction bit position, whereas, if the number of "1"s on transition from the L level to the H level is larger than the number of "1"s on transition from the H level to the L level, the backward side of the (k'+1) domain is designated as the correction bit position, for correcting the channel bit data having the run length of the same symbol so that the run length of the same symbol will be equal to k', thereby decreasing the der in the vicinity of the minimum run length Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k'+1) are detected, using n-tupled clocks obtained on n-tupling channel clocks of the playback data. The bit information obtained by bit data of a given channel clock and bit data of the next channel clock and n-tupled clocks sandwiched in-between is split with a comparison level as the boundary into the H-level and the L-level to give (n+1) items of the domain information. For example, (n−1) items of the domain information from the bit information obtained from n-tupled clocks sandwiched between channel bit data directly previous to the (k'+1) domain and the next channel bit data and (n−1) items of the domain information by the bit information obtained from n-tupled clocks sandwiched between channel bit data directly following the (k'+1) domain and previous channel bit data are split respectively into H-levels and L-levels with a comparison level as a boundary and, if the domain information for the H levels is the same as that for the L-levels, the correction bit position is designated based on the previous correction bit position held on memory, for correcting the channel bit data having the run length of the same symbol so that the run length of the same symbol will be equal to k', thereby decreasing the der in the vicinity of the minimum run length Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k'+1) are detected, using n-tupled clocks obtained on n-tupling channel clocks of the playback data. The bit information obtained by bit data of a given channel clock and bit data of the next channel clock and n-tupled clocks sandwiched in-between is split with a comparison level as the boundary into the H-level and the L-level to give (n+1) items of the domain information. For example, n-items of the bit information including bit data of a given channel clock in the bit information obtained from n-tupled clocks are split into H-levels and L-levels with a comparison level as a boundary to give respective n-items of the domain information for designating a correction position of channel bit data having a run length of the same symbol equal to (k'+1), for correcting the channel bit data having the run length of the same symbol so that the run length of the same symbol will be equal to k', thereby decreasing the der in the vicinity of the minimum run length Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k'+1) are detected, using n-tupled clocks obtained on n-tupling channel clocks of the playback data. The bit information obtained by bit data of a given channel clock and bit data of the next channel clock and n-tupled clocks sandwiched in-between is split with a comparison level as the boundary into the H-level and the L-level to give (n+1) items of the domain information. For example, from n-items of the bit information including bit data of a given channel clock in the bit information obtained from n-tupled clocks, plural domain information items consisting of n bits are held on memory for designating a correction position of channel bit data having a run length of the same symbol equal to (k'+1) for correcting the channel bit data having the run length of the same symbol so that the run length of the same symbol will be equal to k', thereby decreasing the der in the vicinity of the minimum run length Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, the channel bit data having a run length of the same symbol equal to (k'+1) are detected, using n-tupled clocks obtained on n-tupling channel clocks of the playback data, and the bit information obtained by bit data of a given channel clock and bit data of the next channel clock and n-tupled clocks sandwiched in-between is split with a comparison level as the boundary into the H-level and the L-level to give (n+1) items of the domain information. The bit information of n-bit including bit data of a channel clock in the bit information obtained from n-tupled clocks is split into H-and L-levels with the comparison level as a boundary to give n-items of the domain information. For example, n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between are compared to each other to select a correction bit position which is designated, for correcting the channel bit data having the run length of the same symbol so that the run length of the same symbol will be equal to k', thereby decreasing the der in the vicinity of the minimum run length Tmax to improve the bit error rate.

Also, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, the channel bit data having a run length of the same symbol equal to (k'+1) are detected, using n-tupled clocks obtained on n-tupling channel clocks of the playback data, and the bit information obtained by bit data of a given channel clock and bit data of the next channel clock and n-tupled clocks sandwiched in-between is split with a comparison level as the boundary into the H-level and the L-level to give (n+1) items of the domain information. The bit information of n-bit including bit data of a channel clock in the bit information obtained from n-tupled clocks is split into H- and L-levels with the comparison level as a boundary to give n-items of the domain information. For example, n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between are split respectively into H-levels and L-levels with a comparison level as a boundary and a correction bit position as selected depending on the relative magnitude of the H-levels or L-levels is designated, for correcting the channel bit data having the run length of the same symbol so that the run length of the same symbol will be equal to k', thereby decreasing the der in the vicinity of the minimum run length Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, the channel bit data having a run length of the same symbol equal to (k'+1) are detected, using n-tupled clocks obtained on n-tupling channel clocks of the playback data, and the bit information obtained by bit data of a given channel clock and bit data of the next channel clock and n-tupled clocks sandwiched in-between is split with a comparison level as the boundary into the H-level and the L-level to give (n+1) items of the domain information while the bit information of n-bit including bit data of a channel clock in the bit information obtained from n-tupled clocks is split into H-and L-levels with the comparison level as a boundary to give n-items of the domain information. For example, n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between are split respectively into H-levels and L-levels with a comparison level as a boundary and the number of the L-levels or that of the H-levels is used for designation as a correction bit position. This corrects channel bit data having a run length of "0"s between neighboring "1"s in a codestring equal to (k'+1) so that the run length of the same symbol will be equal to k' to decrease data decoding error in the vicinity of the minimum run length Tmax to improved the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, the channel bit data having a run length of the same symbol equal to (k'+1) are detected, using n-tupled clocks obtained on n-tupling channel clocks of the playback data, and the bit information obtained by bit data of a given channel clock and bit data of the next channel clock and n-tupled clocks sandwiched in-between is split with a comparison level as the boundary into the H-level and the L-level to give (n+1) items of the domain information while the n-bit bit information including channel bit data of a given channel clock in the bit information obtained from n-tupled clocks is split with a comparison level to H-levels and L-level to give n-items of the domain information. For example, n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between are split respectively into H-levels and L-levels with a comparison level as a boundary and, if n-items of the domain information include backward side channel bit data, the forward side of the (k'+1) domain is designated as the correction bit position in case the number of "0"s on transition from the L-level to the H-level plus 1 is larger than the number of "0"s on transition from the H-level to the L-level, while the backward side of the (k'+1) domain is designated as the correction bit position in case the number of "0"s on transition from the H-level to the L-level is larger than the number of "0"s on transition from the L-level to the H-level plus 1. This corrects channel bit data having a run length of "0"s between neighboring "1"s in a codestring equal to (k'+1) so that the run length of the same symbol will be equal to k' to decrease data decoding error in the vicinity of the minimum run length Tmax to improved the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, the channel bit data having a run length of the same symbol equal to (k'+1) are detected, using n-tupled clocks obtained on n-tupling channel clocks of the playback data, and the bit information obtained by bit data of a given channel clock and bit data of the next channel clock and n-tupled clocks sandwiched in-between is split with a comparison level as the boundary into the H-level and the L-level to give (n+1) items of the domain information while the n-bit bit information including bit data of a given channel clock in the bit information obtained from n-tupled clocks sandwiched in-between is split with a comparison level to H-levels and L-level to give n-items of the domain information. For example, n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between are split respectively into H-levels and L-levels with a comparison level as a boundary and, if n-items of the domain information include backward side channel bit data, the forward side of the (k'+1) domain is designated as the correction bit position in case the number of "1"s on transition from the H-level to the L-level plus 1 is larger than the number of "1"s on transition from the L-level to the H-level, while the backward side of the (k'+1) domain is designated as the correction bit position in case the number of "1"s on transition from the L-level to the H-level is larger than the number of "1"s on transition from the H-level to the L-level plus 1. This corrects channel bit data having a run length of "0"s between neighboring "1"s in a codestring equal to (k'+1) so that the run length of the same symbol will be equal to k' to decrease data decoding error in the vicinity of the minimum run length Tmax to improved the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, the channel bit data having a run length of the same symbol equal to (k'+1) are detected, using n-tupled clocks obtained on n-tupling channel clocks of the playback data, and the bit information obtained by bit data of a given channel clock and bit data of the next channel clock and n-tupled clocks sandwiched in-between is split with a comparison level as the boundary into the H-level and the L-level to give (n+1) items of the domain information while the n-bit bit information including bit data of a given channel clock in the bit information obtained from n-tupled clocks sandwiched in-between is split with a comparison level to H-levels and L-level to give n-items of the domain information. For example, n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between are split respectively into H-levels and L-levels with a comparison level as a boundary and, if n-items of the domain information include forward side channel bit data, the forward side of the (k'+1) domain is designated as the correction bit position in case the number of "1"s on transition from the H-level to the L-level is larger than the number of "1"s on transition from the L-level to the H-level plus 1, while the backward side of the (k'+1) domain is designated as the correction bit position in case the number of "1"s on transition from the L-level to the H-level plus 1 is larger than the number of "1"s on transition from the H-level to the L-level. This corrects channel bit data having a run length of "0"s between neighboring "1"s in a codestring equal to (k'+1) so that the run length of the same symbol will be equal to k' to decrease data decoding error in the vicinity of the minimum run length Tmax to improved the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, the channel bit data having a run length of the same symbol equal to (k'+1) are detected, using n-tupled clocks obtained on n-tupling channel clocks of the playback data, and the bit information obtained by bit data of a given channel clock and bit data of the next channel clock and n-tupled clocks sandwiched in-between is split with a comparison level as the boundary into the H-level and the L-level to give (n+1) items of the domain information while the n-bit bit information including bit data of a given channel clock in the bit information obtained from n-tupled clocks sandwiched in-between is split with a comparison level to H-levels and L-level to give n-items of the domain information. For example, n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between are split respectively into H-levels and L-levels with a comparison level as a boundary. If the domain information for the H levels is the same as that for the L-levels, the correction bit position is designated based on the previous correction bit position held on memory. This corrects channel bit data having a run length of "0"s between neighboring "1"s in a codestring equal to (k'+1) so that the run length of the same symbol will be equal to k' to decrease data decoding error in the vicinity of the minimum run length Tmax to improved the bit error rate.

Also, using n-tupled clocks obtained on n-tupling channel clocks of playback data from a recording medium having recording codes recorded thereon, the recording codes being NRZI modulated codes having a maximum run length of "0"s between neighboring "1"s in a code string equal to k, the recording codes having a maximum run length of the same symbol following inverse NRZI modulation equal to k'=k+1, where n is an integer not less than 2 with k≧1 and k≧d, channel bit data having a run length of the same symbol following inverse NRZI modulation equal to (k'+1) are detected, and a correction position of the detected channel bit data having the run length of "0"s equal to (k'+1) is designated and the logical level of data at the designated correction bit position is inverted for correcting channel bit data having the run length of "0"s equal to (k'+1) so that the run length of "0"s will be equal to k'. This corrects channel bit data having a run length of "0"s between neighboring "1"s in a codestring equal to (k'+1) so that the run length of the same symbol will be equal to k'to decrease data decoding error in the vicinity of the minimum run length Tmax to improved the bit error rate.

Also, by generating n-tupled clocks by n-tupling channel clocks of playback data from a recording medium having recording codes recorded thereon, the recording codes being NRZI modulated codes having a maximum run length of "0"s between neighboring "1"s in a code string equal to k, the recording codes having a maximum run length of the same symbol following inverse NRZI modulation equal to k'=k+1, where n is an integer not less than 2 with k≧1 and k≧d, detecting channel bit data having a run length of "0"s following inverse NRZI modulation equal to (k'+1), and by designating a correction position of the detected channel bit data having the run length of "0"s equal to (k+1) for correcting channel bit data having the run length of "0"s equal to (k+1) so that the run length of "0"s will be equal to k, the data decoding error in the vicinity of the maximum length between transitions Tmax can be decreased to improve the bit error rate.

Likewise, by decoding the playback RF signals read out from a recording medium at at least a comparison level for decoding into channel bit data, detecting channel bit data having a run length of "0"s after inverse NRZI modulation equal to (k+1), designating the correction position of the detected channel bit data having the run length of "0"s equal to (k+1) and by correcting the channel bit data having the run length of "0"s equal to (k+1) so that the run length of "0"s will be equal t k, the data decoding error in the vicinity of the maximum length between transitions Tmax can be decreased to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k+1) are detected, using n-tupled clocks obtained on n-tupling channel clocks of the playback data. For example, the bit information obtained by bit data of a given channel clock and bit data of the next channel clock and n-tupled clocks sandwiched in-between is split with a comparison level as the boundary into the H-level and the L-level to give (n+1) items of the domain information for designating a correction position of channel bit data having a run length of "0"s equal to (k+1). This corrects channel bit data having a run length of "0"s between neighboring "1"s in a codestring equal to (k+1) so that the run length of the same symbol will be equal to k to decrease data decoding error in the vicinity of the minimum run length Tmax to improved the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k+1) are detected, using n-tupled clocks obtained on n-tupling channel clocks of the playback data. For example, (n+1) items of the domain information from the bit information obtained by bit data of a given channel clock and bit data of the next channel clock and n-tupled clocks sandwiched in-between are held on memory for designating a correction position of channel bit data having a run length of "0"s equal to (k+1). This corrects channel bit data having a run length of "0"s between neighboring "1"s in a codestring equal to (k+1) so that the run length of the same symbol will be equal to k to decrease data decoding error in the vicinity of the minimum run length Tmax to improved the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k+1) are detected, using n-tupled clocks obtained on n-tupling channel clocks of the playback data. For example, (n+1) items of the domain information from the bit information obtained by channel bit data directly previous to the (k+1) domain and next channel bit data and n-tupled clocks sandwiched in-between are compared to (n+1) items of the domain information by the bit information obtained from channel bit data directly following the (k+1) domain, previous channel bit data and n-tupled clocks sandwiched in-between to select a correction bit position which is designated. This corrects channel bit data having a run length of "0"s between neighboring "1"s in a codestring equal to (k+1) so that the run length of the same symbol will be equal to k to decrease data decoding error in the vicinity of the minimum run length Tmax to improved the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k+1) are detected, using n-tupled clocks obtained on n-tupling channel clocks of the playback data. For example, (n+1) items of the domain information from the bit information obtained by channel bit data directly previous to the (k+1) domain and next channel bit data and n-tupled clocks sandwiched in-between and (n+1) items of the domain information by the bit information obtained from channel bit data directly following the (k+1) domain, previous channel bit data and n-tupled clocks sandwiched in-between are split respectively into H-levels and L-levels with a comparison level as a boundary and a correction bit position as selected depending on the relative magnitude of the H-levels or L-levels is designated. This corrects channel bit data having a run length of "0"s between neighboring "1"s in a codestring equal to (k+1) so that the run length of the same symbol will be equal to k to decrease data decoding error in the vicinity of the minimum run length Tmax to improved the bit error rate.

On the other hand, the playback RF signals read out from a recording medium having recorded thereon recording codes as NRZI modulated codes having a maximum run length of "0"s between neighboring "1"s in a code string equal to k, which recording codes have a maxi mum run length of the same symbol following inverse NRZI modulation equal to k'=k+1, where k≧1 and k≧d, are decoded at at least a comparison level into channel bit data, and the channel bit data having a run length of the same symbol equal to (k+1) are detected, using n-tupled clocks obtained on n-tupling channel clocks of the playback data. For example, (n+1) items of the domain information from the bit information obtained by channel bit data directly previous to the (k+1) domain and next channel bit data and n-tupled clocks sandwiched in-between and (n+1) items of the domain information by the bit information obtained from channel bit data directly following the (k+1) domain, previous channel bit data and n-tupled clocks sandwiched in-between are split respectively into H-levels and L-levels with a comparison level as a boundary and a side with a larger number of the H-levels is designated as a correction bit position if the (k+1) domain i s of the Hm level and a side with a larger number of the H-levels is designated as a correction bit position if the (k+1) domain is of the L-level. This corrects channel bit data having a run length of "0"s between neighboring "1"s in a codestring equal to (k+1) so that the run length of the same symbol will be equal to k to decrease data decoding error in the vicinity of the minimum run length Tmax to improved the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k>1 and k≧d, are decoded at at least a comparison level into channel bit data, and the channel bit data having a run length of the same symbol equal to (k+1) are detected, using n-tupled clocks obtained on n-tupling channel clocks of the playback data. For example, (n+1) items of the domain information from the bit information obtained by channel bit data directly previous to the (k+1) domain and next channel bit data and n-tupled clocks sandwiched in-between and (n+1) items of the domain information by the bit information obtained from channel bit data directly following the (k+1) domain, previous channel bit data and n-tupled clocks sandwiched in-between are split respectively into H-levels and L-levels with a comparison level as a boundary and, if the number of "0"s on transition from the L level to the H level is larger than the number of "0"s on transition from the H level to the L level, the backward side of the (k+1) domain is designated as the correction bit position, whereas, if the number of "0"s on transition from the H level to the L level is larger than the number of "0"s on transition from the L level to the H level, the forward side of the (k+1) domain is designated as the correction bit position. This corrects channel bit data having a run length of "0"s between neighboring "1"s in a codestring equal to (k+1) so that the run length of the same symbol will be equal to k to decrease data decoding error in the vicinity of the minimum run length Tmax to improved the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k+1) are detected, using n-tupled clocks obtained on n-tupling channel clocks of the playback data. For example, (n+1) items of the domain information from the bit information obtained by channel bit data directly previous to the (k+1) domain and next channel bit data and n-tupled clocks sandwiched in-between and (n+1) items of the domain information by the bit information obtained from channel bit data directly following the (k+1) domain, previous channel bit data and n-tupled clocks sandwiched in-between are split respectively into H-levels and L-levels with a comparison level as a boundary and, if the number of "1"s on transition from the H level to the L level is larger than the number of "1"s on transition from the L level to the H level, the forward side of the (k+1) domain is designated as the correction bit position, whereas, if the number of "1"s on transition from the L level to the H level is larger than the number of "1"s on transition from the H level to the L level, the backward side of the (k+1) domain is designated as the correction bit position so that the run length of the same symbol will be equal to k to decrease data decoding error in the vicinity of the minimum run length Tmax to improved the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k+1) are detected, using n-tupled clocks obtained on n-tupling channel clocks of the playback data. For example, (n+1) items of the domain information from the bit information by channel bit data directly previous to the (k+1) domain and next channel bit data and n-tupled clocks sandwiched in-between and (n+1) items of the domain information by the bit information obtained from channel bit data directly following the (k+1) domain, previous channel bit data and n-tupled clocks sandwiched in-between are split respectively into H-levels and L-levels with a comparison level as a boundary and, if the domain information for the H levels is the same as that for the L-levels, the correction bit position is designated based on the previous correction bit position held on memory. This corrects channel bit data having a run length of "0"s between neighboring "1"s in a codestring equal to (k+1) so that the run length of the same symbol will be equal to k to decrease data decoding error in the vicinity of the minimum run length Tmax to improved the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k+1) are detected, using n-tupled clocks obtained on n-tupling channel clocks of the playback data. For example, the bit information obtained from n-tupled clocks sandwiched between bit data of a given channel clock and bit data of the next channel clock is split with a comparison level as the boundary into the H-level and the L-level to give (n−1) items of the domain information for designating a correction position of channel bit data having a run length of "0"s equal to (k+1). This corrects channel bit data having a run length of "0"s equal to (k+1) so that the run length of "0"s will be equal to k for decreasing data decoding error in the vicinity of the maximum length between transitions Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k+1) are detected, using n-tupled clocks obtained on n-tupling channel clocks of the playback data, to produce (n−1) items of the domain information from the bit information obtained by n-tupled clocks sandwiched between bit data of a given channel clock and bit data of the next channel clock. For example, (n−1) items of the domain information from the bit information obtained by n-tupled clocks sandwiched between bit data of a given channel clock and bit data of the next channel clock are held on memory for designating a correction position of channel bit data having a run length of "0"s equal to (k+1). This corrects channel bit data having a run length of "0"s equal to (k+1) so that the run length of "0"s will be equal to k for decreasing data decoding error in the vicinity of the maximum length between transitions Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k+1) are detected, using n-tupled clocks obtained on n-tupling channel clocks of the playback data, to produce (n−1) items of the domain information by the bit information obtained from n-tupled clocks sandwiched between channel bit data directly previous to the (k+1) domain and next channel bit data. For example, (n−1) items of the domain information by the bit information obtained from n-tupled clocks sandwiched between channel bit data directly previous to the (k+1) domain and next channel bit data are compared to (n−1) items of the domain information by the bit information obtained from n-tupled clocks sandwiched between channel bit data directly following the (k+1) domain and previous channel bit data to select a correction bit position which is designated. This corrects channel bit data having a run length of "0"s equal to (k+1) so that the run length of "0"s will be equal to k for decreasing data decoding error in the vicinity of the maximum length between transitions Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol following inverse NRZI equal to (k+1) are detected, using n-tupled clocks obtained on n-tupling channel clocks of the playback data, to produce (n−1) items of the domain information by the bit information obtained from n-tupled clocks sandwiched between channel bit data directly previous to the (k+1) domain and the next channel bit data, where n is an integer not less than 2. For example, (n−1) items of the domain information by the bit information obtained from n-tupled clocks sandwiched between channel bit data directly previous to the (k+1) domain and the next channel bit data and (n−1) items of the domain information by the bit information obtained from n-tupled clocks sandwiched between channel bit data directly following the (k+1)

domain and previous channel bit data are split respectively into H-levels and L-levels with a comparison level as a boundary and a correction bit position as selected depending on the relative magnitude of the H-levels or L-levels is designated. This corrects channel bit data having a run length of "0"s equal to (k+1) so that the run length of "0"s will be equal to k for decreasing data decoding error in the vicinity of the maximum length between transitions Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol following inverse NRZI modulation equal to (k+1) are detected, using n-tupled clocks obtained on n-tupling channel clocks of the playback data, to produce (n−1) items of the domain information by the bit information obtained from n-tupled clocks sandwiched between channel bit data directly previous to the (k+1) domain and the next channel bit data. For example, (n−1) items of the domain information by the bit information obtained from n-tupled clocks sandwiched between channel bit data directly previous to the (k+1) domain and the next channel bit data and (n−1) items of the domain information by the bit information obtained from n-tupled clocks sandwiched between channel bit data directly following the (k+1) domain and previous channel bit data are split respectively into H-levels and L-levels with a comparison level as a boundary and a side with a smaller number of the H-levels is designated as a correction bit position if the (k+1) domain is of the H-level whilst a side with a smaller number of the L-levels is designated as a correction bit position if the (k+1) domain is of the L-level. This corrects channel bit data having a run length of "0"s equal to (k+1) so that the run length of "0"s will be equal to k for decreasing data decoding error in the vicinity of the maximum length between transitions Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol following inverse NRZI modulation equal to (k+1) are detected, using n-tupled clocks obtained on n-tupling channel clocks of the playback data. For example, (n−1) items of the domain information by the bit information obtained from n-tupled clocks sandwiched between channel bit data directly previous to the (k+1) domain and the next channel bit data and (n−1) items of the domain information by the bit information obtained from n-tupled clocks sandwiched between channel bit data directly following the (k+1) domain and previous channel bit data are split respectively into H-levels and L-levels with a comparison level as a boundary and the number of the L-levels or that of the H-levels is used for designation as a correction bit position. This corrects channel bit data having a run length of "0"s equal to (k+1) so that the run length of "0"s will be equal to k for decreasing data decoding error in the vicinity of the maximum length between transitions Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k+1) are detected, using n-tupled clocks obtained on n-tupling channel clocks of the playback data. For example, (n−1) items of the domain information by the bit information obtained from n-tupled clocks sandwiched between channel bit data directly previous to the (k+1) domain and the next channel bit data and (n−1) items of the domain information by the bit information obtained from n-tupled clocks sandwiched between channel bit data directly following the (k+1) domain and previous channel bit data are split respectively into H-levels and L-levels with a comparison level as a boundary and, if the number of "0"s on transition from the L level to the H level is larger than the number of "0"s on transition from the H level to the L level, the forward side of the (k+1) domain is designated as the correction bit position, whereas, if the number of "0"s on transition from the H level to the L level is larger than the number of "0"s on transition from the L level to the H level, the backward side of the (k+1) domain is designated as the correction bit position. This corrects channel bit data having a run length of "0"s equal to (k+1) so that the run length of "0"s will be equal to k for decreasing data decoding error in the vicinity of the maximum length between transitions Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of "0"s equal to (k+1) are detected, using n-tupled clocks obtained on n-tupling channel clocks of the playback data. For example, (n−1) items of the domain information from the bit information obtained from n-tupled clocks sandwiched between channel bit data directly previous to the (k+1) domain and the next channel bit data and (n−1) items of the domain information by the bit information obtained from n-tupled clocks sandwiched between channel bit data directly following the (k+1) domain and previous channel bit data are split respectively into H-levels and L-levels with a comparison level as a boundary and, if the number of "1"s on transition from the H level to the L level is larger than the number of "1"s on transition from the L level to the H level, the forward side of the (k+1) domain is designated as the correction bit position, whereas, if the number of "1"s on transition from the L level to the H level is larger than the number of "1"s on transition from the H level to the L level, the backward side of the (k+1) domain is designated as the correction bit position. This corrects channel bit data having a run length of "0"s equal to (k+1) so that the run length of "0"s will be equal to k for decreasing data decoding error in the vicinity of the maximum length between transitions Tmax to improve the bit error rate.

On the other hand, the playback RF signals read out from a recording medium having recorded thereon recording codes as NRZI modulated codes having a maximum run length of "0"s between neighboring lies in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k+1) are detected, using n-tupled clocks obtained on n-tupling channel clocks of the playback data, to give (n−1) items of the domain information from the bit information obtained from n-tupled clocks sandwiched between bit data of a channel clock and bit data of the next channel clocks. For example, (n−1) items of the domain information from the bit information obtained from n-tupled clocks sandwiched between channel bit data directly previous to the (k+1) domain and the next channel bit data and (n−1) items of the domain information by the bit information obtained from n-tupled clocks sandwiched between channel bit data directly following the (k+1) domain and previous channel bit data are split respectively into H-levels and L-levels with a comparison level as a boundary and, if the domain information for the H levels is the same as that for the L-levels, the correction bit position is designated based on the previous correction bit position held on memory. This corrects channel bit data having a run length of "0"s equal to (k+1) so that the run length of "0"s will be equal to k for decreasing data decoding error in the vicinity of the maximum length between transitions Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol following inverse NRZI modulation equal to (k+1) are detected, using n-tupled clocks obtained on n-tupling channel clocks of the playback data. For example, from n-items of the bit information including bit data of a given channel clock in the bit information obtained from n-tupled clocks, plural domain information items consisting of n bits are held on memory for designating a correction position of channel bit data having a run length of the same symbol equal to (k+1). This corrects channel bit data having a run length of "0"s equal to (k+1) so that the run length of "0"s will be equal to k for decreasing data decoding error in the vicinity of the maximum length between transitions Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol following inverse NRZI modulation equal to (k+1) are detected, using n-tupled clocks obtained on n-tupling channel clocks of the playback data. For example, n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between are compared to each other to select a correction bit position which is designated. This corrects channel bit data having a run length of "0"s equal to (k+1) so that the run length of "0"s will be equal to k for decreasing data decoding error in the vicinity of the maximum length between transitions Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k+1) following inverse NRZI modulation are detected, using n-tupled clocks obtained on n-tupling channel clocks of the playback data. For example, n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between are split respectively into H-levels and L-levels with a comparison level as a boundary and a correction bit position as selected depending on the relative magnitude of the H-levels or L-levels is designated. This corrects channel bit data having a run length of "0"s equal to (k+1) so that the run length of "0"s will be equal to k for decreasing data decoding error in the vicinity of the maximum length between transitions Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k+1) are detected, using n-tupled clocks obtained on n-tupling channel clocks of the playback data. For example, n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between are split respectively into H-levels and L-levels with a comparison level as a boundary and the number of the L-levels or that of the H-levels is used for designation as a correction bit position. This corrects channel bit data having a run length of "0"s equal to (k+1) so that the run length of "0"s will be equal to k for decreasing data decoding error in the vicinity of the maximum length between transitions Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol following inverse NRZI modulation equal to (k+1) are detected, using n-tupled clocks obtained on n-tupling channel clocks of the playback data. For example, n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between are split respectively into H-levels and L-levels with a comparison level as a boundary and, if n-items of the domain information include backward side channel bit data, the forward side of the (k+1) domain is designated as the correction bit position in case the number of "0"s on transition from the L-level to the H-level plus 1 is larger than the number of "0"s on transition from the H-level to the L-level, while the backward side of the (k+1) domain is designated as the correction bit position in case the number of "0"s on transition from the H-level to the L-level is larger than the number of "0"s on transition from the L-level to the H-level plus 1. This corrects channel bit data having a run length of "0"s equal to (k+1) so that the run length of "0"s will be equal to k for decreasing data decoding error in the vicinity of the maximum length between transitions Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol following inverse NRZI modulation equal to (k+1) are detected, using n-tupled clocks obtained on n-tupling channel clocks of the playback data. For example, n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between are split respectively into H-levels and L-levels with a comparison level as a boundary and, if n-items of the domain information include forward side channel bit data, the forward side of the (k+1) domain is designated as the correction bit position in case the number of "0"s on transition from the L-level to the H-level plus 1 is larger than the number of "0"s on transition from the H-level to the L-level plus 1, while the backward side of the (k+1) domain is designated as the correction bit position in case the number of "0"s on transition from the H-level to the L-level plus 1 is larger than the number of "0"s on transition from the L-level to the H-level. This corrects channel bit data having a run length of "0"s equal to (k+1) so that the run length of "0"s will be equal to k for decreasing data decoding error in the vicinity of the maximum length between transitions Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of "0"s following inverse NRZI modulation equal to (k+1) are detected, using n-tupled clocks obtained on n-tupling channel clocks of the playback data. For example, n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between are split respectively into H-levels and L-levels with a comparison level as a boundary and, if n-items of the domain information include backward side channel bit data, the forward side of the (k+1) domain is designated as the correction bit position in case the number of "1"s on transition from the H-level to the L-level plus 1 is larger than the number of "1"s on transition from the L-level to the H-level, while the backward side of the (k+1) domain is designated as the correction bit position in case the number of "1"s on transition from the L-level to the H-level is larger than the number of "1"s on transition from the H-level to the L-level plus 1. This corrects channel bit data having a run length of "0"s equal to (k+1) so that the run length of "0"s will be equal to k for decreasing data decoding error in the vicinity of the maximum length between transitions Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k+1) are detected, using n-tupled clocks obtained on n-tupling channel clocks of the playback data. For example, n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between are split respectively into H-levels and L-levels with a comparison level as a boundary and, if n-items of the domain information include forward side channel bit data, the forward side of the (k+1) domain is designated as the correction bit position in case the number of "1"s on transition from the H-level to the L-level is larger than the number of "1"s on transition from the L-level to the H-level plus 1, while the backward side of the (k+1) domain is designated as the correction bit position in case the number of "1"s on transition from the L-level to the H-level plus 1 is larger an the number of "1"s on transition from the H-level to the L-level. This corrects channel bit data having a run length of "0"s equal to (k+1) so that the run length of "0"s will be equal to k for decreasing data decoding error in the vicinity of the maximum length between transitions Tmax to improve the bit error rate.

On the other hand, the playback RF signals read out from a recording medium having recorded thereon recording codes as NRZI modulated codes having a maximum run length of "0"s between neighboring "1"s in a code string equal to k, which recording codes have a maximum run length of the same symbol following inverse NRZI modulation equal to k'=k+1, where k≧1 and k≧d, are decoded at at least a comparison level into channel bit data, and the channel bit data having a run length of the same symbol equal to (k+1) are detected, using n-tupled clocks obtained on n-tupling channel clocks of the playback data. For example, n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between are split respectively into H-levels and L-levels with a comparison level as a boundary and, if the domain information for the H levels is the same as that for the L-levels, the correction bit position is designated based on the previous correction bit position held on memory. This corrects channel bit data having a run length of "0"s equal to (k+1) so that the run length of "0"s will be equal to k for decreasing data decoding error in the vicinity of the maximum length between transitions Tmax to improve the bit error rate.

Also, by generating n-tupled clocks by n-tupling channel clocks of playback data from a recording medium having recording codes recorded thereon, the recording codes being NRZI modulated codes having a maximum run length of "0"s between neighboring "1"s in a code string equal to k, the recording codes having a maximum run length of the same symbol following inverse NRZI modulation equal to k'=k+1, where n is an integer not less than 2 with k≧1 and k≧d, detecting channel bit data having a run length of the same symbol following inverse NRZI modulation equal to (k'+1), designating a correction position of the detected channel bit data having the run length of "0"s equal to (k+1), inverting the logical level of data at a designated correction bit position and inverting the logical level of data at a bot position inside of the (k+1) domain at the designated bit position for correcting channel bit data having the run length of "0"s equal to (k+1) so that the run length of "0"s will be equal to k, the data decoding error in the vicinity of the maximum length between transitions Tmax can be decreased to improve the bit error rate.

Also, by generating n-tupled clocks by n-tupling channel clocks of playback data from a recording medium having recording codes recorded thereon, the recording codes being NRZI modulated codes having a maximum run length of "0"s between neighboring "1"s in a code string equal to k, the recording codes having a maximum run length of the same symbol following inverse NRZI modulation equal to k'=k+1, where n is an integer not less than 2 with k≧1 and k≧d, detecting channel bit data having a run length of the same symbol following inverse NRZI modulation equal to (k+1), designating a correction position of the detected channel bit data having the run length of "0"s equal to (k+1), and by shifting data of "1" at the designated correction bit position to data on an inner side of the (k+1) domain, for correcting channel bit data having the run length of "0"s equal to (k+1) so that the run length of "0"s will be equal to k, it becomes possible to decrease the data decoding error in the vicinity of the maximum length between transitions Tmax to improve the bit error rate.

Figure 10:
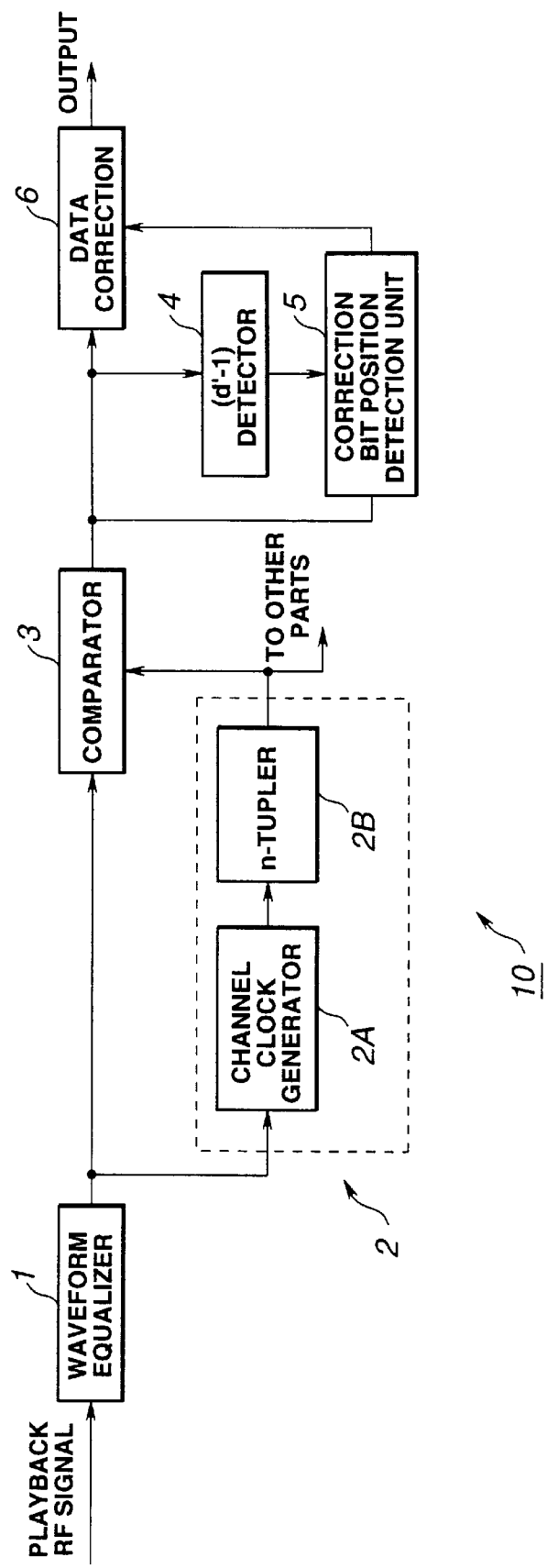
FIG. 10 is a block diagram of a data decoding device according to the present invention.

The data decoding device according to the present invention is constructed as shown for example in the block diagram of FIG. 10. That is, a data decoding device 10, designed for decoding data from an optical disc, includes a waveform equalizer 1 for waveform-equalizing the playback RF signals read out from the optical disc, a clock generator 2 and a comparator 3, supplied with the playback RF signals waveform-equalized by the waveform equalizer 1, a (d'−1) detector 4 supplied with an output of the comparator 3, a correction bit position detector 5 and a data correction unit 6.

The clock generator 2 is made up of a channel clock generator 2A of the PLL system for generating channel clocks from the playback RF signals waveform-equalized by the waveform equalizer 1, and a n-tupler 2B supplied with the channel clocks generated by the channel clock generator 2A, where n is an integer not less than 2. The channel clocks generated by the channel clock generator 2A are n-tupled by the n-tupler 2B for outputting n-tupled clocks.

The comparator 3 converts the playback RF signals waveform-equalized by the waveform equalizer 1 into bi-level signals, and is actuated by the n-tupled clocks to output bit data with the logic level "1" if the playback RF signal level is not less than the comparison level, while outputting bit data with the logic level "0" if the playback RF signal level is less than the comparison level.

For a n-tupled clock rate output of the comparator 3, the (d'−1) detector 4 generates a (d'−1) detection signal indicating detection of a portion of the NRZI modulated channel bit data string having the run length value of the same symbol (d'−1), thus not satisfying the minimum run length condition, that is a signal indicating detection of a bit data string of (d'−1) for the minimum run length d=2 in case a run length value of the logical level "1" or the logical level "0" in the channel bit data string is equal to 2.

For the n-tupled clock rate output of the comparator 3, the correction bit position detector 5 holds on memory the domain information from the (n+1)-bit bit information obtained from bit data in a given channel clock, bit data of the next channel clock and n-tupled clocks sandwiched in-between, and outputs a correction bit position designating signal designating the selected correction bit position violating the minimum run length from the domain information based on the (d'−1) detection signal by the (d'−1) detector 4. Specifically, the correction bit position detector 5 outputs the correction bit position designating signal designating the correction position of the channel bit data having the run length of the same symbol equal to (d'−1) based on the (d'−1) detection signal by the (d'−1) detector 4.

The data correction unit 6 corrects the bi-level data from the comparator 3, responsive to the correction bit position designating signal from the correction bit position detector 5, so that the run length of the same symbol will be equal to d', to output channel bit data of the channel clock rate.

That is, the data decoding device 10 decodes the playback RF signals read out from the optical disc by the comparator 3 on the comparator level for correcting the signal by the data correction unit 6 so that the run length of the same symbol will be equal to d' in order to output channel bit data of the channel clock rate.

In the present data decoding device 10, the correction bit position detector 5 holds on memory the domain information in terms of the number of the logical level '1' and the number of the logical level '0' and, using the domain information of channel bit data directly previous to the (d'−1) domain and the next channel bit data and the domain information of the channel bit data directly following the (d'−1) domain and the directly previous channel bit data, sets the side or position with a larger number of '1' of the domain information as a correction bit position if the (d'−1) domain is of the logical level "1".

Figure 11:
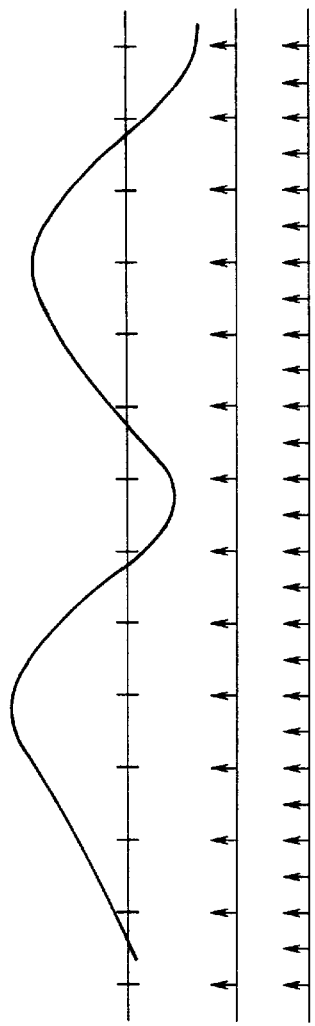
FIG. 11 is a time chart showing an exemplary correction operation in the above data decoding device.

The operation of the data decoding device 10 is explained in detail. The timing chart of FIG. 11 shows a specified operation in which n=2 and double-rate clocks are outputted by the n-tupler 2B of the clock generator 2. The EFM modulation code (2, 10: 8, 17: 1) is used as the modulation code. A data string violating Tmin of 3 (=2+1)T, T being a bit length of a channel bit string (recording waveform string), is corrected.

From the playback RF signals, shown in FIG. 11a, the channel clock generator 2A generates channel clocks shown in FIG. 11b and double-rate clocks shown in FIG. 11c. The comparator 3 compares the RF signals to bi-level signals of "1" and "0", with the comparator level as a boundary, at a timing of the channel clocks as shown in FIG. 11d, in order to generate a bit string following NRZI modulation. The comparator 3 also comparates the RF signal to bi-level signals of "1" and "0" with the comparison level as a boundary, as shown in FIG. 11e. The correction bit position detector 5 holds on memory the numbers of "1"s and "0"s between channel clocks in a number memory H and a number memory L, as shown in FIG. 11e. That is, in the configuration of FIG. 11, the numbers of "1"s and "0"s of both side channel clocks and the number of "1"s or "0"s between channel clocks, given by the double-rate clocks, totaling three comparation values, are stored in the respective channel clocks.

At first, from the data string following NRZI, comparated to "1"s or "0"s by the channel clocks, the (d'−1) detector 4 detects 2T violating Tmin, T being a bit length of the channel bit string.

Correction is performed on the forward side or the backward side of 2T. In the configuration of FIG. 11, a 2T "0" domain is corrected. Therefore, the correction bit position detector 5 compares the numbers of "0"s on both sides of 2T stored in the number memory L and outputs the side with a larger number of "0"s as a correction bit position designating signal.

In the configuration of FIG. 11, the correction bit position detector 5 compares the numbers of "0"s stored in the number memory L as shown in FIG. 11h in order to output a correction bit position designating signal designating the backward side with a larger number of "0"s as a correction bit as shown in FIG. 11i.

The data correction unit 6 takes an exclusive-OR of the correction bit position designating signal and the NRZI modulated bit string to complement the bit on the backward side of 2T to carry out correction from 2T to 3T.

Meanwhile, if the correction bit position is designated using double-rate clocks, the numbers of "0"s on both sides of 2T stored in the number memories L on both sides of 2T tend to be equal to each other. Therefore, the correction bit position detector 5 is designed to store the information as to which side has been corrected in previous 2T processing as the flag information. If the numbers of "0"s on both sides of 2T become equal to each other, the previous flag information is used for designating the correction bit position.

If the number memories on both sides of 2T differ from each other such that correction bit position designation is carried out, the flag information delivers the new information as the flag information. If the number memories on both sides of 2T become equal to each other, the flag delivers the directly previous flag information as new flag information. The flag information, once set, is held until next 2T correction.

Figure 12:
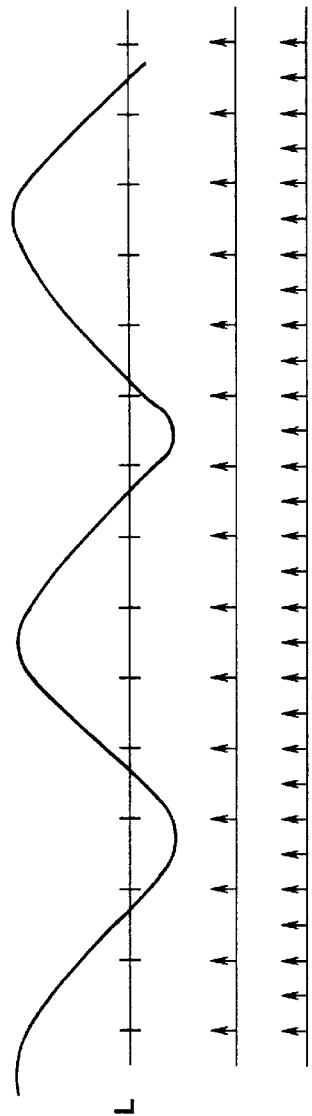
FIG. 12 is a time chart showing another exemplary correction operation in the above data decoding device.

FIG. 12 shows a configuration of a correcting operation in need of the flag information.

The basic operation i n this case is similar to that in FIG. 11. If, after 2T detection, the number memory L is seen in the comparison operation, and it has been found that the values of the memories on both sides of 2T are equal to each other, the flag information used at the directly previous correction is used for designating the direction which is the same as that of the directly previous correction as the correction bit position. That is, in the configuration of FIG. 12, the backward side is corrected by the first 2T correction operation, with the backward side being designated as the flag information. Since judgment is impossible for the next 2T portion, the backward side designated by the directly previous flag information is corrected as being the correction bit position. At this time, the new flag information again designates the backward side.

The flag inform at i on is held until the comparison operation by the memories and updated each time the comparison operation is carried out.

The same applies if the flag information is updated each time 2T correction is carried out.

If the correction bit position is designated using double-rate clocks, as in the configuration shown in FIG. 11, the clocks are at mid position s between neighboring channel clocks. Therefore, the results of comparison at the mid positions may be used in designating the correction bit position in detecting 2T. Specifically, the side having the comparison value at the mid position as given by the double-rate clocks of channel bits on both sides of 2T is designated as the correction bit position, because the "0" domain is 2T in FIG. 11. If the "0" domain is 2T and both comparison values at the mid positions given by the double-rate clocks of the channels bits on both sides of 2T are "0" or "1" to render judgment difficult, the correction bit position is designated based on the flag information as described above.

In the configuration of FIG. 11, three number memories, that is the memories for both side channel clocks and the memory for the mid clock prepared by the double-rate clocks sandwiched therebetween, are used. However, the number memories may be constituted by comparison values at the respective clock position formulated by the double-rate clocks, with the exclusion of both side channel clocks.

Figure 13:
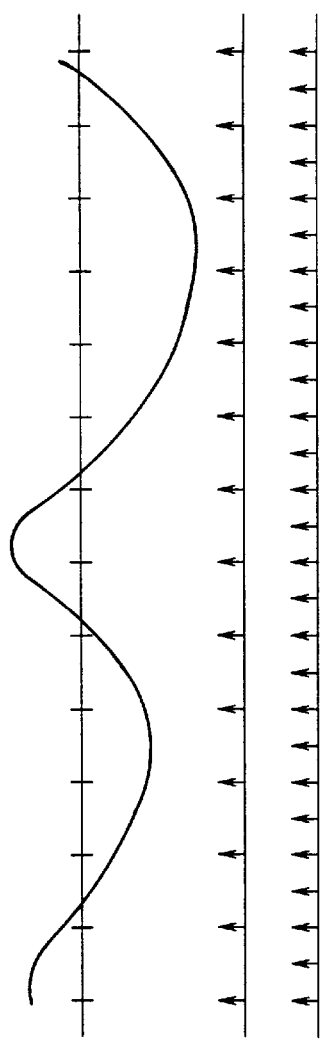
FIG. 13 is a time chart showing still another exemplary correction operation in the above data decoding device.

FIG. 13 shows a configuration in which a sum total of (n−1) number memories are produced by the information of the n-tupled clock portion, with the exclusion of both side channel clock data information. Although the sequence of operations is similar to that of FIG. 11, the information memory portion differs. If double-rate clocks are used as in FIG. 13, the number of memories is limited to one or zero, thus simplifying the structure.

Figure 14:
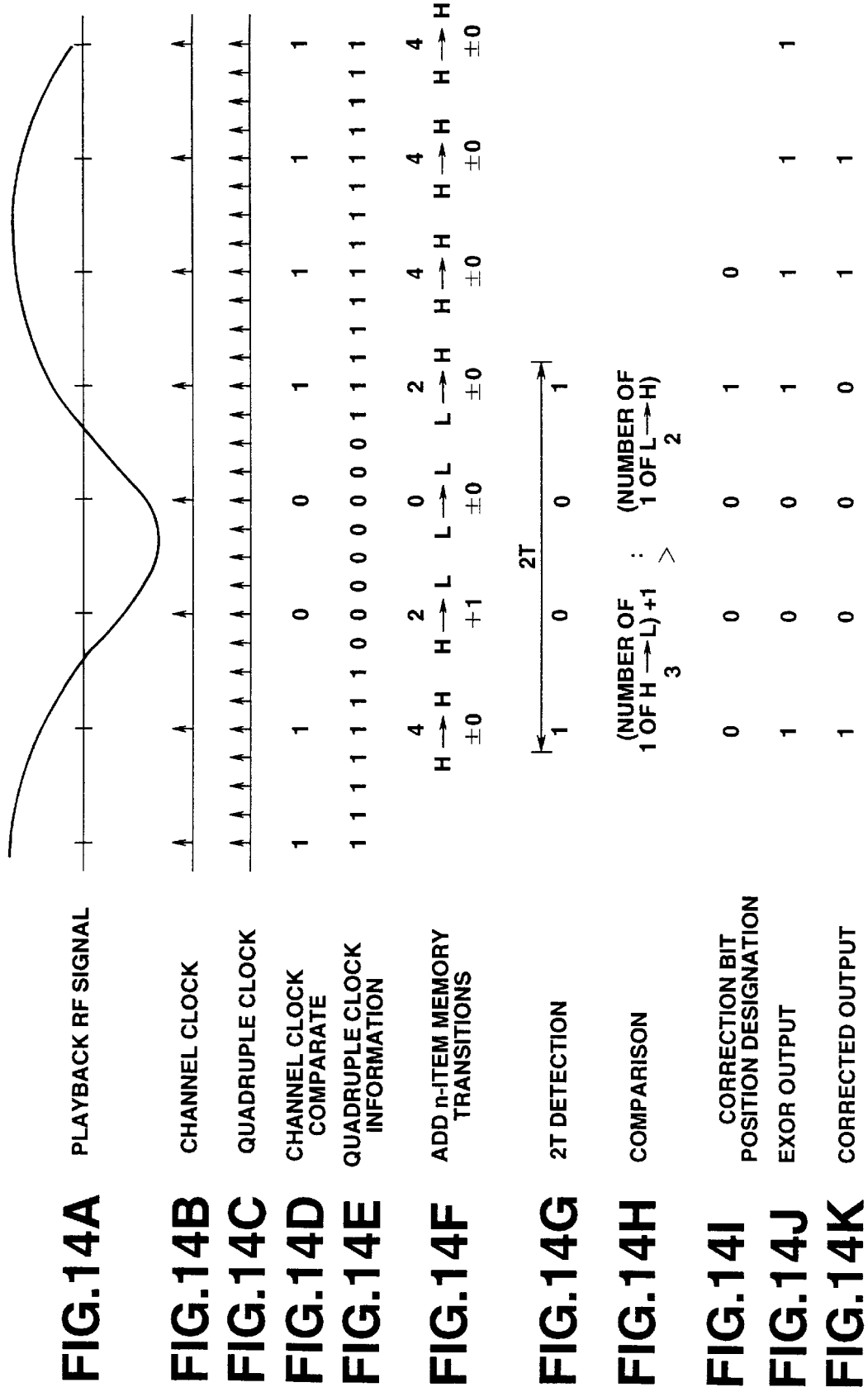
FIG. 14 is time chart showing yet another exemplary correction operation in the above data decoding device.

FIG. 14 shows a configuration in which a sum total of n of number memories are prepared by one of both side channel clock information data and n-tupled clock portions.

FIG. 14 shows a configuration in which the backward portion of the channel bits is encompassed.

A memory is prepared by a total of four information items, as in the configuration of FIG. 11. The four-item memory latches up to four items of the clock information from the channel bit directly after switching from the H level to the L level. If decision by comparison is done only for "1" level, the number of the four-item memories in which transition from the L level to the H level has occurred is incremented by +1. If the value of the "1" number memory in which has occurred transition from the L level to the H level is larger than the number of the number memories of "1" in which transition from the H level to the L level has occurred plus 1, the forward side of (d'−1) is corrected, whereas, if the value of the "1" number memory in which has occurred transition from the L level to the H level is smaller than the number of the number memories of "1" in which transition from the 1 level to the H level has occurred plus 1, the backward side of (d'−1) is corrected.

Referring to FIG. 14, the four-item memory latches up to four items of the clock information from the channel bit directly following transition from the H level to the L level. If decision by comparison is done by solely the "0" level, the number of the four-item memories is incremented by +1 when transition from the L level to the H level occurs. If the number of the number memories for "0"s in which transition from the L level to the H level has occurred plus 1 is larger than the number of the number memories for "0" where transition from H level to L level has occurred, the backward side of (d'−1) is corrected, whereas, if the number of the number memories for "0"s in which transition from the L level to the H level has occurred plus 1 is smaller than the number of the number memories for "0" where transition from H level to L level has occurred, the forward side of (d'−1) is corrected.

The data decoding device of the present invention can be applied to disc reproducing devices employing not only an optical disc but also a variety of discs, such as magneto-optical discs, on which data has been recorded using the (d, k) code.

Figure 15:
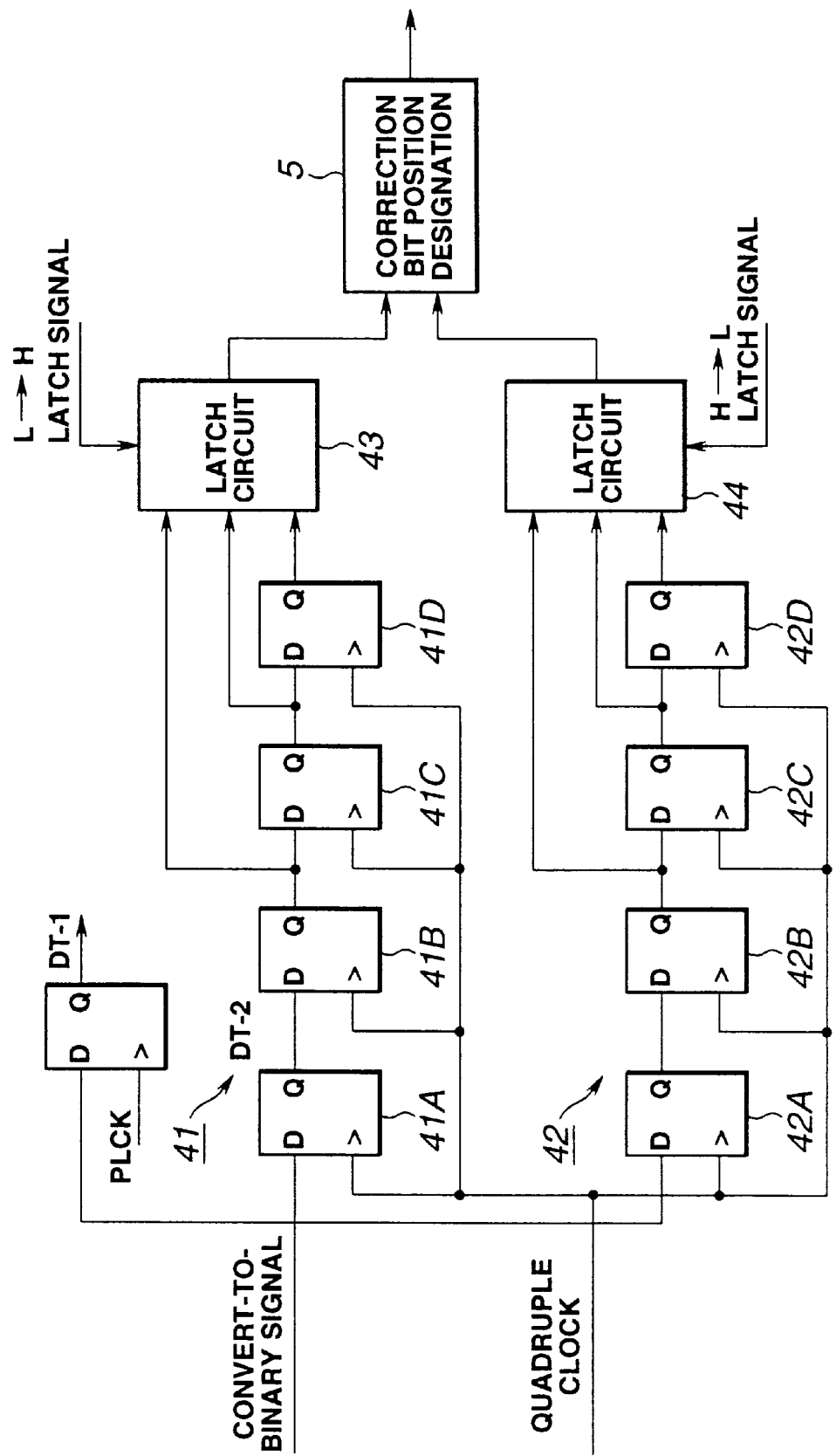
FIG. 15 is a block diagram showing a specified illustrative structure of a minimum run length correction bit position detector.

The block circuit diagram of FIG. 15 shows an illustrative structure of a portion of the correction bit position detector 5 in case the correction bit position is designated using quadrupled clocks. The portion of the correction bit position detector 5, shown in the block circuit diagram of FIG. 15, includes two latch circuits 43, 44 supplied via shift registers 41, 42 with quadrupled clock rate outputs of the comparator 3.

The shift register 41 is made up of four serially interconnected D flip-flops 41A, 41B, 41C and 41D constituting a four-stage shift register operating with quadrupled clocks. The 3-bit data from the latter three stages 41B, 41C and 41D are supplied to the latch circuit 43.

The shift register 42 is made up of four serially interconnected D flip-flops 42A, 42B, 42C and 42D constituting a four-stage shift register operating with quadrupled clocks. The 3-bit data from the latter three stages 42B, 42C and 42D are supplied to the latch circuit 44.

The latch circuit 43 latches the 3-bit data by a latch signal synchronized with the 1T channel clocks supplied thereto at a timing of transition from the L-level to the H-level to send the latch output as a (d'−1) detection signal to the correction bit position detector 5. The latch circuit 44 latches the 3-bit data by a latch signal synchronized with the 1T channel clocks supplied thereto at a timing of transition from the H-level to the L-level to send the latch output as a (d'−1) detection signal to the correction bit position detector 5.

The correction bit position detector 5 compares the number A of "0" of 3-bit data latched by the latch circuit 43 and the number B of "0" of 3-bit data latched by the latch circuit 44 to each other. The detector 5 gives a decision for decision not possible for A=B, a decision for backward correction for A>B and a decision for forward correction for A<B to designate the correction bit position.

The correction bit position detector 5 of the data decoding device 10 shown in FIG. 10 may be configured for holding on memory the domain information for an output of the n-tupled clock rate from the comparator 3, obtained from the (n−1)-bit bit information sandwiched between bit data of a channel clock and bit data of the next following channel clock, and selects the correction position of the data portion violating the minimum run length from the domain information held on memory based on the (d'−1) detection signal from the (d'−1) detector 4.

The correction bit position detector 5 of the data decoding device 10 shown in FIG. 10 may also be configured for holding on memory the domain information for an output of the n-tupled clock rate from the comparator 3, obtained from the (n+1)-bit bit information sandwiched between bit data of a channel clock and bit data of the next following channel clock, and selects the correction position of the data portion violating the minimum run length from the domain information held on memory based on the (d'−1) detection signal from the (d'−1) detector 4.

The correction bit position detector 5 of the data decoding device 10 shown in FIG. 10 may be configured for holding on memory the domain information for an output of the n-tupled clock rate from the comparator 3, obtained from the n-bit bit information sandwiched between bit data of a channel clock or bit data of the next following channel clock and n-tupled channel clocks sandwiched in-between, and selects the correction position of the data portion violating the minimum run length from the domain information held on memory based on the (d'−1) detection signal from the (d'−1) detector 4.

Thus, the data decoding device 10 for playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, generates n-tupled clocks of channel clocks of the playback data by a clock generator 2, n being an integer not less than 2, detects channel bit data having a run length of the same symbol equal to (d'−1) by a (d'−1) detector 4, designates a correction position for channel bit data having the detected run length of the same symbol equal to (d'−1) by a correction bit position detector 5, and corrects the channel bit data having the detected run length of the same symbol equal to (d'−1) by a data correction unit 6, so that the run length of the same symbol will be equal to d'. This reduces data decoding error in the vicinity of the minimum length between transitions Tmin to improve the bit error rate.

That is, the data decoding device 10 of the present invention includes a clock generator 2 for n-tupling channel clocks, n being an integer not less than 2, in playback data from a recording medium having recording codes recorded thereon, the recording codes being NRZI modulated codes having a minimum run length of "0"s between neighboring alps in a code string equal to d, d being a positive integer, the recording codes having a minimum run length of the same symbol equal to d'=d+1, a (d'−1) detector 4 for detecting channel bit data having a run length of the same symbol equal to (d'−1), a correction bit position detector 5 for outputting a correction bit position designating signal for designating a correction position for channel bit data having the run length of the same symbol as detected by the (d'−1) detector equal to (d'−1) and a data correction unit 6 for correcting the channel bit data having the run length of the same symbol as detected by the (d'−1) detector equal to (d'−1), based on the correction bit position designating signal of the correction bit position detector, so that the run length of the same symbol will be equal to d'.

In the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'-1) detector 4 for detecting channel bit data having a run length of the same symbol equal to (d'-1), a correction bit position detector 5 for outputting a correction bit position designating signal for designating a correction position for channel bit data having the run length of the same symbol as detected by the (d'-1) detector equal to (d'-1) and a data correction unit 6 for correcting the channel bit data having the run length of the same symbol equal to (d'-1) as detected by the (d'-1) detector, based on the correction bit position designating signal of the correction bit position detector, so that the run length of the same symbol will be equal to d', the playback RF signal read out from a recording medium is decoded at at least a comparison level to output channel bit data to correct the channel bit data having a run length of the same symbol equal to (d'-1) by the data correction unit 6 so that the run length of the same symbol will be equal to d' to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'-1) detector 4 for detecting channel bit data having a run length of the same symbol equal to (d'-1), a correction bit position detector 5 for outputting a correction bit position designating signal for designating a correction position for channel bit data having the run length of the same symbol as detected by the (d'-1) detector equal to (d'-1) and a data correction unit 6 for correcting the channel bit data having the run length of the same symbol as detected by the (d'-1) detector equal to (d'-1), based on the correction bit position designating signal of the correction bit position detector, so that the run length of the same symbol will be equal to d', the playback RF signals read out from a recording medium is decoded at at least a comparison level int channel bit data the channel bit data having the run length of the same symbol equal to (d'-1) by the data correction unit 6 so that the run length of the same symbol will be equal to d' for decreasing the data decoding error in the vicinity of the minimum length between transitions Tmin to improve the bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'-1) detector 4 for detecting channel bit data having a run length of the same symbol equal to (d'-1), a correction bit position detector 5 for outputting a correction bit position designating signal for designating a correction position for channel bit data having the run length of the same symbol as detected by the (d'-1) detector equal to (d'-1) and a data correction unit 6 for correcting the channel bit data having the run length of the same symbol as detected by the (d'-1) detector equal to (d'-1), based on the correction bit position designating signal of the correction bit position detector, so that the run length of the same symbol will be equal to d', the correction bit position detector has (n+1) items of the domain information which is obtained from bit data of a given channel clock and bit data of the next channel clock and n-tupled clocks sandwiched in-between with a comparison level as the boundary into the H-level and the L-level, and designates a correction position of channel bit data having a run length of the same symbol equal to (d'-1) to correct the channel bit data having a run length of the same symbol equal to (d'-1) by the data correction unit 6 so that the run length of the same symbol will be equal to d' to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'-1) detector 4 for detecting channel bit data having a run length of the same symbol equal to (d'-1), a correction bit position detector 5 for outputting a correction bit position designating signal for designating a correction position for channel bit data having the run length of the same symbol equal to (d'-1) as detected by the (d'-1) detector equal to (d'-1) and a data correction unit 6 for correcting the channel bit data having the run length of the same symbol as detected by the (d'-1) detector equal to (d'-1), based on the correction bit position designating signal of the correction bit position detector, so that the run length of the same symbol will be equal to d', the playback RF signals read out from the recording medium are decoded at at least a comparison level for outputting channel bit data and the correction bit position detector 5 stores (n+1) items of the domain information from the bit information obtained by bit data of a given channel clock and next bit data of the next channel clock and n-tupled clocks sandwiched in-between to designate a correction position of channel bit data having a run length of the same symbol equal to (d'-1). The data correction unit 6 corrects the channel bit data having a run length of the same symbol equal to (d'-1) so that the run length of the same symbol will be equal to d' to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'-1) detector 4 for detecting channel bit data having a run length of the same symbol equal to (d'-1), a correction bit position detector 5 for outputting a correction bit position designating signal for designating a correction position for channel bit data having the run length of the same symbol as detected by the (d'-1) detector equal to (d'-1) and a data correction unit 6 for correcting the channel bit data having the run length of the same symbol as detected by the (d'−1) detector equal to (d'−1), based on the correction bit position designating signal of the correction bit position detector, so that the run length of the same symbol will be equal to d', the playback RF signals read out from the recording medium are decoded at at least a comparison level for outputting channel bit data. The correction bit position detector 5 compares (n+1) items of the domain information by the bit information obtained by channel bit data directly previous to the (d'−1) domain and next channel bit data and n-tupled clocks sandwiched in-between to (n+1) items of the domain information by the bit information obtained from channel bit data directly following the (d'−1) domain, previous channel bit data and n-tupled clocks sandwiched in-between to output a correction bit position designating signal designating a selected correction bit position which is outputted. This designates a correction position of channel bit data having a run length of the same symbol equal to (d'−1) to correct the channel bit data having a run length of the same symbol equal to (d'−1) by the data correction unit 6 so that the run length of the same symbol will be equal to d'to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol as detected by the (d'−1) detector equal to (d'−1) and a data correction unit 6 for correcting the channel bit data having the run length of the same symbol as detected by the (d'−1) detector equal to (d'−1), based on the correction bit position designating signal of the correction bit position detector, so that the run length of the same symbol will be equal to d', the playback RF signals read out from the recording medium are decoded at at least a comparison level for outputting channel bit data. The correction bit position detector 5 has (n+1) items of the domain information by the bit information which is obtained by channel bit data directly previous to the (d'−1) domain and next channel bit data and n-tupled clocks sandwiched in-between and (n+1) items of the domain information by the bit information obtained from channel bit data directly following the (d'−1) domain, previous channel bit data and n-tupled clocks sandwiched in-between are split into H-levels and L-levels with a comparison level as a boundary to output a correction bit position designating signal designating a correction bit position selected depending on the relative magnitudes of the H levels and L-levels. This designates a correction position of channel bit data having a run length of the same symbol equal to (d'−1) to correct the channel bit data having a run length of the same symbol equal to (d'−1) by the data correction unit 6 so that the run length of the same symbol will be equal to d' to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol as detected by the (d'−1) detector equal to (d'−1) and a data correction unit 6 for correcting the channel bit data having the run length of the same symbol as detected by the (d'−1) detector equal to (d'−1), based on the correction bit position designating signal of the correction bit position detector, so that the run length of the same symbol will be equal to d', the playback RF signals read out from the recording medium are decoded at at least a comparison level for outputting channel bit data. The correction bit position detector 5 has (n+1) items of the domain information which is obtained on splitting the bit information into H-levels and L-levels with a comparison level as a boundary. The bit information is obtained by bit data in a given channel clock and the next channel bit clock. For example, (n+1) items of the domain information by the bit information obtained by channel bit data directly previous to the (d'−1) domain and next channel bit data and n-tupled clocks sandwiched in-between and (n+1) items of the domain information by the bit information obtained from channel bit data directly following the (d'−1) domain, previous channel bit data and n-tupled clocks sandwiched in-between are split respectively into H-levels and L-levels with a comparison level as a boundary to output a correction bit position designating signal designating a side with a larger number of the H-levels as a correction bit position if the (d'−1) domain is of the H-level and a side with a larger number of the L-levels as a correction bit position if the (d'−1) domain is of the L-level. The correction bit position detector 5 designates a correction position of channel bit data having a run length of the same symbol equal to (d'−1) to correct the channel bit data having a run length of the same symbol equal to (d'−1) by the data correction unit 6 so that the run length of the same symbol will be equal to d' to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol as detected by the (d'−1) detector equal to (d'−1) and a data correction unit 6 for correcting the channel bit data having the run length of the same symbol equal to (d'−1) as detected by the (d'−1) detector, based on the correction bit position designating signal of the correction bit position detector, so that the run length of the same symbol will be equal to d', the playback RF signals read out from the recording medium are decoded at at least a comparison level for outputting channel bit data. The correction bit position detector 5 has (n+1) items of the domain information which is obtained on splitting the bit information into H-levels and L-levels with a comparison level as a boundary. For example, (n+1) items of the domain information by the bit information obtained by channel bit data directly previous to the (d'−1) domain and next channel bit data and n-tupled clocks sandwiched in-between and (n+1) items of the domain information by the bit information obtained from channel bit data directly following the (d'−1) domain, previous channel bit data and n-tupled clocks sandwiched in-between are split into H-levels and L-levels with a comparison level as a boundary to output a correction bit position designating signal designating a correction bit position using the number of the L-levels or that of the H-levels. Thus the correction bit position detector 5 can designate a correction position of channel bit data having a run length of the same symbol equal to (d'−1) to correct the channel bit data having a run length of the same symbol equal to (d'−1) by the data correction unit 6 so that the run length of the same symbol will be equal to d' to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol as detected by the (d'−1) detector equal to (d'−1) and a data correction unit 6 for correcting the channel bit data having the run length of the same symbol equal to (d'−1) as detected by the (d'−1) detector, based on the correction bit position designating signal of the correction bit position detector, so that the run length of the same symbol will be equal to d', the playback RF signals read out from the recording medium are decoded at at least a comparison level for outputting channel bit data. The correction bit position detector 5 has (n+1) items of the domain information by the bit information obtained by splitting bit data in a given channel clock, bit data in the next following channel clock and n-tupled clocks sandwiched in-between into H-levels and L-levels with a comparison level as a boundary. For example, (n+1) items of the domain information by the bit information obtained by channel bit data directly previous to the (d'−1) domain and next channel bit data and n-tupled clocks sandwiched in-between and (n+1) items of the domain information by the bit information obtained from channel bit data directly following the (d'−1) domain, previous channel bit data and n-tupled clocks sandwiched in-between are split into H-levels and L-levels with a comparison level as a boundary to output a correction bit position designating signal designating the backward side or the forward side of the (d'−1) domain as the correction bit position if the number of "0"s on transition from the L level to the H level is larger than the number of "0"s on transition from the H level to the L level or if the number of "0"s on transition from the H level to the L level is larger than the number of "0"s on transition from the L level to the H level, respectively. Thus the correction bit position detector 5 can designate a correction position of channel bit data having a run length of the same symbol equal to (d'−1) to correct the channel bit data having a run length of the same symbol equal to (d'−1) by the data correction unit 6 so that the run length of the same symbol will be equal to d' to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol as detected by the (d'−1) detector equal to (d'−1) and a data correction unit 6 for correcting the channel bit data having the run length of the same symbol equal to (d'−1) as detected by the (d'−1) detector, based on the correction bit position designating signal of the correction bit position detector, so that the run length of the same symbol will be equal to d', the playback RF signals read out from the recording medium are decoded at at least a comparison level for outputting channel bit data. The correction bit position detector 5 has (n+1) items of the domain information by the bit information obtained by splitting bit data in a given channel clock, bit data in the next following channel clock and n-tupled clocks sandwiched in-between into H-levels and L-levels with a comparison level as a boundary. For example, (n+1) items of the domain information by the bit information obtained by channel bit data directly previous to the (d'−1) domain and next channel bit data and n-tupled clocks sandwiched in-between and (n+1) items of the domain information by the bit information obtained from channel bit data directly following the (d'−1) domain, previous channel bit data and n-tupled clocks sandwiched in-between are split into H-levels and L-levels with a comparison level as a boundary to output a correction bit position designating signal designating the backward side or the forward side of the (d'−1) domain as the correction bit position if the number of "1"s on transition from the H level to the L level is larger than the number of "1"s on transition from the L level to the H level or if the number of "1"s on transition from the L level to the H level is larger than the number of "1"s on transition from the H level to the L level, respectively. Thus the correction bit position detector 5 can designate a correction position of channel bit data having a run length of the same symbol equal to (d'−1) to correct the channel bit data having a run length of the same symbol equal to (d'−1) by the data correction unit 6 so that the run length of the same symbol will be equal to d' to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol as detected by the (d'−1) detector equal to (d'−1) and a data correction unit 6 for correcting the channel bit data having the run length of the same symbol as detected by the (d'−1) detector equal to (d'−1), based on the correction bit position designating signal of the correction bit position detector, so that the run length of the same symbol will be equal to d', in which the playback RF signals read out from the recording medium are decoded at at least a comparison level for outputting channel bit data. The correction bit position detector 5 has (n+1) items of the domain information by the bit information obtained by splitting bit data in a given channel clock, bit data in the next following channel clock and n-tupled clocks sandwiched in-between into H-levels and L-levels with a comparison level as a boundary. For example, (n+1) items of the domain information by the bit information obtained by channel bit data directly previous to the (d'−1) domain and next channel bit data and n-tupled clocks sandwiched in-between and (n+1) items of the domain information by the bit information obtained from channel bit data directly following the (d'−1) domain, previous channel bit data and n-tupled clocks sandwiched in-between are split into H-levels and L-levels with a comparison level as a boundary to output a correction bit position designating signal designating a correction bit position based on the previous correction bit position held on memory if the domain information for the H levels is the same as that for the L-levels. Thus the correction bit position detector 5 can designate a correction position of channel bit data having a run length of the same symbol equal to (d'−1) to correct the channel bit data having a run length of the same symbol equal to (d'−1) by the data correction unit 6 so that the run length of the same symbol will be equal to d'to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback, data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol as detected by the (d'−1) detector equal to (d'−1) and a data correction unit 6 for correcting the channel bit data having the run length of the same symbol equal to (d'−1) as detected by the (d'−1) detector, based on the correction bit position designating signal of the correction bit position detector, so that the run length of the same symbol will be equal to d', the playback RF signals read out from the recording medium are decoded at at least a comparison level for outputting channel bit data. The correction bit position detector 5 has (n−1) items of the domain information which is obtained on splitting the bit information obtained from n-tupled clocks sandwiched between bit data of a given channel clock and bit data of the next channel clock with a comparison level as the boundary into the H-level and the L-level. Thus the correction bit position detector 5 can designate a correction position of channel bit data having a run length of the same symbol equal to (d'−1) to correct the channel bit data having a run length of the same symbol equal to (d'−1) by the data correction unit 6 so that the run length of the same symbol will be equal to d' to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol as detected by the (d'−1) detector equal to (d'−1) and a data correction unit 6 for correcting the channel bit data having the run length of the same symbol as detected by the (d'−1) detector equal to (d'−1), based on the correction bit position designating signal of the correction bit position detector, so that the run length of the same symbol will be equal to d', the playback RF signals read out from the recording medium are decoded at least a comparison level for outputting channel bit data. The correction bit position detector holds on memory (n−1) items of the domain information by the bit information obtained from n-tupled clocks sandwiched between channel bit data directly previous to the (d'−1) domain and next channel bit data to (n−1) items of the domain information by the bit information obtained from n-tupled clocks sandwiched between channel bit data directly following the (d'−1) domain and previous channel bit data. Thus the correction bit position detector 5 can designate a correction position of channel bit data having a run length of the same symbol equal to (d'−1) to correct the channel bit data having a run length of the same symbol equal to (d'−1) by the data correction unit 6 so that the run length of the same symbol will be equal to d' to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol as detected by the (d'−1) detector equal to (d'−1) and a data correction unit 6 for correcting the channel bit data having the run length of the same symbol as detected by the (d'−1) detector equal to (d'−1), based on the correction bit position designating signal of the correction bit position detector, so that the run length of the same symbol will be equal to d', the playback RF signals read out from the recording medium are decoded at at least a comparison level for outputting channel bit data. The correction bit position detector 5 correction bit position detector has (n−1) items of the domain information obtained on splitting the bit information obtained from n-tupled clocks sandwiched between bit data of a channel clock and the next channel clock int H and L levels with a comparison level as a boundary. Thus the correction bit position detector 5 can designate a correction position of channel bit data having a run length of the same symbol equal to (d'−1) to correct the channel bit data having a run length of the same symbol equal to (d'−1) by the data correction unit 6 so that the run length of the same symbol will be equal to d'to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol as detected by the (d'−1) detector equal to (d'−1) and a data correction unit 6 for correcting the channel bit data having the run length of the same symbol as detected by the (d'−1) detector equal to (d'−1), based on the correction bit position designating signal of the correction bit position detector, so that the run length of the same symbol will be equal to d', the playback RF signals read out from the recording medium are decoded at at least a comparison level for outputting channel bit data. The correction bit position detector 5 correction bit position detector has (n−1) items of the domain information obtained on splitting the bit information obtained from n-tupled clocks sandwiched between bit data of a channel clock and the next channel clock int H and L levels with a comparison level as a boundary. For example, (n−1) items of the domain information by the bit information obtained from n-tupled clocks sandwiched between channel bit data directly previous to the (d'−1) domain and the next channel bit data and (n−1) items of the domain information by the bit information obtained from n-tupled clocks sandwiched between channel bit data directly following the (d'−1) domain and previous channel bit data are split respectively into H-levels and L-levels with a comparison level as a boundary to select and output a correction bit position designating signal designating a correction bit position. Thus the correction bit position detector 5 can designate a correction position of channel bit data having a run length of the same symbol equal to (d'−1) to correct the channel bit data having a run length of the same symbol equal to (d'−1) by the data correction unit 6 so that the run length of the same symbol will be equal to d'to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol as detected by the (d'−1) detector equal to (d'−1) and a data correction unit 6 for correcting the channel bit data having the run length of the same symbol as detected by the (d'−1) detector equal to (d'−1), based on the correction bit position designating signal of the correction bit position detector, so that the run length of the same symbol will be equal to d', the playback RF signals read out from the recording medium are decoded at at least a comparison level for outputting channel bit data. The correction bit position detector 5 correction bit position detector has (n−1) items of the domain information obtained on splitting the bit information obtained from n-tupled clocks sandwiched between bit data of a channel clock and the next channel clock int H and L levels with a comparison level as a boundary. For example, (n−1) items of the domain information by the bit information obtained from n-tupled clocks sandwiched between channel bit data directly previous to the (d'−1) domain and the next channel bit data and (n−1) items of the domain information by the bit information obtained from n-tupled clocks sandwiched between channel bit data directly following the (d'−1) domain and previous channel bit data are split respectively into H-levels and L-levels with a comparison level as a boundary to output a correction bit position designating signal designating a correction bit position depending on the relative magnitude of the H- or L-levels. Thus the correction bit position detector 5 can designate a correction position of channel bit data having a run length of the same symbol equal to (d'−1) to correct the channel bit data having a run length of the same symbol equal to (d'−1) by the data correction unit 6 so that the run length of the same symbol will be equal to d' to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol equal to (d'−1) as detected by the (d'−1) detector and a data correction unit 6 for correcting the channel bit data having the run length of the same symbol equal to (d'−1) as detected by the (d'−1) detector, based on the correction bit position designating signal of the correction bit position detector, so that the run length of the same symbol will be equal to d', in which the playback RF signals read out from the recording medium are decoded at at least a comparison level for outputting channel bit data. The correction bit position detector 5 has (n−1) items of the domain information which is obtained on splitting the bit information obtained from n-tupled clocks sandwiched between bit data of a given channel clock and bit data of the next channel clock with a comparison level as the boundary into the H-level and the L-level. The correction bit position detector splits (n−1) items of the domain information by the bit information obtained from n-tupled clocks sandwiched between channel bit data directly previous to the (d'−1)

domain and the next channel bit data and (n−1) items of the domain information by the bit information obtained from n-tupled clocks sandwiched between channel bit data directly following the (d'−1) domain and previous channel bit data are split respectively into H-levels and L-levels with a comparison level as a boundary to output a correction bit position designating signal designating a side with a larger number of the H-levels as a correction bit position if the (d'−1) domain is of the H-level and a side with a larger number of the L-levels as a correction bit position if the (d'−1) domain is of the L-level, respectively. Thus the correction bit position detector 5 can designate a correction position of channel bit data having a run length of the same symbol equal to (d'−1) to correct the channel bit data having a run length of the same symbol equal to (d'−1) by the data correction unit 6 so that the run length of the same symbol will be equal to d' to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol equal to (d'−1) as detected by the (d'−1) detector and a data correction unit 6 for correcting the channel bit data having the run length of the same symbol equal to (d'−1) as detected by the (d'−1) detector, based on the correction bit position designating signal of the correction bit position detector, so that the run length of the same symbol will be equal to d', the playback RF signals read out from the recording medium are decoded at at least a comparison level for outputting channel bit data. The correction bit position detector has (n−1) items of the domain information which is obtained by splitting n-tupled clocks sandwiched between channel bit data of a channel clock and the next channel clock bit data into H-levels and L-levels with a comparison level as a boundary. For example, the correction bit position detector 5 splits (n−1) items of the domain information by the bit information obtained from n-tupled clocks sandwiched between channel bit data directly previous to the (d'−1) domain and the next channel bit data and (n−1) items of the domain information by the bit information obtained from n-tupled clocks sandwiched between channel bit data directly following the (d'−1) domain and previous channel bit data respectively into H-levels and L-levels with a comparison level as a boundary to output a correction bit position designating signal designating a correction bit position using the number of the L-levels or that of the H-levels. Thus the correction bit position detector 5 can designate a correction position of channel bit data having a run length of the same symbol equal to (d'−1) to correct the channel bit data having a run length of the same symbol equal to (d'−1) by the data correction unit 6 so that the run length of the same symbol will be equal to d' to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol equal to (d'−1) as detected by the (d'−1) detector and a data correction unit 6 for correcting the channel bit data having the run length of the same symbol equal to (d'−1) as detected by the (d'−1) detector, based on the correction bit position designating signal of the correction bit position detector, so that the run length of the same symbol will be equal to d', the playback RF signals read out from the recording medium are decoded at at least a comparison level for outputting channel bit data. The correction bit position detector 5 has (n−1) items of the domain information which is obtained on splitting the bit information obtained from n-tupled clocks sandwiched between bit data of a given channel clock and bit data of the next channel clock with a comparison level as the boundary into the H-level and the L-level. The correction bit position detector splits (n−1) items of the domain information by the bit information obtained from n-tupled clocks sandwiched between channel bit data directly previous to the (d'−1) domain and the next channel bit data and (n−1) items of the domain information by the bit information obtained from n-tupled clocks sandwiched between channel bit data directly following the (d'−1) domain and previous channel bit data respectively into H-levels and L-levels with a comparison level as a boundary to output a correction bit position designating the backward side or the forward side of the (d'−1) domain as a correction bit position if the number of "0"s on transition from the L level to the H level is larger than the number of "0"s on transition from the H level to the L level or if the number of "0"s on transition from the H level to the L level is larger than the number of "0"s on transition from the L level to the H level, respectively. Thus the correction bit position detector 5 can designate a correction position of channel bit data having a run length of the same symbol equal to (d'−1) to correct the channel bit data having a run length of the same symbol equal to (d'−1) by the data correction unit 6 so that the run length of the same symbol will be equal to d'to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol as detected by the (d'−1) detector equal to (d'−1) and a data correction unit 6 for correcting the channel bit data having the run length of the same symbol equal to (d'−1) as detected by the (d'−1) detector, based on the correction bit position designating signal of the correction bit position detector, so that the run length of the same symbol will be equal to d', in which the playback RF signals read out from the recording medium are decoded at at least a comparison level for outputting channel bit data. The correction bit position detector 5 has (n−1) items of the domain information which is obtained on splitting the bit information obtained from n-tupled clocks sandwiched between bit data of a given channel clock and bit data of the next channel clock with a comparison level as the boundary into the H-level and the L-level. For example, the correction bit position detector splits (n−1) items of the domain information from the bit information obtained from n-tupled clocks sandwiched between channel bit data directly previous to the (d'−1) domain and the next channel bit data and (n−1) items of the domain information by the bit information obtained from n-tupled clocks sandwiched between channel bit data directly following the (d'−1) domain and previous channel bit data respectively into H-levels and L-levels with a comparison level as a boundary to output a correction bit position designating the backward side or the forward side of the (d'−1) domain as a correction bit position if the number of "1"s on transition from the H level to the L level is larger than the number of "1"s on transition from the L level to the H level or if the number of "1"s on transition from the L level to the H level is larger than the number of "1"s on transition from the H level to the L level, respectively. Thus the correction bit position detector 5 can designate a correction position of channel bit data having a run length of the same symbol equal to (d'−1) to correct the channel bit data having a run length of the same symbol equal to (d'−1) by the data correction unit 6 so that the run length of the same symbol will be equal to d' to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d−1), a correction bit position detector 5 for outputting a correction bit position designating signal for designating a correction position for channel bit data having the run length of the same symbol as detected by the (d'−1) detector equal to (d'−1) and a data correction unit 6 for correcting the channel bit data having the run length of the same symbol equal to (d'−1) as detected by the (d'−1) detector, based on the correction bit position designating signal of the correction bit position detector, so that the run length of the same symbol will be equal to d', the playback RF signals read out from the recording medium are decoded at at least a comparison level for outputting channel bit data. The correction bit position detector 5 has (n−1) items of the domain information which is obtained on splitting the bit information obtained from n-tupled clocks sandwiched between bit data of a given channel clock and bit data of the next channel clock with a comparison level as the boundary into the H-level and the L-level. For example, the correction bit position detector splits (n−1) items of the domain information from the bit information obtained from n-tupled clocks sandwiched between channel bit data directly previous to the (d'−1) domain and the next channel bit data and (n−1) items of the domain information by the bit information obtained from n-tupled clocks sandwiched between channel bit data directly following the (d'−1) domain and previous channel bit data respectively into H-levels and L-levels with a comparison level as a boundary to output a correction bit position designating signal designating the correction bit position based on the previous correction bit position held on memory if the domain information for the H levels is the same as that for the L-levels. Thus the correction bit position detector 5 can designate a correction position of channel bit data having a run length of the same symbol equal to (d'−1) to correct the channel bit data having a run length of the same symbol equal to (d'−1) by the data correction unit 6 so that the run length of the same symbol will be equal to d' to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol equal to (d'−1) as detected by the (d'−1) detector and a data correction unit 6 for correcting the channel bit data having the run length of the same symbol equal to (d'−1) as detected by the (d'−1) detector, based on the correction bit position designating signal of the correction bit position detector, so that the run length of the same symbol will be equal to d', the playback RF signals read out from the recording medium are decoded at at least a comparison level for outputting channel bit data. For example, the correction bit position detector has n-items of the domain information which are obtained on splitting n items of the bit information including bit data of a given channel clock in the bit information obtained from n-tupled clocks into H-levels and L-levels with a comparison level as a boundary. Thus the correction bit position detector 5 can designate a correction position of channel bit data having a run length of the same symbol equal to (d'−1) to correct the channel bit data having a run length of the same symbol equal to (d'−1) by the data correction unit 6 so that the run length of the same symbol will be equal to d' to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol equal to (d'−1) as detected by the (d'−1) detector and a data correction unit 6 for correcting the channel bit data having the run length of the same symbol equal to (d'−1) as detected by the (d'−1) detector, based on the correction bit position designating signal of the correction bit position detector, so that the run length of the same symbol will be equal to d', the playback RF signals read out from the recording medium are decoded at at least a comparison level for outputting channel bit data. For example, the correction bit position detector has n-items of the domain information including bit data of a given channel clock in the bit information obtained from n-tupled clocks into H-levels and L-levels with a comparison level as a boundary and designates a correction position of channel bit data having a run length of the same symbol equal to (d'−1) to correct the channel bit data having a run length of the same symbol equal to (d'−1) by the data correction unit 6 so that the run length of the same symbol will be equal to d'to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol equal to (d'−1) as detected by the (d'−1) detector equal to (d'−1) and a data correction unit 6 for correcting the channel bit data having the run length of the same symbol equal to (d'−1) as detected by the (d'−1) detector equal to (d'−1), based on the correction bit position designating signal of the correction bit position detector, so that the run length of the same symbol will be equal to d', the playback RF signals read out from the recording medium are decoded at at least a comparison level for outputting channel bit data. For example, the correction bit position detector stores plural domain information items consisting of n bits from n-items of the bit information including bit data of a given channel clock in the bit information obtained from n-tupled clocks. Thus the correction bit position detector 5 can designate a correction position of channel bit data having a run length of the same symbol equal to (d'−1) to correct the channel bit data having a run length of the same symbol equal to (d'−1) by the data correction unit 6 so that the run length of the same symbol will be equal to d' to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol equal to (d'−1) as detected by the (d'−1) detector and a data correction unit 6 for correcting the channel bit data having the run length of the same symbol equal to (d'−1) as detected by the (d'−1) detector, based on the correction bit position designating signal of the correction bit position detector, so that the run length of the same symbol will be equal to d', the playback RF signals read out from the recording medium are decoded at at least a comparison level for outputting channel bit data. The correction bit position detector has n-items of the domain information which are obtained on splitting n items of the bit information including bit data of a given channel clock in the bit information obtained from n-tupled clocks into H-levels and L-levels with a comparison level as a boundary. For example, the correction bit position detector compares n-items of the domain information by the bit information obtained by channel bit data directly previous to a (d'−1) domain or the next channel bit data and n-tupled clocks sandwiched in-between to n-items of the domain information by the bit information obtained from channel bit data directly following the (d'−1) domain or previous channel bit data and n-tupled clocks sandwiched in-between to select and output a correction bit position designating signal designating a correction bit position. Thus the correction bit position detector 5 can designate a correction position of channel bit data having a run length of the same symbol equal to (d'−1) to correct the channel bit data having a run length of the same symbol equal to (d'−1) by the data correction unit 6 so that the run length of the same symbol will be equal to d' to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol equal to (d'−1) as detected by the (d'−1) detector and a data correction unit 6 for correcting the channel bit data having the run length of the same symbol equal to (d'−1) as detected by the (d'−1) detector, based on the correction bit position designating signal of the correction bit position detector, so that the run length of the same symbol will be equal to d', in which the playback RF signals read out from the recording medium are decoded at at least a comparison level for outputting channel bit data. The correction bit position detector has n-items of the domain information which are obtained on splitting n items of the bit information including bit data of a given channel clock in the bit information obtained from n-tupled clocks into H-levels and L-levels with a comparison level as a boundary. For example, the correction bit position detector splits n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between respectively into H-levels and L-levels with a comparison level as a boundary to output a correction bit position designating signal designating a correction bit position as selected depending on the relative magnitude of the H-levels or L-levels. Thus the correction bit position detector 5 can designate a correction position of channel bit data having a run length of the same symbol equal to (d'−1) to correct the channel bit data having a run length of the same symbol equal to (d'−1) by the data correction unit 6 so that the run length of the same symbol will be equal to d' to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol as detected by the (d'−1) detector equal to (d'−1) and a data correction unit 6 for correcting the channel bit data having the run length of the same symbol as detected by the (d'−1) detector equal to (d'−1), based on the correction bit position designating signal of the correction bit position detector, so that the run length of the same symbol will be equal to d', the playback RF signals read out from the recording medium are decoded at at least a comparison level for outputting channel bit data. The correction bit position detector has n-items of the domain information which are obtained on splitting n items of the bit information including bit data of a given channel clock in the bit information obtained from n-tupled clocks into H-levels and L-levels with a comparison level as a boundary. For example, the correction bit position detector splits n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between respectively into H-levels and L-levels with a comparison level as a boundary to output a correction bit position designating signal designating a correction bit position using the number of the L-levels or that of the H-levels. Thus the correction bit position detector 5 can designate a correction position of channel bit data having a run length of the same symbol equal to (d'−1) to correct the channel bit data having a run length of the same symbol equal to (d'−1) by the data correction unit 6 so that the run length of the same symbol will be equal to d'to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol as detected by the (d'−1) detector equal to (d'−1) and a data correction unit 6 for correcting the channel bit data having the run length of the same symbol as detected by the (d'−1) detector equal to (d'−1), based on the correction bit position designating signal of the correction bit position detector, so that the run length of the same symbol will be equal to d', the playback RF signals read out from the recording medium are decoded at least a comparison level for outputting channel bit data. The correction bit position detector has n-items of the domain information which are obtained on splitting n items of the bit information including bit data of a given channel clock in the bit information obtained from n-tupled clocks into H-levels and L-levels with a comparison level as a boundary. For example, the correction bit position detector splits n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between respectively into H-levels and L-levels with a comparison level as a boundary to output a correction bit position designating signal designating the backward side or the forward side of the (d'−1) domain as the correction bit position if, when the n-items of the domain information include backward side channel bit data, the number of "0"s on transition from the L-level to the H-level plus 1 is larger than the number of "0"s on transition from the H-level to the L-level or if the number of "0"s on transition from the H-level to the L-level is larger than the number of "0"s on transition from the L-level to the H-level plus 1, respectively. Thus the correction bit position detector 5 can designate a correction position of channel bit data having a run length of the same symbol equal to (d'−1) to correct the channel bit data having a run length of the same symbol equal to (d'−1) by the data correction unit 6 so that the run length of the same symbol will be equal to d' to reduce data decoding error in the vicinity of the minimum length between transitions Tmin to improve bit error rate.

Also, in the data decoding device 10 including a clock generator 2 for n-tupling channel clocks of channel clocks in playback data from a recording medium having recording codes recorded thereon, n being an integer not less than 2, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol equal to (d'−1) as detected by the (d'−1) detector and a data correction unit 6 for correcting the channel bit data having the run length of the same symbol equal to (d'−1) as detected by the (d'−1) detector, based on the correction bit position designating signal of the correction bit position detector, so that the run length of the same symbol will be equal to d', the playback RF signals read out from the recording medium are decoded at at least a comparison level for outputting channel bit data. The correction bit position detector has n-items of the domain information which are obtained on splitting n items of the bit information including bit data of a given channel clock in the bit information obtained from n-tupled clocks into H-levels and L-levels with a comparison level as a boundary. For example, the correction bit position detector splits n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between respectively into H-levels and L-levels with a comparison level as a boundary to output a correction bit position designating signal designating a selected correction bit position designating signal designating the backward side or the forward side of the (d'−1) domain as the correction bit position if, when n-items of the domain information include forward side channel bit data, the number of "0"s on transition from the L-level to the H-level is larger than the number of "0"s on transition from the H-level to the L-level plus 1 or if the number of "0"s on transition from the H-level to the L-level plus 1 is larger than the number of "0"s on transition from the L-level to the H-level, respectively. Thus the correction bit position detector 5 can designate a correction position of channel bit data having a run length of the same symbol equal to (d'−1) to correct the channel bit data having a run length of the same symbol equal to (d'−1) by the data correction unit 6 so that the run length of the same symbol will be equal to d' to reduce data decoding error in the vicinity of the minimum length between transitions Tmin to improve bit error rate.

Also, in the data decoding device 10 including a clock generator 2 for n-tupling channel clocks of channel clocks in playback data from a recording medium having recording codes recorded thereon, n being an integer not less than 2, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol equal to (d'−1) as detected by the (d'−1) detector and a data correction unit 6 for correcting the channel bit data having the run length of the same symbol equal to (d'−1) as detected by the (d'−1) detector, based on the correction bit position designating signal of the correction bit position detector, so that the run length of the same symbol will be equal to d', the playback RF signals read out from the recording medium are decoded at at least a comparison level for outputting channel bit data. The correction bit position detector has n-items of the domain information which are obtained on splitting n items of the bit information including bit data of a given channel clock in the bit information obtained from n-tupled clocks into H-levels and L-levels with a comparison level as a boundary. For example, the correction bit position detector splits n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between respectively into H-levels and L-levels with a comparison level as a boundary to output a correction bit position designating signal designating the backward side or the forward side of the (d'−1) domain as the correction bit position if, when n-items of the domain information include backward side channel bit data, the number of "1"s on transition from the H-level to the L-level plus 1 is larger than the number of "1"s on transition from the L-level to the H-level, or in case the number of "1"s on transition from the L-level to the H-level is larger than the number of "1"s on transition from the H-level to the L-level plus one, respectively. Thus the correction bit position detector 5 can designate a correction position of channel bit data having a run length of the same symbol equal to (d'−1) to correct the channel bit data having a run length of the same symbol equal to (d'−1) by the data correction unit 6 so that the run length of the same symbol will be equal to d' to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol equal to (d'−1) as detected by the (d'−1) detector and a data correction unit 6 for correcting the channel bit data having the run length of the same symbol equal to (d'−1) as detected by the (d'−1) detector, based on the correction bit position designating signal of the correction bit position detector, so that the run length of the same symbol will be equal to d', the playback RF signals read out from the recording medium are decoded at at least a comparison level for outputting channel bit data. The correction bit position detector has n-items of the domain information which are obtained on splitting n items of the bit information including bit data of a given channel clock in the bit information obtained from n-tupled clocks into H-levels and L-levels with a comparison level as a boundary. For example, the correction bit position detector splits n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between respectively into H-levels and L-levels with a comparison level as a boundary to output a correction bit position designating signal designating the backward side or the forward side of the (d'−1) domain as a correction bit position if, when n-items of the domain information include forward side channel bit data, the number of "1"s on transition from the H-level to the L-level is larger than the number of "1"s on transition from the L-level to the H-level plus 1 or if the number of "1"s on transition from the L-level to the H-level plus 1 is larger than the number of "1"s on transition from the H-level to the L-level, respectively. Thus the correction bit position detector 5 can designate a correction position of channel bit data having a run length of the same symbol equal to (d'−1) to correct the channel bit data having a run length of the same symbol equal to (d'−1) by the data correction unit 6 so that the run length of the same symbol will be equal to d' to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol as detected by the (d'−1) detector equal to (d'−1) and a data correction unit 6 for correcting the channel bit data having the run length of the same symbol as detected by the (d'−1) detector equal to (d'−1), based on the correction bit position designating signal of the correction bit position detector, so that the run length of the same symbol will be equal to d', the playback RF signals read out from the recording medium are decoded at at least a comparison level for outputting channel bit data. For example, the correction bit position detector has n-items of the domain information which are obtained on splitting n items of the bit information including bit data of a given channel clock into H-levels and L-levels with a comparison level as a boundary. For example, the correction bit position detector splits n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between respectively into H-levels and L-levels with a comparison level as a boundary to output a correction bit position designating signal designating a correction bit position based on the previous correction bit position held on memory if the domain information for the H levels is the same as that for the L-levels. Thus the correction bit position detector 5 can designate a correction position of channel bit data having a run length of the same symbol equal to (d'−1) to correct the channel bit data having a run length of the same symbol equal to (d'−1) by the data correction unit 6 so that the run length of the same symbol will be equal to d' to reduce data decoding error in the vicinity of the minimum length between transitions Tmin to improve bit error rate.

Also, in the data decoding device 10 including a clock generator 2 for n-tupling channel clocks of channel clocks, n being an integer not less than 2, in playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, a (d'−1) detector 4 for detecting channel bit data having a run length of the same symbol equal to (d'−1), a correction bit position detector 5 for outputting a correction bit position designating signal for designating a correction position for channel bit data having the run length of the same symbol as detected by the (d'−1) detector equal to (d'−1) and a data correction unit 6 for correcting the channel bit data having the run length of the same symbol as detected by the (d'−1) detector equal to (d'−1), based on the correction bit position designating signal of the correction bit position detector, so that the run length of the same symbol will be equal to d', the playback RF signals read out from the recording medium are decoded at at least a comparison level for outputting channel bit data. The data correction unit 6 inverts the logical level of data at the correction bit position designated by the correction bit position designating signal by the channel bit data 5 by way of correction for decreasing the data decoding error in the vicinity of the minimum length between transitions Tmin for improving the bit error rate.

Although the data decoding device 10 of FIG. 10 corrects channel bit data having the run length of the same symbol equal to (d'−1), the data decoding device may also be configured for correcting channel bit data having the minimum run length of "0"s inserted between two neighboring "1"s on inverse NRZI modulation equal to (d−1).

Figure 16:
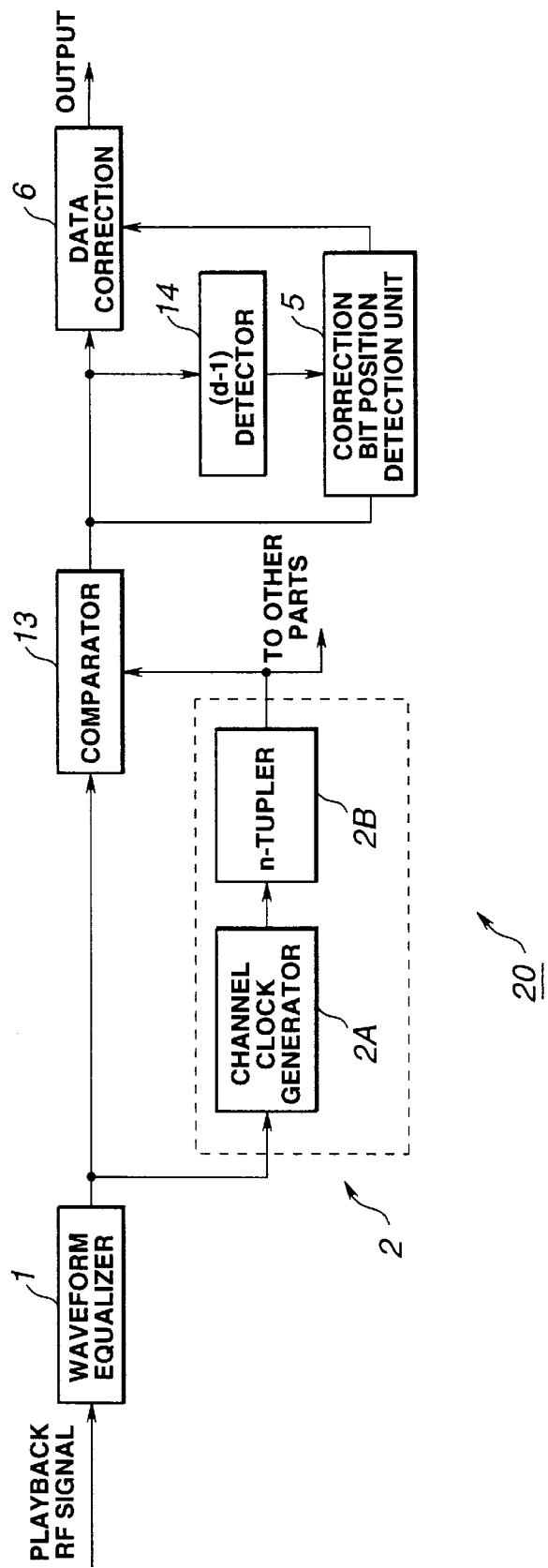
FIG. 16 is another block diagram showing a data decoding device according to the present invention.

Referring to FIG. 16, the comparator 3 of the data decoding device 10 can be designed as a comparator of the type in which it comparates to "1" and "0" based on the usual comparison value but may also have two comparison values for converting the compared RF levels value into two values of "0", "1" and "0" looking from above for outputting inverse NRZI code, and the (d'−1) detector 4 may be designed as a (d−1) detector 14 for correcting channel bit data having a run length of "0"s equal to (d−1).

A data decoding apparatus 20 for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, includes a clock generator 2 for n-tupling channel clocks of channel clocks, n being an integer not less than 2, a (d−1) detector 4 for detecting channel bit data having a run length of the same symbol following inverse NRZI modulation equal to (d−1), a correction bit position detector 5 for outputting a correction bit position designating signal for designating a correction position for channel bit data having the run length of ACTs as detected by the (d−1) detector equal to (d−1) and a data correction unit 6 for correcting the channel bit data having the run length of "0"s as detected by the (d−1) detector equal to (d−1), based on the correction bit position designating signal of the correction bit position detector, so that the run length of '0's will be equal to d, for decreasing data decoding error in the vicinity of the minimum length between transitions Tmin for improving the bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector 14 equal to (d−1) and a data correction unit 6 for correcting the channel bit data having the run length of "0"s as detected by the (d−1) detector 14 equal to (d−1), based on the correction bit position designating signal of the correction bit position detector, so that the run length of '0's will be equal to d, the playback RF signals read out from the recording medium are decoded at at least a comparison level into channel bit data which are then corrected by the data correction unit 6 so that the minimum run length of "0"s between neighboring "1"s in a codestring will be equal to d, for decreasing data decoding error in the vicinity of the minimum length between transitions Tmin for improving the bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector 14 equal to (d−1) and a data correction unit for correcting the channel bit data having the run length of "0"s as detected by the (d−1) detector 14 equal to (d−1), based on the correction bit position designating signal of the correction bit position detector 5, so that the run length of '0's will be equal to d, the playback RF signals read out from the recording medium are decoded at at least a comparison level into channel bit data, the correction bit position detector 5 has (n+1) items of the domain information obtained on splitting the bit information obtained by bit data of a given channel clock and bit data of the next channel clock and n-tupled clocks sandwiched in-between into the H-level and the L-level with a comparison level as the boundary. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector for detecting channel bit data having a run length of the same symbol following inverse NRZI modulation equal to (d−1), a correction bit position detector for outputting a correction bit position designating signal for designating a correction position for channel bit data having the run length of "0"s as detected by the (d−1) detector equal to (d−1) and a data correction unit for correcting the channel bit data having the run length of "0"s as detected by the (d−1) detector equal to (d−1), based on the correction bit position designating signal of the correction bit position detector, so that the run length of '0's will be equal to d, the playback RF signals read out from the recording medium are decoded at at least a comparison level into channel bit data, the correction bit position detector stores (n+1) items of the domain information obtained on splitting the bit information obtained by bit data of a given channel clock and bit data of the next channel clock and n-tupled clocks sandwiched in-between into the H-level and the L-level with a comparison level as the boundary. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector 14 equal to (d−1) and a data correction unit 6 for correcting the channel bit data having the run length of "0"s as detected by the (d−1) detector equal to (d−1), based on the correction bit position designating signal of the correction bit position detector, so that the run length of '0's will be equal to d, the playback RF signals read out from the recording medium are decoded at at least a comparison level into channel bit data. The correction bit position detector 5 has (n+1) items of the domain information obtained on splitting the bit information obtained by bit data of a given channel clock and bit data of the next channel clock and n-tupled clocks sandwiched in-between into the H-level and the L-level with a comparison level as the boundary. For example, (n+1) items of the domain information from the bit information obtained by channel bit data directly previous to the (d−1) domain and next channel bit data and n-tupled clocks sandwiched in-between are compared to (n+1) items of the domain information by the bit information obtained from channel bit data directly following the (d−1) domain, previous channel bit data and n-tupled clocks sandwiched in-between to select and output a correction bit position designating signal designating a correction bit position. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector equal to (d−1) and a data correction unit 6 for correcting the channel bit data having the run length of "0"s as detected by the (d−1) detector equal to (d−1), based on the correction bit position designating signal of the correction bit position detector, so that the run length of '0's will be equal to d, the playback RF signals read out from the recording medium are decoded at at least a comparison level into channel bit data, the correction bit position detector has (n+1) items of the domain information obtained on splitting the bit information obtained by bit data of a given channel clock and bit data of the next channel clock and n-tupled clocks sandwiched in-between into the H-level and the L-level with a comparison level as the boundary. For example, the correction bit position detector splits (n+1) items of the domain information from the bit information obtained by channel bit data directly previous to the (d−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between respectively into H-levels and L-levels with a comparison level as a boundary to output a correction bit position designating signal designating a correction bit position as selected depending on the relative magnitude of the H-levels or L-levels. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector 14 equal to (d−1) and a data correction unit 6 for correcting the channel bit data having the run length of "0"s as detected by the (d−1) detector 14 equal to (d−1), based on the correction bit position designating signal of the correction bit position detector, so that the run length of '0's will be equal to d, the playback RF signals read out from the recording medium are decoded at at least a comparison level into channel bit data, the correction bit position detector has (n+1) items of the domain information obtained on splitting the bit information obtained by bit data of a given channel clock and bit data of the next channel clock and n-tupled clocks sandwiched in-between into the H-level and the L-level with a comparison level as the boundary. For example, the correction bit position detector 5 splits (n+1) items of the domain information from the bit information obtained by channel bit data directly previous to the (d−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between respectively into H-levels and L-levels with a comparison level as a boundary to output a correction bit position designating signal designating a side with a larger number of the H-levels or a side with a larger number of the L-levels as a correction bit position if the (d−1) domain is of the H-level or of the L-level, respectively. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector 14 equal to (d−1) and a data correction unit 6 for correcting the channel bit data having the run length of "0"s as detected by the (d−1) detector 14 equal to (d−1), based on the correction bit position designating signal of the correction bit position detector, so that the run length of '0's will be equal to d, the playback RF signals read out from the recording medium are decoded at at least a comparison level into channel bit data. The correction bit position detector 5 has (n+1) items of the domain information obtained on splitting the bit information obtained by bit data of a given channel clock and bit data of the next channel clock and n-tupled clocks sandwiched in-between into the H-level and the L-level with a comparison level as the boundary. For example, the correction bit position detector splits (n+1) items of the domain information from the bit information obtained from channel bit data directly previous to the (d−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between respectively into H-levels and L-levels with a comparison level as a boundary to output a correction bit position designating signal designating a correction bit position using the number of the L-levels or that of the H-levels. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector 14 equal to (d−1) and a data correction unit 6 for correcting the channel bit data having the run length of "0"s as detected by the (d−1) detector 14 equal to (d−1), based on the correction bit position designating signal of the correction bit position detector 5, so that the run length of '0's will be equal to d, the playback RF signals read out from the recording medium are decoded at at least a comparison level into channel bit data. The correction bit position detector has (n+1) items of the domain information obtained on splitting the bit information obtained by bit data of a given channel clock and bit data of the next channel clock and n-tupled clocks sandwiched in-between into the H-level and the L-level with a comparison level as the boundary. For example, the correction bit position detector splits (n+1) items of the domain information from the bit information obtained by channel bit data directly previous to the (d−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between respectively into H-levels and L-levels with a comparison level as a boundary to output a correction bit position designating the backward side or the forward side of the (d−1) domain if the number of "0"s on transition from the L level to the H level is larger than the number of "0"s on transition from the H level to the L level or if the number of "0"s on transition from the H level to the L level is larger than the number of "0"s on transition from the L level to the H level, respectively. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector 14 equal to (d−1) and a data correction unit 6 for correcting the channel bit data having the run length of "0"s as detected by the (d−1) detector equal to (d−1), based on the correction bit position designating signal of the correction bit position detector, so that the run length of '0's will be equal to d, the playback RF signals read out from the recording medium are decoded at at least a comparison level into channel bit data. The correction bit position detector has (n+1) items of the domain information obtained on splitting the bit information obtained by bit data of a given channel clock and bit data of the next channel clock and n-tupled clocks sandwiched in-between into the H-level and the L-level with a compari-son level as the boundary. For example, the correction bit position detector splits (n+1) items of the domain information from the bit information obtained by channel bit data directly previous to the (d−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between respectively into H-levels and L-levels with a comparison level as a boundary to output a correction bit position designating signal designating the backward side or the forward side of the (d−1) domain as the correction bit position if the number of "1"s on transition from the H level to the L level is larger than the number of "1"s on transition from the L level to the H level or if the number of "1"s on transition from the L level to the H level is larger than the number of "1"s on transition from the H level to the L level, respectively. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector 14 equal to (d−1) and a data correction unit 6 for correcting the channel bit data having the run length of "0"s as detected by the (d−1) detector 14 equal to (d−1), based on the correction bit position designating signal of the correction bit position detector 5, so that the run length of '0's will be equal to d, the playback RF signals read out from the recording medium are decoded at at least a comparison level into channel bit data. The correction bit position detector has (n+1) items of the domain information obtained on splitting the bit information obtained by bit data of a given channel clock and bit data of the next channel clock and n-tupled clocks sandwiched in-between into the H-level and the L-level with a comparison level as the boundary. For example, the correction bit position detector splits (n+1) items of the domain information from the bit information by channel bit data directly previous to the (d−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between respectively into H-levels and L-levels with a comparison level as a boundary to output a correction bit position designating signal designating a correction bit position, based on the previous correction bit position designating signal held on memory, if the domain information for the H levels is the same as that for the L-levels. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector 14 equal to (d−1) and a data correction unit 6 for correcting the channel bit data having the run length of "0"s as detected by the (d−1) detector equal to (d−1), based on the correction bit position designating signal of the correction bit position detector, so that the run length of '0's will be equal to d, the playback RF signals read out from the recording medium are decoded at at least a comparison level into channel bit data. The correction bit position detector has (n−1) items of the domain information which is obtained on splitting the bit information obtained from n-tupled clocks sandwiched between bit data of a given channel clock and bit data of the next channel clock with a comparison level as the boundary into the H-level and the L-level. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector 14 equal to (d−1) and a data correction unit 6 for correcting the channel bit data having the run length of "0"s as detected by the (d−1) detector equal to (d−1), based on the correction bit position designating signal of the correction bit position detector, so that the run length of '0's will be equal to d, the playback RF signals read out from the recording medium are decoded at at least a comparison level into channel bit data. The correction bit position detector holds on memory (n−1) items of the domain information which is obtained from n-tupled clocks sandwiched between bit data of a given channel clock and bit data of the next channel clock. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector equal to (d−1) and a data correction unit 6 for correcting the channel bit data having the run length of "0"s as detected by the (d−1) detector equal to (d−1), based on the correction bit position designating signal of the correction bit position detector, so that the run length of '0's will be equal to d, the playback RF signals read out from the recording medium are decoded at at least a comparison level into channel bit data. The correction bit position detector compares (n−1) items of the domain information by the bit information obtained from n-tupled clocks sandwiched between channel bit data directly previous to the (d−1) domain and next channel bit data to (n−1) items of the domain information by the bit information obtained from n-tupled clocks sandwiched between channel bit data directly following the (d−1) domain and previous channel bit data to select and output a correction bit position designating signal designating a correction bit position. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector equal to (d−1) and a data correction unit 6 for correcting the channel bit data having the run length of "0"s as detected by the (d−1) detector equal to (d−1), based on the correction bit position designating signal of the correction bit position detector, so that the run length of '0's will be equal to d, the playback RF signals read out from the recording medium are decoded at at least a comparison level into channel bit data. The correction bit position detector has (n−1) items of the domain information obtained on splitting n-tupled clocks sandwiched between the bit information obtained by bit data of a given channel clock and bit data of the next channel clock into the H-level and the L-level with a comparison level as the boundary. For example, the correction bit position detector splits (n−1) items of the domain information by the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data respectively into H-levels and L-levels with a comparison level as a boundary to output a correction bit position designating signal designating a correction bit position as selected depending on the relative magnitude of the H-levels or L-levels. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector equal to (d−1) and a data correction unit 6 for correcting the channel bit data having the run length of "0"s as detected by the (d−1) detector equal to (d−1), based on the correction bit position designating signal of the correction bit position detector, so that the run length of '0's will be equal to d, the playback RF signals read out from the recording medium are decoded at at least a comparison level into channel bit data. The correction bit position detector stores (n+1) items of the domain information obtained on splitting the bit information obtained by bit data of a given channel clock and bit data of the next channel clock and n-tupled clocks sandwiched in-between into the H-level and the L-level with a comparison level as the boundary. For example, the correction bit position detector splits (n+1) items of the domain information by the bit information obtained from channel bit data directly previous to the (d−1) domain and the next channel bit data and n-tupled clocks sandwiched in-between and (n+1) items of the domain information by the bit information obtained from channel bit data directly following the (d−1) domain and previous channel bit data and n-tupled clocks sandwiched in-between respectively into H-levels and L-levels with a comparison level as a boundary to output a correction bit position designating signal designating a side with a larger number of the H-levels or a side with a larger number of the L-levels as a correction bit position if the (d−1) domain is of the H-level or if the (d−1) domain is of the L-level, respectively. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector equal to (d−1) and a data correction unit 6 for correcting the channel bit data having the run length of "0"s as detected by the (d−1) detector equal to (d−1), based on the correction bit position designating signal of the correction bit position detector, so that the run length of '0's will be equal to d, the playback RF signals read out from the recording medium are decoded at at least a comparison level into channel bit data. The correction bit position detector has (n+1) items of the domain information obtained on splitting the bit information obtained by bit data of a given channel clock and bit data of the next channel clock and n-tupled clocks sandwiched in-between into the H-level and the L-level with a comparison level as the boundary. For example, the correction bit position detector splits (n+1) items of the domain information by the bit information obtained from channel bit data directly previous to the (d−1) domain and the next channel bit data and n-tupled clocks sandwiched in-between and (n+1) items of the domain information by the bit information obtained from channel bit data directly following the (d−1) domain and previous channel bit data and n-tupled clocks sandwiched in-between respectively into H-levels and L-levels with a comparison level as a boundary to output a correction bit position designating signal designating a correction bit position using the number of the L-levels or that of the H-levels for designating the correction bit position. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector equal to (d−1) and a data correction unit 6 for correcting the channel bit data having the run length of "0"s as detected by the (d−1) detector equal to (d−1), based on the correction bit position designating signal of the correction bit position detector, so that the run length of '0's will be equal to d, the playback RF signals read out from the recording medium are decoded at at least a comparison level into channel bit data. The correction bit position detector has (n+1) items of the domain information obtained on splitting the bit information obtained by bit data of a given channel clock and bit data of the next channel clock and n-tupled clocks sandwiched in-between into the H-level and the L-level with a comparison level as the boundary. For example, the correction bit position detector splits (n+1) items of the domain information by the bit information obtained from channel bit data directly previous to the (d−1) domain and the next channel bit data and n-tupled clocks sandwiched in-between and (n+1) items of the domain information by the bit information obtained from channel bit data directly following the (d−1) domain and previous channel bit data and n-tupled clocks sandwiched in-between respectively into H-levels and L-levels with a comparison level as a boundary to output a correction bit position designating signal designating the backward side or the forward side of the (d−1) domain if the number of "0"s on transition from the L level to the H level is larger than the number of "0"s on transition from the H level to the L level or if the number of "0"s on transition from the H level to the L level is larger than the number of "0"s on transition from the L level to the H level, respectively. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector 14 equal to (d−1) and a data correction unit 6 for correcting the channel bit data having the run length of "0"s as detected by the (d−1) detector equal to (d−1), based on the correction bit position designating signal of the correction bit position detector, so that the run length of '0's will be equal to d, the playback RF signals read out from the recording medium are decoded at at least a comparison level into channel bit data. The correction bit position detector has (n+1) items of the domain information obtained on splitting the bit information obtained by bit data of a given channel clock and bit data of the next channel clock and n-tupled clocks sandwiched in-between into the H-level and the L-level with a comparison level as the boundary. For example, the correction bit position detector splits (n+1) items of the domain information by the bit information obtained from channel bit data directly previous to the (d−1) domain and the next channel bit data and n-tupled clocks sandwiched in-between and (n+1) items of the domain information by the bit information obtained from channel bit data directly following the (d−1) domain and previous channel bit data and n-tupled clocks sandwiched in-between respectively into H-levels and L-levels with a comparison level as a boundary to output a correction bit position designating signal designating the backward side or the forward side of the (d−1) domain if the number of "1"s on transition from the H level to the L level is larger than the number of "1"s on transition from the L level to the H level or if the number of "1"s on transition from the L level to the H level is larger than the number of "1"s on transition from the H level to the L level, respectively. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector 14 equal to (d−1) and a data correction unit 6 for correcting the channel bit data having the run length of "0"s as detected by the (d−1) detector equal to (d−1), based on the correction bit position designating signal of the correction bit position detector, so that the run length of '0's will be equal to d, the playback RF signals read out from the recording medium are decoded at at least a comparison level into channel bit data. The correction bit position detector has (n+1) items of the domain information obtained on splitting the bit information obtained by bit data of a given channel clock and bit data of the next channel clock and n-tupled clocks sandwiched in-between into the H-level and the L-level with a comparison level as the boundary. For example, the correction bit position detector splits (n+1) items of the domain information by the bit information obtained from channel bit data directly previous to the (d−1) domain and the next channel bit data and n-tupled clocks sandwiched in-between and (n+1) items of the domain information by the bit information obtained from channel bit data directly following the (d−1) domain and previous channel bit data and n-tupled clocks sandwiched in-between respectively into H-levels and L-levels with a comparison level as a boundary to output a correction bit position designating signal designating a correction bit position, based on the previous correction bit position held on memory, if the domain information for the H levels is the same as that for the L-levels. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector for detecting channel bit data having a run length of the same symbol following inverse NRZI modulation equal to (d−1), a correction bit position detector for outputting a correction bit position designating signal for designating a correction position for channel bit data having the run length of "0"s as detected by the (d−1) detector equal to (d−1) and a data correction unit for correcting the channel bit data having the run length of "0"s as detected by the (d−1) detector equal to (d−1), based on the correction bit position designating signal of the correction bit position detector, so that the run length of '0's will be equal to d, the playback RF signals read out from the recording medium are decoded at at least a comparison level into channel bit data. The correction bit position detector has n-items of the domain information which is obtained on splitting the bit information including bit data of a given channel clock in the bit information obtained from n-tupled clocks into H-levels and L-levels with a comparison level as a boundary. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector equal to (d−1) and a data correction unit 6 for correcting the channel bit data having the run length of "0"s as detected by the (d−1) detector 14 equal to (d−1), based on the correction bit position designating signal of the correction bit position detector, so that the run length of '0's will be equal to d, the playback RF signals read out from the recording medium are decoded at at least a comparison level into channel bit data. The correction bit position detector holds on memory n-items of the domain information which is obtained on splitting the bit information including bit data of a given channel clock in the bit information obtained from n-tupled clocks into H-levels and L-levels with a comparison level as a boundary. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector equal to (d−1) and a data correction unit 6 for correcting the channel bit data having the run length of "0"s as detected by the (d−1) detector equal to (d−1), based on the correction bit position designating signal of the correction bit position detector, so that the run length of '0's will be equal to d, the playback RF signals read out from the recording medium are decoded at at least a comparison level into channel bit data. The correction bit position detector has n-items of the domain information obtained on splitting n-items of the bit information including bit data of a channel clock in the bit information obtained from n-tupled clocks into H-levels and L-levels with a comparison level as a boundary. For example, the correction bit position detector compares n-items of the domain information by the bit information obtained by channel bit data directly previous to a (d−1) domain or the next channel bit data and n-tupled clocks sandwiched in-between to n-items of the domain information by the bit information obtained from channel bit data directly following the (d−1) domain or previous channel bit data and n-tupled clocks sandwiched in-between to select and output a correction bit position designating signal designating a correction bit position. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector equal to (d−1) and a data correction unit 6 for correcting the channel bit data having the run length of "0"s as detected by the (d−1) detector equal to (d−1), based on the correction bit position designating signal of the correction bit position detector, so that the run length of '0's will be equal to d, the playback RF signals read out from the recording medium are decoded at at least a comparison level into channel bit data. The correction bit position detector has n-items of the domain information obtained on splitting n-items of the bit information including bit data of a channel clock in the bit information obtained from n-tupled clocks into H-levels and L-levels with a comparison level as a boundary. For example, the correction bit position detector splits n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between respectively into H-levels and L-levels with a comparison level as a boundary to output a correction bit position designating signal designating a correction bit position as selected depending on the relative magnitude of the H-levels or L-levels. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector equal to (d−1) and a data correction unit 6 for correcting the channel bit data having the run length of "0"s as detected by the (d−1) detector equal to (d−1), based on the correction bit position designating signal of the correction bit position detector, so that the run length of '0's will be equal to d, the playback RF signals read out from the recording medium are decoded at at least a comparison level into channel bit data. The correction bit position detector has n-items of the domain information obtained on splitting n-items of the bit information including bit data of a channel clock in the bit information obtained from n-tupled clocks into H-levels and L-levels with a comparison level as a boundary. For example, the correction bit position detector splits n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between respectively into H-levels and L-levels with a comparison level as a boundary to output a correction bit position designating signal designating a correction bit position using the number of the L-levels or that of the H-levels. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector equal to (d−1) and a data correction unit 6 for correcting the channel bit data having the run length of "0"s as detected by the (d−1) detector equal to (d−1), based on the correction bit position designating signal of the correction bit position detector, so that the run length of '0's will be equal to d, the playback RF signals read out from the recording medium are decoded at at least a comparison level into channel bit data, the correction bit position detector has n-items of the domain information obtained on splitting n-items of the bit information including bit data of a channel clock in the bit information obtained from n-tupled clocks into H-levels and L-levels with a comparison level as a boundary. For example, the correction bit position detector splits n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between respectively into H-levels and L-levels with a comparison level as a boundary to output a correction bit position designating signal designating the backward side or the forward side of the (d−1) domain as a correction bit position if, when n-items of the domain information include backward side channel bit data, the number of "0"s on transition from the L-level to the H-level plus 1 is larger than the number of "0"s on transition from the H-level to the L-level or the number of "0"s on transition from the H-level to the L-level is larger than the number of "0"s on transition from the L-level to the H-level plus 1. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector equal to (d−1) and a data correction unit 6 for correcting the channel bit data having the run length of "0"s as detected by the (d−1) detector equal to (d−1), based on the correction bit position designating signal of the correction bit position detector, so that the run length of '0's will be equal to d, the playback RF signals read out from the recording medium are decoded at at least a comparison level into channel bit data, the correction bit position detector has n-items of the domain information obtained on splitting n-items of the bit information including bit data of a channel clock in the bit information obtained from n-tupled clocks into H-levels and L-levels with a comparison level as a boundary. For example, the correction bit position detector splits n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between respectively into H-levels and L-levels with a comparison level as a boundary to output a correction bit position designating signal designating the backward side or the forward side of the (d−1) domain if, when n-items of the domain information include forward side channel bit data, the number of "0"s on transition from the L-level to the H-level is larger than the number of "0"s on transition from the H-level to the L-level plus 1 or the number of "0"s on transition from the H-level to the L-level plus 1 is larger than the number of "0"s on transition from the L-level to the H-level, respectively. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector equal to (d−1) and a data correction unit 6 for correcting the channel bit data having the run length of "0"s as detected by the (d−1) detector equal to (d−1), based on the correction bit position designating signal of the correction bit position detector, so that the run length of '0's will be equal to d, the playback RF signals read out from the recording medium are decoded at at least a comparison level into channel bit data. The correction bit position detector has n-items of the domain information obtained on splitting n-items of the bit information including bit data of a channel clock in the bit information obtained from n-tupled clocks into H-levels and L-levels with a comparison level as a boundary. For example, the correction bit position detector splits n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between respectively into H-levels and L-levels with a comparison level as a boundary to output a correction bit position designating signal designating the backward side or the forward side of the (d−1) domain as the correction bit position if, when n-items of the domain information include backward side channel bit data, the number of "1"s on transition from the H-level to the L-level plus 1 is larger than the number of "1"s on transition from the L-level to the H-level or if the number of "1"s on transition from the L-level to the H-level is larger than the number of "1"s on transition from the H-level to the L-level plus 1, respectively. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector equal to (d−1) and a data correction unit 6 for correcting the channel bit data having the run length of "0"s as detected by the (d−1) detector equal to (d−1), based on the correction bit position designating signal of the correction bit position detector, so that the run length of '0's will be equal to d, the playback RF signals read out from the recording medium are decoded at at least a comparison level into channel bit data. The correction bit position detector has n-items of the domain information obtained on splitting n-items of the bit information including bit data of a channel clock in the bit information obtained from n-tupled clocks into H-levels and L-levels with a comparison level as a boundary. For example, the correction bit position detector splits n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between respectively into H-levels and L-levels with a comparison level as a boundary to output a correction bit position designating signal designating the backward side or the forward side of the (d−1) domain as a correction bit position if, when n-items of the domain information include forward side channel bit data, the number of "1"s on transition from the H-level to the L-level is larger than the number of "1"s on transition from the L-level to the H-level plus 1, or the number of "1"s on transition from the L-level to the H-level plus 1 is larger than the number of "1"s on transition from the H-level to the L-level, respectively. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector equal to (d−1) and a data correction unit 6 for correcting the channel bit data having the run length of "0"s as detected by the (d−1) detector equal to (d−1), based on the correction bit position designating signal of the correction bit position detector, so that the run length of '0's will be equal to d, the playback RF signals read out from the recording medium are decoded at at least a comparison level into channel bit data. The correction bit position detector has n-items of the domain information obtained on splitting n-items of the bit information including bit data of a channel clock in the bit information obtained from n-tupled clocks into H-levels and L-levels with a comparison level as a boundary. For example, the correction bit position detector splits n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between respectively into H-levels and L-levels with a comparison level as a boundary to output a correction bit position designating signal designating the correction bit position based on the previous correction bit position held on memory if the domain information for the H levels is the same as that for the L-levels. Thus the correction bit position detector 5 can designate a correction position of channel bit data having a run length of the same symbol equal to (d−1) to correct the channel bit data having a run length of the same symbol equal to (d−1) by the data correction unit 6 so that the run length of the same symbol will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector equal to (d−1) and a data correction unit 6 for correcting the channel bit data having the run length of "0"s as detected by the (d−1) detector equal to (d−1), based on the correction bit position designating signal of the correction bit position detector, so that the run length of '0's will be equal to d, the playback RF signals read out from the recording medium are decoded at at least a comparison level into channel bit data. The data correction unit 6 performs correction processing by inverting the logical level of data at the designated correction bit position based on the correction bit position designating signal by the correction bit position detector and further inverting the logical level of data at an outer side of the (d−1) domain at the designated correction bit position. Thus the correction bit position detector 5 can correct the channel bit data so that the run length of the "0"s will be equal to d to reduce data decoding error in the vicinity of the minimum length between transitions Tmin to improve bit error rate.

In the data decoding apparatus for playback data from a recording medium having recorded thereon recording codes, which are NRZI modulated codes having a minimum run length of "0"s between neighboring "1"s in a code string equal to d, and which have a minimum run length of the same symbol equal to d'=d+1, d being a positive integer, including a clock generator 2 for n-tupling channel clocks of playback data, n being an integer not less than 2, a (d−1) detector 14 for detecting channel bit data having a run length of the same symbol following inverse NRZI modulation equal to (d−1), a correction bit position detector 5 for outputting a correction bit position designating signal for designating a correction position for channel bit data having the run length of "0"s as detected by the (d−1) detector equal to (d−1) and a data correction unit 6 for correcting the channel bit data having the run length of "0"s as detected by the (d−1) detector equal to (d−1), based on the correction bit position designating signal of the correction bit position detector, so that the run length of '0's will be equal to d, the playback RF signals read out from the recording medium are decoded at at least a comparison level into channel bit data. The data correction unit performs correction processing by shifting data "1" at the designated correction bit position based on the correction bit position designating signal by the correction bit position detector 5 to data on an outer side of the (d−1) domain. Thus the correction bit position detector 5 can designate a correction position of channel bit data having a run length of the same symbol equal to (d−1) to correct the channel bit data having a run length of the same symbol equal to (d−1) by the data correction unit 6 so that the run length of "0"s between neighboring "1"s will be equal to d to reduce data decoding error in the vicinity of the minimum length between transitions Tmin to improve bit error rate.

Figure 17:
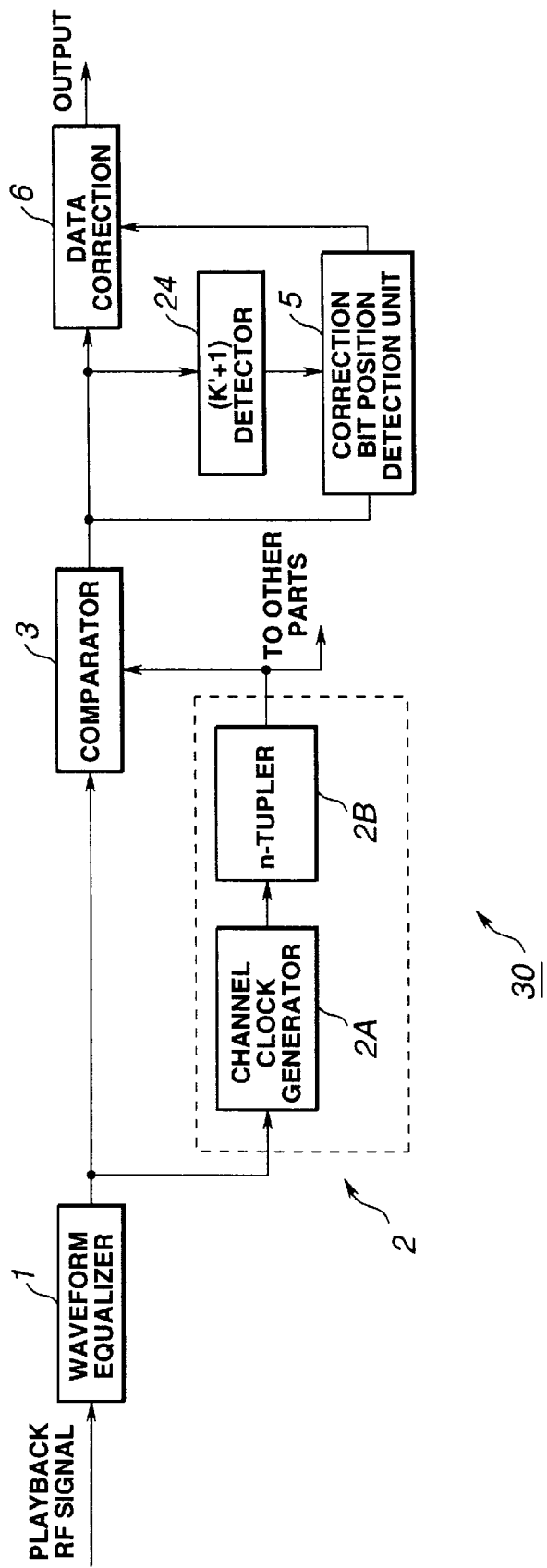
FIG. 17 is still another block diagram showing a data decoding device according to the present invention.

Although the data decoding device 10 shown in FIG. 10 corrects channel bit data having the run length of the same symbol equal to (d−1), such a circuit correcting channel bit data having a run length of the same symbol equal to (k'+1) thus longer than the maximum run length of k' may similarly be implemented by providing a (k'+1) detector 24 in place of the d−1)detector 4 as shown in FIG. 17.

That is, a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. This decreases the data decoding error in the vicinity of the maximum length between transitions Tmax to improve the bit error rate.

With the data decoding device 30, the playback RF signal read out from a recording medium is decoded at at least a comparison level to correct the channel bit data having the run length of the same symbol equal to (k'+1) so that the run length of the same symbol will be equal to k'. This decreases the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k', the correction bit position detector has (n+1) items of the domain information obtained on splitting the bit information obtained by bit data of a given channel clock and bit data of the next channel clock and n-tupled clocks sandwiched in-between into the H-level and the L-level with a comparison level as the boundary. The correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k', the correction bit position detector holds on memory (n+1) items of the domain information from the bit information obtained from bit data in a channel clock and bit data in the next channel clock and n-tupled clocks in-between and designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k', the correction bit position detector has (n+1) items of the domain information obtained on splitting the bit information obtained by bit data of a given channel clock and bit data of the next channel clock and n-tupled clocks sandwiched in-between into the H-level and the L-level with a comparison level as the boundary. The correction bit position detector 5 has (n+1) items of the domain information obtained on splitting the bit information obtained by bit data of a given channel clock and bit data of the next channel clock and n-tupled clocks sandwiched in-between into the H-level and the L-level with a comparison level as the boundary. The correction bit position detector 5 compares (n+1) items of the domain information from the bit information obtained by channel bit data directly previous to the (k'+1) domain and next channel bit data and n-tupled clocks sandwiched in-between are compared to (n+1) items of the domain information by the bit information obtained from channel bit data directly following the (k'+1) domain, previous channel bit data and n-tupled clocks sandwiched in-between to output a correction bit position designating signal designating a selected correction bit position and designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. The correction bit position detector 5 has (n+1) items of the domain information obtained on splitting the bit information obtained by bit data of a given channel clock and bit data of the next channel clock and n-tupled clocks sandwiched in-between into the H-level and the L-level with a comparison level as the boundary. For example, the correction bit position detector splits (n+1) items of the domain information from the bit information obtained by channel bit data directly previous to the (k'+1) domain and next channel bit data and n-tupled clocks sandwiched in-between and (n+1) items of the domain information by the bit information obtained from channel bit data directly following the (k'+1) domain, previous channel bit data and n-tupled clocks sandwiched in-between respectively into H-levels and L-levels with a comparison level as a boundary to output a correction bit position designating signal designating a correction bit position as selected depending on the relative magnitude of the H-levels or L-levels to designate the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. The correction bit position detector 5 has (n+1) items of the domain information obtained on splitting the bit information obtained by bit data of a given channel clock and bit data of the next channel clock and n-tupled clocks sandwiched in-between into the H-level and the L-level with a comparison level as the boundary. For example, the correction bit position detector splits (n+1) items of the domain information from the bit information obtained by channel bit data directly previous to the (k'+1) domain and next channel bit data and n-tupled clocks sandwiched in-between and (n+1) items of the domain information by the bit information obtained from channel bit data directly following the (k'+1) domain, previous channel bit data and n-tupled clocks sandwiched in-between respectively into H-levels and L-levels with a comparison level as a boundary to output a correction bit position designating signal designating a side with a smaller number of the H-levels or a side with a smaller number of the L-levels as a correction bit position if the (k'+1) domain is of the H-level or of the L-level, respectively. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. The correction bit position detector 5 has (n+1) items of the domain information obtained on splitting the bit information obtained by bit data of a given channel clock and bit data of the next channel clock and n-tupled clocks sandwiched in-between into the H-level and the L-level with a comparison level as the boundary. For example, the correction bit position detector splits (n+1) items of the domain information from the bit information obtained from channel bit data directly previous to the (k'+1) domain and next channel bit data and n-tupled clocks sandwiched in-between and (n+1) items of the domain information by the bit information obtained from channel bit data directly following the (k'+1) domain, previous channel bit data and n-tupled clocks sandwiched in-between respectively into H-levels and L-levels with a comparison level as a boundary to output a correction bit position designating signal designating a correction bit position using the number of the L-levels or that of the H-levels. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. The correction bit position detector 5 has (n+1) items of the domain information obtained on splitting the bit information obtained by bit data of a given channel clock and bit data of the next channel clock and n-tupled clocks sandwiched in-between into the H-level and the L-level with a comparison level as the boundary. For example, the correction bit position detector splits (n+1) items of the domain information from the bit information obtained by channel bit data directly previous to the (k'+1) domain and next channel bit data and n-tupled clocks sandwiched in-between and (n+1) items of the domain information by the bit information obtained from channel bit data directly following the (k'+1) domain, previous channel bit data and n-tupled clocks sandwiched in-between respectively into H-levels and L-levels with a comparison level as a boundary to output a correction bit position designating the forward side or the backward side of the (k'+1) domain if the number of "0"s on transition from the L level to the H level is larger than the number of "0"s on transition from the H level to the L level or if the number of "0"s on transition from the H level to the L level is larger than the number of "0"s on transition from the L level to the H level, respectively. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. The correction bit position detector 5 has (n+1) items of the domain information obtained on splitting the bit information obtained by bit data of a given channel clock and bit data of the next channel clock and n-tupled clocks sandwiched in-between into the H-level and the L-level with a comparison level as the boundary. For example, the correction bit position detector splits (n+1) items of the domain information from the bit information obtained by channel bit data directly previous to the (k'+1) domain and next channel bit data and n-tupled clocks sandwiched in-between and (n+1) items of the domain information by the bit information obtained from channel bit data directly following the (k'+1) domain, previous channel bit data and n-tupled clocks sandwiched in-between respectively into H-levels and L-levels with a comparison level as a boundary to output a correction bit position designating signal designating the forward side or the backward side of the (k'+1) domain as the correction bit position if the number of "1"s on transition from the H level to the L level is larger than the number of "1"s on transition from the L level to the H level or if the number of "1"s on transition from the L level to the H level is larger than the number of "1"s on transition from the H level to the L level, respectively. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, according to the present invention, includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. The correction bit position detector 5 has (n+1) items of the domain information obtained on splitting the bit information obtained by bit data of a given channel clock and bit data of the next channel clock and n-tupled clocks sandwiched in-between into the H-level and the L-level with a comparison level as the boundary. For example, the correction bit position detector splits (n+1) items of the domain information from the bit information by channel bit data directly previous to the (k'+1) domain and next channel bit data and n-tupled clocks sandwiched in-between and (n+1) items of the domain information by the bit information obtained from channel bit data directly following the (k'+1) domain, previous channel bit data and n-tupled clocks sandwiched in-between respectively into H-levels and L-levels with a comparison level as a boundary to output a correction bit position designating signal designating a correction bit position, based on the previous correction bit position designating signal held on memory, if the domain information for the H levels is the same as that for the L-levels. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. The correction bit position detector 5 has (n+1) items of the domain information obtained on splitting the bit information obtained by bit data of a given channel clock and bit data of the next channel clock and n-tupled clocks sandwiched in-between into the H-level and the L-level with a comparison level as the boundary. For example, the correction bit position detector has (n−1) items of the domain information which is obtained on splitting the bit information obtained from n-tupled clocks sandwiched between bit data of a given channel clock and bit data of the next channel clock with a comparison level as the boundary into the H-level and the L-level. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. The correction bit position detector holds on memory (n−1) items of the domain information from the bit information obtained from n-tupled clocks sandwiched between bit data of a given channel clock and bit data of the next channel clock. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. The correction bit position detector has (n−1) items of the domain information which is obtained on splitting the bit information obtained from n-tupled clocks sandwiched between bit data of a given channel clock and bit data of the next channel clock with a comparison level as the boundary into the H-level and the L-level. The correction bit position detector compares (n−1) items of the domain information by the bit information obtained from n-tupled clocks sandwiched between channel bit data directly previous to the (k'+1) domain and next channel bit data to (n−1) items of the domain information by the bit information obtained from n-tupled clocks sandwiched between channel bit data directly following the (k'+1) domain and previous channel bit data to select and output a correction bit position designating signal designating a correction bit position. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. The correction bit position detector has (n−1) items of the domain information which is obtained on splitting the bit information obtained from n-tupled clocks sandwiched between bit data of a given channel clock and bit data of the next channel clock with a comparison level as the boundary into the H-level and the L-level. The correction bit position detector splits (n−1) items of the domain information by the bit information obtained from n-tupled clocks sandwiched between channel bit data directly previous to the (k'+1) domain and the next channel bit data and (n−1) items of the domain information by the bit information obtained from n-tupled clocks sandwiched between channel bit data directly following the (k'+1) domain and previous channel bit data respectively into H-levels and L-levels with a comparison level as a boundary to output a correction bit position designating signal designating the correction bit position selected depending on the relative magnitude of the H-level or L-level with a comparison level as a boundary. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. The correction bit position detector has (n−1) items of the domain information which is obtained on splitting the bit information obtained from n-tupled clocks sandwiched between bit data of a given channel clock and bit data of the next channel clock with a comparison level as the boundary into the H-level and the L-level. The correction bit position detector splits (n−1) items of the domain information by the bit information obtained from n-tupled clocks sandwiched between channel bit data directly previous to the (k'+1) domain and the next channel bit data and (n−1) items of the domain information by the bit information obtained from n-tupled clocks sandwiched between channel bit data directly following the (k'+1) domain and previous channel bit data respectively into H-levels and L-levels with a comparison level as a boundary to output a correction bit position designating signal designating a side with a smaller number of the H-levels or a side with a smaller number of the L-levels as a correction bit position if the (k'+1) domain is of the H-level or if the (k'+1) domain is of the L-level, respectively. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, according to the present invention, includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. the correction bit position detector has (n−1) items of the domain information which is obtained on splitting the bit information obtained from n-tupled clocks sandwiched between bit data of a given channel clock and bit data of the next channel clock with a comparison level as the boundary into the H-level and the L-level. The correction bit position detector splits (n−1) items of the domain information by the bit information obtained from n-tupled clocks sandwiched between channel bit data directly previous to the (k'+1) domain and the next channel bit data and (n−1) items of the domain information by the bit information obtained from n-tupled clocks sandwiched between channel bit data directly following the (k'+1) domain and previous channel bit data respectively into H-levels and L-levels with a comparison level as a boundary to output a correction bit position designating signal designating a correction bit position using the number of the L-levels or that of the H-levels. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. The correction bit position detector has (n−1) items of the domain information which is obtained on splitting the bit information obtained from n-tupled clocks sandwiched between bit data of a given channel clock and bit data of the next channel clock with a comparison level as the boundary into the H-level and the L-level. The correction bit position detector splits (n−1) items of the domain information from the bit information obtained from n-tupled clocks sandwiched between channel bit data directly previous to the (k'+1) domain and the next channel bit data and (n−1) items of the domain information by the bit information obtained from n-tupled clocks sandwiched between channel bit data directly following the (k'+1) domain and previous channel bit data respectively into H-levels and L-levels with a comparison level as a boundary to output a correction bit position designating signal designating the forward side or the backward side of the (k'+1) domain if the number of "0"s on transition from the L level to the H level is larger than the number of "0"s on transition from the H level to the L level or if the number of "0"s on transition from the H level to the L level is larger than the number of "0"s on transition from the L level to the H level, respectively. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, according to the present invention, includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. The correction bit position detector has (n−1) items of the domain information which is obtained on splitting the bit information obtained from n-tupled clocks sandwiched between bit data of a given channel clock and bit data of the next channel clock with a comparison level as the boundary into the H-level and the L-level. The correction bit position detector splits (n−1) items of the domain information from the bit information obtained from n-tupled clocks sandwiched between channel bit data directly previous to the (k'+1) domain and the next channel bit data and (n−1) items of the domain information by the bit information obtained from n-tupled clocks sandwiched between channel bit data directly following the (k'+1) domain and previous channel bit data respectively into H-levels and L-levels with a comparison level as a boundary to output a correction bit position designating signal designating the forward side or the backward side of the (k'+1) domain if the number of "1"s on transition from the L level to the H level is larger than the number of "1"s on transition from the H level to the L level or if the number of "1"s on transition from the H level to the L level is larger than the number of "1"s on transition from the L level to the H level, respectively. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, according to the present invention, includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. the correction bit position detector has (n−1) items of the domain information which is obtained on splitting the bit information obtained from n-tupled clocks sandwiched between bit data of a given channel clock and bit data of the next channel clock with a comparison level as the boundary into the H-level and the L-level. The correction bit position detector splits (n−1) items of the domain information from the bit information obtained from n-tupled clocks sandwiched between channel bit data directly previous to the (k'+1) domain and the next channel bit data and (n−1) items of the domain information by the bit information obtained from n-tupled clocks sandwiched between channel bit data directly following the (k'+1) domain and previous channel bit data respectively into H-levels and L-levels for comparing the two with a comparison level as a boundary to output a correction bit position designating signal designating a correction bit position, based on the previous correction bit position held on memory, if the domain information for the H levels is the same as that for the L-levels. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, according to the present invention, includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. The correction bit position detector has n-items of the domain information which is obtained on splitting the bit information including bit data of a given channel clock in the bit information obtained from n-tupled clocks into H-levels and L-levels with a comparison level as a boundary. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, according to the present invention, includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. The correction bit position detector holds on memory n-items of the domain information from n-items of the bit information including bit data of a given channel clock in the bit information obtained from n-tupled clocks. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. The detector has n-items of the domain information which is obtained on splitting the bit information including bit data of a given channel clock in the bit information obtained from n-tupled clocks into H-levels and L-levels with a comparison level as a boundary. The correction bit position detector compares n-items of the domain information by the bit information obtained by channel bit data directly previous to a (k'+1) domain or the next channel bit data and n-tupled clocks sandwiched in-between to n-items of the domain information by the bit information obtained from channel bit data directly following the (k'+1) domain or previous channel bit data and n-tupled clocks sandwiched in-between to select and output a correction bit position designating signal designating a correction bit position. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. The correction bit position detector 5 has n-items of the domain information obtained on splitting the n-items of the bit information including bit data of a channel clock in the bit information obtained from n-tupled clocks into the H-levels and the L-levels with a comparison level as a boundary. For example, the correction bit position detector compares n-items of the domain information by the bit information obtained by channel bit data directly previous to a (k'+1) domain or the next channel bit data and n-tupled clocks sandwiched in-between to n-items of the domain information by the bit information obtained from channel bit data directly following the (k'+1) domain or previous channel bit data and n-tupled clocks sandwiched in-between to select and output a correction bit position designating signal designating a selected correction bit position. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. The correction bit position detector 5 has n-items of the domain information obtained on splitting the n-items of the bit information including bit data of a channel clock in the bit information obtained from n-tupled clocks into the H-levels and the L-levels with a comparison level as a boundary. For example, the correction bit position detector splits n-items of the domain information by the bit information obtained by channel bit data directly previous to a (k'+1) domain or the next channel bit data and n-tupled clocks sandwiched in-between to n-items of the domain information by the bit information obtained from channel bit data directly following the (k'+1) domain or previous channel bit data and n-tupled clocks sandwiched in-between respectively into H-levels and L-levels with a comparison level as a boundary to output a correction bit position designating signal designating a correction bit position as selected depending on the relative magnitude of the H-levels or L-levels. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. The correction bit position detector 5 has n-items of the domain information obtained on splitting the n-items of the bit information including bit data of a channel clock in the bit information obtained from n-tupled clocks into the H-levels and the L-levels with a comparison level as a boundary. For example, the correction bit position detector splits n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between respectively into H-levels and L-levels with a comparison level as a boundary to output a correction bit position designating signal designating a correction bit position using the number of the L-levels or that of the H-levels. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. The correction bit position detector 5 has n-items of the domain information obtained on splitting the n-items of the bit information including bit data of a channel clock in the bit information obtained from n-tupled clocks into the H-levels and the L-levels with a comparison level as a boundary. For example, the correction bit position detector splits n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between respectively into H-levels and L-levels with a comparison level as a boundary to output a correction bit position designating signal designating the forward side or the backward side of the (k'+1) domain as a correction bit position if, when n-items of the domain information include backward side channel bit data, the number of "0"s on transition from the L-level to the H-level plus 1 is larger than the number of "0"s on transition from the H-level to the L-level or the number of "0"s on transition from the H-level to the L-level is larger than the number of "0"s on transition from the L-level to the H-level plus 1. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. The correction bit position detector 5 has n-items of the domain information obtained on splitting the n-items of the bit information including bit data of a channel clock in the bit information obtained from n-tupled clocks into the H-levels and the L-levels with a comparison level as a boundary. For example, the correction bit position detector splits n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between respectively into H-levels and L-levels with a comparison level as a boundary to output a correction bit position designating signal designating the forward side or the backward side of the (k'+1) domain if, when n-items of the domain information include forward side channel bit data, the number of "0"s on transition from the L-level to the H-level is larger than the number of "0"s on transition from the H-level to the L-level plus 1 or the number of "0"s on transition from the H-level to the L-level plus 1 is larger than the number of "0"s on transition from the L-level to the H-level, respectively. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, includes a clock generator 2 for n-tupling channel clocks of channel clocks, n being an integer not less than 2, a (k'+1) detector 24 for detecting channel bit data having a run length of the same symbol equal to (k'+1) , a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. The correction bit position detector 5 has n-items of the domain information obtained on splitting the n-items of the bit information including bit data of a channel clock in the bit information obtained from n-tupled clocks into the H-levels and the L-levels with a comparison level as a boundary. For example, the correction bit position detector splits n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between respectively into H-levels and L-levels with a comparison level as a boundary to output a correction bit position designating signal designating the forward side or the backward side of the (k'+1) domain as the correction bit position if, when n-items of the domain information include backward side channel bit data, the number of "1"s on transition from the H-level to the L-level plus 1 is larger than the number of "1"s on transition from the L-level to the H-level or if the number of "1"s on transition from the L-level to the H-level is larger than the number of "1"s on transition from the H-level to the L-level plus 1, respectively. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, includes a clock generator 2 for n-tupling channel clocks of channel clocks, n being an integer not less than 2, a (k'+1) detector 24 for detecting channel bit data having a run length of the same symbol equal to (k'+1) , a correction bit position detector 5 for outputting a correction bit position designating signal for designating a correction position for channel bit data having the run length of the same symbol as detected by said (k'+1) detector equal to (k'+1) and a data correction unit 6 for correcting the channel bit data having the run length of the same symbol as detected by said (k'+1) detector equal to (k'+1), based on the correction bit position designating signal of said correction bit position detector, so that the run length of the same symbol will be equal to k'. The correction bit position detector 5 has n-items of the domain information obtained on splitting the n-items of the bit information including bit data of a channel clock in the bit information obtained from n-tupled clocks into the H-levels and the L-levels with a comparison level as a boundary. For example, the correction bit position detector splits n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between respectively into H-levels and L-levels with a comparison level as a boundary to output a correction bit position designating signal designating the forward side or the backward side of the (k'+1) domain as a correction bit position if, when n-items of the domain information include forward side channel bit data, the number of "1"s on transition from the H-level to the L-level is larger than the number of "1"s on transition from the L-level to the H-level plus 1, or the number of "1"s on transition from the L-level to the H-level plus 1 is larger than the number of "1"s on transition from the H-level to the L-level, respectively. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. The correction bit position detector 5 has n-items of the domain information obtained on splitting the n-items of the bit information including bit data of a channel clock in the bit information obtained from n-tupled clocks into the H-levels and the L-levels with a comparison level as a boundary. For example, the correction bit position detector splits n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between respectively into H-levels and L-levels with a comparison level as a boundary to output a correction bit position designating signal designating a correction bit position based on the previous correction bit position designating signal held on memory if the domain information for the H levels is the same as that for the L-levels. Thus the correction bit position detector 5 designates the correction position of channel bit data having a run length of the same symbol equal to (k'+1) to correct channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

In a data decoding apparatus 30 for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, includes a clock generator 2 for n-tupling channel clocks of channel clocks, n being an integer not less than 2, a (k'+1) detector 24 for detecting channel bit data having a run length of the same symbol equal to (k'+1), a correction bit position detector 5 for outputting a correction bit position designating signal for designating a correction position for channel bit data having the run length of the same symbol as detected by the (k'+1) detector equal to (k'+1) and a data correction unit 6 for correcting the channel bit data having the run length of the same symbol as detected by the (k'+1) detector equal to (k'+1), based on the correction bit position designating signal of the correction bit position detector, so that the run length of the same symbol will be equal to k'. The data decoding device 30 decodes the playback RF signals at at least a comparison level to channel bit data. The data correction unit performs correction processing by inverting the logical level of data at the bit position designated by a correction bit position designating signal by the correction bit position detector 5. Thus the correction bit position detector 5 corrects channel bit data having a run length of the same symbol equal to (k'+1) by the data correction unit 6 so that the run length of the same symbol will be equal to k' to decrease the data decoding error in the vicinity of the maximum length between transitions Tmax to improve the bit error rate.

Although the data decoding device 10 of FIG. 17 corrects channel bit data having the run length of the same symbol equal to (k'+1), thus larger than the run length of k', the data decoding device may also be configured for correcting channel bit data having the maximum run length of "0"s inserted between two neighboring "1"s equal to (k−1).

Figure 18:
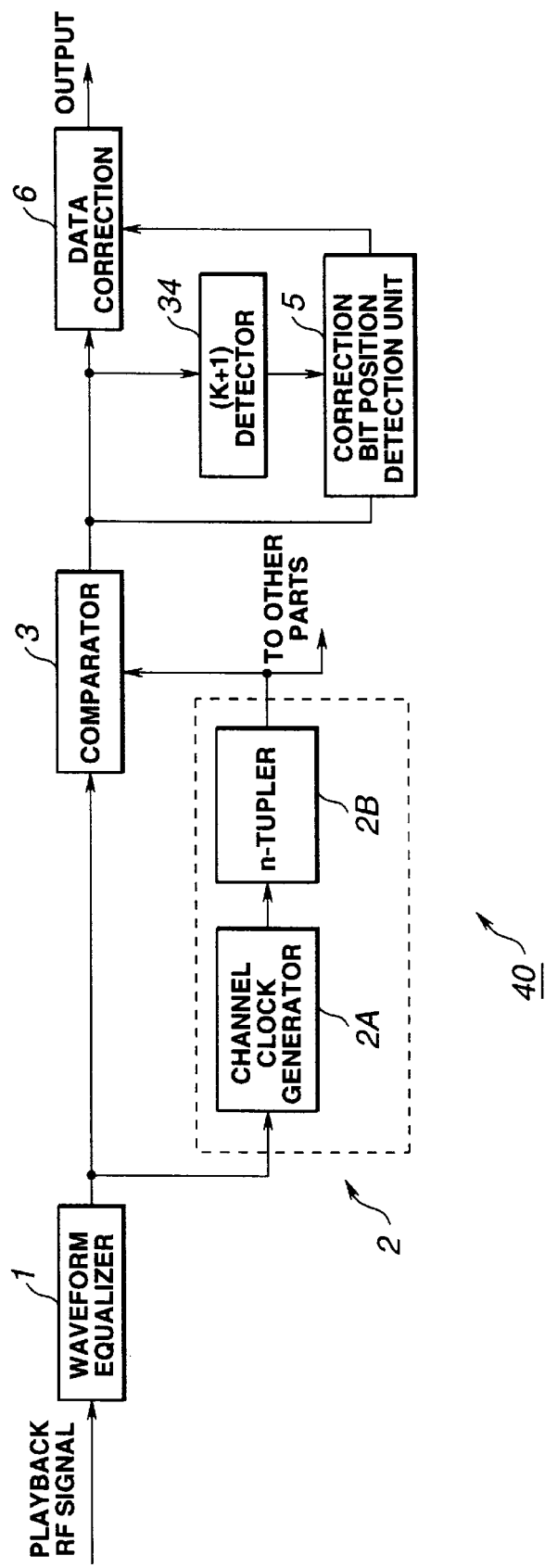
FIG. 18 is yet another block diagram showing a data decoding device according to the present invention.

Referring to FIG. 18, the comparator 3 of the data decoding device 10 can be designed as a comparator of the type in which it comparates to "1" and "0" based on the usual comparison value. However, it may also have two comparison values for converting the comparated RF level values into two values of "0", "1" and "0" looking from above for outputting inverse NRZI code, and the (k'+1) detector 4 may be designed as a (k+1) detector 34 for correcting channel bit data having a run length of "0"s equal to (k+1).

A data decoding device for playback data from a recording medium having recording codes recorded thereon, the recording codes being NRZI modulated codes having a maximum run length of "0"s between neighboring "1"s in a code string equal to k, the recording codes having a maximum run length of the same symbol following inverse NRZI modulation equal to k'=k+1, where k≧1 and k≧d, includes a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector 34 equal to (k+1), and a data correction unit 6 for correcting the channel bit data having the run length of "0"s as detected by the (k+1) detector equal to (k+1), based on the correction bit position designating signal of the correction bit position detector, so that the run length of "0"s will be equal to k. This lowers data decoding error in the vicinity of the minimum length between transitions Tmin to improve the bit error rate.

With the present data decoding device, the playback RF signal read out from a recording medium is decoded at at least a comparison level and the channel bit data having the run length of the same symbol equal to (k+1) is corrected by the data correction unit 6 so that the run length of the same symbol will be equal to k. This lowers data decoding error in the vicinity of the minimum length between transitions Tmin to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector 34 equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector has (n+1) items of the domain information obtained on splitting the bit information obtained by bit data of a given channel clock and bit data of the next channel clock and n-tupled clocks sandwiched in-between into the H-level and the L-level with a comparison level as the boundary. The correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector holds on memory (n+1)

items of the domain information from the bit information obtained by bit data of a given channel clock and bit data of the next channel clock and n-tupled clocks sandwiched in-between. The correction bit position detector 5 thus can designate the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector stores (n+1) items of the domain information from the bit information obtained by bit data of a given channel clock and bit data of the next channel clock and n-tupled clocks sandwiched in-between. The correction bit position detector compares (n+1) items of the domain information from the bit information obtained by channel bit data directly previous to the (k+1) domain and next channel bit data and n-tupled clocks sandwiched in-between to (n+1) items of the domain information by the bit information obtained from channel bit data directly following the (k+1) domain, previous channel bit data and n-tupled clocks sandwiched in-between to select and output a correction bit position designating signal designating a correction bit position. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector has (n+1) items of the domain information from the bit information obtained by bit data of a given channel clock and bit data of the next channel clock and n-tupled clocks sandwiched in-between. For example, the correction bit position detector splits (n+1) items of the domain information from the bit information obtained by channel bit data directly previous to the (k+1) domain and next channel bit data and n-tupled clocks sandwiched in-between and (n+1) items of the domain information by the bit information obtained from channel bit data directly following the (k+1) domain, previous channel bit data and n-tupled clocks sandwiched in-between respectively into H-levels and L-levels with a comparison level as a boundary to output a correction bit position designating signal designating a correction bit position as selected depending on the relative magnitude of the H-levels or L-levels. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector has (n+1) items of the domain information from the bit information obtained by bit data of a given channel clock and bit data of the next channel clock and n-tupled clocks sandwiched in-between. For example, the correction bit position detector splits (n+1) items of the domain information from the bit information obtained by channel bit data directly previous to the (k+1) domain and next channel bit data and n-tupled clocks sandwiched in-between and (n+1) items of the domain information by the bit information obtained from channel bit data directly following the (k+1) domain, previous channel bit data and n-tupled clocks sandwiched in-between respectively into H-levels and L-levels with a comparison level as a boundary to output a correction bit position designating signal designating a side with a smaller number of the H-levels or a side with a smaller number of the L-levels as a correction bit position if the (k+1) domain is of the H-level or of the L-level, respectively. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector has (n+1) items of the domain information from the bit information obtained by bit data of a given channel clock and bit data of the next channel clock and n-tupled clocks sandwiched in-between. For example, the correction bit position detector splits (n+1) items of the domain information from the bit information obtained from channel bit data directly previous to the (k+1) domain and next channel bit data and n-tupled clocks sandwiched in-between and (n+1) items of the domain information by the bit information obtained from channel bit data directly following the (k+1) domain, previous channel bit data and n-tupled clocks sandwiched in-between respectively into H-levels and L-levels with a comparison level as a boundary to output a correction bit position designating signal designating a correction bit position using the number of the L-levels or that of the H-levels. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector has (n+1) items of the domain information from the bit information obtained by bit data of a given channel clock and bit data of the next channel clock and n-tupled clocks sandwiched in-between. For example, the correction bit position detector splits (n+1) items of the domain information from the bit information obtained by channel bit data directly previous to the (k+1) domain and next channel bit data and n-tupled clocks sandwiched in-between and (n+1) items of the domain information by the bit information obtained from channel bit data directly following the (k+1) domain, previous channel bit data and n-tupled clocks sandwiched in-between respectively into H-levels and L-levels with a comparison level as a boundary to output a correction bit position designating signal designating the forward side or the backward side of the (k+1) domain as a correction bit position if the number of "0"s on transition from the L level to the H level is larger than the number of "0"s on transition from the H level to the L level or if the number of "0"s on transition from the H level to the L level is larger than the number of "0"s on transition from the L level to the H level, respectively. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector has (n+1) items of the domain information from the bit information obtained by bit data of a given channel clock and bit data of the next channel clock and n-tupled clocks sandwiched in-between. For example, the correction bit position detector splits (n+1) items of the domain information from the bit information obtained by channel bit data directly previous to the (k+1) domain and next channel bit data and n-tupled clocks sandwiched in-between and (n+1) items of the domain information by the bit information obtained from channel bit data directly following the (k+1) domain, previous channel bit data and n-tupled clocks sandwiched in-between respectively into H-levels and L-levels with a comparison level as a boundary to output a correction bit position designating signal designating the forward side or the backward side of the (k+1) domain as the correction bit position if the number of "1"s on transition from the H level to the L level is larger than the number of "1"s on transition from the L level to the H level or if the number of "1"s on transition from the L level to the H level is larger than the number of "1"s on transition from the H level to the L level, respectively. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector has (n+1) items of the domain information from the bit information obtained by bit data of a given channel clock and bit data of the next channel clock and n-tupled clocks sandwiched in-between. For example, the correction bit position detector splits (n+1) items of the domain information from the bit information by channel bit data directly previous to the (k+1) domain and next channel bit data and n-tupled clocks sandwiched in-between and (n+1) items of the domain information by the bit information obtained from channel bit data directly following the (k+1) domain, previous channel bit data and n-tupled clocks sandwiched in-between respectively into H-levels and L-levels with a comparison level as a boundary to output a correction bit position designating signal designating a correction bit position, based on the previous correction bit position designating signal held on memory, if the domain information for the H levels is the same as that for the L-levels. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector has (n−1) items of the domain information which is obtained on splitting the bit information obtained from n-tupled clocks sandwiched between bit data of a given channel clock and bit data of the next channel clock with a comparison level as the boundary into the H-level and the L-level. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector stores (n−1) items of the domain information from the bit information obtained from n-tupled clocks sandwiched between bit data of a given channel clock and bit data of the next channel clock. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector has (n−1) items of the domain information obtained on splitting the bit information obtained from n-tupled clocks sandwiched between bit data of a given channel clock and bit data of the next channel clock into H-levels and L-levels with a comparison level as a boundary. For example, the correction bit position detector compares (n−1) items of the domain information by the bit information obtained from n-tupled clocks sandwiched between channel bit data directly previous to the (k+1) domain and next channel bit data to (n−1) items of the domain information by the bit information obtained from n-tupled clocks sandwiched between channel bit data directly following the (k+1) domain and previous channel bit data to select and output a correction bit position designating signal designating a correction bit position. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector has (n−1) items of the domain information obtained on splitting the bit information obtained from n-tupled clocks sandwiched between bit data of a given channel clock and bit data of the next channel clock into H-levels and L-levels with a comparison level as a boundary. For example, the correction bit position detector splits (n−1) items of the domain information by the bit information obtained from n-tupled clocks sandwiched between channel bit data directly previous to the (k+1) domain and the next channel bit data and (n−1) items of the domain information by the bit information obtained from n-tupled clocks sandwiched between channel bit data directly following the (k+1) domain and previous channel bit data respectively into H-levels and L-levels with a comparison level as a boundary to output a correction bit position designating signal designating a correction bit position as selected depending on the relative magnitude of the H-levels or L-levels. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector has (n−1) items of the domain information obtained on splitting the bit information obtained from n-tupled clocks sandwiched between bit data of a given channel clock and bit data of the next channel clock into H-levels and L-levels with a comparison level as a boundary. For example, the correction bit position detector splits (n−1) items of the domain information by the bit information obtained from n-tupled clocks sandwiched between channel bit data directly previous to the (k+1) domain and the next channel bit data and (n−1) items of the domain information by the bit information obtained from n-tupled clocks sandwiched between channel bit data directly following the (k+1) domain and previous channel bit data respectively into H-levels and L-levels with a comparison level as a boundary to output a correction bit position designating signal designating a side with a smaller number of the H-levels or a side with a smaller number of the L-levels as a correction bit position if the (k+1) domain is of the H-level or of the L-level, respectively. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector 34 equal to (k+1) and a data correction unit 6 for correcting the channel bit data having the run length of "0"s as detected by the (k+1) detector 34 equal to (k+1), based on the correction bit position designating signal of the correction bit position detector, so that the run length of "0"s will be equal to k, the correction bit position detector has (n−1) items of the domain information obtained on splitting the bit information obtained from n-tupled clocks sandwiched between bit data of a given channel clock and bit data of the next channel clock into H-levels and L-levels with a comparison level as a boundary. For example, the correction bit position detector splits (n−1) items of the domain information by the bit information obtained from n-tupled clocks sandwiched between channel bit data directly previous to the (k+1) domain and the next channel bit data and (n−1) items of the domain information by the bit information obtained from n-tupled clocks sandwiched between channel bit data directly following the (k+1) domain and previous channel bit data respectively into H-levels and L-levels with a comparison level as a boundary to output a correction bit position designating signal designating a correction bit position using the number of the L-levels or that of the H-levels. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector has (n−1) items of the domain information obtained on splitting the bit information obtained in turn from n-tupled clocks sandwiched between bit data of a given channel clock and bit data of the next channel clock into H-levels and L-levels with a comparison level in-between. For example, the correction bit position detector splits (n−1) items of the domain information by the bit information obtained from n-tupled clocks sandwiched between channel bit data directly previous to the (k+1) domain and the next channel bit data and (n−1) items of the domain information by the bit information obtained from n-tupled clocks sandwiched between channel bit data directly following the (k+1) domain and previous channel bit data respectively into H-levels and L-levels with a comparison level as a boundary to output a correction bit position designating signal designating the forward side or the backward side of the (k+1) domain if the number of "0"s on transition from the L level to the H level is larger than the number of "0"s on transition from the H level to the L level or if the number of "0"s on transition from the H level to the L level is larger than the number of "0"s on transition from the L level to the H level, respectively. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector has (n−1) items of the domain information obtained on splitting the bit information obtained in turn from n-tupled clocks sandwiched between bit data of a given channel clock and bit data of the next channel clock into H-levels and L-levels with a comparison level in-between. For example, the correction bit position detector splits (n−1) items of the domain information from the bit information obtained from n-tupled clocks sandwiched between channel bit data directly previous to the (k+1) domain and the next channel bit data and (n−1) items of the domain information by the bit information obtained from n-tupled clocks sandwiched between channel bit data directly following the (k+1) domain and previous channel bit data respectively into H-levels and L-levels with a comparison level as a boundary to output a correction bit position designating signal designating the forward side or the backward side of the (k+1) domain if the number of "1"s on transition from the H level to the L level is larger than the number of "1"s on transition from the L level to the H level or if the number of "1"s on transition from the L level to the H level is larger than the number of "1"s on transition from the H level to the L level, respectively. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector has (n−1) items of the domain information obtained on splitting the bit information obtained in turn from n-tupled clocks sandwiched between bit data of a given channel clock and bit data of the next channel clock into H-levels and L-levels with a comparison level in-between. For example, the correction bit position detector splits (n−1) items of the domain information from the bit information obtained from n-tupled clocks sandwiched between channel bit data directly previous to the (k+1) domain and the next channel bit data and (n−1) items of the domain information by the bit information obtained from n-tupled clocks sandwiched between channel bit data directly following the (k+1) domain and previous channel bit data respectively into H-levels and L-levels for comparing the two with a comparison level as a boundary to output a correction bit position designating signal designating a correction bit position, based on the previous correction bit position designating signal held on memory, if the domain information for the H levels is the same as that for the L-levels. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector has n-items of the domain information which is obtained on splitting n-items of the bit information including bit data of a given channel clock in the bit information obtained from n-tupled clocks into H-levels and L-levels with a comparison level as a boundary. The correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector stores n-items of the domain information obtained on splitting n-items of the bit information including bit data of a given channel clock in the bit information obtained from n-tupled clocks. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector has n-items of the domain information which is obtained on splitting n-items of the bit information including bit data of a given channel clock in the bit information obtained from n-tupled clocks. The correction bit position detector compares n-items of the domain information by the bit information obtained by channel bit data directly previous to a (k+1) domain or the next channel bit data and n-tupled clocks sandwiched in-between to n-items of the domain information by the bit information obtained from channel bit data directly following the (k+1) domain or previous channel bit data and n-tupled clocks sandwiched in-between to output a correction bit position designating signal designating a selected correction bit position. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector has n-items of the domain information which is obtained on splitting n-items of the bit information including bit data of a given channel clock in the bit information obtained from n-tupled clocks. The correction bit position detector splits n-items of the domain information by the bit information obtained by channel bit data directly previous to a (k+1) domain or the next channel bit data and n-tupled clocks sandwiched in-between to n-items of the domain information by the bit information obtained from channel bit data directly following the (k+1) domain or previous channel bit data and n-tupled clocks sandwiched in-between respectively into H-levels and L-levels with a comparison level as a boundary to output a correction bit position designating signal designating a correction bit position as selected depending on the relative magnitude of the H-levels or L-levels. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector has n-items of the domain information which is obtained on splitting n-items of the bit information including bit data of a given channel clock in the bit information obtained from n-tupled clocks. The correction bit position detector splits n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between respectively into H-levels and L-levels with a comparison level as a boundary to output a correction bit position designating signal designating a correction bit position using the number of the L-levels or that of the H-levels. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector has n-items of the domain information which is obtained on splitting n-items of the bit information including bit data of a given channel clock in the bit information obtained from n-tupled clocks. The correction bit position detector splits n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between respectively into H-levels and L-levels with a comparison level as a boundary to output a correction bit position designating signal designating the forward side or the backward side of the (k+1) domain as a correction bit position if, when n-items of the domain information include backward side channel bit data, the number of "0"s on transition from the L-level to the H-level plus 1 is larger than the number of "0"s on transition from the H-level to the L-level or the number of "0"s on transition from the H-level to the L-level is larger than the number of "0"s on transition from the L-level to the H-level plus 1. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector has n-items of the domain information which is obtained on splitting n-items of the bit information including bit data of a given channel clock in the bit information obtained from n-tupled clocks. The correction bit position detector splits n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between respectively into H-levels and L-levels with a comparison level as a boundary to output a correction bit position designating signal designating the forward side or the backward side of the (k+1) domain if, when n-items of the domain information include forward side channel bit data, the number of "0"s on transition from the L-level to the H-level is larger than the number of "0"s on transition from the H-level to the L-level plus 1 or the number of "0"s on transition from the H-level to the L-level plus 1 is larger than the number of "0"s on transition from the L-level to the H-level, respectively. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector has n-items of the domain information which is obtained on splitting n-items of the bit information including bit data of a given channel clock in the bit information obtained from n-tupled clocks. The correction bit position detector splits n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between respectively into H-levels and L-levels with a comparison level as a boundary to output a correction bit position designating signal designating the forward side or the backward side of the (k+1) domain as the correction bit position if, when n-items of the domain information include backward side channel bit data, the number of "1"s on transition from the H-level to the L-level plus 1 is larger than the number of "1"s on transition from the L-level to the H-level or if the number of "1"s on transition from the L-level to the H-level is larger than the number of "1"s on transition from the H-level to the L-level plus 1, respectively. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector has n-items of the domain information which is obtained on splitting n-items of the bit information including bit data of a given channel clock in the bit information obtained from n-tupled clocks. The correction bit position detector splits n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between respectively into H-levels and L-levels with a comparison level as a boundary to output a correction bit position designating signal designating the forward side or the backward side of the (k+1) domain as a correction bit position if, when n-items of the domain information include forward side channel bit data, the number of "1"s on transition from the H-level to the L-level is larger than the number of "1"s on transition from the L-level to the H-level plus 1, or the number of "1"s on transition from the L-level to the H-level plus 1 is larger than the number of "1"s on transition from the H-level to the L-level, respectively. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the correction bit position detector has n-items of the domain information which is obtained on splitting n-items of the bit information including bit data of a given channel clock in the bit information obtained from n-tupled clocks. The correction bit position detector splits n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between respectively into H-levels and L-levels with a comparison level as a boundary to output a correction bit position designating signal designating a correction bit position based on the previous correction bit position designating signal held on memory if the domain information for the H levels is the same as that for the L-levels. Thus the correction bit position detector 5 designates the correction position of channel bit data having a run length of the same symbol equal to (k+1) to correct channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the data correction unit performs correction processing by inverting the logical level of data at a designated bit position based on a correction bit position designating signal by the correction bit position detector 5 and by inverting the logical level of data at a bit position on an inner side of the (k+1) domain of the designated bit position. Thus the correction bit position detector 5 corrects channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In the data decoding apparatus for playback data from a recording medium having recorded thereon recording codes, which are NRZI modulated codes having a maximum run length of "0"s between neighboring "1"s in a code string equal to k, and which have a maximum run length of the same symbol following inverse NRZI modulation equal to k'=k+1, where k≧1 and k≧d, including a clock generator 2 for n-tupling channel clocks where n is an integer not less than 2, a (k+1) detector 34 for detecting channel bit data having a run length of "0"s following inverse NRZI modulation equal to (k+1), a correction bit position detector 5 for outputting a correction bit position designating signal for designating a correction position for channel bit data having the run length of "0"s as detected by the (k+1) detector equal to (k+1) and a data correction unit 6 for correcting the channel bit data having the run length of "0"s as detected by the (k+1) detector equal to (k+1), based on the correction bit position designating signal of the correction bit position detector, so that the run length of "0"s will be equal to k, the data correction unit performs correction processing by shifting data of "1" at a designated bit position to data on an inner side of the (k+1) domain based on a correction bit position designating signal by the correction bit position detector 5. Thus the correction bit position detector 5 corrects channel bit data having a run length of the same symbol equal to (k+1) by the data correction unit 6 so that the run length of the same symbol will be equal to k to decrease the data decoding error in the vicinity of the maximum length between transitions Tmax to improve the bit error rate.

In a data decoding method of the present invention for playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, n-tuples clocks are obtained on n-tupling channel clocks of the playback data, channel bit data having the run length of the same symbol equal to (d'−1) are detected using the n-tupled clocks, and a correction position for detected channel bit data having the run length of the same symbol equal to (d'−1) is designated for correcting the channel bit data so that the run length of the same symbol will be equal to d'. This decreases data decoding error in the vicinity of the minimum length between transitions Tmin to improve the bit error rate.

In the data decoding method of the present invention for playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, where d is a positive integer, n-tupled clocks are obtained on n-tupling channel clocks of the playback data, n being an integer not less than 2, channel bit data having a run length of the same symbol following inverse NRZI modulation equal to (d−1) are detected, using the n-tupled clocks, and a correction position of the channel bit data having the run length of detected "0"s equal to (d−1) for correcting channel bit data having the run length of "0"s equal to (d−1) is designated so that the run length of "0"s will be equal to d. This decreases data decoding error in the vicinity of the minimum length between transitions Tmin to improve the bit error rate.

In the data decoding method of the present invention for playback data from a recording medium having recording codes recorded thereon, the recording codes being NRZI modulated codes having a maximum run length of "0"s between neighboring "1"s in a code string equal to k, the recording codes having a maximum run length of the same symbol following inverse NRZI modulation equal to k'=k+1, where k≧1 and k≧d, n-tupled clocks are obtained on n-tupling channel clocks of the playback data, n being an integer not less than 2, channel bit data having a run length of the same symbol equal to (k'+1) are detected, using the n-tupled clocks, and a correction position of the detected channel bit data having the run length of the same symbol equal to (k'+1) is designated for correcting channel bit data having the run length of the same symbol equal to (k'+1) so that the run length of the same symbol will be equal to k'. This decreases data decoding error in the vicinity of the minimum length between transitions Tmin to improve the bit error rate.

In the data decoding method of the present invention for playback data from a recording medium having recording codes recorded thereon, the recording codes being NRZI modulated codes having a maximum run length of "0"s between neighboring "1"s in a code string equal to k, the recording codes having a maximum run length of the same symbol following inverse NRZI modulation equal to k'=k+1, where k≧1 and k≧d, n-tupled clocks are obtained on n-tupling channel clocks of the playback data, n being an integer not less than 2, channel bit data having a run length of "0"s following inverse NRZI modulation equal to (k+1) are detected, using the n-tupled clocks, and a correction position of the detected channel bit data having the run length of "0"s equal to (k+1) for correcting channel bit data having the run length of "0"s equal to (k+1) is designated so that the run length of "0"s will be equal to k. This decreases data decoding error in the vicinity of the minimum length between transitions Tmin to improve the bit error rate.

The data decoding apparatus of the present invention for playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, includes a clock generator for n-tupling channel clocks of channel clocks, n being an integer not less than 2, a (d'−1) detector for detecting channel bit data having a run length of the same symbol equal to (d'−1), a correction bit position detector for outputting a correction bit position designating signal for designating a correction position for channel bit data having the run length of the same symbol equal to (d'−1) as detected by the (d'−1) detector, and a data correction unit for correcting the channel bit data having the run length of the same symbol equal to (d'−1) as detected by the (d'−1) detector, based on the correction bit position designating signal of the correction bit position detector, so that the run length of the same symbol will be equal to d'. This decreases data decoding error in the vicinity of the minimum length between transitions Tmin to improve the bit error rate.

The data decoding apparatus of the present invention for playback data from a recording medium having recording codes recorded thereon, the recording codes being NRZI modulated codes having a minimum run length of "0"s between neighboring "1"s in a code string equal to d, the recording codes having a minimum run length of the same symbol equal to d'=d+1, d being a positive integer, includes a clock generator for n-tupling channel clocks of channel clocks, n being an integer not less than 2, a (d−1) detector for detecting channel bit data having a run length of the same symbol following inverse NRZI modulation equal to (d−1), a correction bit position detector for outputting a correction bit position designating signal for designating a correction position for channel bit data having the run length of "0"s as detected by the (d−1) detector equal to (d−1) and a data correction unit for correcting the channel bit data having the run length of "0"s as detected by the (d−1) detector equal to (d−1), based on the correction bit position designating signal of the correction bit position detector, so that the run length of '0's will be equal to d. This decreases data decoding error in the vicinity of the minimum length between transitions Tmin to improve the bit error rate.

The data decoding apparatus of the present invention for playback data from a recording medium having recording codes recorded thereon, the recording codes being NRZI modulated codes having a maximum run length of "0"s between neighboring "1"s in a code string equal to k, the recording codes having a maximum run length of the same symbol following inverse NRZI modulation equal to k'=k+1, where k≧1 and k≧d, includes a clock generator for n-tupling channel clocks of channel clocks, n being an integer not less than 2, a (k'+1) detector for detecting channel bit data having a run length of the same symbol equal to (k'+1), a correction bit position detector for outputting a correction bit position designating signal for designating a correction position for channel bit data having the run length of the same symbol as detected by the (k'+1) detector equal to (k'+1) and a data correction unit for correcting the channel bit data having the run length of the same symbol as detected by the (k'+1) detector equal to (k'+1), based on the correction bit position designating signal of the correction bit position detector, so that the run length of the same symbol will be equal to k'. This decreases data decoding error in the vicinity of the minimum length between transitions Tmin to improve the bit error rate.

The data decoding apparatus of the present invention for playback data from a recording medium having recording codes recorded thereon, the recording codes being NRZI modulated codes having a maximum run length of "0"s between neighboring "1"s in a code string equal to k, the recording codes having a maximum run length of the same symbol following inverse NRZI modulation equal to k'=k+1, where k≧1 and k≧d, includes a clock generator for n-tupling channel clocks where n is an integer not less than 2, a (k+1) detector for detecting channel bit data having a run length of "0"s following inverse NRZI modulation equal to (k+1), a correction bit position detector for outputting a correction bit position designating signal for designating a correction position for channel bit data having the run length of "0"s as detected by the (k+1) detector equal to (k+1) and a data correction unit for correcting the channel bit data having the run length of "0"s as detected by the (k+1) detector equal to (k+1), based on the correction bit position designating signal of the correction bit position detector, so that the run length of "0"s will be equal to k. This decreases data decoding error in the vicinity of the minimum length between transitions Tmin to improve the bit error rate.

What is claimed is:

1. A data decoding method for playing back signals from a recording medium having recording codes recorded thereon, said recording codes being NRZI modulated codes having a minimum run length of "0"s between neighboring "1"s in a code string equal to d, said recording codes having a minimum run length of the same symbol equal to d'=d+1, comprising the steps of:

generating n-tuples clocks obtained on n-tupling channel clocks of the playback data;

detecting channel bit data having the run length of the same symbol equal to (d'−1) using said n-tupled clocks; and designating a correction position for detected channel bit data having the run length of the same symbol equal to (d'−1) for correcting the channel bit data so that the run length of the same symbol will be equal to d';

wherein the signal read from the recording medium is decoded at least at a comparison level to output channel bit data; and wherein bit information obtained by bit data of a given channel clock and bit data of the next channel clock and n-tupled clocks sandwiched in-between is split with the comparison level as the boundary into H-level and L-level to give (n+1) items of domain information for designating a correction position of channel bit data having a run length of the same symbol equal to (d'−1).

2. The data decoding method as claimed in claim 1 wherein (n+1) items of the domain information from the bit information obtained by bit data of a given channel clock and next bit data of the next channel clock and n-tupled clocks sandwiched in-between are held on memory for designating a correction position of channel bit data having a run length of the same symbol equal to (d'−1).

3. The data decoding method as claimed in claim 1 wherein (n+1) items of the domain information by the bit information obtained by channel bit data directly previous to a (d'−1) domain and next channel bit data and n-tupled clocks sandwiched in-between are compared to (n+1) items of the domain information by the bit information obtained from channel bit data directly following the (d'−1) domain, previous channel bit data and n-tupled clocks sandwiched in-between to select a correction bit position which is designated.

4. The data decoding method as claimed in claim 1 wherein (n+1) items of the domain information by the bit information obtained by channel bit data directly previous to a (d'−1) domain and next channel bit data and n-tupled clocks sandwiched in-between and (n+1) items of the domain information by the bit information obtained from channel bit data directly following the (d'−1) domain, previous channel bit data and n-tupled clocks sandwiched in-between are split respectively into H-levels and L-levels with a comparison level as a boundary and wherein a correction bit position as selected depending on the magnitude of the H-levels or L-levels is designated.

5. The data decoding method as claimed in claim 1 wherein (n+1) items of the domain information by the bit information obtained by channel bit data directly previous to a (d'−1) domain and next channel bit data and n-tupled clocks sandwiched in-between and (n+1) items of the domain information by the bit information obtained from channel bit data directly following the (d'−1) domain, previous channel bit data and n-tupled clocks sandwiched in-between are split respectively into H-levels and L-levels with a comparison level as a boundary and wherein a side with a larger number of the H-levels is designated as a correction bit position if the (d'−1) domain is of the H-level and a side with a larger number of the H-levels is designated as a correction bit position if the (d'−1) domain is of the H-level.

6. The data decoding method as claimed in claim 1 wherein (n+1) items of the domain information by the bit information obtained by channel bit data directly previous to a (d'−1) domain and next channel bit data and n-tupled clocks sandwiched in-between and (n+1) items of the domain information by the bit information obtained from channel bit data directly following the (d'−1) domain, previous channel bit data and n-tupled clocks sandwiched in-between are split respectively into H-levels and L-levels with a comparison level as a boundary and wherein the number of the L-levels or that of the H-levels is used for designation as a correction bit position.

7. The data decoding method as claimed in claim 1 wherein (n+1) items of the domain information by the bit information obtained by channel bit data directly previous to a (d'−1) domain and next channel bit data and n-tupled clocks sandwiched in-between and (n+1) items of the domain information by the bit information obtained from channel bit data directly following the (d'−1) domain, previous channel bit data and n-tupled clocks sandwiched in-between are split respectively into H-levels and L-levels with a comparison level as a boundary and wherein, if the number of "0"s on transition from the L level to the H level is larger than the number of "0"s on transition from the H level to the L level, the backward side of the (d'−1) domain is designated as the correction bit position, whereas, if the number of "0"s on transition from the H level to the L level is larger than the number of "0"s on transition from the L level to the H level, the forward side of the (d'−1) domain is designated as the correction bit position.

8. The data decoding method as claimed in claim 1 wherein (n+1) items of the domain information by the bit information obtained by channel bit data directly previous to a (d'−1) domain and next channel bit data and n-tupled clocks sandwiched in-between and (n+1) items of the domain information by the bit information obtained from channel bit data directly following the (d'−1) domain, previous channel bit data and n-tupled clocks sandwiched in-between are split respectively into H-levels and L-levels with a comparison level as a boundary and wherein, if the number of "1"s on transition from the H level to the L level is larger than the number of "1"s on transition from the L level to the H level, the backward side of the (d'−1) domain is designated as the correction bit position, whereas, if the number of "1"s on transition from the L level to the H level is larger than the number of "1"s on transition from the H level to the L level, the forward side of the (d'−1) domain is designated as the correction bit position.

9. The data decoding method as claimed in claim 1 wherein (n+1) items of the domain information by the bit information obtained by channel bit data directly previous to a (d'−1) domain and next channel bit data and n-tupled clocks sandwiched in-between and (n+1) items of the domain information by the bit information obtained from channel bit data directly following the (d'−1) domain, previous channel bit data and n-tupled clocks sandwiched in-between are split respectively into H-levels and L-levels with a comparison level as a boundary and wherein, if the domain information for the H levels and that for the L-levels is the same, the correction bit position is designated based on the previous correction bit position held on memory.

10. The data decoding method as claimed in claim 1 wherein the bit information obtained from n-tupled clocks sandwiched between bit data of a given channel clock and bit data of the next channel clock is split with a comparison level as the boundary into the H-level and the L-level to give (n−1) items of the domain information for designating a correction position of channel bit data having a run length of the same symbol equal to (d'−1).

11. The data decoding method as claimed in claim 10 wherein (n−1) items of the domain information by the bit information obtained from n-tupled clocks sandwiched between channel bit data directly previous to the (d'−1) domain and next channel bit data are compared to (n−1) items of the domain information by the bit information obtained from n-tupled clocks sandwiched between channel bit data directly following the (d'−1) domain and previous channel bit data to select a correction bit position which is designated.

12. The data decoding method as claimed in claim 10 wherein (n−1) items of the domain information by the bit information obtained from n-tupled clocks sandwiched between channel bit data directly previous to the (d'−1) domain and the next channel bit data and (n−1) items of the domain information by the bit information obtained from n-tupled clocks sandwiched between channel bit data directly following the (d'−1) domain and previous channel bit data are split respectively into H-levels and L-levels with a comparison level as a boundary and wherein a correction bit position as selected depending on the relative magnitude of the H-levels or L-levels is designated.

13. The data decoding method as claimed in claim 10 wherein (n−1) items of the domain information by the bit information obtained from n-tupled clocks sandwiched between channel bit data directly previous to the (d'−1) domain and the next channel bit data and (n−1) items of the domain information by the bit information obtained from n-tupled clocks sandwiched between channel bit data directly following the (d'−1) domain and previous channel bit data are split respectively into H-levels and L-levels with a comparison level as a boundary and wherein the number of the L-levels or that of the H-levels is used for designation as a correction bit position.

14. The data decoding method as claimed in claim 10 wherein (n−1) items of the domain information by the bit information obtained from n-tupled clocks sandwiched between channel bit data directly previous to the (d'−1) domain and the next channel bit data and (n−1) items of the domain information by the bit information obtained from n-tupled clocks sandwiched between channel bit data directly following the (d'−1) domain and previous channel bit data are split respectively into H-levels and L-levels with a comparison level as a boundary and wherein, if the number of "0"s on transition from the L level to the H level is larger than the number of "0"s on transition from the H level to the L level, the backward side of the (d'−1) domain is designated as the correction bit position, whereas, if the number of "0"s on transition from the H level to the L level is larger than the number of "0"s on transition from the L level to the H level, the forward side of the (d'−1) domain is designated as the correction bit position.

15. The data decoding method as claimed in claim 10 wherein (n−1) items of the domain information from the bit information obtained from n-tupled clocks sandwiched between channel bit data directly previous to the (d'−1) domain and the next channel bit data and (n−1) items of the domain information by the bit information obtained from n-tupled clocks sandwiched between channel bit data directly following the (d'−1) domain and previous channel bit data are split respectively into H-levels and L-levels with a comparison level as a boundary and wherein, if the number of "1"s on transition from the H level to the L level is larger than the number of "1"s on transition from the L level to the H level, the backward side of the (d'−1) domain is designated as the correction bit position, whereas, if the number of "1"s on transition from the L level to the H level is larger than the number of "1"s on transition from the H level to the L level, the forward side of the (d'−1) domain is designated as the correction bit position.

16. The data decoding method as claimed in claim 10 wherein (n−1) items of the domain information from the bit information obtained from n-tupled clocks sandwiched between channel bit data directly previous to the (d'−1) domain and the next channel bit data and (n−1) items of the domain information by the bit information obtained from n-tupled clocks sandwiched between channel bit data directly following the (d'−1) domain and previous channel bit data are split respectively into H-levels and L-levels with a comparison level as a boundary and wherein, if the domain information for the H levels is the same as that for the L-levels, the correction bit position is designated based on the previous correction bit position held on memory.

17. The data decoding method as claimed in claim 10 wherein (n−1) items of the domain information by the bit information obtained from n-tupled clocks sandwiched between channel bit data directly previous to the (d'−1) domain and the next channel bit data and (n−1) items of the domain information by the bit information obtained from n-tupled clocks sandwiched between channel bit data directly following the (d'−1) domain and previous channel bit data are split respectively into H-levels and L-levels with a comparison level as a boundary and wherein a side with a larger number of the H-levels is designated as a correction bit position if the (d'−1) domain is of the H-level and a side with a larger number of the H-levels is designated as a correction bit position if the (d'−1) domain is of the L-level.

18. The data decoding method as claimed in claim 1 wherein (n−1) items of the domain information from the bit information obtained by n-tupled clocks sandwiched between bit data of a given channel clock and bit data of the next channel clock are held on memory for designating a correction position of channel bit data having a run length of the same symbol equal to (d'−1).

19. The data decoding method as claimed in claim 1 wherein n-items of the bit information including bit data of a given channel clock in the bit information obtained from n-tupled clocks are split into H-levels and L-levels with a comparison level as a boundary to give respective n-items of the domain information for designating a correction position of channel bit data having a run length of the same symbol equal to (d'−1).

20. The data decoding method as claimed in claim 19 wherein n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between are compared to each other to select a correction bit position which is designated.

21. The data decoding method as claimed in claim 19 wherein n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between are split respectively into H-levels and L-levels with a comparison level as a boundary and wherein a correction bit position as selected depending on the relative magnitude of the H-levels or L-levels is designated.

22. The data decoding method as claimed in claim 19 wherein n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between are split respectively into H-levels and L-levels with a comparison level as a boundary and wherein the number of the L-levels or that of the H-levels is used for designation as a correction bit position.

23. The data decoding method as claimed in claim 19 wherein n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between are split respectively into H-levels and L-levels with a comparison level as a boundary and wherein, if the n-items of the domain information include backward side channel bit data, the backward side of the (d'−1) domain is designated as the correction bit position in case the number of "0"s on transition from the L-level to the H-level plus 1 is larger than the number of "0"s on transition from the H-level to the L-level, while the forward side of the (d'−1) domain is designated as the correction bit position in case the number of "0"s on transition from the H-level to the L-level is larger than the number of "0"s on transition from the L-level to the H-level plus 1.

24. The data decoding method as claimed in claim 19 wherein n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between are split respectively into H-levels and L-levels with a comparison level as a boundary and wherein, if the n-items of the domain information include forward side channel bit data, the backward side of the (d'−1) domain is designated as the correction bit position in case the number of "0"s on transition from the L-level to the H-level is larger than the number of "0"s on transition from the H-level to the L-level plus 1, while the forward side of the (d'−1) domain is designated as the correction bit position in case the number of "0"s on transition from the H-level to the L-level plus 1 is larger than the number of "0"s on transition from the L-level to the H-level.

25. The data decoding method as claimed in claim 19 wherein n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between are split respectively into H-levels and L-levels with a comparison level as a boundary and wherein, if n-items of the domain information include backward side channel bit data, the backward side of the (d'−1) domain is designated as the correction bit position in case the number of "1"s on transition from the H-level to the L-level plus 1 is larger than the number of "1"s on transition from the L-level to the H-level, while the forward side of the (d'−1) domain is designated as the correction bit position in case the number of "1"s on transition from the L-level to the H-level is larger than the number of "1"s on transition from the H-level to the L-level plus 1.

26. The data decoding method as claimed in claim 19 wherein n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between are split respectively into H-levels and L-levels with a comparison level as a boundary and wherein, if n-items of the domain information include forward side channel bit data, the backward side of the (d'−1) domain is designated as the correction bit position in case the number of "1"s on transition from the H-level to the L-level is larger than the number of "1"s on transition from the L-level to the H-level plus 1, while the forward side of the (d'−1) domain is designated as the correction bit position in case the number of "1"s on transition from the L-level to the H-level plus 1 is larger than the number of "1"s on transition from the H-level to the L-level.

27. The data decoding method as claimed in claim 19 wherein n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between are split respectively into H-levels and L-levels with a comparison level as a boundary and wherein, if the domain information for the H levels is the same as that for the L-levels, the correction bit position is designated based on the previous correction bit position held on memory.

28. The data decoding method as claimed in claim 1 wherein, from n-items of the bit information including bit data of a given channel clock in the bit information obtained from n-tupled clocks, plural domain information items each consisting of n bits are held on memory for designating a correction position of channel bit data having a run length of the same symbol equal to (d'−1).

29. A data decoding method for playing back signals from a recording medium having recording codes recorded thereon, said recording codes being NRZI modulated codes having a minimum run length of "0"s between neighboring "1"s in a code string equal to d, said recording codes having a minimum run length of the same symbol equal to d'=d+1 where d is a positive integer, comprising the steps of:

generating n-tupled clocks obtained on n-tupling channel clocks of the playback data, n being an integer not less than 2;

detecting channel bit data having a run length of the same symbol following inverse NRZI modulation equal to (d−1), using said n-tupled clocks; and designating a correction position of the channel bit data having the run length of the detected "0"s equal to (d−1) for correcting channel bit data having the run length of "0"s equal to (d−1) so that the run length of "0"s will be equal to d;

wherein the signal read from the recording medium is decoded at least at a comparison level to output channel bit data in which the minimum run length of "0"s sandwiched between neighboring "1"s in a code string is equal to d; and wherein bit information obtained by bit data of a given channel clock and bit data of the next channel clock and n-tupled clocks sandwiched in-between is split with the comparison level as the boundary into H-level and L-level to give (n+1) items of the domain information for designating a correction position of channel bit data having a run length of "0"s equal to (d−1).

30. The data decoding method as claimed in claim 29 wherein (n+1) items of the domain information from the bit information obtained by channel bit data directly previous to the (d−1) domain and next channel bit data and n-tupled clocks sandwiched in-between are compared to (n+1) items of the domain information by the bit information obtained from channel bit data directly following the (d−1) domain, previous channel bit data and n-tupled clocks sandwiched in-between to select a correction bit position which is designated.

31. The data decoding method as claimed in claim 29 wherein (n+1) items of the domain information from the bit information obtained by channel bit data directly previous to the (d−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between are split respectively into H-levels and L-levels with a comparison level as a boundary and wherein a correction bit position as selected depending on the magnitude of the H-levels or L-levels is designated.

32. The data decoding method as claimed in claim 29 wherein (n+1) items of the domain information from the bit information obtained by channel bit data directly previous to the (d−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between are split respectively into H-levels and L-levels with a comparison level as a boundary and wherein a side with a larger number of the H-levels is designated as a correction bit position if the (d−1) domain is of the H-level and a side with a larger number of the H-levels is designated as a correction bit position if the (d−1) domain is of the L-level.

33. The data decoding method as claimed in claim 29 wherein (n+1) items of the domain information from the bit information obtained from channel bit data directly previous to the (d−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between are split respectively into H-levels and L-levels with a comparison level as a boundary and wherein the number of the L-levels or that of the H-levels is used for designation as a correction bit position.

34. The data decoding method as claimed in claim 29 wherein (n+1) items of the domain information from the bit information obtained by channel bit data directly previous to the (d−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between are split respectively into H-levels and L-levels with a comparison level as a boundary and wherein, if the number of "0"s on transition from the L level to the H level is larger than the number of "0"s on transition from the H level to the L level, the backward side of the (d−1) domain is designated as the correction bit position, whereas, if the number of "0"s on transition from the H level to the L level is larger than the number of "0"s on transition from the L level to the H level, the forward side of the (d−1) domain is designated as the correction bit position.

35. The data decoding method as claimed in claim 29 wherein (n+1) items of the domain information from the bit information obtained by channel bit data directly previous to the (d−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between are split respectively into H-levels and L-levels with a comparison level as a boundary and wherein, if the number of "1"s on transition from the H level to the L level is larger than the number of "1"s on transition from the L level to the H level, the backward side of the (d−1) domain is designated as the correction bit position, whereas, if the number of "1"s on transition from the L level to the H level is larger than the number of "1"s on transition from the H level to the L level, the forward side of the (d−1) domain is designated as the correction bit position.

36. The data decoding method as claimed in claim 29 wherein (n+1) items of the domain information from the bit information by channel bit data directly previous to the (d−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between are split respectively into H-levels and L-levels with a comparison level as a boundary and wherein, if the domain information for the H levels is the same as that for the L-levels, the correction bit position is designated based on the previous correction bit position held on memory.

37. The data decoding method as claimed in claim 29 wherein (n+1) items of the domain information from the bit information obtained by bit data of a given channel clock and next bit data of the next channel clock and n-tupled clocks sandwiched in-between are held on memory for designating a correction position of channel bit data having a run length of "0"s equal to (d−1).

38. The data decoding method as claimed in claim 29 wherein the bit information obtained from n-tupled clocks sandwiched between bit data of a given channel clock and bit data of the next channel clock is split with a comparison level as the boundary into the H-level and the L-level to give (n−1) items of the domain information for designating a correction position of channel bit data having a run length of "0"s equal to (d−1).

39. The data decoding method as claimed in claim 38 wherein (n−1) items of the domain information by the bit information obtained from n-tupled clocks sandwiched between channel bit data directly previous to the (d−1) domain and next channel bit data are compared to (n−1) items of the domain information by the bit information obtained from n-tupled clocks sandwiched between channel bit data directly following the (d−1) domain and previous channel bit data to select a correction bit position which is designated.

40. The data decoding method as claimed in claim 38 wherein (n−1) items of the domain information by the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data are split respectively into H-levels and L-levels with a comparison level as a boundary and wherein a correction bit position as selected depending on the relative magnitude of the H-levels or L-levels is designated.

41. The data decoding method as claimed in claim 38 wherein (n−1) items of the domain information by the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data are split respectively into H-levels and L-levels with a comparison level as a boundary and wherein a side with a larger number of the H-levels is designated as a correction bit position if the (d−1) domain is of the H-level and a side with a larger number of the L-levels is designated as a correction bit position if the (d−1) domain is of the L-level.

42. The data decoding method as claimed in claim 38 wherein (n−1) items of the domain information by the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data are split respectively into H-levels and L-levels with a comparison level as a boundary and wherein the number of the L-levels or that of the H-levels is used for designation as a correction bit position.

43. The data decoding method as claimed in claim 38 wherein (n−1) items of the domain information by the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data are split respectively into H-levels and L-levels with a comparison level as a boundary and wherein, if the number of "0"s on transition from the L level to the H level is larger than the number of "0"s on transition from the H level to the L level, the backward side of the (d−1) domain is designated as the correction bit position, whereas, if the number of "0"s on transition from the H level to the L level is larger than the number of "0"s on transition from the L level to the H level, the forward side of the (d−1) domain is designated as the correction bit position.

44. The data decoding method as claimed in claim 38 wherein (n−1) items of the domain information from the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data are split respectively into H-levels and L-levels with a comparison level as a boundary and wherein, if the number of "1"s on transition from the H level to the L level is larger than the number of "1"s on transition from the L level to the H level, the backward side of the (d−1) domain is designated as the correction bit position, whereas, if the number of "1"s on transition from the L level to the H level is larger than the number of "1"s on transition from the H level to the L level, the forward side of the (d−1) domain is designated as the correction bit position.

45. The data decoding method as claimed in claim 38 wherein (n−1) items of the domain information from the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data are split respectively into H-levels and L-levels with a comparison level as a boundary and wherein, if the information for the H levels is the same as that for the L-levels, the correction bit position is designated based on the previous correction bit position held on memory.

46. The data decoding method as claimed in claim 29 wherein (n−1) items of the domain information from the bit information obtained by n-tupled clocks sandwiched between bit data of a given channel clock and bit data of the next channel clock are held on memory for designating a correction position of channel bit data having a run length of "0"s equal to (d−1).

47. The data decoding method as claimed in claim 29 wherein n-items of the bit information including bit data of a given channel clock in the bit information obtained from n-tupled clocks are split into H-levels and L-levels with a comparison level as a boundary to give respective n-items of the domain information for designating a correction position of channel bit data having a run length of "0"s equal to (d−1).

48. The data decoding method as claimed in claim 47 wherein n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between are compared to each other to select a correction bit position which is designated.

49. The data decoding method as claimed in claim 47 wherein n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between are split respectively into H-levels and L-levels with a comparison level as a boundary and wherein a correction bit position as selected depending on the relative magnitude of the H-levels or L-levels is designated.

50. The data decoding method as claimed in claim 47 wherein n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between are split respectively into H-levels and L-levels with a comparison level as a boundary and wherein the number of the L-levels or that of the H-levels is used for designation as a correction bit position.

51. The data decoding method as claimed in claim 47 wherein n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between are split respectively into H-levels and L-levels with a comparison level as a boundary and wherein, if n-items of the domain information include backward side channel bit data, the backward side of the (d−1) domain is designated as the correction bit position in case the number of "0"s on transition from the L-level to the H-level plus 1 is larger than the number of "0"s on transition from the H-level to the L-level, while the forward side of the (d−1) domain is designated as the correction bit position in case the number of "0"s on transition from the H-level to the L-level is larger than the number of "0"s on transition from the L-level to the H-level plus 1.

52. The data decoding method as claimed in claim 47 wherein n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between are split respectively into H-levels and L-levels with a comparison level as a boundary and wherein, if n-items of the domain information include forward side channel bit data, the backward side of the (d−1) domain is designated as the correction bit position in case the number of "0"s on transition from the L-level to the H-level is larger than the number of "0"s on transition from the H-level to the L-level plus 1, while the forward side of the (d−1) domain is designated as the correction bit position in case the number of "0"s on transition from the H-level to the L-level plus 1 is larger than the number of "0"s on transition from the L-level to the H-level.

53. The data decoding method as claimed in claim 47 wherein n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between are split respectively into H-levels and L-levels with a comparison level as a boundary and wherein, if n-items of the domain information include backward side channel bit data, the backward side of the (d−1) domain is designated as the correction bit position in case the number of "1"s on transition from the H-level to the L-level plus 1 is larger than the number of "1"s on transition from the L-level to the H-level, while the forward side of the (d−1) domain is designated as the correction bit position in case the number of "1"s on transition from the L-level to the H-level is larger than the number of "1"s on transition from the H-level to the L-level plus 1.

54. The data decoding method as claimed in claim 47 wherein n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between are split respectively into H-levels and L-levels with a comparison level as a boundary and wherein, if n-items of the domain information include forward side channel bit data, the backward side of the (d−1) domain is designated as the correction bit position in case the number of "1"s on transition from the H-level to the L-level is larger than the number of "1"s on transition from the L-level to the H-level plus 1, while the forward side of the (d−1) domain is designated as the correction bit position in case the number of "1"s on transition from the L-level to the H-level plus 1 is larger than the number of "1"s on transition from the H-level to the L-level.

55. The data decoding method as claimed in claim 47 wherein n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between are split respectively into H-levels and L-levels with a comparison level as a boundary and wherein, if the domain information for the H levels is the same as that for the L-levels, the correction bit position is designated based on the previous correction bit position held on memory.

56. The data decoding method as claimed in claim 29 wherein, from n-items of the bit information including bit data of a given channel clock in the bit information obtained from n-tupled clocks, plural domain information items consisting of n bits are held on memory for designating a correction position of channel bit data having a run length of "0"s equal to (d−1).

57. A data decoding method for playing back signals from a recording medium having recording codes recorded thereon, said recording codes being NRZI modulated codes having a maximum run length of "0"s between neighboring codes having a maximum run length of the same symbol following inverse NRZI modulation equal to k'=k+1 and k>d, comprising the steps of:

generating n-tupled clocks obtained on n-tupling channel clocks of the playback data, n being an integer not less than 2;

detecting channel bit data having a run length of the same symbol equal to (k'+1), using said n-tupled clocks; and designating a correction position of the detected channel bit data having the run length of the same symbol equal to (k'+1) for correcting channel bit data having the run length of the same symbol will be equal to k';

wherein the signal read from the recording medium is decoded at least at a comparison level to output channel bit data; and wherein bit information obtained by bit data of a given channel clock and bit data of the next channel clock and n-tupled clocks sandwiched in-between is split with the comparison level as the boundary into H-level and L-level to give (n+1) items of the domain information for designating a correction position of channel bit data having a run length of the same symbol equal to (k'+1).

58. The data decoding method as claimed in claim 57 wherein (n+1) items of the domain information from the bit information obtained by channel bit data directly previous to the (k'+1) domain and next channel bit data and n-tupled clocks sandwiched in-between are compared to (n+1) items of the domain information by the bit information obtained from channel bit data directly following the (k'+1) domain, previous channel bit data and n-tupled clocks sandwiched in-between to select a correction bit position which is designated.

59. The data decoding method as claimed in claim 57 wherein (n+1) items of the domain information from the bit information obtained by channel bit data directly previous to the (k'+1) domain and next channel bit data and n-tupled clocks sandwiched in-between and (n+1) items of the domain information by the bit information obtained from channel bit data directly following the (k'+1) domain, previous channel bit data and n-tupled clocks sandwiched in-between are split respectively into H-levels and L-levels with a comparison level as a boundary and wherein a correction bit position as selected depending on the relative magnitude of the H-levels or L-levels is designated.

60. The data decoding method as claimed in claim 57 wherein (n+1) items of the domain information from the bit information obtained by channel bit data directly previous to the (k'+1) domain and next channel bit data and n-tupled clocks sandwiched in-between and (n+1) items of the domain information by the bit information obtained from channel bit data directly following the (k'+1) domain, previous channel bit data and n-tupled clocks sandwiched in-between are split respectively into H-levels and L-levels with a comparison level as a boundary and wherein a side with a larger number of the H-levels is designated as a correction bit position if the (k'+1) domain is of the H-level and a side with a larger number of the H-levels is designated as a correction bit position if the (k'+1) domain is of the L-level.

61. The data decoding method as claimed in claim 57 wherein (n+1) items of the domain information from the bit information obtained from channel bit data directly previous to the (k'+1) domain and next channel bit data and n-tupled clocks sandwiched in-between and (n+1) items of the domain information by the bit information obtained from channel bit data directly following the (k'+1) domain, previous channel bit data and n-tupled clocks sandwiched in-between are split respectively into H-levels and L-levels with a comparison level as a boundary and wherein the number of the L-levels or that of the H-levels is used for designation as a correction bit position.

62. The data decoding method as claimed in claim 57 wherein (n+1) items of the domain information from the bit information obtained by channel bit data directly previous to the (k'+1) domain and next channel bit data and n-tupled clocks sandwiched in-between and (n+1) items of the domain information by the bit information obtained from channel bit data directly following the (k'+1) domain, previous channel bit data and n-tupled clocks sandwiched in-between are split respectively into H-levels and L-levels with a comparison level as a boundary and wherein, if the number of "0"s on transition from the L level to the H level is larger than the number of "0"s on transition from the H level to the L level, the backward side of the (k'+1) domain is designated as the correction bit position, whereas, if the number of "0"s on transition from the H level to the L level is larger than the number of "0"s on transition from the L level to the H level, the forward side of the (k'+1) domain is designated as the correction bit position.

63. The data decoding method as claimed in claim 57 wherein (n+1) items of the domain information from the bit information obtained by channel bit data directly previous to the (k'+1) domain and next channel bit data and n-tupled clocks sandwiched in-between and (n+1) items of the domain information by the bit information obtained from channel bit data directly following the (k'+1) domain, previous channel bit data and n-tupled clocks sandwiched in-between are split respectively into H-levels and L-levels with a comparison level as a boundary and wherein, if the number of "1"s on transition from the H level to the L level is larger than the number of "1"s on transition from the L level to the H level, the forward side of the (k'+1) domain is designated as the correction bit position, whereas, if the number of "1"s on transition from the L level to the H level is larger than the number of "1"s on transition from the H level to the L level, the backward side of the (k'+1) domain is designated as the correction bit position.

64. The data decoding method as claimed in claim 57 wherein (n+1) items of the domain information from the bit information by channel bit data directly previous to the (k'+1) domain and next channel bit data and n-tupled clocks sandwiched in-between and (n+1) items of the domain information by the bit information obtained from channel bit data directly following the (k'+1) domain, previous channel bit data and n-tupled clocks sandwiched in-between are split respectively into H-levels and L-levels with a comparison level as a boundary and wherein, if the domain information for the H levels is the same as that for the L-levels, the correction bit position is designated based on the previous correction bit position held on memory.

65. The data decoding method as claimed in claim 57 wherein (n−1) items of the domain information by the bit information obtained from n-tupled clocks sandwiched between channel bit data directly previous to the (k'+1) domain and the next channel bit data and (n−1) items of the domain information by the bit information obtained from n-tupled clocks sandwiched between channel bit data directly following the (k'+1) domain and previous channel bit data are split respectively into H-levels and L-levels with a comparison level as a boundary and wherein the number of the L-levels or that of the H-levels is used for designation as a correction bit position.

66. The data decoding method as claimed in claim 57 wherein (n−1) items of the domain information by the bit information obtained from n-tupled clocks sandwiched between channel bit data directly previous to the (k'+1) domain and the next channel bit data and (n−1) items of the domain information by the bit information obtained from n-tupled clocks sandwiched between channel bit data directly following the (k'+1) domain and previous channel bit data are split respectively into H-levels and L-levels with a comparison level as a boundary and wherein, if the number of "0"s on transition from the L level to the H level is larger than the number of "0"s on transition from the H level to the L level, the forward side of the (k'+1) domain is designated as the correction bit position, whereas, if the number of "0"s on transition from the H level to the L level is larger than the number of "0"s on transition from the L level to the H level, the backward side of the (k'+1) domain is designated as the correction bit position.

67. The data decoding method as claimed in claim 57 wherein (n−1) items of the domain information from the bit information obtained from n-tupled clocks sandwiched between channel bit data directly previous to the (k'+1) domain and the next channel bit data and (n−1) items of the domain information by the bit information obtained from n-tupled clocks sandwiched between channel bit data directly following the (k'+1) domain and previous channel bit data are split respectively into H-levels and L-levels with a comparison level as a boundary and wherein, if the number of "1"s on transition from the H level to the L level is larger than the number of "1"s on transition from the L level to the H level, the forward side of the (k'+1) domain is designated as the correction bit position, whereas, if the number of "1"s on transition from the L level to the H level is larger than the number of "1"s on transition from the H level to the L level, the backward side of the (k'+1) domain is designated as the correction bit position.

68. The data decoding method as claimed in claim 57 wherein (n+1) items of the domain information from the bit information obtained by bit data of a given channel clock and bit data of the next channel clock and n-tupled clocks sandwiched in-between are held on memory for designating a correction position of channel bit data having a run length of the same symbol equal to (k'+1).

69. The data decoding method as claimed in claim 57 wherein the bit information obtained from n-tupled clocks sandwiched between bit data of a given channel clock and bit data of the next channel clock is split with a comparison level as the boundary into the H-level and the L-level to give (n−1) items of the domain information for designating a correction position of channel bit data having a run length of the same symbol equal to (k'+1).

70. The data decoding method as claimed in claim 69 wherein (n−1) items of the domain information by the bit information obtained from n-tupled clocks sandwiched between channel bit data directly previous to the (k'+1) domain and next channel bit data are compared to (n−1) items of the domain information by the bit information obtained from n-tupled clocks sandwiched between channel bit data directly following the (k'+1) domain and previous channel bit data to select a correction bit position which is designated.

71. The data decoding method as claimed in claim 69 wherein (n−1) items of the domain information by the bit information obtained from n-tupled clocks sandwiched between channel bit data directly previous to the (k'+1) domain and the next channel bit data and (n−1) items of the domain information by the bit information obtained from n-tupled clocks sandwiched between channel bit data directly following the (k'+1) domain and previous channel bit data are split respectively into H-levels and L-levels with a comparison level as a boundary and wherein a correction bit position as selected depending on the magnitude of the H-levels or L-levels is designated.

72. The data decoding method as claimed in claim 69 wherein (n−1) items of the domain information by the bit information obtained from n-tupled clocks sandwiched between channel bit data directly previous to the (k'+1) domain and the next channel bit data and (n−1) items of the domain information by the bit information obtained from n-tupled clocks sandwiched between channel bit data directly following the (k'+1) domain and previous channel bit data are split respectively into H-levels and L-levels with a comparison level as a boundary and wherein a side with a smaller number of the H-levels is designated as a correction bit position if the (k'+1) domain is of the H-level and a side with a smaller number of the L-levels is designated as a correction bit position if the (k'+1) domain is of the L-level.

73. The data decoding method as claimed in claim 69 wherein (n−1) items of the domain information from the bit information obtained from n-tupled clocks sandwiched between channel bit data directly previous to the (k'+1) domain and the next channel bit data and (n−1) items of the domain information by the bit information obtained from n-tupled clocks sandwiched between channel bit data directly following the (k'+1) domain and previous channel bit data are split respectively into H-levels and L-levels with a comparison level as a boundary and wherein, if the domain information for the H levels is the same as that for the L-levels, the correction bit position is designated based on the previous correction bit position held on memory.

74. The data decoding method as claimed in claim 57 wherein (n−1) items of the domain information from the bit information obtained by n-tupled clocks sandwiched between bit data of a given channel clock and bit data of the next channel clock are held on memory for designating a correction position of channel bit data having a run length of the same symbol equal to (k'+1).

75. The data decoding method as claimed in claim 57 wherein n-items of the bit information including bit data of a given channel clock in the bit information obtained from n-tupled clocks are split into H-levels and L-levels with a comparison level as a boundary to give respective n-items of the domain information for designating a correction position of channel bit data having a run length of the same symbol equal to (k'+1).

76. The data decoding method as claimed in claim 75 wherein n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between are compared to each other to select a correction bit position which is designated.

77. The data decoding method as claimed in claim 75 wherein n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between are split respectively into H-levels and L-levels with a comparison level as a boundary and wherein a correction bit position as selected depending on the relative magnitude of the H-levels or L-levels is designated.

78. The data decoding method as claimed in claim 75 wherein n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between are split respectively into H-levels and L-levels with a comparison level as a boundary and wherein the number of the L-levels or that of the H-levels is used for designation as a correction bit position.

79. The data decoding method as claimed in claim 75 wherein n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between are split respectively into H-levels and L-levels with a comparison level as a boundary and wherein, if n-items of the domain information include backward side channel bit data, the forward side of the (k'+1) domain is designated as the correction bit position in case the number of "0"s on transition from the L-level to the H-level plus 1 is larger than the number of "0"s on transition from the H-level to the L-level, while the backward side of the (k'+1) domain is designated as the correction bit position in case the number of "0"s on transition from the H-level to the L-level is larger than the number of "0"s on transition from the L-level to the H-level plus 1.

80. The data decoding method as claimed in claim 75 wherein n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between are split respectively into H-levels and L-levels with a comparison level as a boundary and wherein, if n-items of the domain information include forward side channel bit data, the forward side of the (k'+1) domain is designated as the correction bit position in case the number of "0"s on transition from the L-level to the H-level is larger than the number of "0"s on transition from the H-level to the L-level plus 1, while the backward side of the (k'+1) domain is designated as the correction bit position in case the number of "0"s on transition from the H-level to the L-level plus 1 is larger than the number of "0"s on transition from the L-level to the H-level.

81. The data decoding method as claimed in claim 75 wherein n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between are split respectively into H-levels and L-levels with a comparison level as a boundary and wherein, if n-items of the domain information include backward side channel bit data, the forward side of the (k'+1) domain is designated as the correction bit position in case the number of "1"s on transition from the H-level to the L-level plus 1 is larger than the number of "1"s on transition from the L-level to the H-level, while the backward side of the (k'+1) domain is designated as the correction bit position in case the number of "1"s on transition from the L-level to the H-level is larger than the number of "1"s on transition from the H-level to the L-level plus 1.

82. The data decoding method as claimed in claim 75 wherein n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between are split respectively into H-levels and L-levels with a comparison level as a boundary and wherein, if n-items of the domain information include forward side channel bit data, the forward side of the (k'+1) domain is designated as the correction bit position in case the number of "1"s on transition from the H-level to the L-level is larger than the number of "1"s on transition from the L-level to the H-level plus 1, while the backward side of the (k'+1) domain is designated as the correction bit position in case the number of "1"s on transition from the L-level to the H-level plus 1 is larger than the number of "1"s on transition from the H-level to the L-level.

83. The data decoding method as claimed in claim 75 wherein n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between are split respectively into H-levels and L-levels with a comparison level as a boundary and wherein, if the domain information for the H levels is the same as that for the L-levels, the correction bit position is designated based on the previous correction bit position held on memory.

84. The data decoding method as claimed in claim 57 wherein, from n-items of the bit information including bit data of a given channel clock in the bit information obtained from n-tupled clocks, plural domain information items consisting of n bits are held on memory for designating a correction position of channel bit data having a run length of the same symbol equal to (k'+1).

85. A data decoding method for playing back signals from a recording medium having recording codes recorded thereon, said recording codes being NRZI modulated codes having a maximum run length of "0"s between neighboring "1"s in a code string equal to k, said recording codes having a maximum length of the same symbol following inverse NRZI modulation equal to k'=k+1 where k>1 and k>d, comprising the steps of:

generating n-tupled clocks obtained on n-tupling channel clocks of the playback data, n being an integer not less than 2;

detecting channel bit data having a run length of "0"s following inverse NRZI modulation equal to (k+1), using said n-tupled clocks; and designating a correction position of the detected channel bit data having the run length of "0"s equal to (k+1) for correcting channel bit data having the run length of "0"s equal to (k+1) by so that the run length of "0"s will be equal to k;

wherein the signal read from the recording medium is decoded at least at a comparison level to output channel bit data n which the maximum run length of "0"s between neighboring "1"s in a code string is k; and wherein bit information obtained by bit data of a given channel clock and bit data of the next channel clock and n-tupled clocks sandwiched in-between is split with the comparison level as the boundary into H-level and L-level to give (n+1) items of the domain information for designating a correction position of channel bit data having a run length of "0"s equal to (k+1).

86. The data decoding method as claimed in claim 85 wherein (n+1) items of the domain information from the bit information obtained by channel bit data directly previous to the (k+1) domain and next channel bit data and n-tupled clocks sandwiched in-between are compared to (n+1) items of the domain information by the bit information obtained from channel bit data directly following the (k+1) domain, previous channel bit data and n-tupled clocks sandwiched in-between to select a correction bit position which is designated.

87. The data decoding method as claimed in claim 85 wherein (n+1) items of the domain information from the bit information obtained by channel bit data directly previous to the (k+1) domain and next channel bit data and n-tupled clocks sandwiched in-between and (n+1) items of the domain information by the bit information obtained from channel bit data directly following the (k+1) domain, previous channel bit data and n-tupled clocks sandwiched in-between are split respectively into H-levels and L-levels with a comparison level as a boundary and wherein a correction bit position as selected depending on the relative magnitude of the H-levels or L-levels is designated.

88. The data decoding method as claimed in claim 85 wherein (n+1) items of the domain information from the bit information obtained by channel bit data directly previous to the (k+1) domain and next channel bit data and n-tupled clocks sandwiched in-between and (n+1) items of the domain information by the bit information obtained from channel bit data directly following the (k+1) domain, previous channel bit data and n-tupled clocks sandwiched in-between are split respectively into H-levels and L-levels with a comparison level as a boundary and wherein a side with a larger number of the H-levels is designated as a correction bit position if the (k+1) domain is of the H-level and a side with a larger number of the H-levels is designated as a correction bit position if the (k+1) domain is of the L-level.

89. The data decoding method as claimed in claim 85 wherein (n+1) items of the domain information from the bit information obtained from channel bit data directly previous to the (k+1) domain and next channel bit data and n-tupled clocks sandwiched in-between and (n+1) items of the domain information by the bit information obtained from channel bit data directly following the (k+1) domain, previous channel bit data and n-tupled clocks sandwiched in-between are split respectively into H-levels and L-levels with a comparison level as a boundary and wherein the number of the L-levels or that of the H-levels is used for designation as a correction bit position.

90. The data decoding method as claimed in claim 85 wherein (n+1) items of the domain information from the bit information obtained by channel bit data directly previous to the (k+1) domain and next channel bit data and n-tupled clocks sandwiched in-between and (n+1) items of the domain information by the bit information obtained from channel bit data directly following the (k+1) domain, previous channel bit data and n-tupled clocks sandwiched in-between are split respectively into H-levels and L-levels with a comparison level as a boundary and wherein, if the number of "0"s on transition from the L level to the H level is larger than the number of "0"s on transition from the H level to the L level, the backward side of the (k+1) domain is designated as the correction bit position, whereas, if the number of "0"s on transition from the H level to the L level is larger than the number of "0"s on transition from the L level to the H level, the forward side of the (k+1) domain is designated as the correction bit position.

91. The data decoding method as claimed in claim 85 wherein (n+1) items of the domain information from the bit information obtained by channel bit data directly previous to the (k+1) domain and next channel bit data and n-tupled clocks sandwiched in-between and (n+1) items of the domain information by the bit information obtained from channel bit data directly following the (k+1) domain, previous channel bit data and n-tupled clocks sandwiched in-between are split respectively into H-levels and L-levels with a comparison level as a boundary and wherein, if the number of "1"s on transition from the H level to the L level is larger than the number of "1"s on transition from the L level to the H level, the forward side of the (k+1) domain is designated as the correction bit position, whereas, if the number of "1"s on transition from the L level to the H level is larger than the number of "1"s on transition from the H level to the L level, the backward side of the (k+1) domain is designated as the correction bit position.

92. The data decoding method as claimed in claim 85 wherein (n+1) items of the domain information from the bit information by channel bit data directly previous to the (k+1) domain and next channel bit data and n-tupled clocks sandwiched in-between and (n+1) items of the domain information by the bit information obtained from channel bit data directly following the (k+1) domain, previous channel bit data and n-tupled clocks sandwiched in-between are split respectively into H-levels and L-levels with a comparison level as a boundary and wherein, if the domain information for the H levels is the same as that for the L-levels, the correction bit position is designated based on the previous correction bit position held on memory.

93. The data decoding method as claimed in claim 85 wherein (n+1) items of the domain information from the bit information obtained by bit data of a given channel clock and bit data of the next channel clock and n-tupled clocks sandwiched in-between are held on memory for designating a correction position of channel bit data having a run length of "0"s equal to (k+1).

94. The data decoding method as claimed in claim 85 wherein the bit information obtained from n-tupled clocks sandwiched between bit data of a given channel clock and bit data of the next channel clock is split with a comparison level as the boundary into the H-level and the L-level to give (n−1) items of the domain information for designating a correction position of channel bit data having a run length of "0"s equal to (k+1).

95. The data decoding method as claimed in claim 94 wherein (n−1) items of the domain information by the bit information obtained from n-tupled clocks sandwiched between channel bit data directly previous to the (k+1) domain and next channel bit data are compared to (n−1) items of the domain information by the bit information obtained from n-tupled clocks sandwiched between channel bit data directly following the (k+1) domain and previous channel bit data to select a correction bit position which is designated.

96. The data decoding method as claimed in claim 94 wherein (n−1) items of the domain information by the bit information obtained from n-tupled clocks sandwiched between channel bit data directly previous to the (k+1) domain and the next channel bit data and (n−1) items of the domain information by the bit information obtained from n-tupled clocks sandwiched between channel bit data directly following the (k+1) domain and previous channel bit data are split respectively into H-levels and L-levels with a comparison level as a boundary and wherein a correction bit position as selected depending on the relative magnitude of the H-levels or L-levels is designated.

97. The data decoding method as claimed in claim 94 wherein (n−1) items of the domain information by the bit information obtained from n-tupled clocks sandwiched between channel bit data directly previous to the (k+1) domain and the next channel bit data and (n−1) items of the domain information by the bit information obtained from n-tupled clocks sandwiched between channel bit data directly following the (k+1) domain and previous channel bit data are split respectively into H-levels and L-levels with a comparison level as a boundary and wherein a side with a smaller number of the H-levels is designated as a correction bit position if the (k+1) domain is of the H-level and a side with a smaller number of the L-levels is designated as a correction bit position if the (k+1) domain is of the L-level.

98. The data decoding method as claimed in claim 94 wherein (n−1) items of the domain information by the bit information obtained from n-tupled clocks sandwiched between channel bit data directly previous to the (k+1) domain and the next channel bit data and (n−1) items of the domain information by the bit information obtained from n-tupled clocks sandwiched between channel bit data directly following the (k+1) domain and previous channel bit data are split respectively into H-levels and L-levels with a comparison level as a boundary and wherein the number of the L-levels or that of the H-levels is used for designation as a correction bit position.

99. The data decoding method as claimed in claim 94 wherein (n−1) items of the domain information by the bit information obtained from n-tupled clocks sandwiched between channel bit data directly previous to the (k+1) domain and the next channel bit data and (n−1) items of the domain information by the bit information obtained from n-tupled clocks sandwiched between channel bit data directly following the (k+1) domain and previous channel bit data are split respectively into H-levels and L-levels with a comparison level as a boundary and wherein, if the number of "0"s on transition from the L level to the H level is larger than the number of "0"s on transition from the H level to the L level, the forward side of the (k+1) domain is designated as the correction bit position, whereas, if the number of "0"s on transition from the H level to the L level is larger than the number of "0"s on transition from the L level to the H level, the backward side of the (k+1) domain is designated as the correction bit position.

100. The data decoding method as claimed in claim 94 wherein (n−1) items of the domain information from the bit information obtained from n-tupled clocks sandwiched between channel bit data directly previous to the (k+1) domain and the next channel bit data and (n−1) items of the domain information by the bit information obtained from n-tupled clocks sandwiched between channel bit data directly following the (k+1) domain and previous channel bit data are split respectively into H-levels and L-levels with a comparison level as a boundary and wherein, if the number of "1"s on transition from the H level to the L level is larger than the number of "1"s on transition from the L level to the H level, the forward side of the (k+1) domain is designated as the correction bit position, whereas, if the number of "1"s on transition from the L level to the H level is larger than the number of "1"s on transition from the H level to the L level, the backward side of the (k+1) domain is designated as the correction bit position.

101. The data decoding method as claimed in claim 94 wherein (n−1) items of the domain information from the bit information obtained from n-tupled clocks sandwiched between channel bit data directly previous to the (k+1) domain and the next channel bit data and (n−1) items of the domain information by the bit information obtained from n-tupled clocks sandwiched between channel bit data directly following the (k+1) domain and previous channel bit data are split respectively into H-levels and L-levels with a comparison level as a boundary and wherein, if the domain information for the H levels is the same as that for the L-levels, the correction bit position is designated based on the previous correction bit position held on memory.

102. The data decoding method as claimed in claim 85 wherein (n−1) items of the domain information from the bit information obtained by n-tupled clocks sandwiched between bit data of a given channel clock and bit data of the next channel clock are held on memory for designating a correction position of channel bit data having a run length of "0"s equal to (k+1).

103. The data decoding method as claimed in claim 85 wherein n-items of the bit information including bit data of a given channel clock in the bit information obtained from n-tupled clocks are split into H-levels and L-levels with a comparison level as a boundary to give respective n-items of the domain information for designating a correction position of channel bit data having a run length of "0"s equal to (k+1).

104. The data decoding method as claimed in claim 103 wherein n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between are compared to each other to select a correction bit position which is designated.

105. The data decoding method as claimed in claim 103 wherein n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between are split respectively into H-levels and L-levels with a comparison level as a boundary and wherein a correction bit position as selected depending on the magnitude of the H-levels or L-levels is designated.

106. The data decoding method as claimed in claim 103 wherein n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between are split respectively into H-levels and L-levels with a comparison level as a boundary and wherein the number of the L-levels or that of the H-levels is used for designation as a correction bit position.

107. The data decoding method as claimed in claim 103 wherein n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between are split respectively into H-levels and L-levels with a comparison level as a boundary and wherein, if n-items of the domain information include backward side channel bit data, the forward side of the (k+1) domain is designated as the correction bit position in case the number of "0"s on transition from the L-level to the H-level plus 1 is larger than the number of "0"s on transition from the H-level to the L-level, while the backward side of the (k+1) domain is designated as the correction bit position in case the number of "0"s on transition from the H-level to the L-level is larger than the number of "0"s on transition from the L-level to the H-level plus 1.

108. The data decoding method as claimed in claim 103 wherein n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between are split respectively into H-levels and L-levels with a comparison level as a boundary and wherein, if n-items of the domain information include forward side channel bit data, the forward side of the (k+1) domain is designated as the correction bit position in case the number of "0"s on transition from the L-level to the H-level is larger than the number of "0"s on transition from the H-level to the L-level plus 1, while the backward side of the (k+1) domain is designated as the correction bit position in case the number of "0"s on transition from the H-level to the L-level plus 1 is larger than the number of "0"s on transition from the L-level to the H-level.

109. The data decoding method as claimed in claim 103 wherein n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between are split respectively into H-levels and L-levels with a comparison level as a boundary and wherein, if n-items of the domain information include backward side channel bit data, the forward side of the (k+1) domain is designated as the correction bit position in case the number of "1"s on transition from the H-level to the L-level plus 1 is larger than the number of "1"s on transition from the L-level to the H-level, while the backward side of the (k+1) domain is designated as the correction bit position in case the number of "1"s on transition from the L-level to the H-level is larger than the number of "1"s on transition from the H-level to the L-level plus 1.

110. The data decoding method as claimed in claim 103 wherein n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between are split respectively into H-levels and L-levels with a comparison level as a boundary and wherein, if n-items of the domain information include forward side channel bit data, the forward side of the (k+1) domain is designated as the correction bit position in case the number of "1"s on transition from the H-level to the L-level is larger than the number of "1"s on transition from the L-level to the H-level plus 1, while the backward side of the (k+1) domain is designated as the correction bit position in case the number of "1"s on transition from the L-level to the H-level plus 1 is larger than the number of "1"s on transition from the H-level to the L-level.

111. The data decoding method as claimed in claim 103 wherein n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between are split respectively into H-levels and L-levels with a comparison level as a boundary and wherein, if the domain information for the H levels is the same as that for the L-levels, the correction bit position is designated based on the previous correction bit position held on memory.

112. The data decoding method as claimed in claim 85 wherein, form n-items of the bit information including bit data of a given channel clock in the bit information obtained from n-tupled clocks, plural domain information items consisting of n bits are held on memory for designating a correction position of n bits are held on memory for designating a correction position of channel bit data having a run length of the same symbol equal to (k'+1).

113. A data decoding apparatus for playing back signals from a recording medium having recording codes recorded thereon, said recording codes being NRZI modulated codes having a minimum run length of "0"s between neighboring "1"s in a code string equal to d, said recording codes having a minimum run length of the same symbol equal to d'=d+1, d being a positive integer, comprising:

a clock generator for n-tupling channel clocks of channel clocks, n being an integer not less than 2;

a (d'−1) detector for detecting channel bit data having a run length of the same symbol equal to (d'−1);

a correction bit position detector for outputting a correction bit position designating signal for designating a correction position for channel bit data having the run length of the same symbol equal to (d'−1) as detected by said (d'−1) detector; and a data correction unit for correcting the channel bit data having the run length of the same symbol equal to (d'−1) as detected by said (d'−1) detector, based on the correction bit position designating signal of said correction bit position detector so that the run length of the same symbol will be equal to d';

wherein the signal read from the recording medium is decoded at least at a comparison level to output channel bit data; and wherein said correction bit position detector has (n+1) items of the domain information which is obtained on splitting bit information obtained by splitting bit data of a given channel clock and bit data of the next channel clock and n-tupled clocks sandwiched in-between with the comparison level as the boundary into H-level and L-level.

114. The data decoding apparatus as claimed in claim 113 wherein (n+1) items of the domain information by the bit information obtained by channel bit data directly previous to the (d'−1) domain and next channel bit data and n-tupled clocks sandwiched in-between are compared to (n+1) items of the domain information by the bit information obtained from channel bit data directly following the (d'−1) domain, previous channel bit data and n-tupled clocks sandwiched in-between to output a correction bit position designating signal designating a selected correction bit position.

115. The data decoding apparatus as claimed in claim 113 wherein (n+1) items of the domain information by the bit information obtained by channel bit data directly previous to the (d'−1) domain and next channel bit data and n-tupled clocks sandwiched in-between and (n+1) items of the domain information by the bit information obtained from channel bit data directly following the (d'−1) domain, previous channel bit data and n-tupled clocks sandwiched in-between are split into H-levels and L-levels with a comparison level as a boundary to output a correction bit position designating signal designating a correction bit position selected depending on the relative magnitudes of the H levels and L-levels.

116. The data decoding apparatus as claimed in claim 113 wherein (n+1) items of the domain information by the bit information obtained by channel bit data directly previous to the (d'−1) domain and next channel bit data and n-tupled clocks sandwiched in-between and (n+1) items of the domain information by the bit information obtained from channel bit data directly following the (d'−1) domain, previous channel bit data and n-tupled clocks sandwiched in-between are split into H-levels and L-levels with a comparison level as a boundary to output a correction bit position designating signal designating a side with a larger number of the H-levels as a correction bit position if the (d'−1) domain is of the H-level and a side with a larger number of the L-levels as a correction bit position if the (d'−1) domain is of the L-level.

117. The data decoding apparatus as claimed in claim 113 wherein (n+1) items of the domain information by the bit information obtained by channel bit data directly previous to the (d'−1) domain and next channel bit data and n-tupled clocks sandwiched in-between and (n+1) items of the domain information by the bit information obtained from channel bit data directly following the (d'−1) domain, previous channel bit data and n-tupled clocks sandwiched in-between are split into H-levels and L-levels with a comparison level as a boundary to output a correction bit position designating signal designating a correction bit position using the number of the L-levels or that of the H-levels.

118. The data decoding apparatus as claimed in claim 113 wherein (n+1) items of the domain information by the bit information obtained by channel bit data directly previous to the (d'−1) domain and next channel bit data and n-tupled clocks sandwiched in-between and (n+1) items of the domain information by the bit information obtained from channel bit data directly following the (d'−1) domain, previous channel bit data and n-tupled clocks sandwiched in-between are split into H-levels and L-levels with a comparison level as a boundary to output a correction bit position designating signal designating the backward side or the forward side of the (d'−1) domain as the correction bit position if the number of "0"s on transition from the L level to the H level is larger than the number of "0"s on transition from the H level to the L level or if the number of "0"s on transition from the H level to the L level is larger than the number of "0"s on transition from the L level to the H level, respectively.

119. The data decoding apparatus as claimed in claim 113 wherein (n+1) items of the domain information by the bit information obtained by channel bit data directly previous to the (d'−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between are split into H-levels and L-levels with a comparison level as a boundary to output a correction bit position designating signal designating the backward side or the forward side of the (d'−1) domain as the correction bit position if the number of "1"s on transition from the H level to the L level is larger than the number of "1"s on transition from the L level to the H level or if the number of "1"s on transition from the L level to the H level is larger than the number of "1"s on transition from the H level to the L level, respectively.

120. The data decoding apparatus as claimed in claim 113 wherein (n+1) items of the domain information by the bit information obtained by channel bit data directly previous to the (d'−1) domain and next channel bit data and n-tupled clocks sandwiched in-between and (n+1) items of the domain information by the bit information obtained from channel bit data directly following the (d'−1) domain, previous channel bit data and n-tupled clocks sandwiched in-between are split into H-levels and L-levels with a comparison level as a boundary to output a correction bit position designating signal designating a correction bit position based on the previous correction bit position held on memory if the domain information for the H levels is the same as that for the L-levels.

121. The data decoding apparatus as claimed in claim 113 wherein said correction bit position detector stores (n+1) items of the domain information from the bit information obtained by bit data of a given channel clock and next bit data of the next channel clock and n-tupled clocks sandwiched in-between.

122. The data decoding apparatus as claimed in claim 113 wherein said correction bit position detector has (n−1) items of the domain information which is obtained on splitting the bit information obtained from n-tupled clocks sandwiched between bit data of a given channel clock and bit data of the next channel clock with a comparison level as the boundary into the H-level and the L-level.

123. The data decoding apparatus as claimed in claim 122 wherein said correction bit position detector compares (n−1) items of the domain information by the bit information obtained from n-tupled clocks sandwiched between channel bit data directly previous to the (d'−1) domain and next channel bit data to (n−1) items of the domain information by the bit information obtained from n-tupled clocks sandwiched between channel bit data directly following the (d'−1) domain and previous channel bit data to output a correction bit position designating signal designating a selected correction bit position.

124. The data decoding apparatus as claimed in claim 122 wherein said correction bit position detector splits (n−1) items of the domain information by the bit information obtained from n-tupled clocks sandwiched between channel bit data directly previous to the (d'−1) domain and the next channel bit data and (n−1) items of the domain information by the bit information obtained from n-tupled clocks sandwiched between channel bit data directly following the (d'−1) domain and previous channel bit data respectively into H-levels and L-levels with a comparison level as a boundary to output a correction bit position designating signal designating a correction bit position as selected depending on the relative magnitude of the H-levels or L-levels.

125. The data decoding apparatus as claimed in claim 122 wherein said correction bit position detector splits (n−1)

items of the domain information by the bit information obtained from n-tupled clocks sandwiched between channel bit data directly previous to the (d'−1) domain and the next channel bit data and (n−1) items of the domain information by the bit information obtained from n-tupled clocks sandwiched between channel bit data directly following the (d'−1) domain and previous channel bit data are split respectively into H-levels and L-levels with a comparison level as a boundary to output a correction bit position designating signal designating a side with a larger number of the H-levels as a correction bit position if the (d'−1) domain is of the H-level and a side with a larger number of the L-levels as a correction bit position if the (d'−1) domain is of the L-level.

126. The data decoding apparatus as claimed in claim 122 wherein said correction bit position detector splits (n−1) items of the domain information by the bit information obtained from n-tupled clocks sandwiched between channel bit data directly previous to the (d'−1) domain and the next channel bit data and (n−1) items of the domain information by the bit information obtained from n-tupled clocks sandwiched between channel bit data directly following the (d'−1) domain and previous channel bit data respectively into H-levels and L-levels with a comparison level as a boundary to output a correction bit position designating signal designating a correction bit position using the number of the L-levels or that of the H-levels.

127. The data decoding apparatus as claimed in claim 122 wherein said correction bit position detector splits (n−1) items of the domain information by the bit information obtained from n-tupled clocks sandwiched between channel bit data directly previous to the (d'−1) domain and the next channel bit data and (n−1) items of the domain information by the bit information obtained from n-tupled clocks sandwiched between channel bit data directly following the (d'−1) domain and previous channel bit data respectively into H-levels and L-levels with a comparison level as a boundary to output a correction bit position designating the backward side or the forward side of the (d'−1) domain as a correction bit position if the number of "0"s on transition from the L level to the H level is larger than the number of "0"s on transition from the H level to the L level or if the number of "0"s on transition from the H level to the L level is larger than the number of "0"s on transition from the L level to the H level, respectively.

128. The data decoding apparatus as claimed in claim 122 wherein said correction bit position detector splits (n−1) items of the domain information from the bit information obtained from n-tupled clocks sandwiched between channel bit data directly previous to the (d'−1) domain and the next channel bit data and (n−1) items of the domain information by the bit information obtained from n-tupled clocks sandwiched between channel bit data directly following the (d'−1) domain and previous channel bit data respectively into H-levels and L-levels with a comparison level as a boundary to output a correction bit position designating the backward side or the forward side of the (d'−1) domain as a correction bit position if the number of "1"s on transition from the H level to the L level is larger than the number of "1"s on transition from the L level to the H level or if the number of "1"s on transition from the L level to the H level is larger than the number of "1"s on transition from the H level to the L level, respectively.

129. The data decoding apparatus as claimed in claim 122 wherein said correction bit position detector splits (n−1) items of the domain information from the bit information obtained from n-tupled clocks sandwiched between channel bit data directly previous to the (d'−1) domain and the next channel bit data and (n−1) items of the domain information by the bit information obtained from n-tupled clocks sandwiched between channel bit data directly following the (d'−1) domain and previous channel bit data respectively into H-levels and L-levels with a comparison level as a boundary to output a correction bit position designating signal designating the correction bit position based on the previous correction bit position held on memory if the domain information for the H levels is the same as that for the L-levels.

130. The data decoding apparatus as claimed in claim 113 wherein said correction bit position detector stores (n−1) items of the domain information from the bit information obtained by n-tupled clocks sandwiched between bit data of a given channel clock and bit data of the next channel clock.

131. The data decoding apparatus as claimed in claim 113 wherein said correction bit position detector has n-items of the domain information which are obtained on splitting n items of the bit information including bit data of a given channel clock in the bit information obtained from n-tupled clocks into H-levels and L-levels with a comparison level as a boundary.

132. The data decoding apparatus as claimed in claim 131 wherein said correction bit position detector compares n-items of the domain information by the bit information obtained by channel bit data directly previous to a (d'−1) domain or the next channel bit data and n-tupled clocks sandwiched in-between to n-items of the domain information by the bit information obtained from channel bit data directly following the (d'−1) domain or previous channel bit data and n-tupled clocks sandwiched in-between to output a correction bit position designating signal designating a selected correction bit position.

133. The data decoding apparatus as claimed in claim 131 wherein said correction bit position detector splits n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between respectively into H-levels and L-levels with a comparison level as a boundary to output a correction bit position designating signal designating a correction bit position as selected depending on the relative magnitude of the H-levels or L-levels.

134. The data decoding apparatus as claimed in claim 131 wherein said correction bit position detector splits n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between are split respectively into H-levels and L-levels with a comparison level as a boundary to output a correction bit position designating signal designating a correction bit position using the number of the L-levels or that of the H-levels.

135. The data decoding apparatus as claimed in claim 131 wherein said correction bit position detector splits n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between respectively into H-levels and L-levels with a comparison level as a boundary to output a correction bit position designating signal designating the backward side or the forward side of the (d'−1) domain as the correction bit position if, when n-items of the domain information include backward side channel bit data, the number of "0"s on transition from the L-level to the H-level plus 1 is larger than the number of "0"s on transition from the H-level to the L-level or if the number of "0"s on transition from the H-level to the L-level is larger than the number of "0"s on transition from the L-level to the H-level plus 1, respectively.

136. The data decoding apparatus as claimed in claim 131 wherein said correction bit position detector splits n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between respectively into H-levels and L-levels with a comparison level as a boundary to output a correction bit position designating signal designating a selected correction bit position designating signal designating the backward side or the forward side of the (d'−1) domain as the correction bit position if, when n-items of the domain information include forward side channel bit data, the number of "0"s on transition from the L-level to the H-level is larger than the number of "0"s on transition from the H-level to the L-level plus 1 or if the number of "0"s on transition from the H-level to the L-level plus 1 is larger than the number of "0"s on transition from the L-level to the H-level, respectively.

137. The data decoding apparatus as claimed in claim 131 wherein said correction bit position detector splits n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between respectively into H-levels and L-levels with a comparison level as a boundary to output a correction bit position designating signal designating the backward side or the forward side of the (d'−1) domain as the correction bit position if, when n-items of the domain information include backward side channel bit data, the number of "1"s on transition from the H-level to the L-level plus 1 is larger than the number of "1"s on transition from the L-level to the H-level, or in case the number of "1"s on transition from the L-level to the H-level is larger than the number of "1"s on transition from the H-level to the L-level plus one, respectively.

138. The data decoding apparatus as claimed in claim 131 wherein said correction bit position detector splits n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between respectively into H-levels and L-levels with a comparison level as a boundary to output a correction bit position designating signal designating the backward side of the (d'−1) domain as a correction bit position if, when n-items of the domain information include forward side channel bit data, the number of "1"s on transition from the H-level to the L-level is larger than the number of "1"s on transition from the L-level to the H-level plus 1 or if the number of "1"s on transition from the L-level to the H-level plus 1 is larger than the number of "1"s on transition from the H-level to the L-level, respectively.

139. The data decoding apparatus as claimed in claim 131 wherein said correction bit position detector splits n-items of the domain information by the bit information obtained by channel bit data directly previous to a (d'−1) domain or the next channel bit data and n-tupled clocks sandwiched in-between and n-items of the domain information by the bit information obtained from channel bit data directly following the (d'−1) domain or previous channel bit data and n-tupled clocks sandwiched in-between respectively into H-levels and L-levels with a comparison level as a boundary to output a correction bit position designating signal designating a correction bit position based on the previous correction bit position held on memory if the domain information for the H levels is the same as that for the L-levels.

140. The data decoding apparatus as claimed in claim 113 wherein said correction bit position detector stores plural domain information items consisting of n bits from n-items of the bit information including bit data of a given channel clock in the bit information obtained from n-tupled clocks.

141. A data decoding apparatus for playing back signals from a recording medium having recording codes recorded thereon, said recording codes being NRZI modulated codes having a minimum run length of "0"s between neighboring "1"s in a code string equal to d, said recording codes having a minimum run length of the same symbol equal to d'=d+1, d being a positive integer, comprising:

a clock generator for n-tupling channel clocks of channel clocks, n being an integer not less then 2;

a (d−1) detector for detecting channel bit data having a run length of the same symbol following inverse NRZI modulation equal to (d−1);

a correction bit position detector for outputting a correction bit position designating signal for designating a correction position for channel bit data having the run length of "0"s as detected by said (d−1) detector equal to (d−1); and a data correction unit for correcting the channel bit data having the run length of "0"s as detected by said (d−1) detector equal to (d−1), based on the correction bit position designating signal of said correction bit position detector, so that the run length of "0"s will be equal to d;

wherein the signal read from the recording medium is decoded at least at a comparison level to output channel bit data t output channel bit data in which the minimum run length of "0"s between neighboring "1"s in a code string is d; and wherein said correction bit position detector has (n+1) items of the domain information obtained on splitting bit information obtained by bit data of a given channel clock and bit data of the next channel clock and n-tupled clocks sandwiched in-between into H-level and L-level with the comparison level as the boundary.

142. The data decoding apparatus as claimed in claim 141 wherein said correction bit position detector compares (n+1) items of the domain information from the bit information obtained by channel bit data directly previous to the (d−1) domain and next channel bit data and n-tupled clocks sandwiched in-between are compared to (n+1) items of the domain information by the bit information obtained from channel bit data directly following the (d−1) domain, previous channel bit data and n-tupled clocks sandwiched in-between to output a correction bit position designating signal designating a selected correction bit position.

143. The data decoding apparatus as claimed in claim 141 wherein said correction bit position detector splits (n+1) items of the domain information from the bit information obtained by channel bit data directly previous to the (d−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between respectively into H-levels and L-levels with a comparison level as a boundary to output a correction bit position designating signal designating a correction bit position as selected depending on the relative magnitude of the H-levels or L-levels.

144. The data decoding apparatus as claimed in claim 141 wherein said correction bit position detector splits (n+1) items of the domain information from the bit information obtained by channel bit data directly previous to the (d−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between respectively into H-levels and L-levels with a comparison level as a boundary to output a correction bit position designating signal designating a side with a larger number of the H-levels or a side with a larger number of the H-levels as a correction bit position if the (d−1) domain is of the H-level or of the L-level, respectively.

145. The data decoding apparatus as claimed in claim 141 wherein said correction bit position detector splits (n+1) items of the domain information from the bit information obtained from channel bit data directly previous to the (d−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between respectively into H-levels and L-levels with a comparison level as a boundary to output a correction bit position designating signal designating a correction bit position using the number of the L-levels or that of the H-levels.

146. The data decoding apparatus as claimed in claim 141 wherein said correction bit position detector splits (n+1) items of the domain information from the bit information obtained by channel bit data directly previous to the (d−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between respectively into H-levels and L-levels with a comparison level as a boundary to output a correction bit position designating the backward side or the forward side of the (d−1) domain if the number of "0"s on transition from the L level to the H level is larger than the number of "0"s on transition from the H level to the L level or if the number of "0"s on transition from the H level to the L level is larger than the number of "0"s on transition from the L level to the H level, respectively.

147. The data decoding apparatus as claimed in claim 141 wherein said correction bit position detector splits (n+1) items of the domain information from the bit information obtained by channel bit data directly previous to the (d−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between respectively into H-levels and L-levels with a comparison level as a boundary to output a correction bit position designating signal designating the backward side or the forward side of the (d−1) domain as the correction bit position if the number of "1"s on transition from the H level to the L level is larger than the number of "1"s on transition from the L level to the H level or if the number of "1"s on transition from the L level to the H level is larger than the number of "1"s on transition from the H level to the L level, respectively.

148. The data decoding apparatus as claimed in claim 141 wherein said correction bit position detector splits (n+1) items of the domain information from the bit information by channel bit data directly previous to the (d−1) domain and next channel bit data and n-tupled clocks sandwiched in-between and (n+1) items of the domain information by the bit information obtained from channel bit data directly following the (d−1) domain, previous channel bit data and n-tupled clocks sandwiched in-between respectively into H-levels and L-levels with a comparison level as a boundary to output a correction bit position designating signal designating a correction bit position, based on the previous correction bit position designating signal held on memory, if the domain information for the H levels is the same as that for the L-levels.

149. The data decoding apparatus as claimed in claim 141 wherein said correction bit position detector stores (n+1) items of the domain information obtained on splitting the bit information obtained by bit data of a given channel clock and bit data of the next channel clock and n-tupled clocks sandwiched in-between into the H-level and the L-level with a comparison level as the boundary.

150. The data decoding apparatus as claimed in claim 141 wherein said correction bit position detector has (n−1) items of the domain information which is obtained on splitting the bit information obtained from n-tupled clocks sandwiched between bit data of a given channel clock and bit data of the next channel clock with a comparison level as the boundary into the H-level and the L-level.

151. The data decoding apparatus as claimed in claim 150 wherein said correction bit position detector compares (n−1) items of the domain information by the bit information obtained from n-tupled clocks sandwiched between channel bit data directly previous to the (d−1) domain and next channel bit data to (n−1) items of the domain information by the bit information obtained from n-tupled clocks sandwiched between channel bit data directly following the (d−1) domain and previous channel bit data to output a correction bit position designating signal designating a selected correction bit position.

152. The data decoding apparatus as claimed in claim 150 wherein said correction bit position detector splits (n−1) items of the domain information by the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data respectively into H-levels and L-levels with a comparison level as a boundary to output a correction bit position designating signal designating a correction bit position as selected depending on the relative magnitude of the H-levels or L-levels.

153. The data decoding apparatus as claimed in claim 150 wherein said correction bit position detector splits (n−1) items of the domain information by the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data respectively into H-levels and L-levels with a comparison level as a boundary to output a correction bit position designating signal designating a side with a larger number of the H-levels or a side with a larger number of the L-levels as a correction bit position if the (d−1) domain is of the H-level and is designated as a correction bit position if the (d−1) domain is of the L-level, respectively.

154. The data decoding apparatus as claimed in claim 150 wherein said correction bit position detector splits (n−1) items of the domain information by the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data respectively into H-levels and L-levels with a comparison level as a boundary to output a correction bit position designating signal designating a correction bit position using the number of the L-levels or that of the H-levels for designating the correction bit position.

155. The data decoding apparatus as claimed in claim 150 wherein said correction bit position detector splits (n−1) items of the domain information by the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data respectively into H-levels and L-levels with a comparison level as a boundary to output a correction bit position designating signal designating the backward side or the forward side of the (d−1) domain if the number of "0"s on transition from the L level to the H level is larger than the number of "0"s on transition from the H level to the L level or if the number of "0"s on transition from the H level to the L level is larger than the number of "0"s on transition from the L level to the H level, respectively.

156. The data decoding apparatus as claimed in claim 150 wherein said correction bit position detector splits (n−1) items of the domain information from the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data respectively into H-levels and L-levels with a comparison level as a boundary to output a correction bit position designating signal designating the backward side or the forward side of the (d−1) domain if the number of "1"s on transition from the H level to the L level is larger than the number of "1"s on transition from the L level to the H level or if the number of "1"s on transition from the L level to the H level is larger than the number of "1"s on transition from the H level to the L level, respectively.

157. The data decoding apparatus as claimed in claim 150 wherein said correction bit position detector splits (n−1) items of the domain information from the bit information obtained from n-tupled clocks sandwiched between channel bit data directly previous to the (d−1) domain and the next channel bit data and (n−1) items of the domain information by the bit information obtained from n-tupled clocks sandwiched between channel bit data directly following the (d−1) domain and previous channel bit data respectively into H-levels and L-levels for comparing the two with a comparison level as a boundary to output a correction bit position designating signal designating a correction bit position, based on the previous correction bit position held on memory, if the domain information for the H levels is the same as that for the L-levels.

158. The data decoding apparatus as claimed in claim 141 wherein said correction bit position detector stores (n−1) items of the domain information which is obtained from n-tupled clocks sandwiched between bit data of a given channel clock and bit data of the next channel clock.

159. The data decoding apparatus as claimed in claim 141 wherein said correction bit position detector has n-items of the domain information which is obtained on splitting the bit information including bit data of a given channel clock in the bit information obtained from n-tupled clocks into H-levels and L-levels with a comparison level as a boundary.

160. The data decoding apparatus as claimed in claim 159 wherein said correction bit position detector compares n-items of the domain information by the bit information obtained by channel bit data directly previous to a (d−1) domain or the next channel bit data and n-tupled clocks sandwiched in-between to n-items of the domain information by the bit information obtained from channel bit data directly following the (d−1) domain or previous channel bit data and n-tupled clocks sandwiched in-between to output a correction bit position designating signal designating a selected correction bit position.

161. The data decoding apparatus as claimed in claim 159 wherein said correction bit position detector splits n-items of the domain information by the bit information obtained by channel bit data directly previous to a (d−1) domain or the next channel bit data and n-tupled clocks sandwiched in-between to n-items of the domain information by the bit information obtained from channel bit data directly following the (d−1) domain or previous channel bit data and n-tupled clocks sandwiched in-between respectively into H-levels and L-levels with a comparison level as a boundary to output a correction bit position designating signal designating a correction bit position as selected depending on the relative magnitude of the H-levels or L-levels.

162. The data decoding apparatus as claimed in claim 159 wherein said correction bit position detector splits n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between respectively into H-levels and L-levels with a comparison level as a boundary to output a correction bit position designating signal designating a correction bit position using the number of the L-levels or that of the H-levels.

163. The data decoding apparatus as claimed in claim 159 wherein said correction bit position detector splits n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between respectively into H-levels and L-levels with a comparison level as a boundary to output a correction bit position designating signal designating the backward side or the forward side of the (d−1) domain as a correction bit position if, when n-items of the domain information include backward side channel bit data, the number of "0"s on transition from the L-level to the H-level plus 1 is larger than the number of "0"s on transition from the H-level to the L-level or the number of "0"s on transition from the H-level to the L-level is larger than the number of "0"s on transition from the L-level to the H-level plus 1.

164. The data decoding apparatus as claimed in claim 159 wherein said correction bit position detector splits n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between respectively into H-levels and L-levels with a comparison level as a boundary to output a correction bit position designating signal designating the backward side or the forward side of the (d−1) domain if, when n-items of the domain information include forward side channel bit data, the number of "0"s on transition from the L-level to the H-level is larger than the number of "0"s on transition from the H-level to the L-level plus 1 or the number of "0"s on transition from the H-level to the L-level plus 1 is larger than the number of "0"s on transition from the L-level to the H-level, respectively.

165. The data decoding apparatus as claimed in claim 159 wherein said correction bit position detector splits n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between respectively into H-levels and L-levels with a comparison level as a boundary to output a correction bit position designating signal designating the backward side or the forward side of the (d−1) domain as the correction bit position if, when n-items of the domain information include backward side channel bit data, the number of "1"s on transition from the H-level to the L-level plus 1 is larger than the number of "1"s on transition from the L-level to the H-level or if the number of "1"s on transition from the L-level to the H-level is larger than the number of "1"s on transition from the H-level to the L-level plus 1, respectively.

166. The data decoding apparatus as claimed in claim 159 wherein said correction bit position detector splits n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between respectively into H-levels and L-levels with a comparison level as a boundary to output a correction bit position designating signal designating the backward side or the forward side of the (d−1) domain as a correction bit position if, when n-items of the domain information include forward side channel bit data, the number of "1"s on transition from the H-level to the L-level is larger than the number of "1"s on transition from the L-level to the H-level plus 1, or the number of "1"s on transition from the L-level to the H-level plus 1 is larger than the number of "1"s on transition from the H-level to the L-level, respectively.

167. The data decoding apparatus as claimed in claim 141 wherein said correction bit position detector has n-items of the domain information which is obtained on splitting the bit information including bit data of a given channel clock in the bit information obtained from n-tupled clocks into H-levels and L-levels with a comparison level as a boundary.

168. The data decoding apparatus as claimed in claim 159 wherein said correction bit position detector splits n-items of the domain information by the bit information obtained by channel bit data directly previous to a (d−1) domain or the next channel bit data and n-tupled clocks sandwiched in-between and n-items of the domain information by the bit information obtained from channel bit data directly following the (d−1) domain or previous channel bit data and n-tupled clocks sandwiched in-between respectively into H-levels and L-levels with a comparison level as a boundary to output a correction bit position designating signal designating the correction bit position based on the previous correction bit position held on memory if the domain information for the H levels is the same as that for the L-levels.

169. A data decoding apparatus for playing back signals from a recording medium having recording codes recorded thereon, said recording medium having recording codes recorded thereon, said recording codes being NRZI modulated codes having a maximum run length of "0"s between neighboring "1"s in a code string equal to k, said recording codes having a maximum run length of the same symbol following inverse NRZI modulation equal to k'=k+1 where k>1 and k>d, comprising:

a clock generator for n-tupling channel clocks of channel clocks n being an integer not less than 2;

a (k'+1) detector for detecting channel bit data having a run length of the same symbol equal to (k'+1);

a correction bit position detector for outputting a correction bit position designating signal for designating a correction position for channel bit data having the run length of the same symbol as detected by said (k'+1) detector equal to (k'+1); and a data correction unit for correcting the channel bit data having the run length of the same symbol as detected by said (k'+1) detector equal to (k'+1), based on the correction bit position designating signal of said correction bit position detector, so that the run length of the same symbol will be equal to k';

wherein the signal read from the recording medium is decoded at least at a comparison level to output channel bit data to output channel bit data; and wherein said correction bit position detector has (n+1) items of the domain information obtained on splitting bit information obtained by bit data of a given channel clock and bit data of the next channel clock and n-tupled clocks sandwiched in-between into H-level and L-level with the comparison level as the boundary.

170. The data decoding apparatus as claimed in claim 169 wherein said correction bit position detector compares (n+1) items of the domain information from the bit information obtained by channel bit data directly previous to the (k'+1)

domain and next channel bit data and n-tupled clocks sandwiched in-between are compared to (n+1) items of the domain information by the bit information obtained from channel bit data directly following the (k'+1) domain, previous channel bit data and n-tupled clocks sandwiched in-between to output a correction bit position designating signal designating a selected correction bit position.

171. The data decoding apparatus as claimed in claim 169 wherein said correction bit position detector splits (n+1) items of the domain information from the bit information obtained by channel bit data directly previous to the (k'+1) domain and next channel bit data and n-tupled clocks sandwiched in-between and (n+1) items of the domain information by the bit information obtained from channel bit data directly following the (k'+1) domain, previous channel bit data and n-tupled clocks sandwiched in-between respectively into H-levels and L-levels with a comparison level as a boundary to output a correction bit position designating signal designating a correction bit position as selected depending on the relative magnitude of the H-levels or L-levels.

172. The data decoding apparatus as claimed in claim 169 wherein said correction bit position detector splits (n+1) items of the domain information from the bit information obtained by channel bit data directly previous to the (k'+1) domain and next channel bit data and n-tupled clocks sandwiched in-between and (n+1) items of the domain information by the bit information obtained from channel bit data directly following the (k'+1) domain, previous channel bit data and n-tupled clocks sandwiched in-between respectively into H-levels and L-levels with a comparison level as a boundary to output a correction bit position designating signal designating a side with a smaller number of the H-levels or a side with a smaller number of the L-levels as a correction bit position if the (k'+1) domain is of the H-level or of the L-level, respectively.

173. The data decoding apparatus as claimed in claim 169 wherein said correction bit position detector splits (n+1) items of the domain information from the bit information obtained from channel bit data directly previous to the (k'+1) domain and next channel bit data and n-tupled clocks sandwiched in-between and (n+1) items of the domain information by the bit information obtained from channel bit data directly following the (k'+1) domain, previous channel bit data and n-tupled clocks sandwiched in-between respectively into H-levels and L-levels with a comparison level as a boundary to output a correction bit position designating signal designating a correction bit position using the number of the L-levels or that of the H-levels.

174. The data decoding apparatus as claimed in claim 169 wherein said correction bit position detector splits (n+1) items of the domain information from the bit information obtained by channel bit data directly previous to the (k'+1) domain and next channel bit data and n-tupled clocks sandwiched in-between and (n+1) items of the domain information by the bit information obtained from channel bit data directly following the (k'+1) domain, previous channel bit data and n-tupled clocks sandwiched in-between respectively into H-levels and L-levels with a comparison level as a boundary to output a correction bit position designating the backward side or the forward side of the (k'+1) domain if the number of "0"s on transition from the L level to the H level is larger than the number of "0"s on transition from the H level to the L level or if the number of "0"s on transition from the H level to the L level is larger than the number of "0"s on transition from the L level to the H level, respectively.

175. The data decoding apparatus as claimed in claim 169 wherein said correction bit position detector splits (n+1) items of the domain information from the bit information obtained by channel bit data directly previous to the (k'+1) domain and next channel bit data and n-tupled clocks sandwiched in-between and (n+1) items of the domain information by the bit information obtained from channel bit data directly following the (k'+1) domain, previous channel bit data and n-tupled clocks sandwiched in-between respectively into H-levels and L-levels with a comparison level as a boundary to output a correction bit position designating signal designating the forward side or the backward side of the (k'+1) domain as the correction bit position if the number of "1"s on transition from the H level to the L level is larger than the number of "1"s on transition from the L level to the H level or if the number of "1"s on transition from the L level to the H level is larger than the number of "1"s on transition from the H level to the L level, respectively.

176. The data decoding apparatus as claimed in claim 169 wherein said correction bit position detector splits (n+1) items of the domain information from the bit information by channel bit data directly previous to the (k'+1) domain and next channel bit data and n-tupled clocks sandwiched in-between and (n+1) items of the domain information by the bit information obtained from channel bit data directly following the (k'+1) domain, previous channel bit data and n-tupled clocks sandwiched in-between respectively into H-levels and L-levels with a comparison level as a boundary to output a correction bit position designating signal designating a correction bit position, based on the previous correction bit position designating signal held on memory, if the domain information for the H levels is the same as that for the L-levels.

177. The data decoding apparatus as claimed in claim 169 wherein said correction bit position detector stores (n−1) items of the domain information from the bit information obtained from n-tupled clocks sandwiched between bit data of a given channel clock and bit data of the next channel clock.

178. The data decoding apparatus as claimed in claim 169 wherein said correction bit position detector stores (n+1) items of the domain information from the bit information obtained by bit data of a given channel clock and bit data of the next channel clock and n-tupled clocks sandwiched in-between into the H-level and the L-level with a comparison level as the boundary.

179. The data decoding apparatus as claimed in claim 169 wherein said correction bit position detector has (n−1) items of the domain information which is obtained on splitting the bit information obtained from n-tupled clocks sandwiched between bit data of a given channel clock and bit data of the next channel clock with a comparison level as the boundary into the H-level and the L-level.

180. The data decoding apparatus as claimed in claim 179 wherein said correction bit position detector compares (n−1) items of the domain information by the bit information obtained from n-tupled clocks sandwiched between channel bit data directly previous to the (k'+1) domain and next channel bit data to (n−1) items of the domain information by the bit information obtained from n-tupled clocks sandwiched between channel bit data directly following the (k'+1) domain and previous channel bit data to output a correction bit position designating signal designating a selected correction bit position.

181. The data decoding apparatus as claimed in claim 179 wherein said correction bit position detector splits (n−1) items of the domain information by the bit information obtained from n-tupled clocks sandwiched between channel bit data directly previous to the (k'+1) domain and the next channel bit data and (n−1) items of the domain information by the bit information obtained from n-tupled clocks sandwiched between channel bit data directly following the (k'+1) domain and previous channel bit data respectively into H-levels and L-levels with a comparison level as a boundary to output a correction bit position designating signal designating a correction bit position as selected depending on the relative magnitude of the H-levels or L-levels.

182. The data decoding apparatus as claimed in claim 179 wherein said correction bit position detector splits (n−1) items of the domain information by the bit information obtained from n-tupled clocks sandwiched between channel bit data directly previous to the (k'+1) domain and the next channel bit data and (n−1) items of the domain information by the bit information obtained from n-tupled clocks sandwiched between channel bit data directly following the (k'+1) domain and previous channel bit data respectively into H-levels and L-levels with a comparison level as a boundary to output a correction bit position designating signal designating a side with a smaller number of the H-levels or a side with a smaller number of the L-levels as a correction bit position if the (k'+1) domain is of the H-level or if the (k'+1) domain is of the L-level, respectively.

183. The data decoding apparatus as claimed in claim 179 wherein said correction bit position detector splits (n−1) items of the domain information by the bit information obtained from n-tupled clocks sandwiched between channel bit data directly previous to the (k'+1) domain and the next channel bit data and (n−1) items of the domain information by the bit information obtained from n-tupled clocks sandwiched between channel bit data directly following the (k'+1) domain and previous channel bit data respectively into H-levels and L-levels with a comparison level as a boundary to output a correction bit position designating signal designating a correction bit position using the number of the L-levels or that of the H-levels.

184. The data decoding apparatus as claimed in claim 179 wherein said correction bit position detector splits (n−1) items of the domain information by the bit information obtained from n-tupled clocks sandwiched between channel bit data directly previous to the (k'+1) domain and the next channel bit data and (n−1) items of the domain information by the bit information obtained from n-tupled clocks sandwiched between channel bit data directly following the (k'+1) domain and previous channel bit data respectively into H-levels and L-levels with a comparison level as a boundary to output a correction bit position designating signal designating the forward side or the backward side of the (k'+1) domain if the number of "0"s on transition from the L level to the H level is larger than the number of "0"s on transition from the H level to the L level or if the number of "0"s on transition from the H level to the L level is larger than the number of "0"s on transition from the L level to the H level, respectively.

185. The data decoding apparatus as claimed in claim 179 wherein said correction bit position detector splits (n−1) items of the domain information from the bit information obtained from n-tupled clocks sandwiched between channel bit data directly previous to the (k'+1) domain and the next channel bit data and (n−1) items of the domain information by the bit information obtained from n-tupled clocks sandwiched between channel bit data directly following the (k'+1) domain and previous channel bit data respectively into H-levels and L-levels with a comparison level as a boundary to output a correction bit position designating signal designating the forward side or the backward side of the (k'+1) domain if the number of "1"s on transition from the H level to the L level is larger than the number of "1"s on transition from the L level to the H level or if the number of "1"s on transition from the L level to the H level is larger than the number of "1"s on transition from the H level to the L level, respectively.

186. The data decoding apparatus as claimed in claim 179 wherein said correction bit position detector splits (n−1) items of the domain information from the bit information obtained from n-tupled clocks sandwiched between channel bit data directly previous to the (k'+1) domain and the next channel bit data and (n−1) items of the domain information by the bit information obtained from n-tupled clocks sandwiched between channel bit data directly following the (k'+1) domain and previous channel bit data respectively into H-levels and L-levels for comparing the two with a comparison level as a boundary to output a correction bit position designating signal designating a correction bit position, based on the previous correction bit position held on memory, if the domain information for the H levels is the same as that for the L-levels.

187. The data decoding apparatus as claimed in claim 169 wherein said correction bit position detector has n-items of the domain information which is obtained on splitting the bit information including bit data of a given channel clock in the bit information obtained from n-tupled clocks into H-levels and L-levels with a comparison level as a boundary.

188. The data decoding apparatus as claimed in claim 187 wherein said correction bit position detector compares n-items of the domain information by the bit information obtained by channel bit data directly previous to a (k'+1) domain or the next channel bit data and n-tupled clocks sandwiched in-between to n-items of the domain information by the bit information obtained from channel bit data directly following the (k'+1) domain or previous channel bit data and n-tupled clocks sandwiched in-between to output a correction bit position designating signal designating a selected correction bit position.

189. The data decoding apparatus as claimed in claim 187 wherein said correction bit position detector splits n-items of the domain information by the bit information obtained by channel bit data directly previous to a (k'+1) domain or the next channel bit data and n-tupled clocks sandwiched in-between to n-items of the domain information by the bit information obtained from channel bit data directly following the (k'+1) domain or previous channel bit data and n-tupled clocks sandwiched in-between respectively into H-levels and L-levels with a comparison level as a boundary to output a correction bit position designating signal designating a correction bit position as selected depending on the relative magnitude of the H-levels or L-levels.

190. The data decoding apparatus as claimed in claim 187 wherein said correction bit position detector splits n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between respectively into H-levels and L-levels with a comparison level as a boundary to output a correction bit position designating signal designating a correction bit position using the number of the L-levels or that of the H-levels.

191. The data decoding apparatus as claimed in claim 187 wherein said correction bit position detector splits n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between respectively into H-levels and L-levels with a comparison level as a boundary to output a correction bit position designating signal designating the forward side or the backward side of the (k'+1) domain as a correction bit position if, when n-items of the domain information include backward side channel bit data, the number of "0"s on transition from the L-level to the H-level plus 1 is larger than the number of "0"s on transition from the H-level to the L-level or the number of "0"s on transition from the H-level to the L-level is larger than the number of "0"s on transition from the L-level to the H-level plus 1.

192. The data decoding apparatus as claimed in claim 187 wherein said correction bit position detector splits n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between respectively into H-levels and L-levels with a comparison level as a boundary to output a correction bit position designating signal designating the forward side or the backward side of the (k'+1) domain if, when n-items of the domain information include forward side channel bit data, the number of "0"s on transition from the L-level to the H-level is larger than the number of "0"s on transition from the H-level to the L-level plus 1 or the number of "0"s on transition from the H-level to the L-level plus 1 is larger than the number of "0"s on transition from the L-level to the H-level, respectively.

193. The data decoding apparatus as claimed in claim 187 wherein said correction bit position detector splits n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between respectively into H-levels and L-levels with a comparison level as a boundary to output a correction bit position designating signal designating the forward side or the backward side of the (k'+1) domain as the correction bit position if, when n-items of the domain information include backward side channel bit data, the number of "1"s on transition from the H-level to the L-level plus 1 is larger than the number of "1"s on transition from the L-level to the H-level or if the number of "1"s on transition from the L-level to the H-level is larger than the number of "1"s on transition from the H-level to the L-level plus 1, respectively.

194. The data decoding apparatus as claimed in claim 187 wherein said correction bit position detector splits n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between respectively into H-levels and L-levels with a comparison level as a boundary to output a correction bit position designating signal designating the forward side or the backward side of the (k'+1) domain as a correction bit position if, when n-items of the domain information include forward side channel bit data, the number of "1"s on transition from the H-level to the L-level is larger than the number of "1"s on transition from the L-level to the H-level plus 1, or the number of "1"s on transition from the L-level to the H-level plus 1 is larger than the number of "1"s on transition from the H-level to the L-level, respectively.

195. The data decoding apparatus as claimed in claim 187 wherein said correction bit position detector splits n-items of the domain information by the bit information obtained by channel bit data directly previous to a (k'+1) domain or the next channel bit data and n-tupled clocks sandwiched in-between and n-items of the domain information by the bit information obtained from channel bit data directly following the (k'+1) domain or previous channel bit data and n-tupled clocks sandwiched in-between respectively into H-levels and L-levels with a comparison level as a boundary to output a correction bit position designating signal designating a correction bit position based on the previous correction bit position designating signal held on memory if the domain information for the H levels is the same as that for the L-levels.

196. The data decoding apparatus as claimed in claim 169 wherein said correction bit position detector stores n-items of the domain information from n-items of the bit information including bit data of a given channel clock in the bit information obtained from n-tupled clocks.

197. A data decoding apparatus for playing back signals from a recording medium having recording codes recorded thereon, said recording codes being NRZI modulated codes having a maximum run length of "0"s between neighboring "1"s in a code string equal to k, said recording codes having a maximum run length of the same symbol following inverse NRZI modulation equal to k'=k+1, where k>1 and k>d, comprising:

a clock generator form-tupling channel clocks where n is an integer not less than 2;

a (k+1) detector for detecting channel bit data having a run length of "0"s following inverse NRZI modulation equal to (k+1);

a correction bit position detector for outputting a correction bit position designating signal for designating a correction position for channel bit data having the run length of "0"s as detected by said (k+1) detector equal to (k+1); and a data correction unit for correcting the channel bit data having the run length of "0"s as detected by said (k+1) detector equal to (k+1), based on the correction bit position designating signal of said correction bit position detector, so that the run length of "0"s will be equal to k;

wherein the signal read from the recording medium is decoded at least at a comparison level to output channel bit data in which the maximum run length of "0"s between neighboring "1"s in a code string is k; and wherein said correction bit position detector has (n+1) items of the domain information obtained on splitting bit information obtained by bit data of a given channel clock and bit data of the next channel clock and n-tupled clocks sandwiched in-between into H-level and L-level with the comparison level as the boundary.

198. The data decoding apparatus as claimed in claim 197 wherein said correction bit position detector compares (n+1)

items of the domain information from the bit information obtained by channel bit data directly previous to the (k+1) domain and next channel bit data and n-tupled clocks sandwiched in-between to (n+1) items of the domain information by the bit information obtained from channel bit data directly following the (k+1) domain, previous channel bit data and n-tupled clocks sandwiched in-between to output a correction bit position designating signal designating a selected a correction bit position.

199. The data decoding apparatus as claimed in claim 197 wherein said correction bit position detector splits (n+1) items of the domain information from the bit information obtained by channel bit data directly previous to the (k+1) domain and next channel bit data and n-tupled clocks sandwiched in-between and (n+1) items of the domain information by the bit information obtained from channel bit data directly following the (k+1) domain, previous channel bit data and n-tupled clocks sandwiched in-between respectively into H-levels and L-levels with a comparison level as a boundary to output a correction bit position designating signal designating a correction bit position as selected depending on the relative magnitude of the H-levels or L-levels.

200. The data decoding apparatus as claimed in claim 197 wherein said correction bit position detector splits (n+1) items of the domain information from the bit information obtained by channel bit data directly previous to the (k+1) domain and next channel bit data and n-tupled clocks sandwiched in-between and (n+1) items of the domain information by the bit information obtained from channel bit data directly following the (k+1) domain, previous channel bit data and n-tupled clocks sandwiched in-between respectively into H-levels and L-levels with a comparison level as a boundary to output a correction bit position designating signal designating a side with a smaller number of the H-levels or a side with a smaller number of the L-levels as a correction bit position if the (k+1) domain is of the H-level or of the L-level, respectively.

201. The data decoding apparatus as claimed in claim 197 wherein said correction bit position detector splits (n+1) items of the domain information from the bit information obtained from channel bit data directly previous to the (k+1) domain and next channel bit data and n-tupled clocks sandwiched in-between and (n+1) items of the domain information by the bit information obtained from channel bit data directly following the (k+1) domain, previous channel bit data and n-tupled clocks sandwiched in-between respectively into H-levels and L-levels with a comparison level as a boundary to output a correction bit position designating signal designating a correction bit position using the number of the L-levels or that of the H-levels.

202. The data decoding apparatus as claimed in claim 197 wherein said correction bit position detector splits (n+1) items of the domain information from the bit information obtained by channel bit data directly previous to the (k+1) domain and next channel bit data and n-tupled clocks sandwiched in-between and (n+1) items of the domain information by the bit information obtained from channel bit data directly following the (k+1) domain, previous channel bit data and n-tupled clocks sandwiched in-between respectively into H-levels and L-levels with a comparison level as a boundary to output a correction bit position designating the forward side or the backward side of the (k+1) domain if the number of "0"s on transition from the L level to the H level is larger than the number of "0"s on transition from the H level to the L level or if the number of "0"s on transition from the H level to the L level is larger than the number of "0"s on transition from the L level to the H level, respectively.

203. The data decoding apparatus as claimed in claim 197 wherein said correction bit position detector splits (n+1) items of the domain information from the bit information obtained by channel bit data directly previous to the (k+1) domain and next channel bit data and n-tupled clocks sandwiched in-between and (n+1) items of the domain information by the bit information obtained from channel bit data directly following the (k+1) domain, previous channel bit data and n-tupled clocks sandwiched in-between respectively into H-levels and L-levels with a comparison level as a boundary to output a correction bit position designating signal designating the forward side or the backward side of the (k+1) domain as the correction bit position if the number of "1"s on transition from the H level to the L level is larger than the number of "1"s on transition from the L level to the H level or if the number of "1"s on transition from the L level to the H level is larger than the number of "1"s on transition from the H level to the L level, respectively.

204. The data decoding apparatus as claimed in claim 197 wherein said correction bit position detector splits (n+1) items of the domain information from the bit information by channel bit data directly previous to the (k+1) domain and next channel bit data and n-tupled clocks sandwiched in-between and (n+1) items of the domain information by the bit information obtained from channel bit data directly following the (k+1) domain, previous channel bit data and n-tupled clocks sandwiched in-between respectively into H-levels and L-levels with a comparison level as a boundary to output a correction bit position designating signal designating a correction bit position, based on the previous correction bit position designating signal held on memory, if the domain information for the H levels is the same as that for the L-levels.

205. The data decoding apparatus as claimed in claim 197 wherein said correction bit position detector stores (n+1) items of the domain information from the bit information obtained by bit data of a given channel clock and bit data of the next channel clock and n-tupled clocks sandwiched in-between.

206. The data decoding apparatus as claimed in claim 197 wherein said correction bit position detector has (n−1) items of the domain information which is obtained on splitting the bit information obtained from n-tupled clocks sandwiched between bit data of a given channel clock and bit data of the next channel clock with a comparison level as the boundary into the H-level and the L-level.

207. The data decoding apparatus as claimed in claim 206 wherein said correction bit position detector compares (n−1) items of the domain information by the bit information obtained from n-tupled clocks sandwiched between channel bit data directly previous to the (k+1) domain and next channel bit data to (n−1) items of the domain information by the bit information obtained from n-tupled clocks sandwiched between channel bit data directly following the (k+1) domain and previous channel bit data to output a correction bit position designating signal designating a selected correction bit position.

208. The data decoding apparatus as claimed in claim 206 wherein said correction bit position detector splits (n−1) items of the domain information by the bit information obtained from n-tupled clocks sandwiched between channel bit data directly previous to the (k+1) domain and the next channel bit data and (n−1) items of the domain information by the bit information obtained from n-tupled clocks sandwiched between channel bit data directly following the (k+1) domain and previous channel bit data respectively into H-levels and L-levels with a comparison level as a boundary to output a correction bit position designating signal designating a correction bit position as selected depending on the relative magnitude of the H-levels or L-levels.

209. The data decoding apparatus as claimed in claim 206 wherein said correction bit position detector splits (n−1) items of the domain information by the bit information obtained from n-tupled clocks sandwiched between channel bit data directly previous to the (k+1) domain and the next channel bit data and (n−1) items of the domain information by the bit information obtained from n-tupled clocks sandwiched between channel bit data directly following the (k+1) domain and previous channel bit data respectively into H-levels and L-levels with a comparison level as a boundary to output a correction bit position designating signal designating a side with a smaller number of the H-levels or a side with a smaller number of the L-levels as a correction bit position if the (k+1) domain is of the H-level or of the L-level, respectively.

210. The data decoding apparatus as claimed in claim 206 wherein said correction bit position detector splits (n−1) items of the domain information by the bit information obtained from n-tupled clocks sandwiched between channel bit data directly previous to the (k+1) domain and the next channel bit data and (n−1) items of the domain information by the bit information obtained from n-tupled clocks sandwiched between channel bit data directly following the (k+1) domain and previous channel bit data respectively into H-levels and L-levels with a comparison level as a boundary to output a correction bit position designating signal designating a correction bit position using the number of the L-levels or that of the H-levels.

211. The data decoding apparatus as claimed in claim 206 wherein said correction bit position detector splits (n−1) items of the domain information by the bit information obtained from n-tupled clocks sandwiched between channel bit data directly previous to the (k+1) domain and the next channel bit data and (n−1) items of the domain information by the bit information obtained from n-tupled clocks sandwiched between channel bit data directly following the (k+1) domain and previous channel bit data respectively into H-levels and L-levels with a comparison level as a boundary to output a correction bit position designating signal designating the forward side or the backward side of the (k+1) domain if the number of "0"s on transition from the L level to the H level is larger than the number of "0"s on transition from the H level to the L level or if the number of "0"s on transition from the H level to the L level is larger than the number of "0"s on transition from the L level to the H level, respectively.

212. The data decoding apparatus as claimed in claim 206 wherein said correction bit position detector splits (n−1) items of the domain information from the bit information obtained from n-tupled clocks sandwiched between channel bit data directly previous to the (k+1) domain and the next channel bit data and (n−1) items of the domain information by the bit information obtained from n-tupled clocks sandwiched between channel bit data directly following the (k+1) domain and previous channel bit data respectively into H-levels and L-levels with a comparison level as a boundary to output a correction bit position designating signal designating the forward side or the backward side of the (k+1) domain if the number of "1"s on transition from the H level to the L level is larger than the number of "1"s on transition from the L level to the H level or if the number of "1"s on transition from the L level to the H level is larger than the number of "1"s on transition from the H level to the L level, respectively.

213. The data decoding apparatus as claimed in claim 206 wherein said correction bit position detector splits (n−1) items of the domain information from the bit information obtained from n-tupled clocks sandwiched between channel bit data directly previous to the (k+1) domain and the next channel bit data and (n−1) items of the domain information by the bit information obtained from n-tupled clocks sandwiched between channel bit data directly following the (k+1) domain and previous channel bit data respectively into H-levels and L-levels for comparing the two with a comparison level as a boundary to output a correction bit position designating signal designating a correction bit position, based on the previous correction bit position designating signal held on memory, if the domain information for the H levels is the same as that for the L-levels.

214. The data decoding apparatus as claimed in claim 197 wherein said correction bit position detector stores (n−1) items of the domain information from the bit information obtained from n-tupled clocks sandwiched between bit data of a given channel clock and bit data of the next channel clock.

215. The data decoding apparatus as claimed in claim 196 wherein said correction bit position detector has n-items of the domain information which is obtained on splitting n-items of the bit information including bit data of a given channel clock in the bit information obtained from n-tupled clocks into H-levels and L-levels with a comparison level as a boundary.

216. The data decoding apparatus as claimed in claim 215 wherein said correction bit position detector compares n-items of the domain information by the bit information obtained by channel bit data directly previous to a (k+1) domain or the next channel bit data and n-tupled clocks sandwiched in-between to n-items of the domain information by the bit information obtained from channel bit data directly following the (k+1) domain or previous channel bit data and n-tupled clocks sandwiched in-between to output a correction bit position designating signal designating a selected correction bit position.

217. The data decoding apparatus as claimed in claim 215 wherein said correction bit position detector splits n-items of the domain information by the bit information obtained by channel bit data directly previous to a (k+1) domain or the next channel bit data and n-tupled clocks sandwiched in-between to n-items of the domain information by the bit information obtained from channel bit data directly following the (k+1) domain or previous channel bit data and n-tupled clocks sandwiched in-between respectively into H-levels and L-levels with a comparison level as a boundary to output a correction bit position designating signal designating a correction bit position as selected depending on the relative magnitude of the H-levels or L-levels.

218. The data decoding apparatus as claimed in claim 215 wherein said correction bit position detector splits n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between respectively into H-levels and L-levels with a comparison level as a boundary to output a correction bit position designating signal designating a correction bit position using the number of the L-levels or that of the H-levels.

219. The data decoding apparatus as claimed in claim 215 wherein said correction bit position detector splits n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between respectively into H-levels and L-levels with a comparison level as a boundary to output a correction bit position designating signal designating the forward side or the backward side of the (k+1) domain as a correction bit position if, when n-items of the domain information include backward side channel bit data, the number of "0"s on transition from the L-level to the H-level plus 1 is larger than the number of "0"s on transition from the H-level to the L-level or the number of "0"s on transition from the H-level to the L-level is larger than the number of "0"s on transition from the L-level to the H-level plus 1.

220. The data decoding apparatus as claimed in claim 215 wherein said correction bit position detector splits n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between respectively into H-levels and L-levels with a comparison level as a boundary to output a correction bit position designating signal designating the forward side or the backward side of the (k+1) domain if, when n-items of the domain information include forward side channel bit data, the number of "0"s on transition from the L-level to the H-level is larger than the number of "0"s on transition from the H-level to the L-level plus 1 or the number of "0"s on transition from the H-level to the L-level plus 1 is larger than the number of "0"s on transition from the L-level to the H-level, respectively.

221. The data decoding apparatus as claimed in claim 215 wherein said correction bit position detector splits n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between respectively into H-levels and L-levels with a comparison level as a boundary to output a correction bit position designating signal designating the forward side or the backward side of the (k+1) domain as the correction bit position if, when n-items of the domain information include backward side channel bit data, the number of "1"s on transition from the H-level to the L-level plus 1 is larger than the number of "1"s on transition from the L-level to the H-level or if the number of "1"s on transition from the L-level to the H-level is larger than the number of "1"s on transition from the H-level to the L-level plus 1, respectively.

222. The data decoding apparatus as claimed in claim 215 wherein said correction bit position detector splits n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between respectively into H-levels and L-levels with a comparison level as a boundary to output a correction bit position designating signal designating the forward side or the backward side of the (k+1) domain as a correction bit position if, when n-items of the domain information include forward side channel bit data, the number of "1"s on transition from the H-level to the L-level is larger than the number of "1"s on transition from the L-level to the H-level plus 1, or the number of "1"s on transition from the L-level to the H-level plus 1 is larger than the number of "1"s on transition from the H-level to the L-level, respectively.

223. The data decoding apparatus as claimed in claim 215 wherein said correction bit position detector splits n-items of the domain information by the bit information obtained by channel bit data directly previous to a (k+1) domain or the next channel bit data and n-tupled clocks sandwiched in-between and n-items of the domain information by the bit information obtained from channel bit data directly following the (k+1) domain or previous channel bit data and n-tupled clocks sandwiched in-between respectively into H-levels and L-levels with a comparison level as a boundary to output a correction bit position designating signal designating a correction bit position based on the previous correction bit position designating signal held on memory if the domain information for the H levels is the same as that for the L-levels.

224. The data decoding apparatus as claimed in claim 197 wherein said correction bit position detector stores n-items of the domain information obtained on splitting n-items of the bit information including bit data of a given channel clock in the bit information obtained from n-tupled clocks.

* * * * *